US012669362B2

(12) United States Patent
Anderson

(10) Patent No.: US 12,669,362 B2
(45) Date of Patent: Jun. 30, 2026

(54) SYSTEM AND METHOD FOR DETERMINING CONTENT UTILIZING EXTERNALLY MOUNTED CONTAINER MONITORING SYSTEM

(71) Applicant: BARREL PROOF TECHNOLOGIES LLC, Murfreesboro, TN (US)

(72) Inventor: Brian Richard Anderson, Murfreesboro, TN (US)

(73) Assignee: BARREL PROOF TECHNOLOGIES LLC, Murfreesboro, TN (US)

( * ) Notice: Subject to any disclaimer, the term of this patent is extended or adjusted under 35 U.S.C. 154(b) by 0 days.

(21) Appl. No.: 19/182,441

(22) Filed: Apr. 17, 2025

(65) Prior Publication Data

US 2025/0244159 A1 Jul. 31, 2025

Related U.S. Application Data

(63) Continuation-in-part of application No. 19/080,723, filed on Mar. 14, 2025, now Pat. No. 12,422,295.

(Continued)

(51) Int. Cl.
*G01F 23/284* (2006.01)
*G01F 23/80* (2022.01)

(52) U.S. Cl.
CPC .......... *G01F 23/284* (2013.01); *G01F 23/802* (2022.01)

(58) Field of Classification Search
CPC ..... G01F 23/284; G01F 23/802; G01N 22/00; G01N 22/04

(Continued)

(56) References Cited

U.S. PATENT DOCUMENTS 1,854,122 A    4/1932 Eaton
3,953,856 A    4/1976 Hammack
(Continued)

FOREIGN PATENT DOCUMENTS

CN    11707550 A    11/2023

OTHER PUBLICATIONS

Mulloni, Viviana, et al. "Chipless RFID Sensing System for Precise Ethanol Determination in Alcoholic Solutions," MDPI, Electronics 2022, https://doi.org/10.3390/electronics11050735, 11 pages.
(Continued)

*Primary Examiner* — Michael P Nghiem

(57) ABSTRACT

A system for measuring changes in a fluid stored within a container is disclosed. The system may include a radio-frequency sensing element disposed externally on the container and configured to generate a signal indicative of at least one dielectric property of the fluid, wherein the fluid undergoes composition-based or environment-driven changes due to interactions with the container. In some aspects, a processing component generates an output representative of at least one time-varying fluid characteristic. In some aspects, the container is a wooden barrel with an interior surface adapted to impart flavor or chemical changes to the fluid. In some aspects, the fluid is a beverage including at least one of wine, beer, and distilled spirits, with the time-varying characteristic including a fermentation parameter that changes over time. In some aspects, the at least one time-varying fluid characteristic of the fluid includes at least one of fluid level or fluid volume.

29 Claims, 44 Drawing Sheets

Related U.S. Application Data which is a continuation-in-part of application No. 19/013,859, filed on Jan. 8, 2025, which is a continuation-in-part of application No. 18/818,539, filed on Aug. 28, 2024, now Pat. No. 12,228,525, and a continuation-in-part of application No. 18/800,279, filed on Aug. 12, 2024, now Pat. No. 12,228,445, said application No. 18/818,539 is a continuation-in-part of application No. 18/424,758, filed on Jan. 27, 2024, now Pat. No. 12,117,329, said application No. 18/800,279 is a continuation-in-part of application No. 18/424,758, filed on Jan. 27, 2024, now Pat. No. 12,117,329.

(58) Field of Classification Search
USPC ........................................................ 702/50
See application file for complete search history.

(56) References Cited

U.S. PATENT DOCUMENTS

| | | | | |
|---|---|---|---|---|
| 6,002,357 | A | 12/1999 | Redfern | |
| 6,995,706 | B2 | 2/2006 | Ohlsson | |
| 7,304,601 | B1 | 12/2007 | Edvardsson | |
| 7,525,476 | B1 | 4/2009 | Delin | |
| 7,821,444 | B2 | 10/2010 | Hall | |
| 8,884,632 | B2 | 11/2014 | Klofer | |
| 9,217,660 | B2 | 12/2015 | Zlotnick | |
| 9,377,340 | B2 | 6/2016 | Hagg | |
| 9,518,859 | B2 | 12/2016 | Bartov | |
| 10,260,929 | B2 | 4/2019 | Kassubek | |
| 10,788,351 | B2 | 9/2020 | Welle | |
| 10,801,873 | B2 | 10/2020 | Westerling | |
| 10,996,207 | B1 * | 5/2021 | Taheri | B65D 85/72 |
| 12,117,329 | B1 * | 10/2024 | Anderson | G01F 23/284 |
| 12,228,445 | B1 * | 2/2025 | Anderson | G01F 23/284 |
| 12,228,525 | B1 * | 2/2025 | Anderson | G01F 23/804 |
| 12,422,295 | B2 * | 9/2025 | Anderson | G01S 13/88 |
| 2005/0179584 | A1 | 8/2005 | Ohlsson | |
| 2006/0201246 | A1 | 9/2006 | Rolfes | |
| 2007/0028684 | A1 | 2/2007 | Benz | |
| 2008/0272968 | A1 | 11/2008 | Muller | |
| 2009/0007627 | A1 | 1/2009 | Perl | |
| 2010/0090883 | A1 | 4/2010 | Chen | |
| 2010/0101317 | A1 | 4/2010 | Ashrafzadeh | |
| 2011/0193567 | A1 | 8/2011 | Klofer | |
| 2011/0272866 | A1 | 11/2011 | Shameli | |
| 2012/0281096 | A1 | 11/2012 | Gellaboina | |
| 2014/0208845 | A1 | 7/2014 | Zlotnick | |
| 2015/0007655 | A1 | 1/2015 | Skowaisa | |
| 2015/0009063 | A1 | 1/2015 | Korsbo | |
| 2015/0198474 | A1 | 7/2015 | Howard | |
| 2016/0187277 | A1 * | 6/2016 | Potyrailo | G01N 27/026 324/633 |
| 2017/0138922 | A1 * | 5/2017 | Potyrailo | G01N 33/2888 |
| 2017/0141453 | A1 | 5/2017 | Waelde | |
| 2019/0093065 | A1 * | 3/2019 | Haase | C12N 1/185 |
| 2019/0316951 | A1 | 10/2019 | McCormick | |
| 2022/0252444 | A1 * | 8/2022 | Kincaid | G01F 23/68 |
| 2024/0365115 | A1 | 10/2024 | Lee et al. | |
| 2025/0085237 | A1 * | 3/2025 | Smith | G01N 22/00 |
| 2025/0244157 | A1 * | 7/2025 | Anderson | G01F 23/284 |
| 2025/0244158 | A1 * | 7/2025 | Anderson | G01F 23/284 |
| 2025/0266132 | A1 * | 8/2025 | Anderson | G16C 20/30 |
| 2025/0305968 | A1 * | 10/2025 | Anderson | G01N 22/02 |
| 2025/0314608 | A1 * | 10/2025 | Anderson | G01N 22/02 |

OTHER PUBLICATIONS

Kataria, Tejinder Kaur, et al., "Dielectric properties of tequila in the microwave frequency range (0.5-20 GHz) using coaxial probe," International Journal of Food Properties, 20:sup1, S377-S384, 8 pages.

Tajin, Md Abu Saleh, et al., "Passive UHF RFID-based real-time intravenous fluid level sensor," IEEE Sens J. Feb. 2024 ; 24(3): 3863-3873. doi: 10.1109/jsen.2023.3342129, 28 pages.

Non-Final Office Action for U.S. Appl. No. 19/084,671, dated Jun. 20, 2025, 16 pages.

* cited by examiner

SYSTEM AND METHOD FOR DETERMINING CONTENT UTILIZING EXTERNALLY MOUNTED CONTAINER MONITORING SYSTEM

CROSS-REFERENCE TO RELATED APPLICATIONS

This application is a Continuation-in-part of, and claims the benefit of U.S. application Ser. No. 19/084,671, titled "ARTIFICIAL INTELLIGENCE DRIVEN MONITORING SYSTEM FOR AGING WHISKEY" filed on Mar. 19, 2025 and U.S. application Ser. No. 19/080,723 (now U.S. Pat. No. 12,422,295), titled "SYSTEM AND METHOD FOR DETERMINING CONTENT UTILIZING EXTERNALLY MOUNTED CONTAINER MONITORING SYSTEM" filed on Mar. 14, 2025, which is a Continuation-in-part of, and claims the benefit of U.S. application Ser. No. 19/013,859, titled "SYSTEM AND METHOD FOR DETERMINING FLUID LEVEL AND/OR ALCOHOL CONTENT UTILIZING EXTERNALLY MOUNTED CONTAINER MONITORING SYSTEM" filed on Jan. 8, 2025, which is a Continuation-in part and claims of the benefit of U.S. application Ser. No. 18/800,279 (now U.S. Pat. No. 12,228,445), titled "SYSTEM AND METHOD FOR DETERMINING ALCOHOL CONTENT WITHIN CONTAINER UTILIZING CONTAINER MONITORING SYSTEM," filed on Aug. 12, 2024, and U.S. application Ser. No. 18/818,539 (now U.S. Pat. No. 12,228,525), titled "SYSTEM AND METHOD FOR DETERMINING ALCOHOL CONTENT UTILIZING CONTAINER MONITORING SYSTEM," filed on Aug. 28, 2024, both of which having claimed, as Continuation-in-part applications, the benefit and earlier filing date of U.S. application Ser. No. 18/424,758 (now U.S. Pat. No. 12,117,329), titled "CONTAINER MONITORING SYSTEM AND METHOD THEREOF," filed on Jan. 27, 2024. This application incorporates by reference, herein, the entire contents of the above referred-to patent applications.

TECHNICAL FIELD

This disclosure relates generally to the field of fluid management and measurement of liquid content within containers and alcohol determination based on the fluid content.

BACKGROUND

Containers, such as barrels, have been used for centuries for the containment and processing of fermenting liquids. Whether the enclosed liquid is wine, beer or spirits, the wooden containers (or barrels) represent an industrial standard for the aging and fermentation of the contained liquid. In many cases, the fermenting liquid may be retained within the same wooden barrel for many years, wherein the increase in length of time (i.e., in storage) impairs different favor, quality and cost to the contained liquid. For example, spirits are measured by the duration of their aging process, wherein the longer the contained product is aged, the more expensive the value of the product becomes. For example, a 200-year-old Napoleon brandy is significantly more expensive than a 2-year-old brandy by the same manufacturer, as the brandy has been fermenting in the barrel for a significantly longer period of time.

However, issues regarding the use of wooden barrels are well-known in the art. For example, fermenting liquid within a barrel is prone to two types of losses. The first being evaporation of the liquid within the barrel and the second being absorption by the wooden elements comprising the barrels.

In many cases, the barrels, once filled, are retained within a known position, whether vertical or horizontal, for the duration of their intended aging process. During this time, inspection of the contained liquid (quality, level and alcohol content (or measurement)) may occur by the insertion of one or more types of measurement tools into the barrel.

However, insertion of the measurement tool may introduce air or other contaminants that may alter the quality of the contained liquid. In addition, the repeated insertion of the measurement tools increases the amount of labor required to monitor the critical aspects of the fermentation process (i.e., alcohol production).

Furthermore, the measurement of fluid loss within a barrel or container is an important factor in the whiskey industry as distillers are required to report to Tax and Trade Bureaus container fill volume.

In addition, alcohol content (or Proof) is extremely important to know as distillers are required to follow stringent rules for the classification of different spirits.

For example, to be classified as a Bourbon whiskey the liquid at bottling must have a minimum alcohol content of 40 percent by volume (ABV), Generally, typically bottled Bourbon is between 40 and 60 percent ABV, whereas the liquid entered into the barrel for aging should have an ABV of no greater 62.5 percent ABV. For a general Whiskey, the liquid at bottling must have a minimum alcohol content of 40 percent ABV.

As mentioned above, the conventional methods for determining fluid level and alcohol content is labor intensive as it requires the sampling of the aging fluid by drawing a sample from the container (i.e., opening the barrel, which may introduce air into the container), measuring the sample's temperature, using a hydrometer or alcoholmeter to measure alcohol content, and adjusting the reading based on temperature. Alternatively, more modern analytical methods, such as gas chromatography or near-infrared spectroscopy, may be utilized to determine alcohol content. However, while these methods may provide highly accurate reading, they are more expensive and require specialized equipment.

In still another aspect, wherein container fill level is required to prevent exceeding capacity and also prevent overflow and damage, the conventional methods of such determination is both time-consuming and invasive.

Hence, there is a need in the industry for a non-intrusive method and system for obtaining measurements of the level of the contents of a container in order to determine at least one of a level of fluid and a content, wherein invasive probes or manual inspection or, even guesswork is removed.

SUMMARY

Herein disclosed is a system for determining a fill level of at least one of a content within a container wherein the fill level of the at least one content is determined based on the reception of a time of return of a transmitted signals wherein the transmitted signals are frequency varying with the transmission window. The frequency variation may be continuous or patterned. The frequency variation may be continuous or patterned. The device herein disclosed is applicable to a wide spectrum of configurations to determine a content, whether liquid, mash or solid within the container wherein the container may be associated with a barrel or container associated with alcohol production, or containers involved in the retention of other types of materials or content, such as but not limited to, septic tanks, waste management systems, water towers, etc.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings.

4

Figure 18:
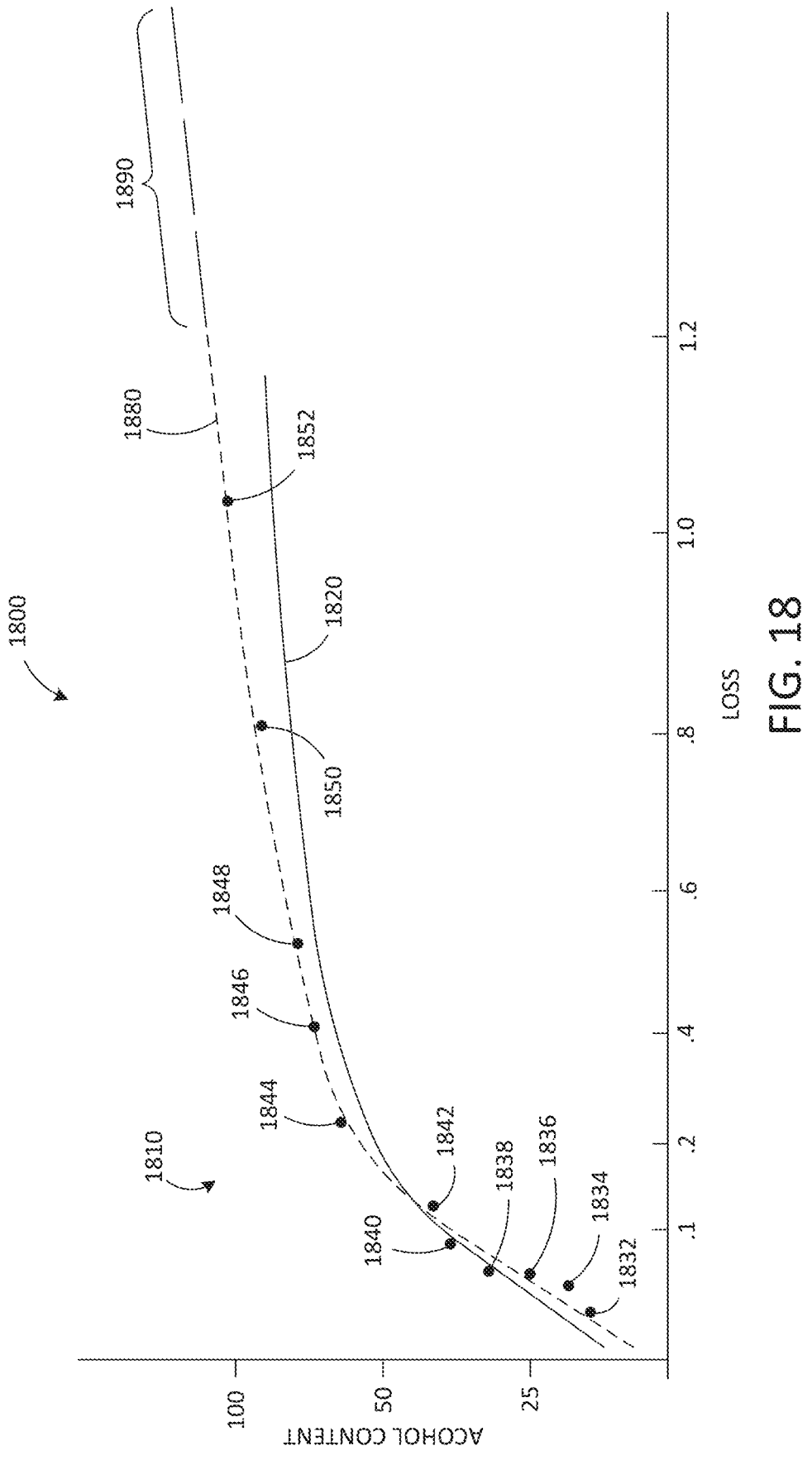

FIG. 18 illustrates an exemplary graph of alcohol content determination in accordance with the principles of the invention.

Figure 19:
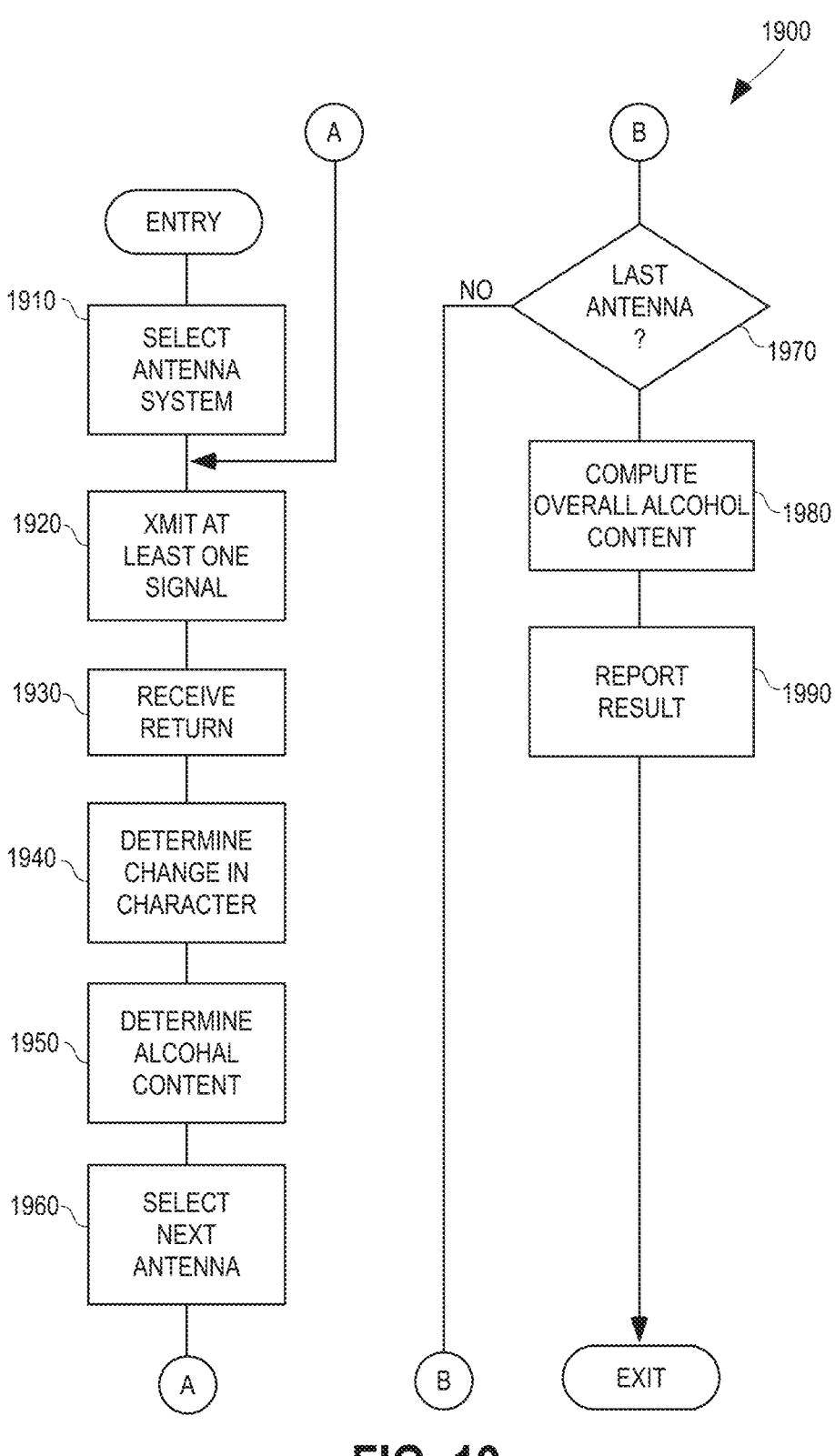

FIG. 19 illustrates a flowchart of a second exemplary process associated with a determination of an alcohol content within a container in accordance with the principles of the invention.

FIGS. 20A-20D illustrate exemplary charts of alcohol content as a function of change in frequency.

Figure 21:
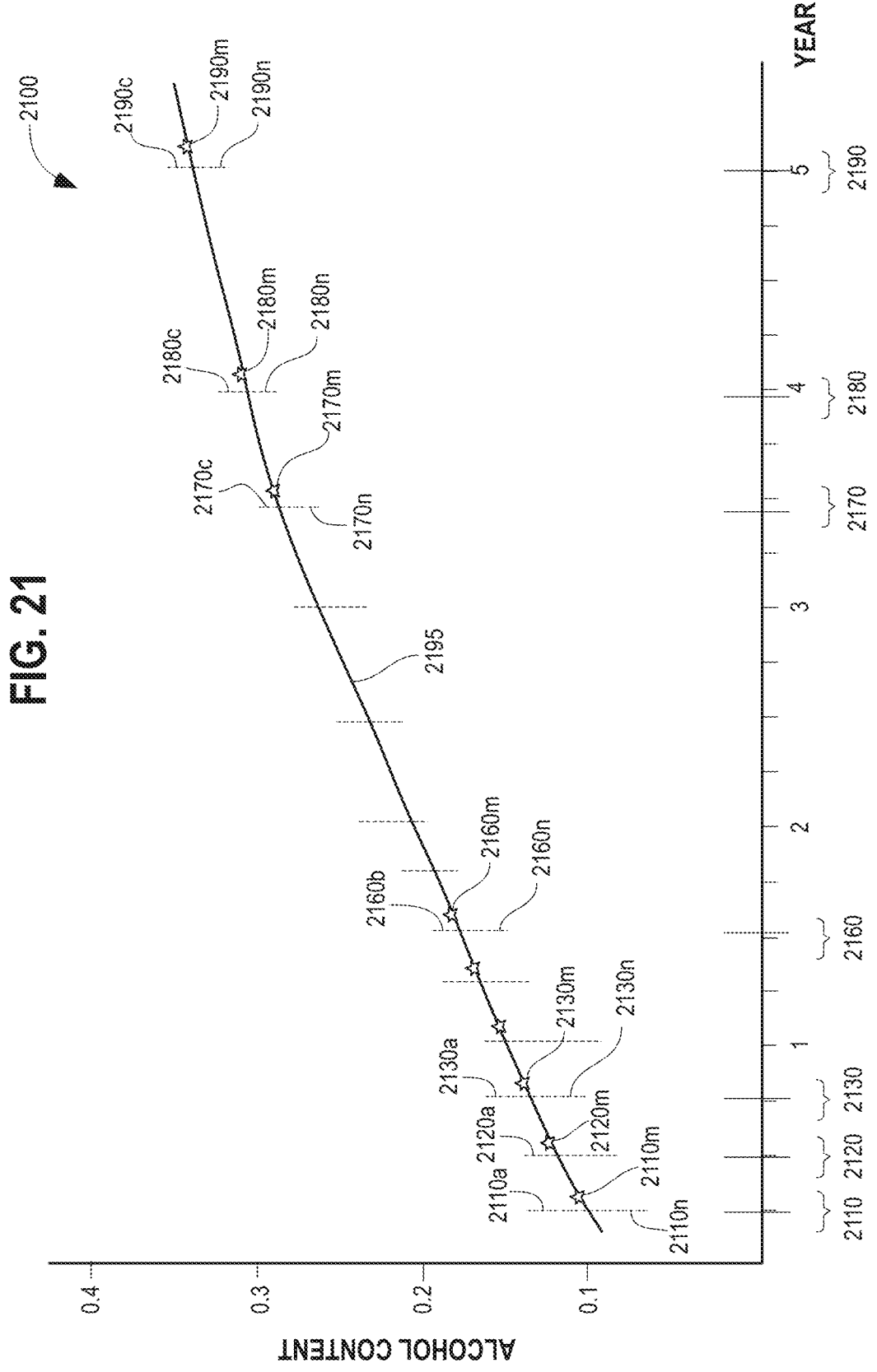

FIG. 21 illustrates an exemplary chart of measurement of alcohol content as a function of time.

Figure 22:
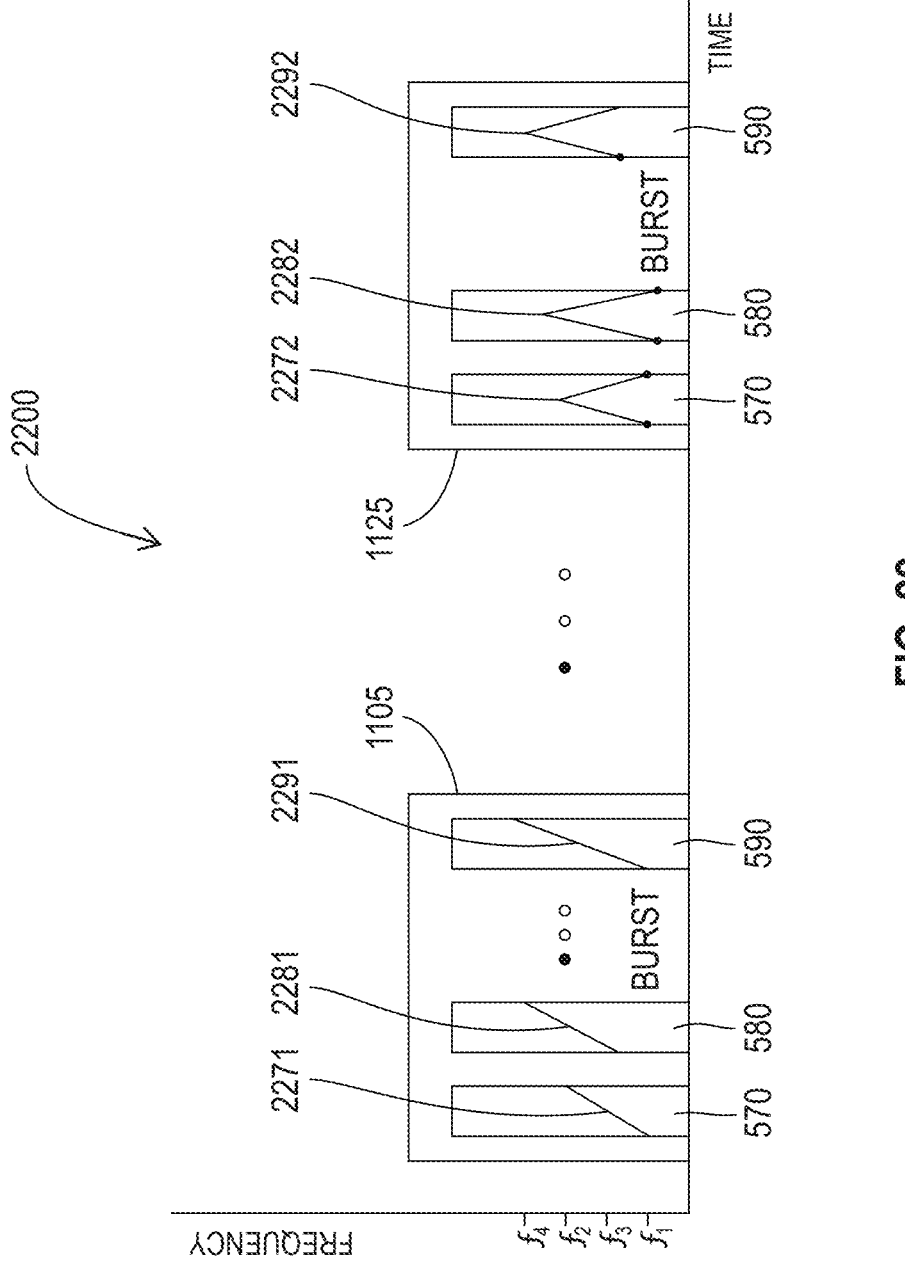

FIG. 22 illustrates an exemplary example of a transmission sequence in accordance with the principles of the invention.

Figure 23:
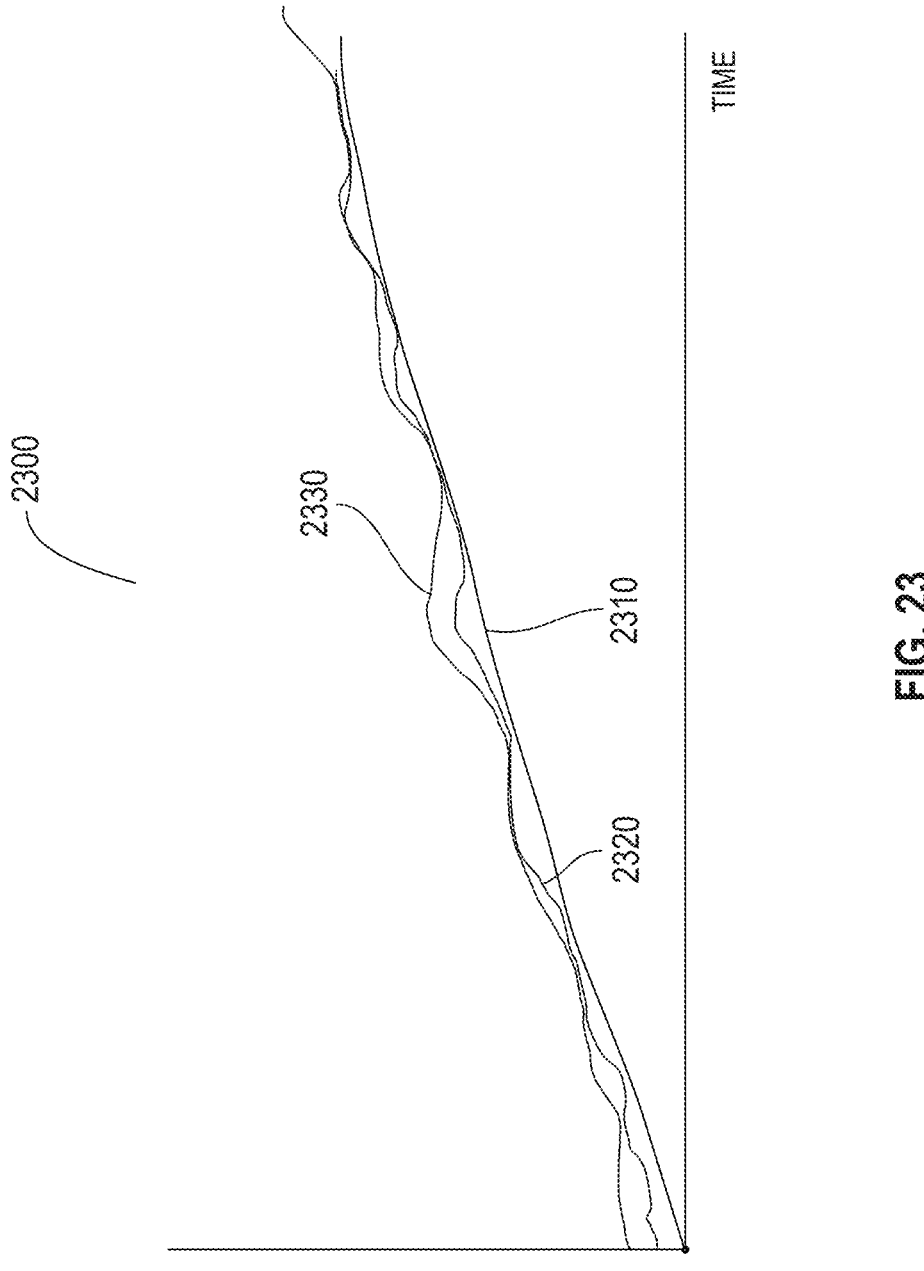

FIG. 23 illustrates an exemplary chart of the collection of one or more materials within a container monitored by the external monitoring system disclosed herein.

Figure 24:
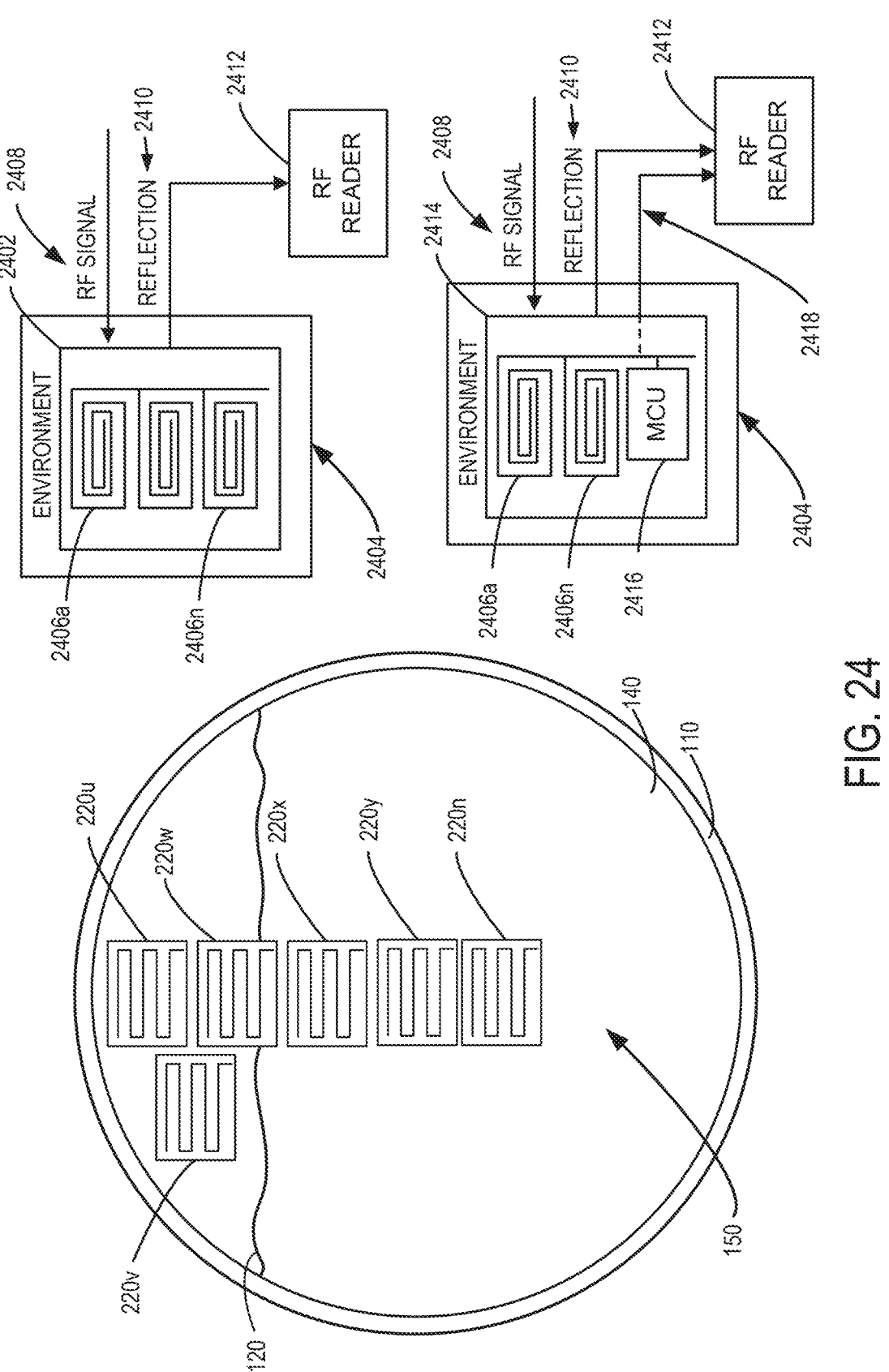

FIG. 24 illustrates an example configuration of a liquid-containing vessel having a plurality of externally mounted RF-responsive elements, and a schematic representation of a system for analyzing reflected signal characteristics as influenced by the surrounding environment in accordance with aspects of the present disclosure.

Figure 25:
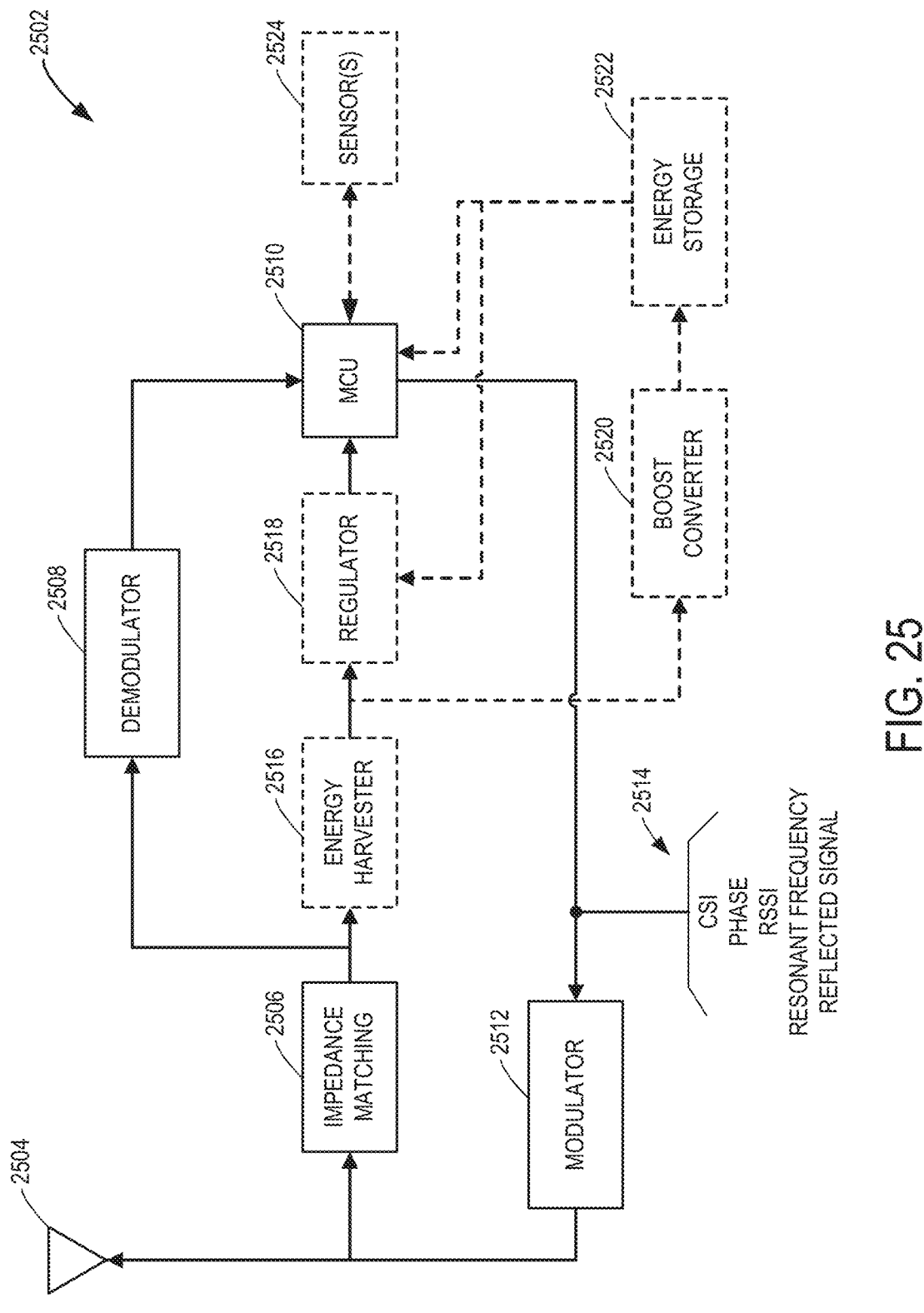

FIG. 25 illustrates a block diagram of an exemplary architecture of a RF sensing device that may be implemented in various embodiments of a non-invasive sensing system for monitoring internal conditions of containers in accordance with aspects of the present disclosure.

Figure 26:
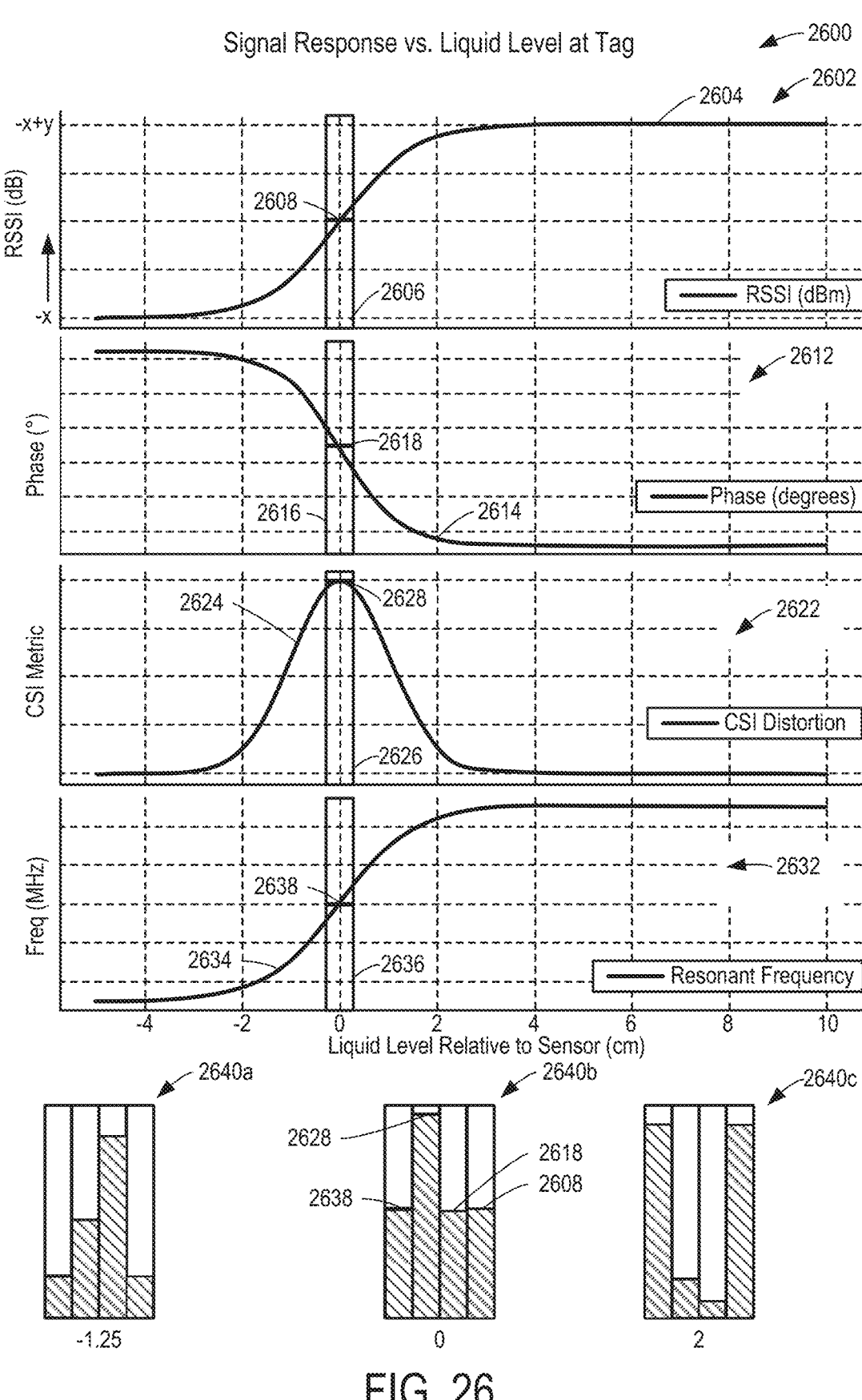

FIG. 26 illustrates signal response profile diagrams showing various radio frequency signal characteristics as functions of liquid level relative to an RF-responsive element in accordance with aspects of the present disclosure.

Figure 27:
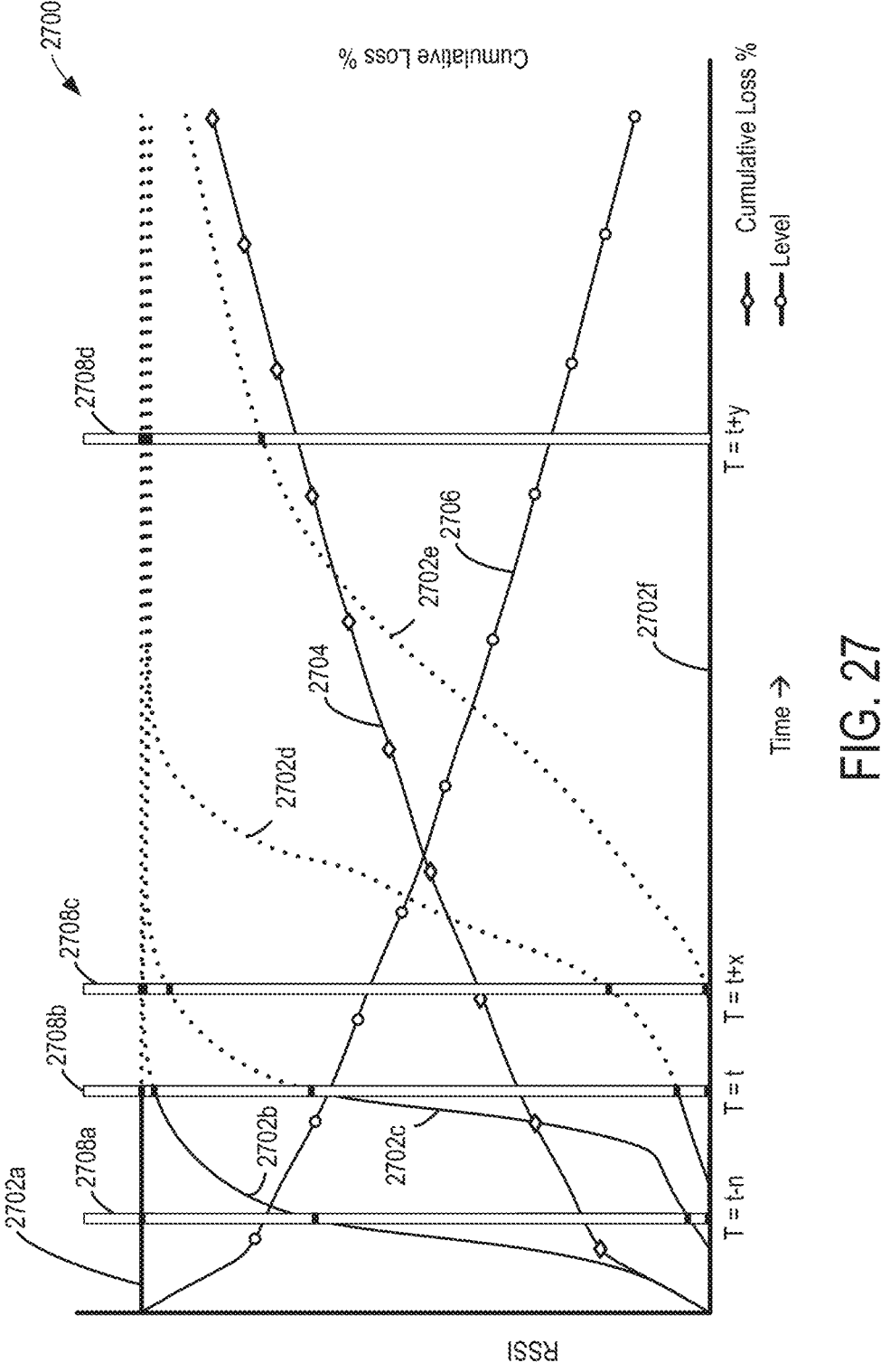

FIG. 27 illustrates a composite time-domain chart showing signal behavior and environmental change over time for a container monitoring system, including RSSI values for multiple RF-responsive elements and corresponding liquid level measurements in accordance with aspects of the present disclosure.

Figure 28:
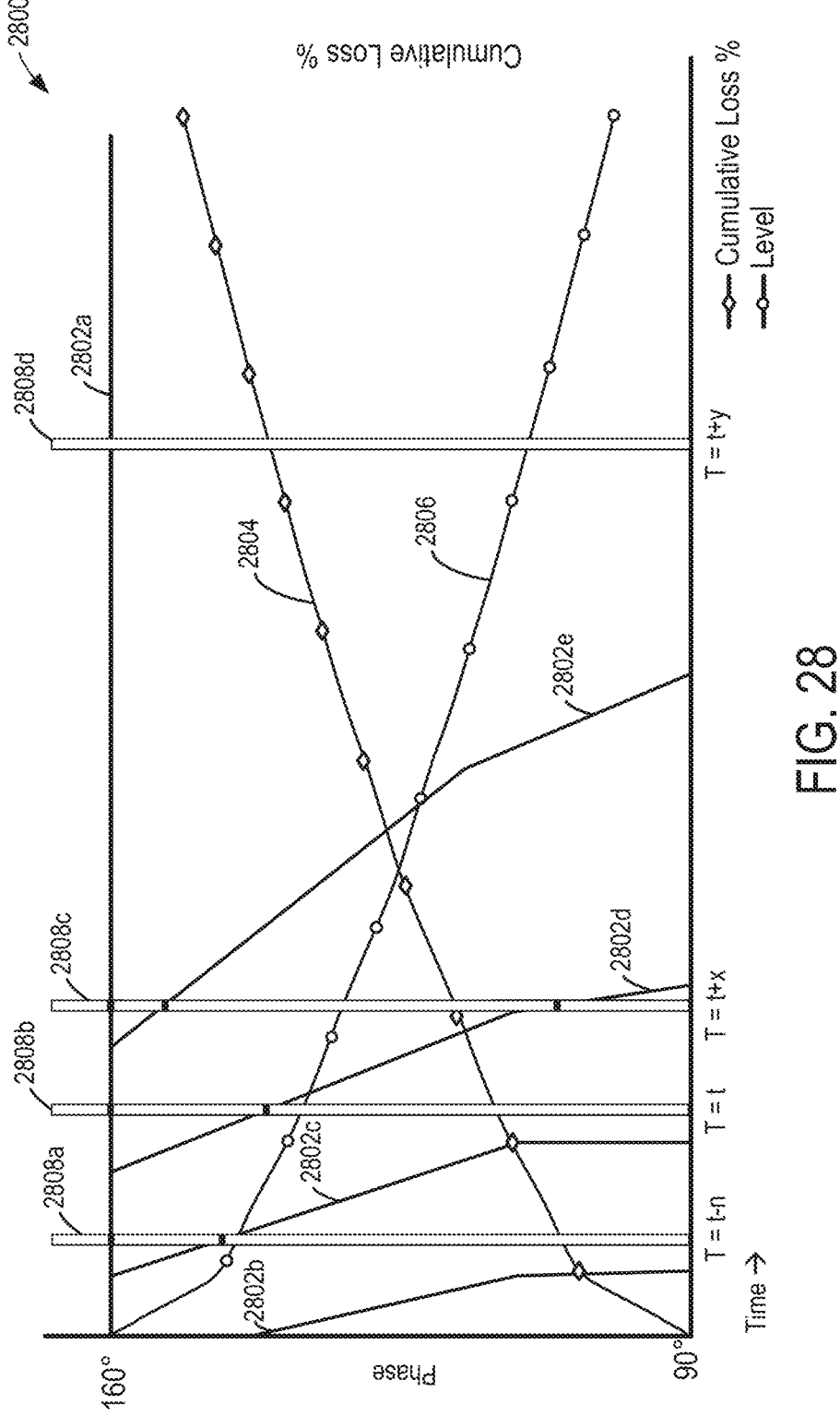

FIG. 28 illustrates a composite phase-domain chart showing signal behavior and environmental change over time for a container monitoring system, including phase response values for multiple RF-responsive elements and corresponding liquid level measurements in accordance with aspects of the present disclosure.

Figure 29:
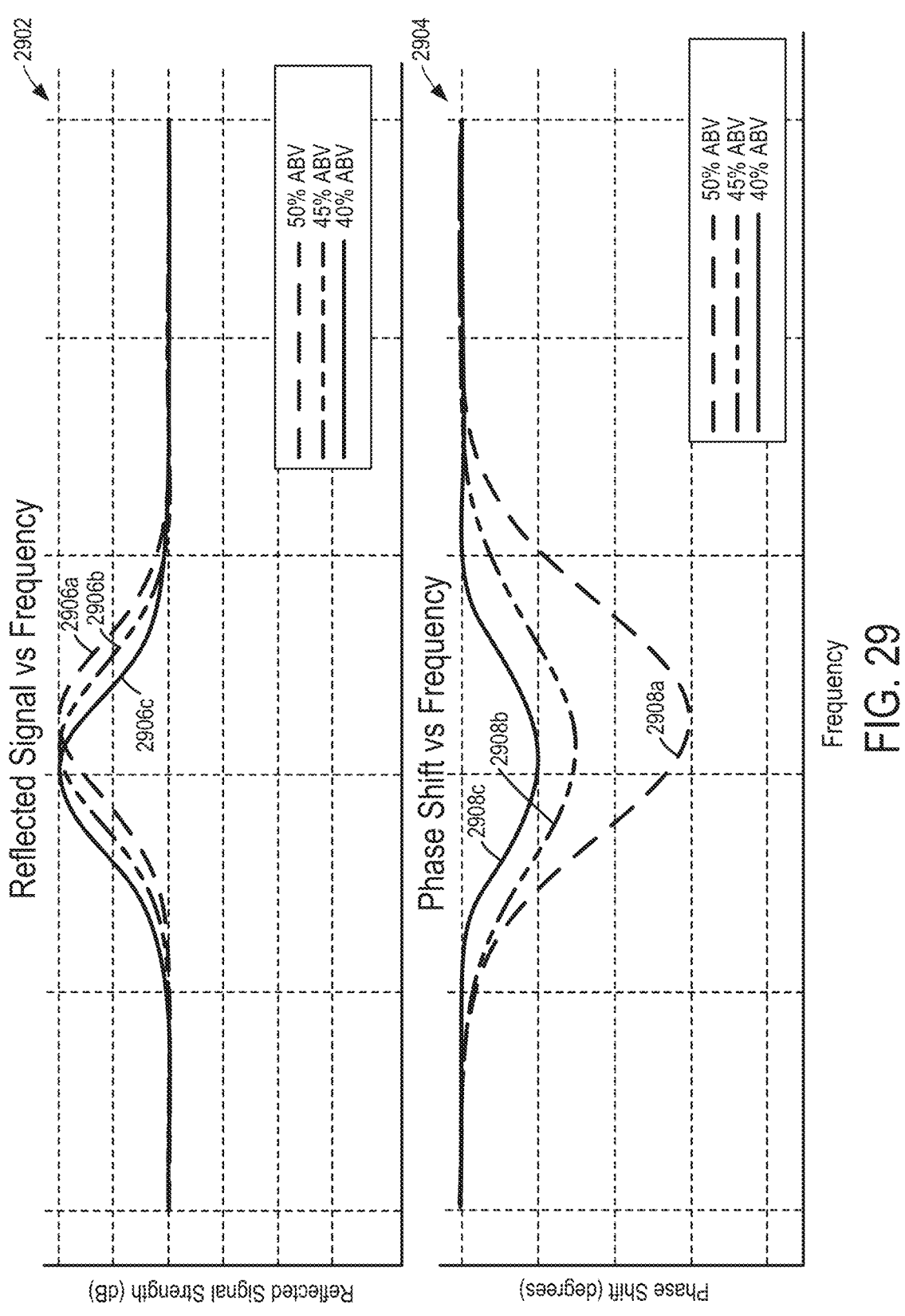

FIG. 29 illustrates frequency-domain plots showing how reflected radio frequency signal characteristics vary as a function of alcohol content within a liquid adjacent to an externally affixed RF-responsive element in accordance with aspects of the present disclosure.

Figure 30:
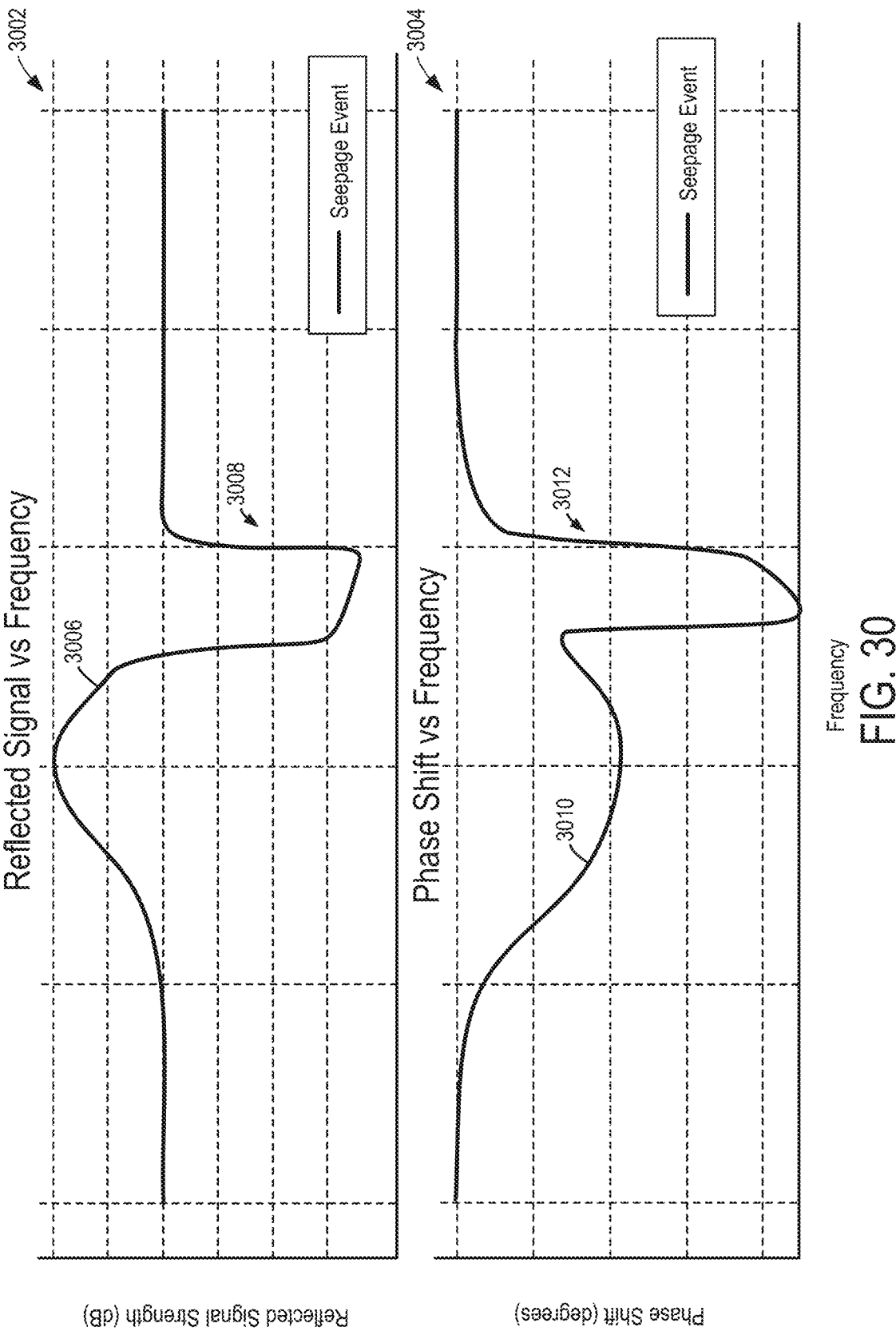

FIG. 30 illustrates frequency-domain plots showing how reflected radio frequency signal characteristics vary as a function of moisture or seepage conditions detected by an externally affixed RF-responsive element in accordance with aspects of the present disclosure.

Figure 31:
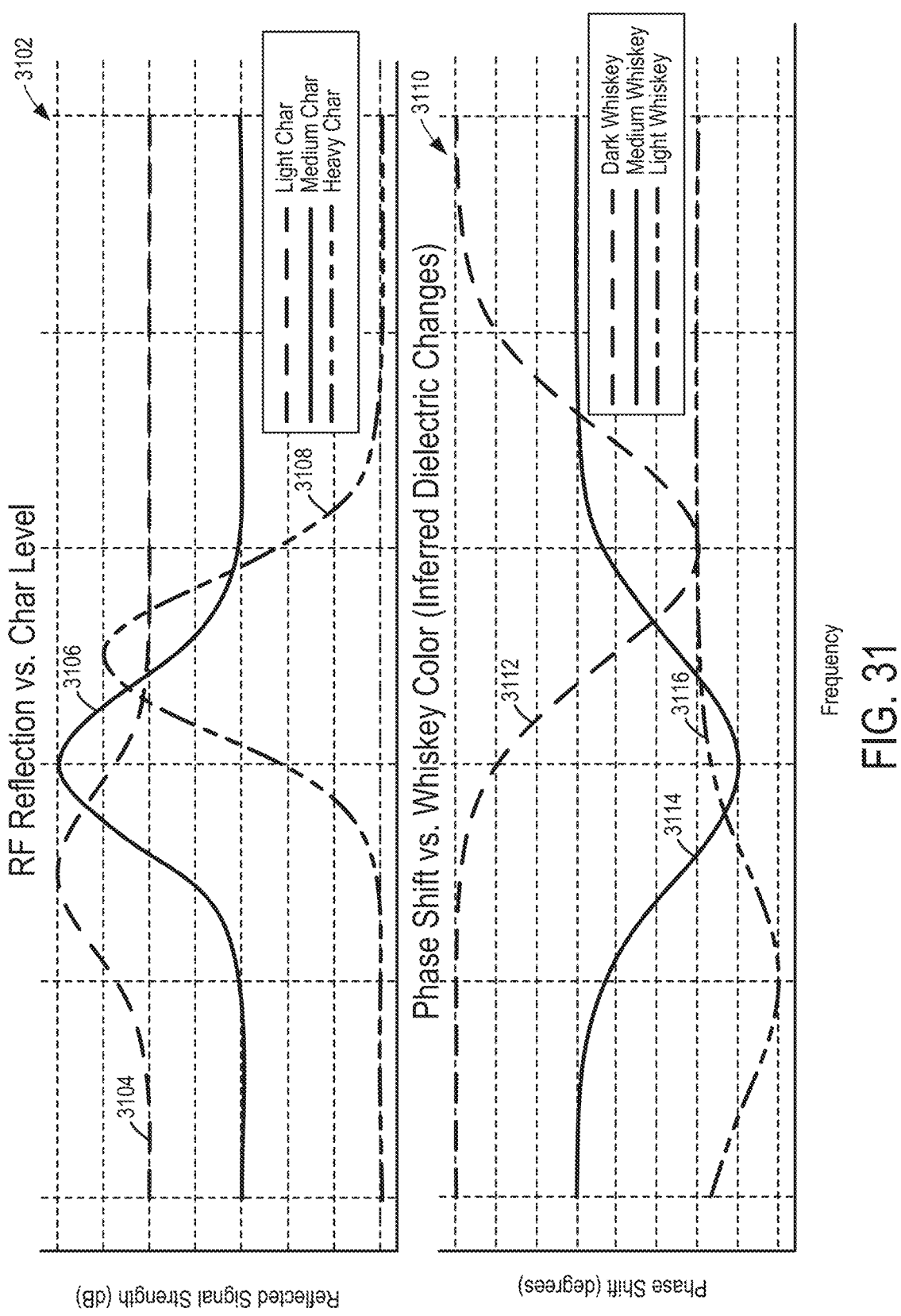

FIG. 31 illustrates a set of frequency-domain signal plots showing radio frequency signal characteristics as affected by both char level of a container's interior wall and the color/maturity of a contained liquid in accordance with aspects of the present disclosure.

Figure 32A:
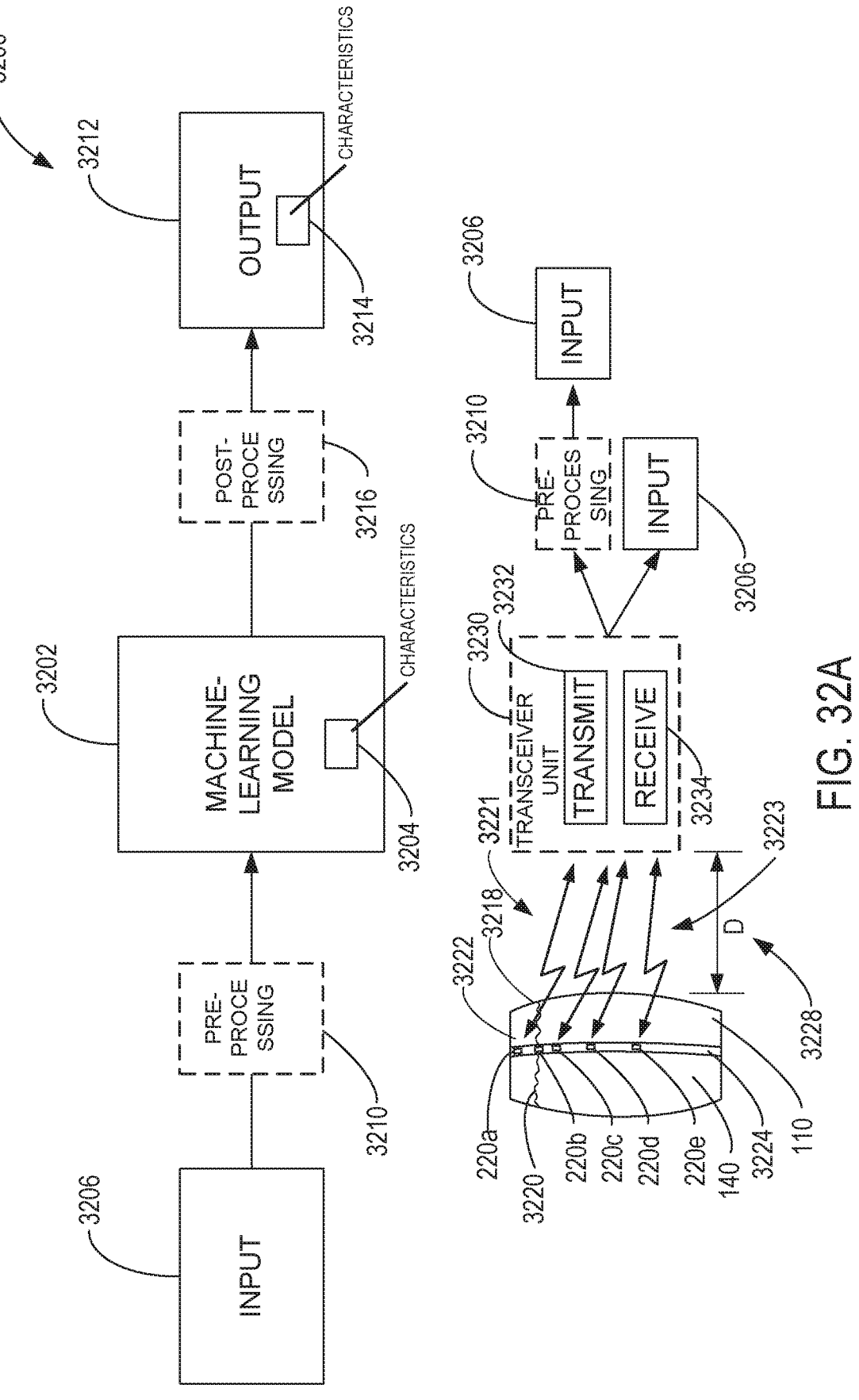

FIG. 32A illustrates an AI-driven RF sensing system configured for analyzing environmental signal characteristics associated with a liquid-filled container in accordance with aspects of the present disclosure.

Figure 32B:
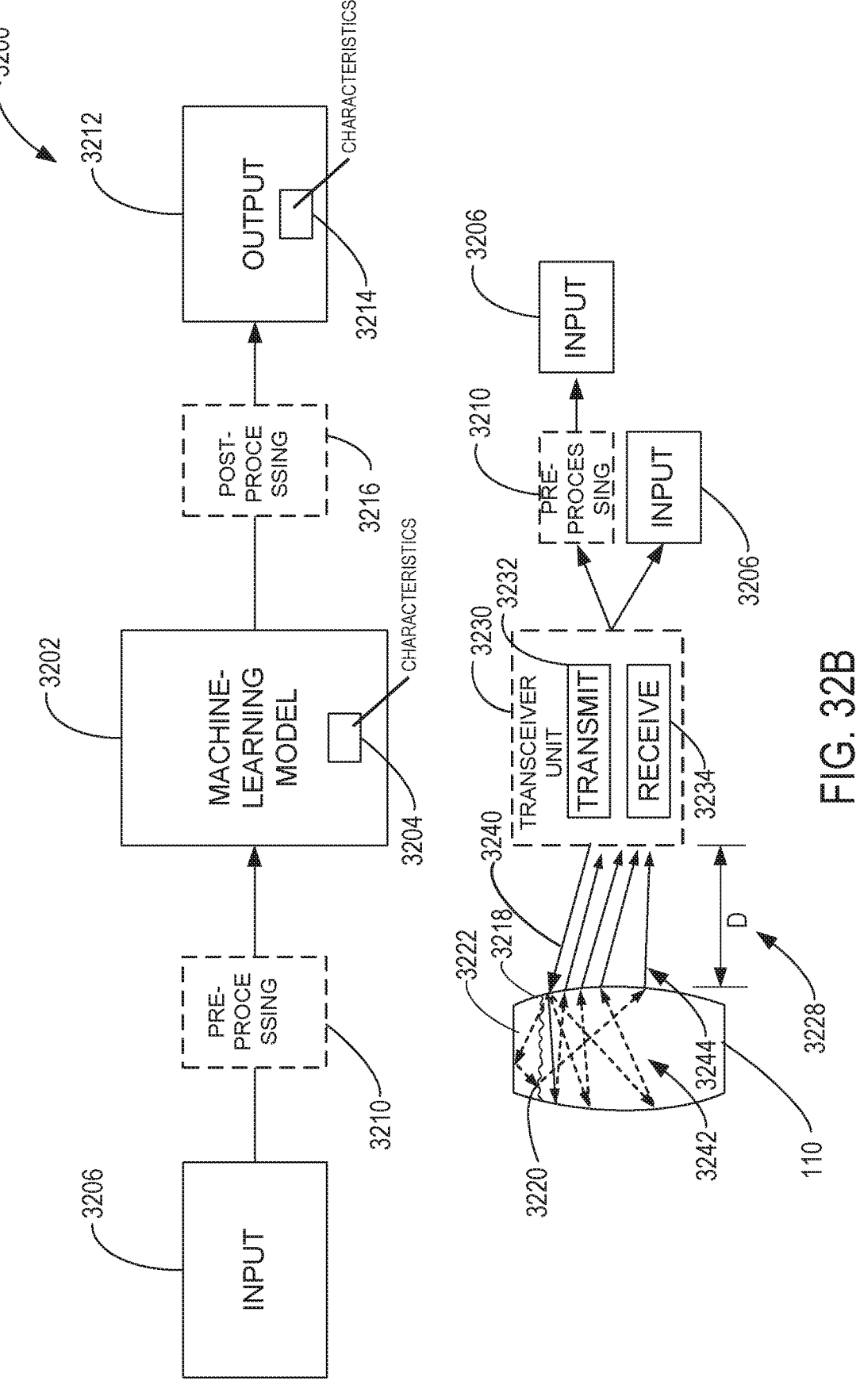

FIG. 32B illustrates another example of an RF-based sensing architecture for analyzing contents within a container, wherein a transmitted signal is directed toward the container and reflected back in accordance with aspects of the present disclosure.

Figure 33:
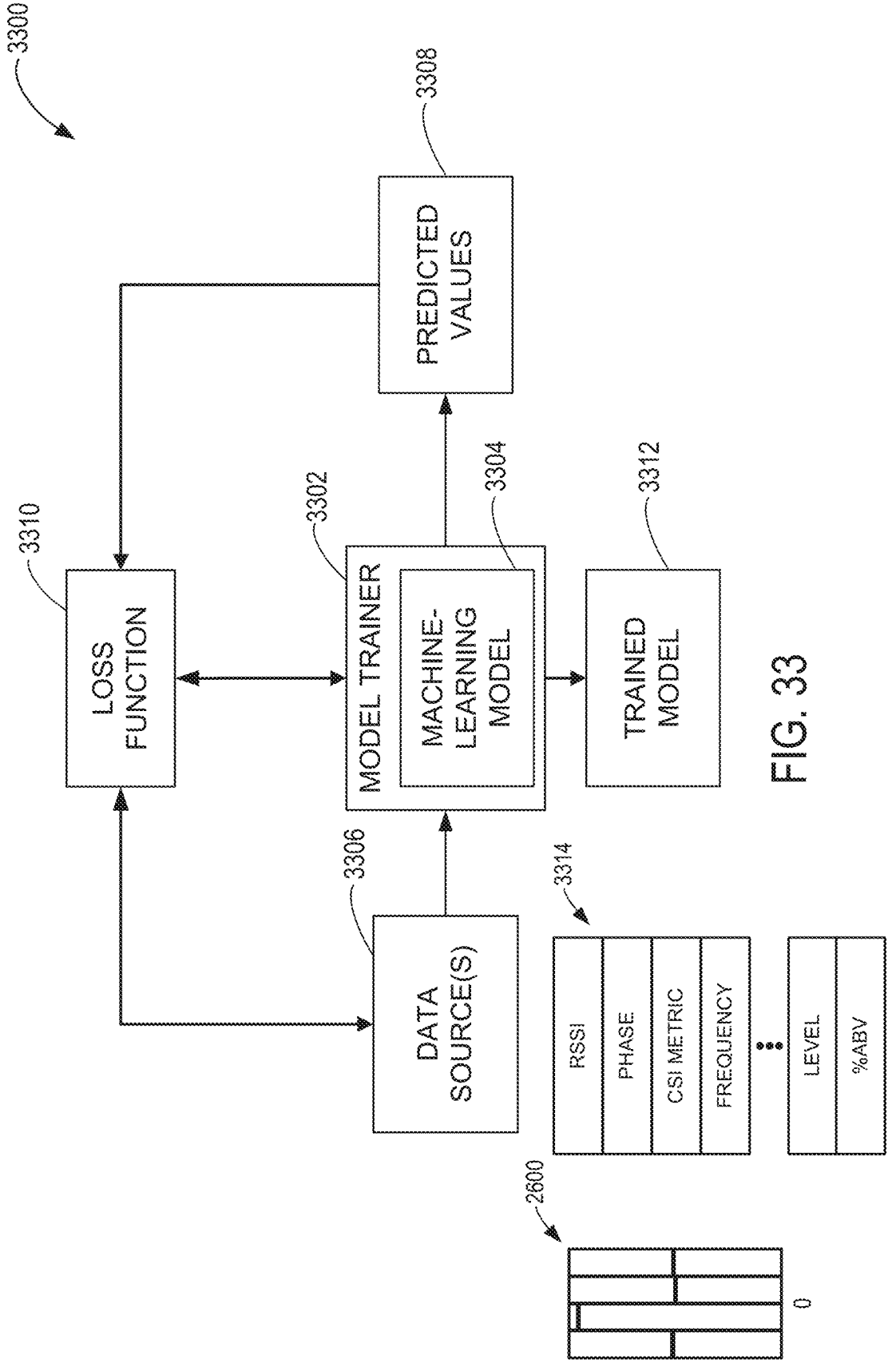

FIG. 33 illustrates a training system for generating a machine-learning model capable of inferring internal conditions of a container using radio-frequency signal features in accordance with aspects of the present disclosure.

Figure 34:
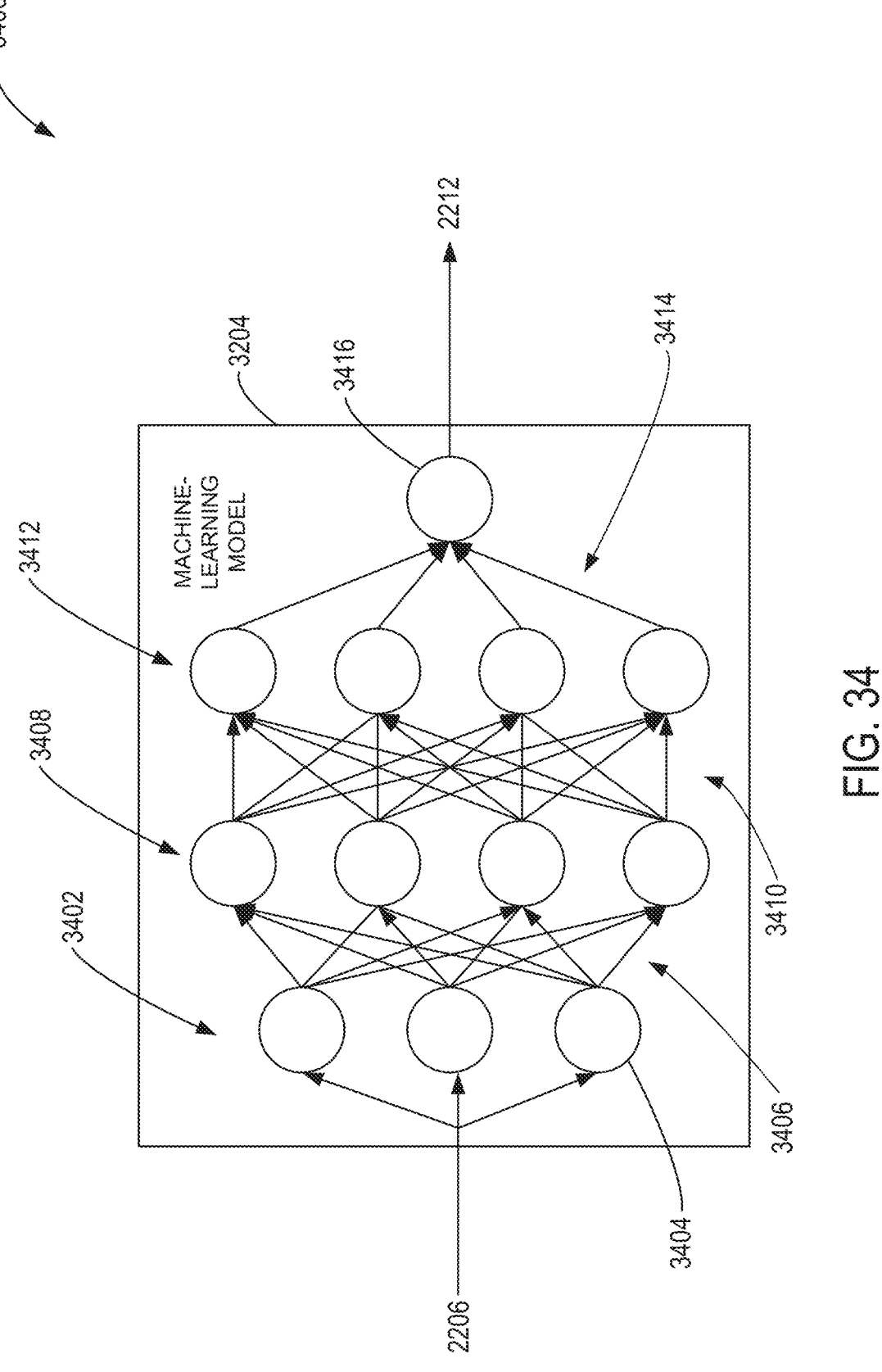

FIG. 34 illustrates an artificial neural network for processing radio-frequency-derived input data and generating predictions relating to characteristics of contents within a sealed container in accordance with aspects of the present disclosure.

Figure 35:
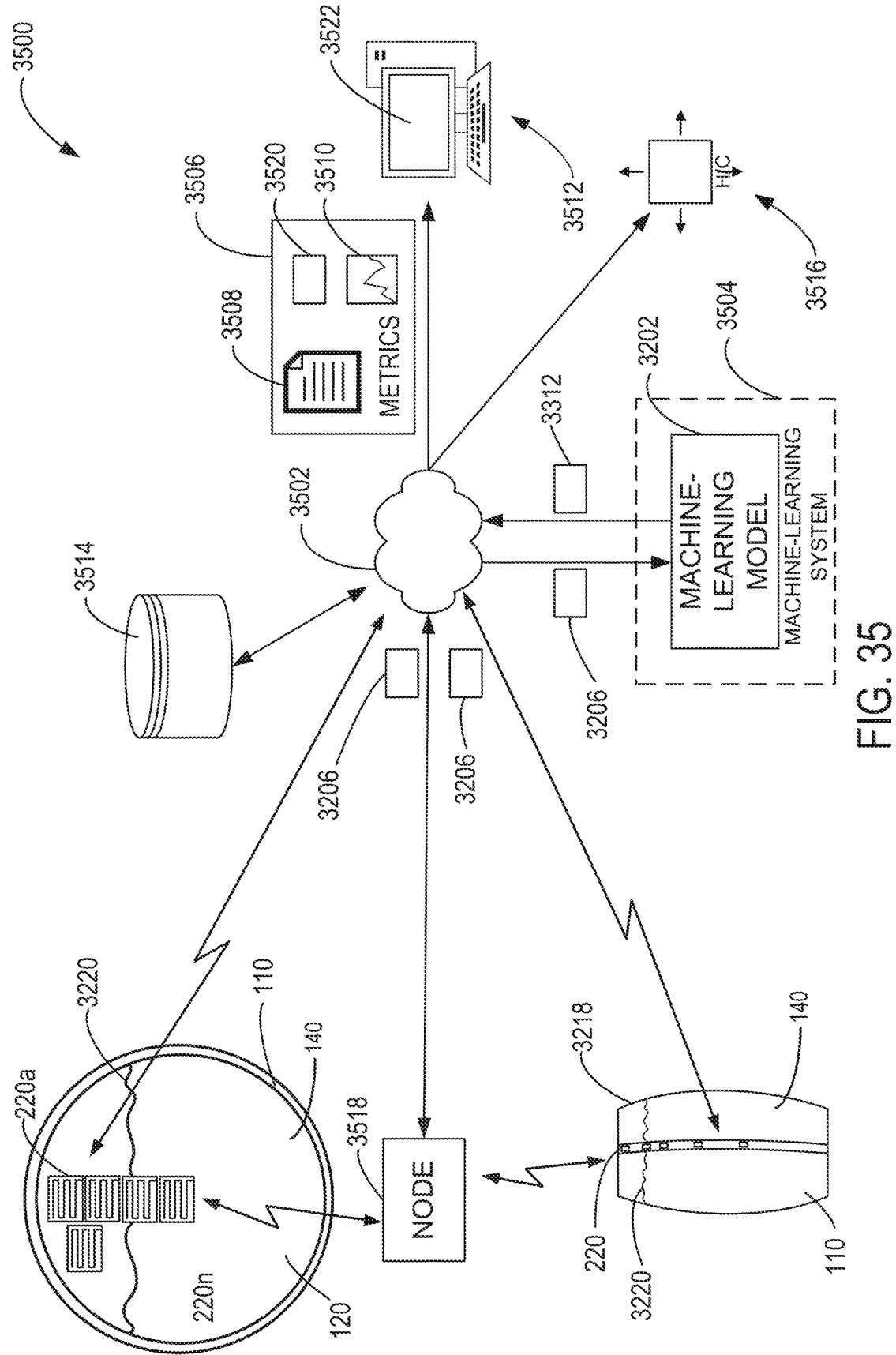

FIG. 35 illustrates a distributed monitoring and analysis system for determining one or more characteristics of a liquid contained within a container in accordance with aspects of the present disclosure.

Figure 36:
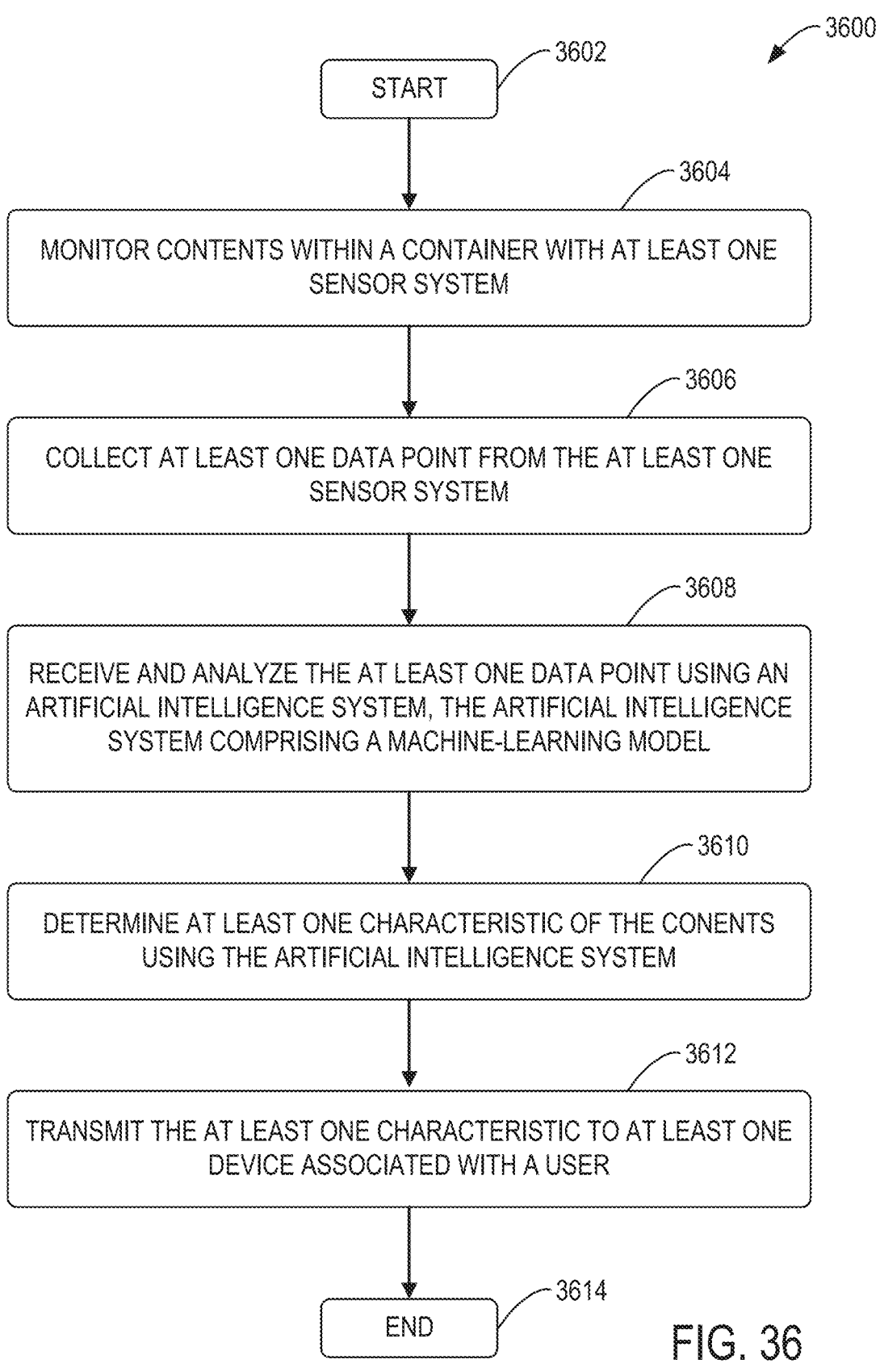

FIG. 36 illustrates a process for determining one or more characteristics of a liquid or other contents stored within a container in accordance with aspects of the present disclosure.

Figure 37:
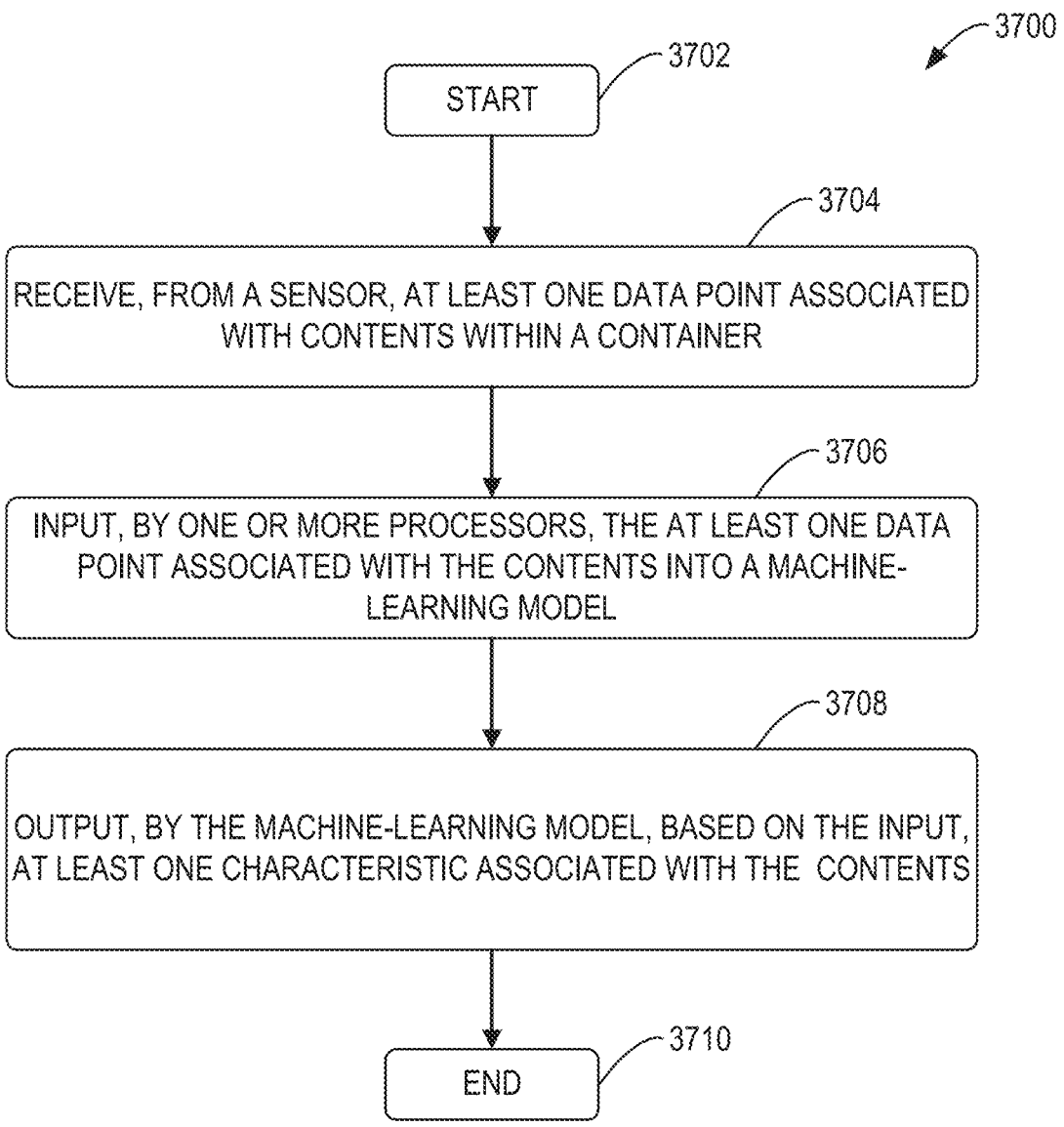

FIG. 37 illustrates an exemplary process for determining at least one characteristic of contents within a container using a machine-learning model in accordance with aspects of the present disclosure.

Figure 38:
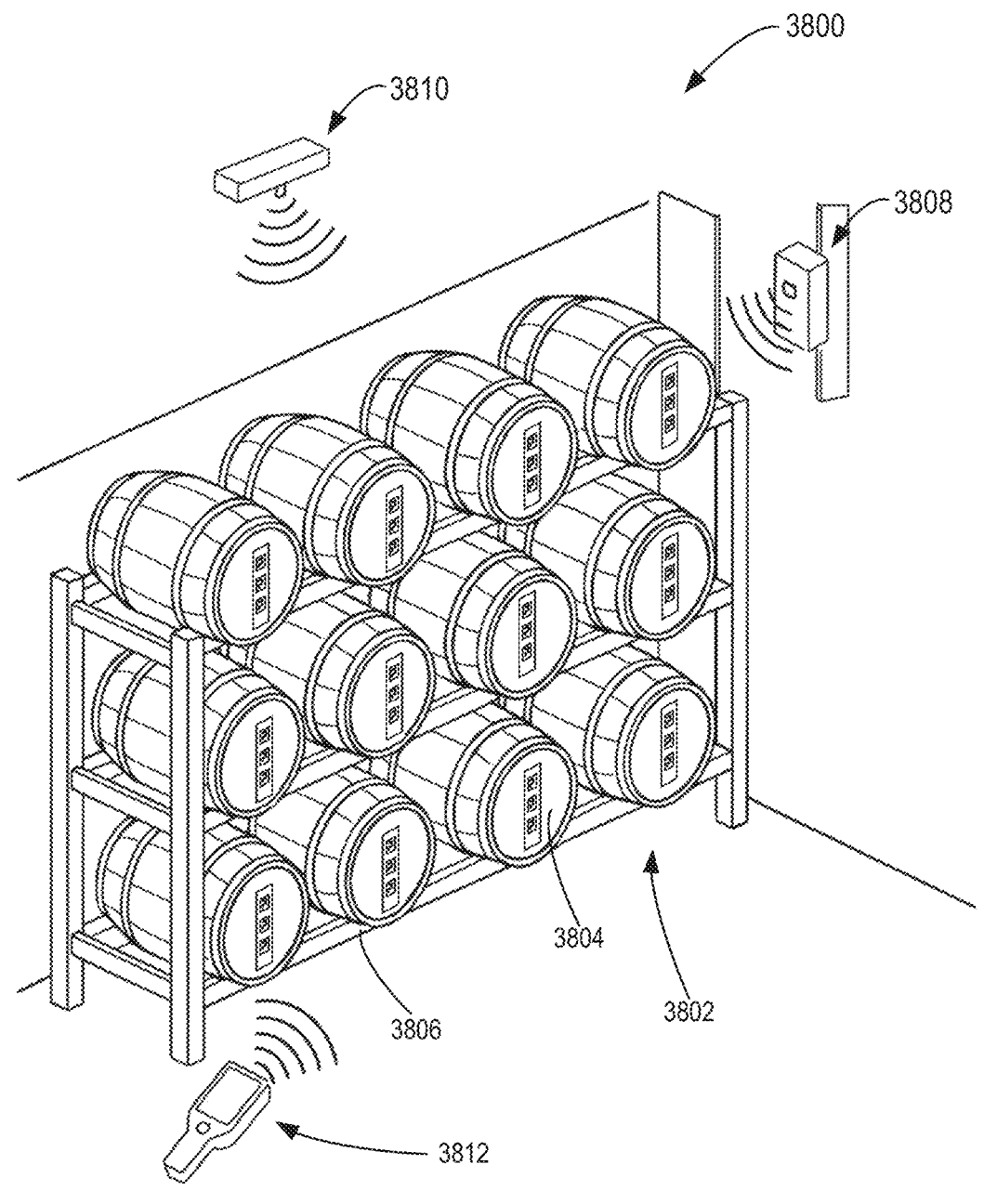

FIG. 38 illustrates an exemplary aspect of a barrel monitoring system deployed in a warehouse environment in accordance with aspects of the present disclosure.

Figure 39:
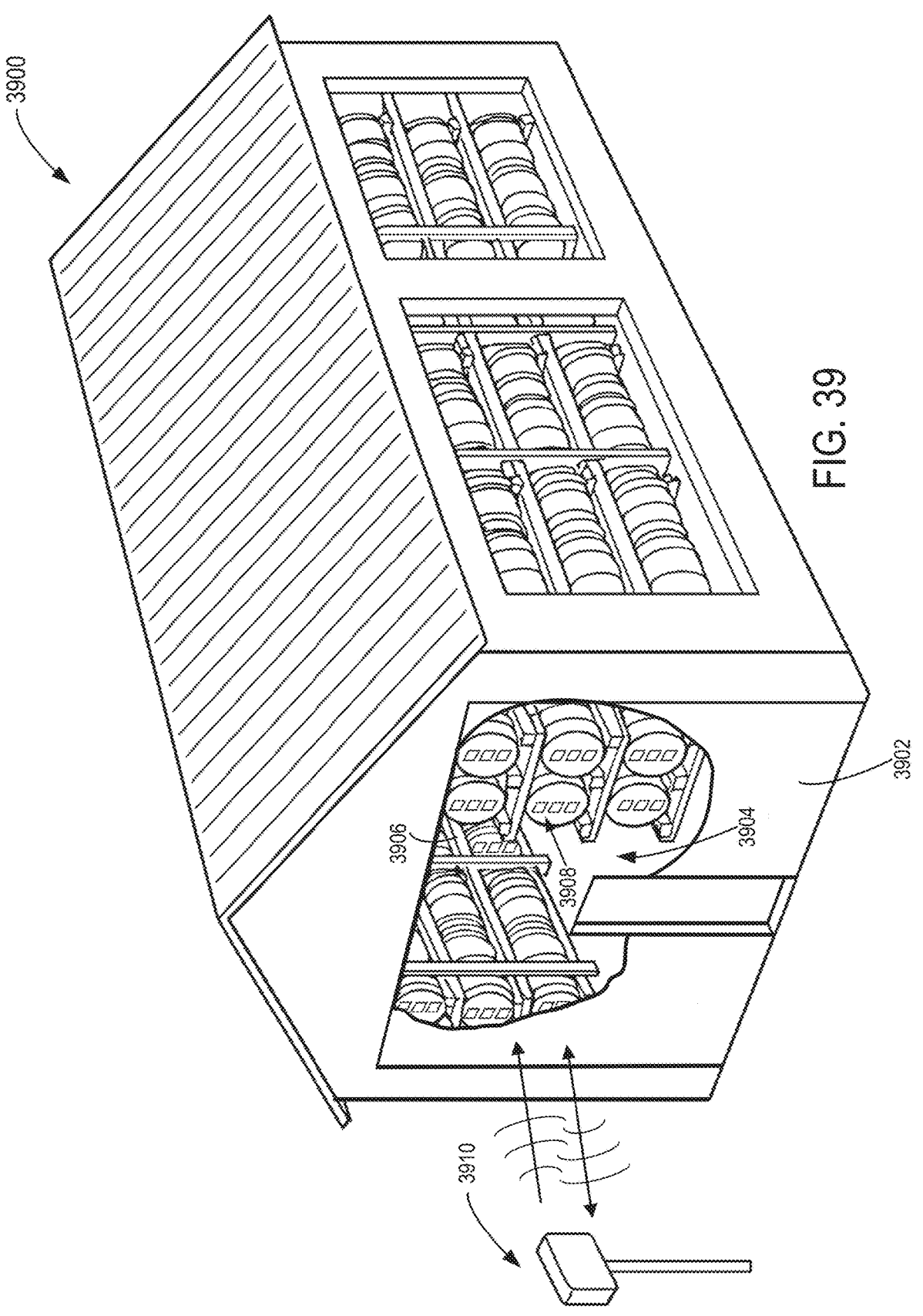

FIG. 39 illustrates an exemplary rickhouse or barrel-aging facility configured for non-invasive wireless monitoring of a plurality of containers in accordance with aspects of the present disclosure.

Figure 40:
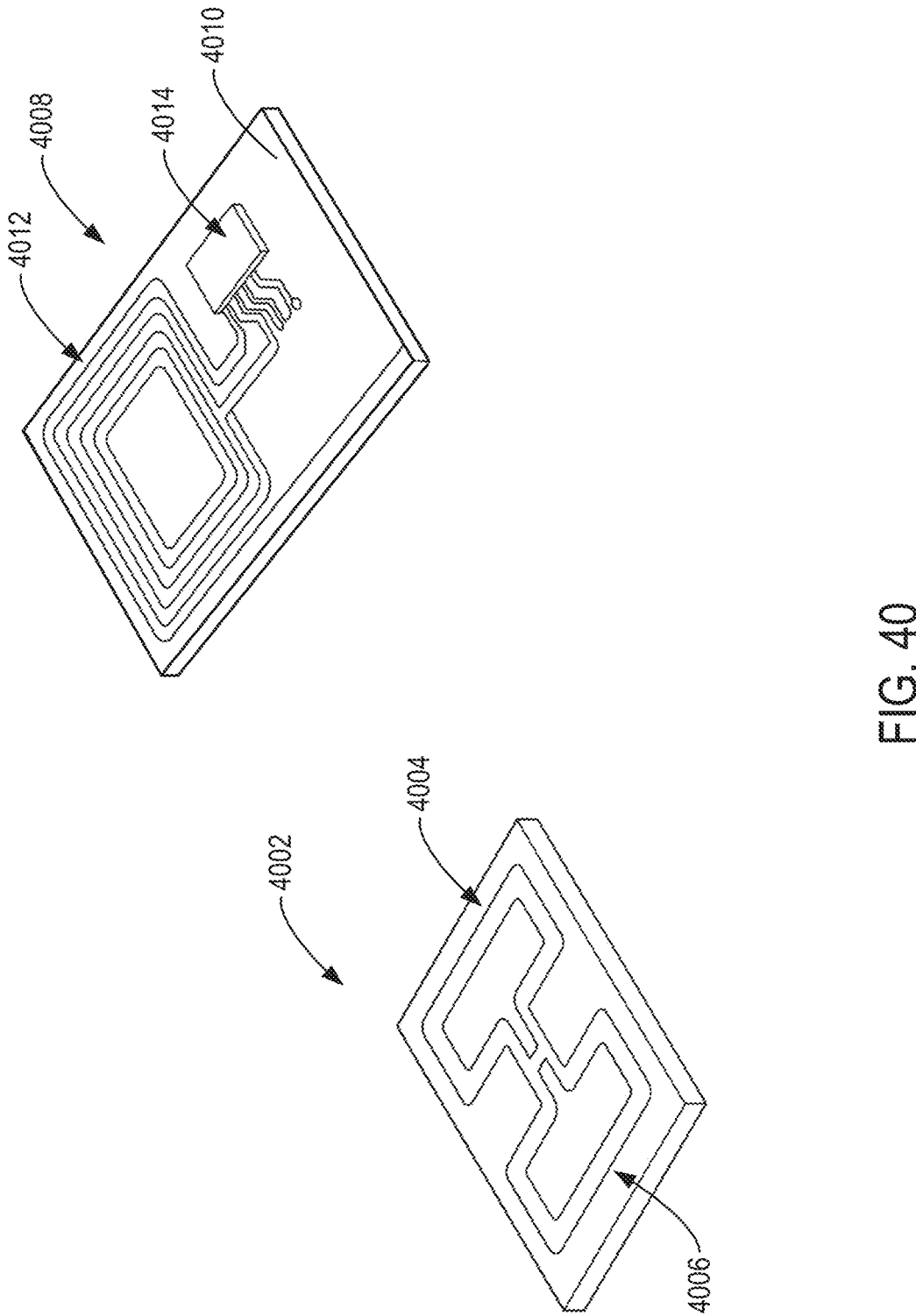

FIG. 40 illustrates two examples of RF-responsive elements that may be affixed to the exterior surface of a container for non-invasively monitoring internal contents in accordance with aspects of the present disclosure.

Figure 41:
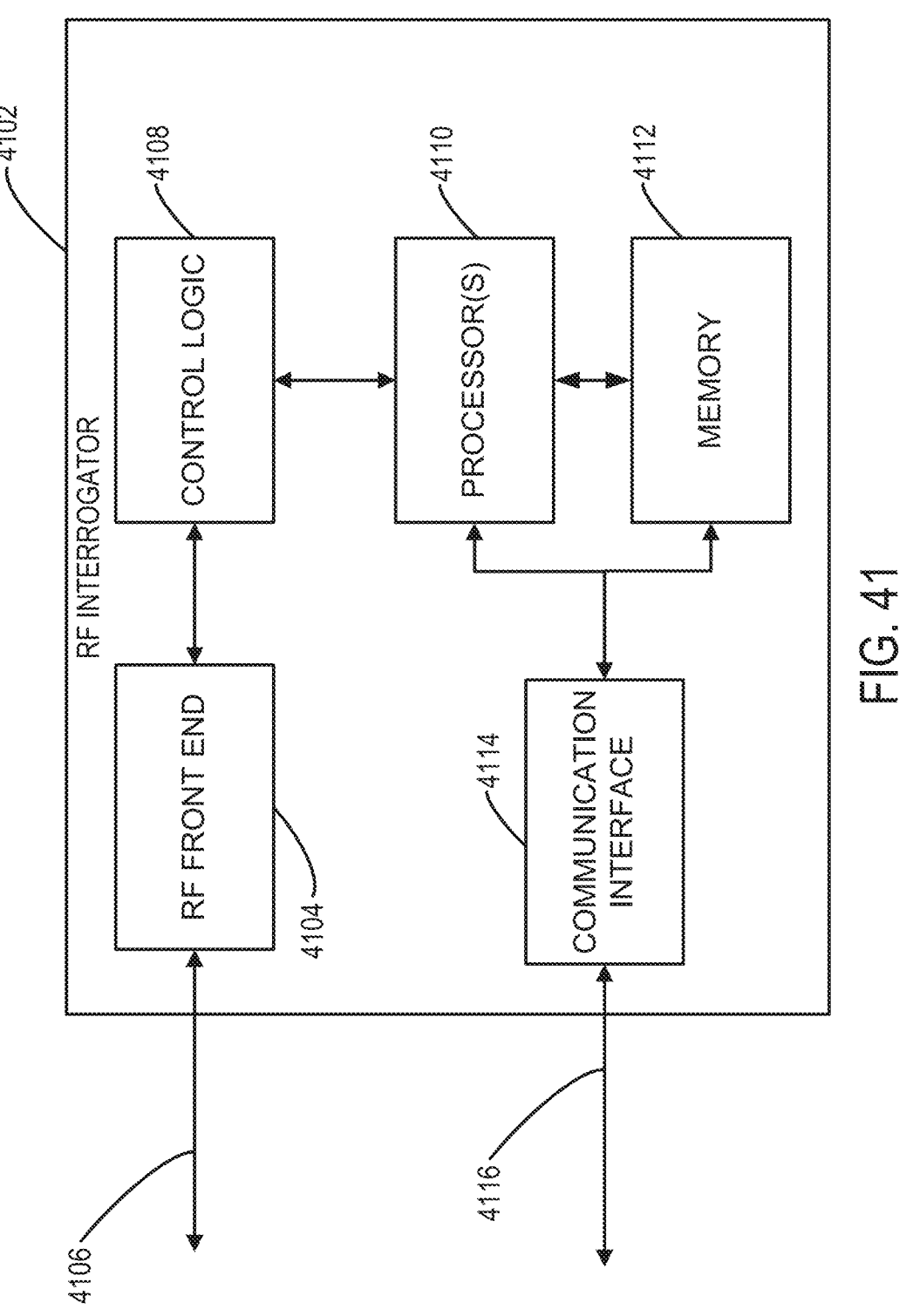

FIG. 41 illustrates an example of an RF interrogator in accordance with aspects of the present disclosure.

Figure 42:
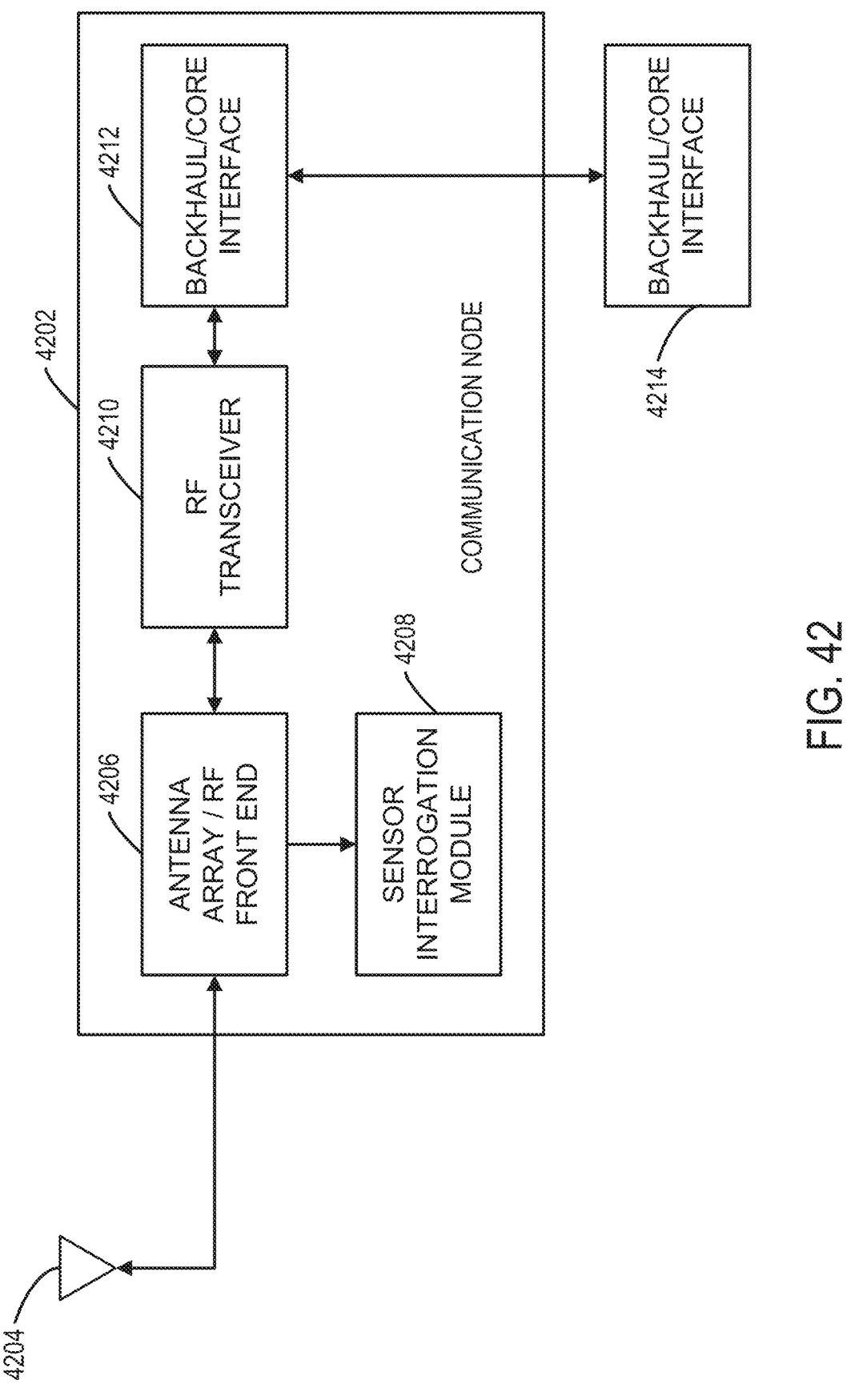

FIG. 42 illustrates an exemplary embodiment of a wireless communication node, such as a 5G base station (gNodeB), configured to perform both conventional wireless communication and RF-based environmental sensing through a sensor interrogation module in accordance with aspects of the present disclosure.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION

Note that the specific embodiments given in the drawings and following description do not limit the disclosure. On the contrary, they provide the foundation for one of ordinary skill to discern the alternative forms, equivalents, and modifications that are contemplated by the inventors and encompassed in the claim scope.

Numerous alternative forms, equivalents, and modifications will become apparent to those skilled in the art once the above disclosure is fully appreciated. It is intended that the claims be interpreted to embrace all such alternative forms, equivalents, and modifications where applicable.

Disclosed herein are an apparatus and associated method implementations related to determining a liquid level within a barrel based on a system, located external to the barrel, configured to transmit a signal into the barrel and processing signals, reflected by the contained liquid, wherein the characteristics of the reflected signal (e.g. distance and time traveled) may be used to determine the presence of the liquid; determining a level of fluid within the barrel as a function of at least one of the distance and time traveled by the transmitted/reflected signal, determining a fluid level within the barrel and determining, as a function of at least the determined level of the fluid within the barrel and the physical dimensions of the barrel, the volume of fluid within the barrel.

Disclosed herein are an apparatus and associated method implementations located external to the barrel for determining an alcohol content within a barrel based on a system configured to transmit a signal (i.e., a measurement signal) into the barrel and processing signals, reflected by the contained liquid, wherein the characteristics of the reflected signal (e.g. signal strength, frequency, phase, distance and/or time traveled) may be used to determine the presence of the liquid and the alcohol content of the liquid, wherein determination of a level of fluid within the barrel may be used to determine which of a plurality of signals are transmitted into the barrel.

In one aspect of the invention, the system disclosed may comprise a modular device consisting of a motherboard, a specialized breakout board (chips), a data transmission module, a power source and at least one transmit and/or receiving antenna. The system may be attached to the face of an enclosed container (e.g., a whiskey barrel, wine barrel, beer barrel) with an antenna array that is suitable for transmitting signals in at least one of a Millimeter Wave (MM Wave) range, or a radio frequency range (i.e., Institute of Electronic and Electrical Engineers (IEEE) designated bands HF through W, and other wavelength ranges). In one aspect of the invention, the system and method disclosed any utilize a millimeter wave transmission system in a wavelength band of 57-64 GHz. In another aspect of the invention, a transmission system may operate in one or more of an ISM (Industrial, scientific, and medical) wavelength band that would avoid interference with other types of electronic equipment.

In one aspect of the invention, each of the at least one antenna may be configured to emit or transmit a signal at a same known wavelength within one or more of the referred to wavelength bands. In one aspect of the invention, each of the at least one antenna may be configured to transmit a signal at a different known frequency (or wavelength) within one or more of the referred to wavelength bands. In one aspect of the invention, each of the at least one antenna may be configured to transmit at least one signal at one or more frequencies within one or more different known frequency or wavelength bands.

In one aspect of the invention, one or more characteristics (e.g., signal strength, frequency, phase, distance and/or time traveled) of the signals reflected by the contained fluid or liquid, may be used to determine a level of the contained fluid based at least on a position of one or more of the antennas receiving the reflected signals and subsequently the alcohol content of the liquid within the barrel.

In one aspect of the invention, the signal strength of the signals reflected by the contained fluid or liquid, may be used to determine the level of the contained fluid based at least on a position of one or more of the antennas receiving the reflected signals.

In one aspect of the invention, measurements regarding the signal strength and determined fluid level (and volume) may be relayed to a communications hub via one or more transmissions protocols and exported wirelessly (cellular, Wi-Fi) or over a wired Internet connection to a common database wherein reports may be derived. In another aspect of the invention, measurements regarding signal strength and determined fluid level (and/or volume) may be relayed by a near-field communication transmission (e.g., RFID, BLUETOOTH, etc.) that enable periodic monitoring of the determined fluid level and/or volume.

In one aspect of the invention, consultative data analysis reports may be created to assist a manufacturer/consumer with making actionable business decisions based upon results.

In accordance with the principles of the invention, the system and method disclosed may utilize a Millimeter wave transmission system (30 GHz-300 GHz) and an appropriately scaled (frequency selective) antennas to determine a level of the liquid inside of an enclosed container (e.g., a whiskey barrel).

In one aspect of the invention, by measuring the liquid level over time, a manufacturer/consumer may determine fluid internal volume at any given period. In accordance with the principles of the invention, while barrel technology is referred to, it would be understood by those skilled in the art that the system and method disclosed may be utilized to determine the fluid level in any enclosed system used containing liquid.

In one aspect of the invention, a method is disclosed for determination of an alcohol content of a liquid within an enclosed barrel wherein the alcohol content is based on an initial alcohol content and one or more environmental factors, such as location, temperature, environment conditions, etc.

In one aspect of the invention, a method is disclosed for the determination of an alcohol content of a contained fluid based on a determination of evaporation and/or absorption of the fluid and an extrapolation from a known initial level.

In one aspect of the invention, a method is disclosed wherein a determination of a loss of fluid within an enclosed container is utilized to determine an alcohol content of the fluid considering one or more environmental factors.

In accordance with the principles of the invention, while barrel technology is referred to, it would be understood by those skilled in the art that the system and method disclosed may be utilized to determine the fluid level in any enclosed system containing liquid.

In one aspect of the invention, a method is disclosed for the determination of an alcohol content of a contained fluid based on an evaluation of at least one variation in at least one characteristic (e.g., signal strength change, frequency shift, phase shift, change in distance and/or time traveled, etc.) of at least one reflection of a signal transmitted in at least one frequency or wavelength band.

Disclosed herein are an apparatus and associated method implementations related to determining a liquid level within a barrel based on a system, located external to the barrel, configured to transmit a signal into the barrel and processing signals reflected by the contained liquid. The characteristics of the reflected signal (e.g., distance and time traveled) may be used to determine the presence of the liquid, determining a level of fluid within the barrel as a function of at least one of the distance and time traveled by the transmitted/reflected signal, determining a fluid level within the barrel and determining, as a function of at least the determined level of the fluid within the barrel and the physical dimensions of the barrel, the volume of fluid within the barrel.

Disclosed herein are an apparatus and associated method implementations related to integrating RF-based environmental sensing capabilities within wireless communication infrastructure. The system is configured to transmit signals toward RF-responsive elements affixed to containers and analyze reflected or backscattered signals to determine characteristics of contained liquids or materials. The characteristics of the reflected signal (e.g., signal strength, frequency, phase, distance and/or time traveled) may be used to determine both the presence of the liquid and additional parameters such as alcohol content, with measurements potentially performed using existing cellular infrastructure to reduce deployment costs.

In one aspect of the invention, the system disclosed may comprise a wireless communication node that integrates conventional wireless communication functionality with specialized sensor interrogation capabilities. The system may include an antenna array and RF front end coupled to at least one antenna, a sensor interrogation module for environmental sensing, an RF transceiver for wireless communication, and a backhaul interface for transmitting collected data to external systems. The system may utilize beamforming capabilities to direct RF signals toward containers or RF-responsive elements positioned on their exterior surfaces, enabling non-invasive monitoring of internal contents while maintaining standard communication services.

In one aspect of the invention, the wireless communication node may be configured to transmit signals across various frequency bands, potentially including sub-6 GHz bands common in cellular deployments as well as millimeter wave ranges (30 GHz-300 GHz). The node may implement multiple frequency band operation to optimize both communication performance and sensing accuracy, with specific frequencies selected based on the materials being monitored and the desired sensing metrics. In some implementations, the node may coordinate resource allocation between communication and sensing functions through time-division or frequency-division multiplexing approaches.

In one aspect of the invention, one or more signal characteristics (e.g., signal strength, frequency, phase, distance and/or time traveled) of the signals reflected by RF-responsive elements on containers may be analyzed by the sensor interrogation module within the wireless communication node. This analysis may determine fluid levels, alcohol content, or other parameters of interest based on correlations between signal features and internal container conditions, potentially leveraging machine learning models trained on reference measurement data.

In one aspect of the invention, the wireless communication node may be a 5G base station (gNodeB) or similar wireless access point that directs beamformed signals toward containers or storage areas, utilizing the same RF infrastructure for both conventional communication services and specialized sensing applications. This dual-use approach enables efficient resource utilization and may simplify deployment in environments where both connectivity and monitoring are required.

In one aspect of the invention, measurements and inferences generated by the sensor interrogation module may be transmitted through the node's backhaul interface to centralized processing systems, management platforms, or application servers. These measurements may be relayed using standard cellular protocols, transmitted via wired Internet connections, or distributed through private networks, enabling integration with broader inventory management, quality control, or regulatory compliance systems.

In one aspect of the invention, the wireless communication node may implement various sensing modalities within the sensor interrogation module, including passive backscatter detection from RFID tags, active interrogation of semi-passive elements, or direct radar-based monitoring of liquid interfaces. The specific technique may be selected based on deployment requirements, container materials, and desired measurement accuracy, with the node potentially supporting multiple simultaneous sensing approaches.

In accordance with the principles of the invention, the wireless communication node may support both local processing of sensing data within the node and transmission of raw or preprocessed measurements to external systems for more sophisticated analysis. This flexible architecture enables deployments tailored to specific operational requirements, from edge-focused implementations with minimal backhaul requirements to cloud-centric approaches that leverage centralized computing resources for enhanced inference accuracy.

Aspects of the present disclosure provide apparatuses, methods, processing systems, and computer-readable mediums for non-invasively monitoring internal contents of sealed containers using external sensor elements configured to detect and analyze radio-frequency (RF) signal interactions. In various embodiments, such external sensor elements are affixed to an outer surface of the container and cooperate with RF interrogation devices to measure signal characteristics corresponding to conditions inside the container. By processing these RF responses, the system can determine parameters such as fluid level, alcohol content, and environmental changes without breaching the container or introducing any measurement probes into the enclosed space.

In one implementation, the aspects disclosed herein evolved from a desire to enable remote, accurate, and efficient tracking of aging fluids (e.g., distilled spirits) and other liquid products stored for extended periods. Traditionally, determining the condition of a liquid inside a sealed barrel involved frequent manual measurements or invasive sampling methods. Building upon improvements in RF sensing, miniaturized antennas, and advanced signal-processing techniques, aspects of the present disclosure leverage multiple externally mounted RF-responsive elements and robust analytics-thereby reducing the operational costs, contamination risks, and inaccuracies associated with prior approaches. The resulting solution not only preserves product quality but also allows real-time or scheduled data gathering and analysis across networks of containers in large-scale facilities.

At least one technical challenge addressed herein is the difficulty of accurately assessing internal container conditions (e.g., fluid level, alcohol strength, or other chemical characteristics) without physically disrupting or exposing the contents. Conventional methods relied on time-intensive sampling, physical probes that can alter flavor profiles or introduce contaminants, or bulky equipment poorly suited for rickhouse and warehouse-scale deployment. Moreover, widespread adoption of non-invasive measurement systems has historically been hindered by limitations in RF propagation through container walls, variable environmental interference, and the need to distinguish between slight changes in liquid volume versus changes in ambient conditions.

The technical solutions provided in embodiments of the present disclosure overcome these problems by integrating RF-responsive elements on external surfaces of the container, as illustrated and described herein, in conjunction with an RF interrogation apparatus and computational intelligence. These RF-responsive elements may provide signal reflections and variations corresponding to fluid levels, dielectric changes of the contained liquid, and structural conditions of the barrel or cask. By correlating these signal signatures with reference data sets or machine-learning models, the aspects described herein can infer internal fluid levels and alcohol content. In some aspects, artificial intelligence algorithms dynamically adjust interrogation parameters to mitigate signal interference or environmental noise, enabling repeated, high-fidelity measurements without dismantling or opening containers.

Advantages of these techniques include a reduced risk of contamination, since no probes intrude into the sealed container, and more consistent data collection, given the automated or semi-automated nature of RF-based measurements. Facilities benefit from near real-time monitoring of large inventories, ensuring better regulatory compliance, predictive maintenance, and timely identification of liquid losses or quality issues. By maintaining container integrity while simultaneously capturing precise analytics, the inventive system significantly enhances production oversight, supports advanced aging strategies, and offers a scalable, low-labor solution applicable across various industries.

Each of the foregoing implementations can be employed individually or in conjunction.

Figure 1:
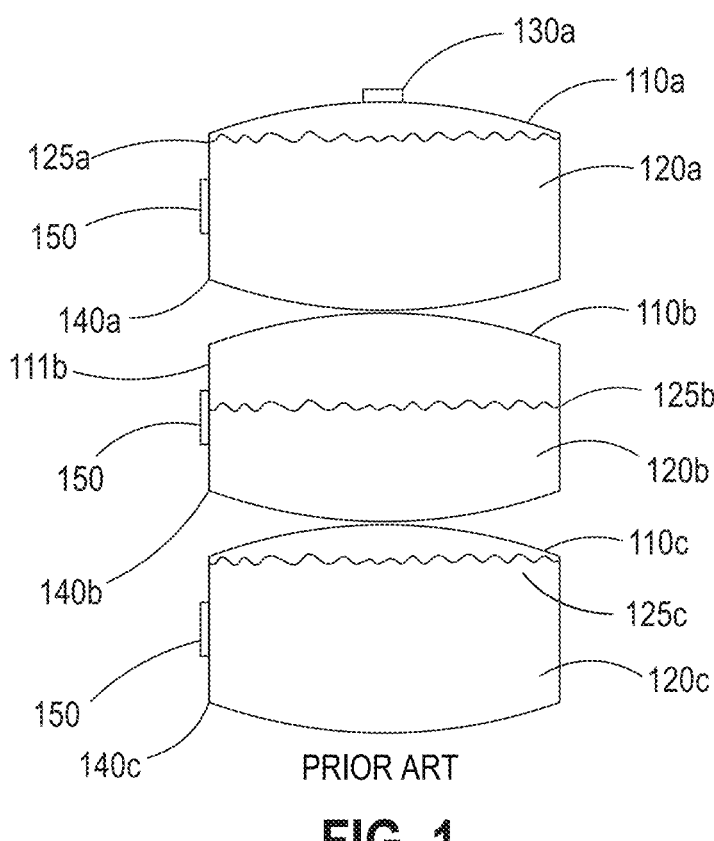
FIG. 1 illustrates a first conventional configuration for storing a plurality of barrels and the liquid contained therein.

FIG. 1 illustrates a first conventional configuration for storing a plurality of barrels and the liquid contained therein.

Conventionally barrels 110a, 110b, 110c, may be filled with a liquid 120a, 120b, 120c, respectively, and stacked horizontally in racks (not shown). The implementation depicted by FIG. 1 shows the exemplary respective liquid levels 125a, 125b, 125c of liquids 120a, 120b, 120c. Access to barrels 110a, 110b, 110c, is conventional though a bung 130 individually configured in each barrel 110 (of which only bung 130a associated with barrel 110a is shown). In the depicted example the bung 130a is positioned on a side surface of the corresponding barrel 110a. Although only bung 130a associated with barrel 110a is shown, it would be recognized that bung 130 (130a, 130b, 130c) is associated with each of the illustrated barrels 110a, 110b, 110c.

Generally, the bung 130 (e.g., 130a, 130b, 130c) enables a tester (not shown) to access the liquid 120a, 120b, 120c in a corresponding one of barrels 110a, 110b, 110c. As previously discussed, the conventional manner of testing is to insert an object (e.g., a pipette), into the bung hole 130, wherein liquid is collected in the pipette and removed from barrel 110. The liquid may then be tested to determine quality and the level of the liquid within the barrel using a graduated scale on the pipette.

However, as discussed above, the opening of the bung 130 to insert the pipette into the container 110 to test the contained liquid 120 introduces air and, possibly, other contaminants into the contained liquid. The introduced air may alter the quality of the contained liquid.

Accordingly, container monitoring system 150, disclosed herein, resolves the issues that are known to occur with the conventional means for testing the liquid level within the container. Container monitoring system 150 provides a non-invasive method for determining a level of a contained liquid 120a within barrel 110a, through its inclusion or introduction onto a face surface 140 of each of the illustrated containers or barrels 110a.

Although face surface 140a associated with barrel 110a is shown, it would be recognized that monitoring system 150 may be applied to the face surface 140 of barrels 110b, 110c to provide a non-invasive method for determining a level of a contained liquid (120b, 120c) within barrels 110b, 110c, respectively.

Figure 2:
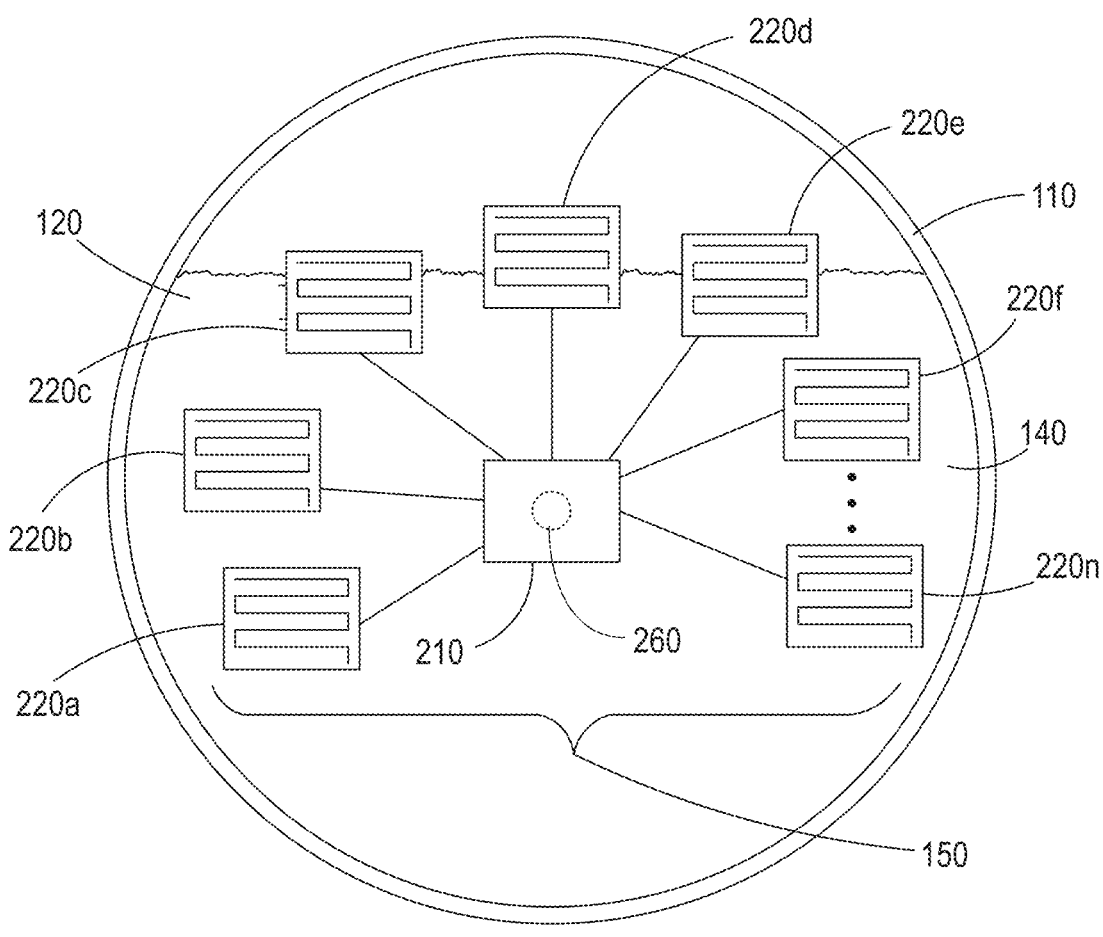
FIG. 2 illustrates a first exemplary embodiment of a system for determining liquid content within a barrel in accordance with the principles of the invention.

FIG. 2 illustrates a first exemplary embodiment of a monitoring system 150 in accordance with the principles of the invention.

In accordance with the principles of the invention, monitoring system 150 comprising processing section 210 and a plurality of antennas 220 (220a, 220b, 220c . . . 220n) which are positioned on a face surface 140 of a corresponding container or barrel 110.

In accordance with the illustrated aspect of the invention, monitoring system 150 is arranged circumferentially (a "wagon wheel" configuration) about the face surface 140 of barrel 110, wherein processing system 210 is at a center (or hub) of the plurality of illustrated antennas 220a, 220b, . . . 220n.

In accordance with this aspect of the invention, the position of each of the illustrated antennas 220a, 220b . . . 220n with respect to a center position 260 of face surface 140 is known and in a symmetrical relationship. For example, in this illustrated aspect, antennas 220a, 220b . . . 220n may be positioned on face 140 in a conventional "clock" formation. That is, antenna 220d is illustrated as being positioned in a 12 o'clock position with respect to center 260, antenna 220e is illustrated as being positioned at a 1 o'clock position with respect to center 260. Antenna 220f is illustrated as being positioned at a 2 o'clock position with respect to center 260 and antenna 220n may be positioned at a 4 o'clock position with respect to center 260. Similarly, antennas 220c, 220b and 220a may be positioned at 11 o'clock, 10 o'clock and 8 o'clock positions, respectively, with respect to center 260. In accordance with the principles of the invention, the positioning of the illustrated antennas establishes a relationship between a reference point (i.e., center point 260) and each of the antennas that may be used to determine a level of fluid 120 within container 110.

In another aspect of the invention, the plurality of illustrated antennas may be arranged in a physically, (i.e., non-systematical) relation, wherein antennas 220d, 220e, 220f, and 220n may be positioned as discussed above (12, 1, 2, 4 o'clock, respectively) and antennas 220c, 220b and 220a may be positioned at 11:30 o'clock, 10:30 o'clock and 8:30 o'clock positions, respectively with respect to center 260. In accordance with the principles of the invention, the positioning of the antennas 220a . . . 220n in this manner provides for a refined determination of the level of fluid 120 within container 110, as will be discussed.

In one aspect of the invention, processing system 210 provides signals to a corresponding one of the antenna 220a, . . . 220n, which operates as a transmitting antenna to transmit the signals through face 140 toward liquid 120 contained within barrel 110. The corresponding antenna 220a . . . 220n, may then operate as a receiving antenna to receive a reflection of the transmitted signal, which is caused by the interaction of the transmitted signal with the contained liquid 120.

In one aspect of the invention, antennas 220a, 220b, . . . 220n may be omni-direction antennas that emit (or transmit) signals over a wide field of view (e.g., toward and away from face 140). In another aspect of the invention, antennas 220a, 220b . . . 220n may be directional antennas that emit (or transmit) signals in a very limited field of view (e.g., toward face 140). In still another aspect of the invention antennas 220a, 220b . . . 220n may be highly directional antennas with narrow beams widths that emit (or transmit) signals in a limited and narrow field of view (e.g., toward face 140 with 1-degree beamwidth).

In one aspect of the invention, antennas 220a, 220b . . . 220n may each be configured as transmitting and receiving antenna, wherein original signals provided by processing system 210 are transmitted by antennas 220a . . . 220n and reflection signals, captured by antennas 220a . . . 220n), are provided to processing system 210. In another aspect of the invention, selected ones of the illustrated antennas 220a, 220b . . . 220n may operate as transmitting antennas to transmit signals into container 110 and selected other ones of the illustrated antennas 220a. 220b . . . 220n may operate as receiving antenna to capture reflections of the transmitted signals. The antennas designated as transmitting antennas receive signals from processing system 210 and receiving antenna provide signals to processing system 210.

In addition, antennas designated as transmitting antennas may comprise omni-directional or highly directional antenna and antennas designated as receiving antennas may be narrow beam width directional antennas.

In one aspect of the invention, a single antenna may be designated as a transmitting antenna (e.g., 220d) and the remaining of the illustrated antennas (220a, 220b, 220c, 220e . . . 220n) may be designated as receiving antenna. In this case, a single "ping" from the one transmitting antenna may be detected by a plurality of receiving antennas and the results of the detected reflections may be utilized to determine a level of fluid contained. In still another aspect of the invention, the single transmitting antenna may periodically transmit a "ping" and each of the designated receiving antenna may be selectively "turned-on" to enable the 'turned-on' receiving antenna to receive a reflection of the transmitted signal.

Although, monitoring system 150 is shown with processing system 210 as a central hub, it would be recognized by those skilled in the art that processing system 210 may be placed at any position on face 140 without altering the scope of the invention claimed.

Figure 3:
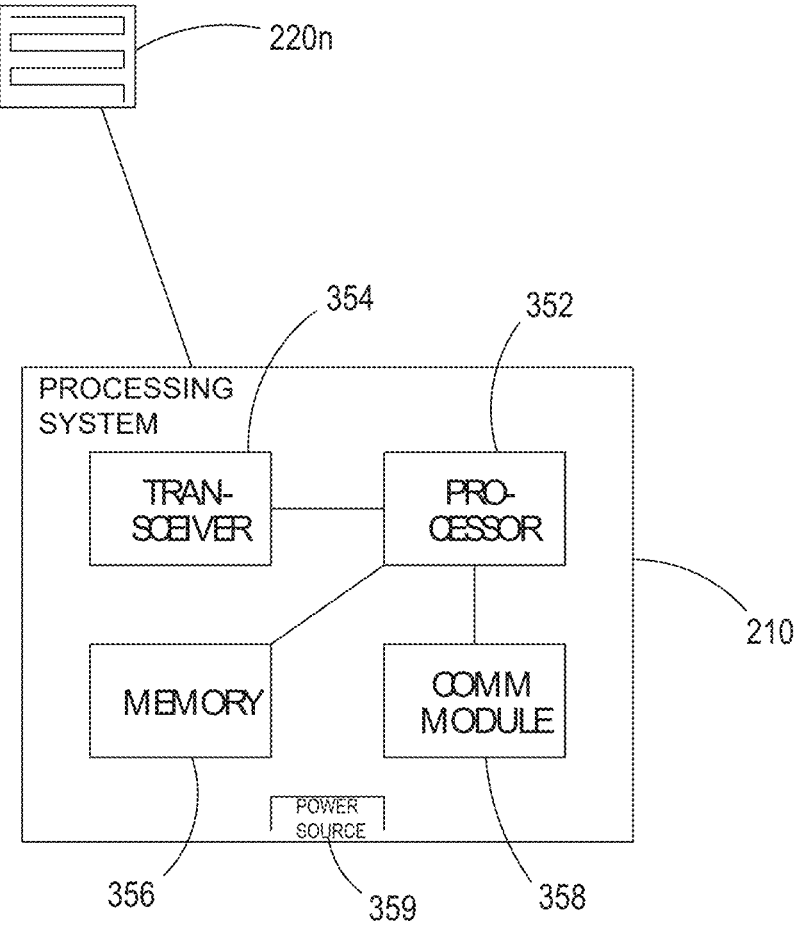
FIG. 3 illustrates a block diagram of an exemplary embodiment of a processing system for determining liquid content within a barrel in accordance with the principles of the invention.

FIG. 3 illustrates a block diagram of an exemplary embodiment of a processing system for determining liquid content within a barrel in accordance with the principles of the invention.

In accordance with the principles of the invention, processing system 210 comprises a transceiving (transmitter/receiver) system 354 that is in communication with antennas 220a . . . 220n (of which only antenna 220n is shown in FIG. 3). Transceiving system 354 may include one or more switching networks (not shown) that provide signals to selectively provide signals to a corresponding one of the plurality of antennas 220a, 220b, 220c . . . 220n. For example, transceiving system 354 may provide through a (not shown) switching network, signals to each of the plurality of antennas shown in FIG. 2, for example, in a sequential manner such that only one antenna is transmitting and/or receiving at any given time. Alternatively, the (not shown) switching network(s) may cause more than one antenna to concurrently transmit signals and/or receive reflection signals. Alternatively, the (not shown) switching network may cause at least one of the antennas to operate as a transmitting antenna while causing at least one of the plurality of antenna to operate as a receiving antenna.

Although element 354 is referred to as a transceiving system, it would be recognized that transceiving system 354 may comprise separate receiving and transmitting system without altering the scope of the invention claimed.

Processor 352 may comprise one or more conventional processing systems (e.g., INTEL Pentium serial processors) that operates to access instructions and provides control instruction to processing system 210. PENTIUM is a registered trademark of INTEL Corporation, a Delaware, USA corporation. Alternatively, processor 352 may comprise dedicated hardware and software that may provide control instruction to processing system 210.

Memory 356 provides storage capability for instructions (software, code) that may be accessed by processor 352 to control the processing of processing system 210. Memory 356 may for example be represented as semiconductor memory, such as a combination of PROM (programmable read-only memory), wherein instructions are permanently stored or RAM (random access memory), wherein data values may be accessed and overwritten.

Communication module (i.e., transmitter/receiver) 358 represents a means to provide data collected by processor 352 to one or more external devices (not shown), which may be used to evaluate, correlate and collate the data collected. Communication module 358 may comprise a wired or a wireless communication connection to the not shown external devices. For example, communication module 358 may be in wired communication with one or more systems that may be in communication with the Internet that allows for the monitoring of the determined fluid level over a broad geographical area.

Alternatively, communication module 358 may include elements that provide information through one or more wireless communication protocols (e.g., a very short-range NFC protocol (e.g., RFID), a short-range protocol (BLUETOOTH), a longer-range protocol (Wi-Fi) and a long-range protocol (e.g., cellular)). In addition, communication module 358 may operate to receive information from an external source either through a wired communication protocol or a wireless communication protocol. Such information may, for example, comprise instructions (code) that may be stored in memory 356, information regarding the tank (e.g., volume, dimensions, a type of material comprising the tank, etc.) to which system 150 is attached, and the content of the tank. This information may include information for the reprogramming, or the pairing, of system 150 with the specific tank (or barrel) 110. In one aspect of the invention, monitoring system 150 may be "paired" with a specific barrel, such that monitoring system 150 may monitor the contents of the paired barrel 110 over multiple uses of the barrel. For example, an identification number of the container (or barrel) to which monitoring system 150 is attached, may be input into memory 354. Alternatively, barrel 110 may include an electronic identification code that may be input via a wireless communication connection into monitoring system 150 (i.e., paired) using a short-range identification communication protocol (e.g., RFID).

Power source 359 provides power (electrical energy) to the electrical/electronic components of processing system 210. In one aspect of the invention power source 359 may represent a lithium-nickel battery that provides power to monitoring system 210 for an extended period of time. In another aspect of the invention, power source 359 may be a rechargeable battery element that may be recharged by removal from processing system 210 or recharged while included within processing system 210. Alternatively, power source 359 may be an AC to DC converter that receives electrical energy from a main source of power (e.g., 120-volt outlet) and converts the received power to a direct current that is used to power the electrical/electronic components of processing system 210.

Figure 4:
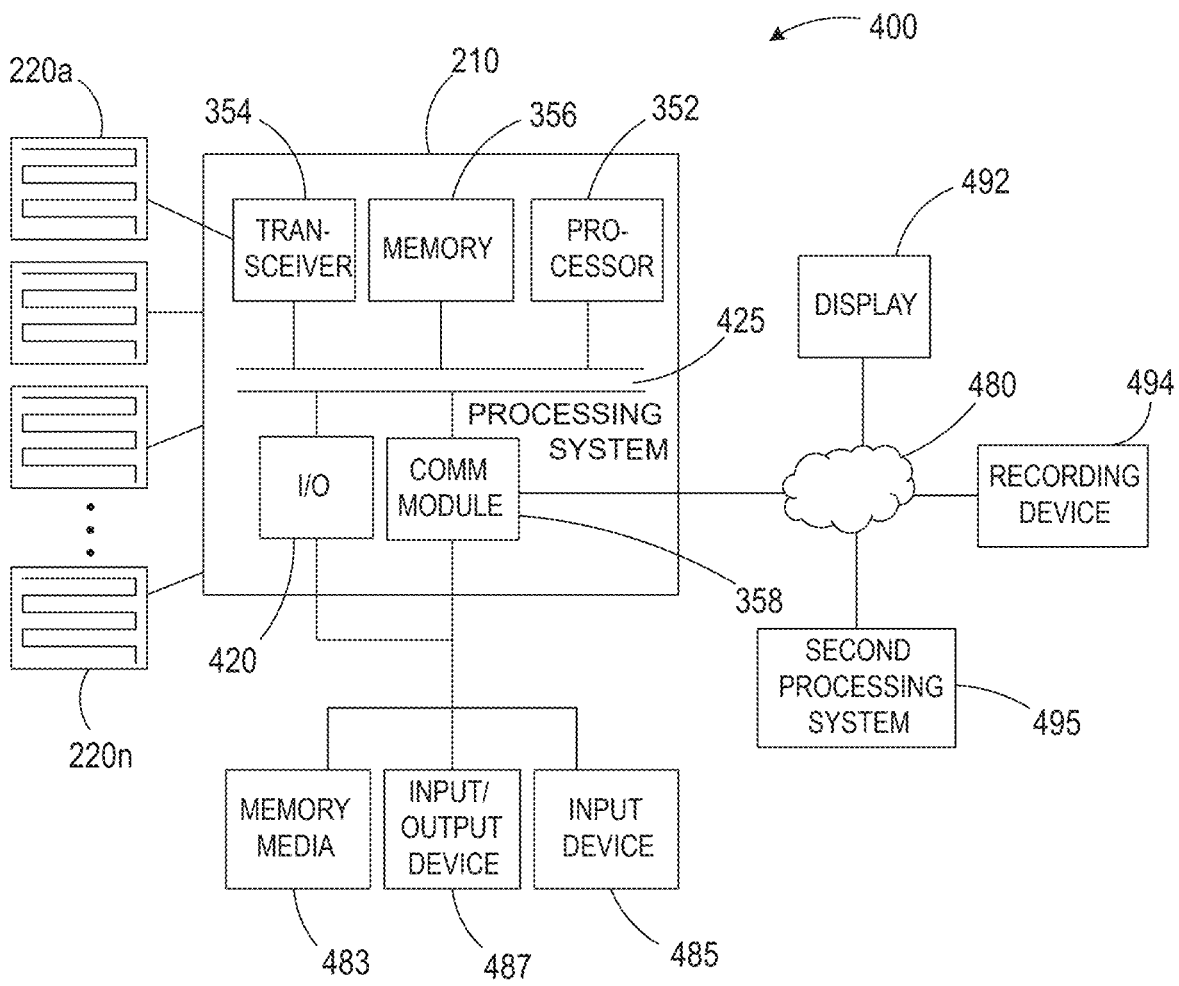
FIG. 4 illustrates a block diagram of an exemplary system for determining liquid content within a barrel in accordance with the principles of the invention.

FIG. 4 illustrates a block diagram of an exemplary system for determining liquid content within a barrel in accordance with the principles of the invention.

In this exemplary system embodiment 400, input data is received from antennas (sources) 220a . . . 220n and processed in accordance with one or more programs, either software or firmware, executed by processing system 210. The results of processing system 210 may then be transmitted over network 480 for viewing on display 492, reporting device 494 and/or a second processing system 495.

In the depicted implementation processing system 210 includes one or more receiving devices 354 that receive data from the illustrated sources or devices 220a . . . 220n. The received data is then applied to processor 352, which is in communication with input/output device 420 and memory 356. Transmitting/receiving element 354, processor 352 and memory 356 may communicate over a communication medium 425, which may represent a communication network, e.g., ISA, PCI, PCMCIA bus, one or more internal connections of a circuit, circuit card or other device, as well as portions and combinations of these and other communication media.

Processor 352 may be a general processor central processing unit (CPU) or a special purpose processing unit or dedicated hardware/software, such as a PAL, ASIC, FGPA, each of which is operable to execute computer instruction code or a combination of code and logical operations. In one embodiment, processor 352 may include, or access, software or code that, when executed by processor 352, performs the operations illustrated herein. As would be understood by those skilled in the art when a general-purpose computer (e.g., a CPU) loaded with or accesses software or code to implement the processing shown herein, the execution of the code transforms the general-purpose computer into a special purpose computer. The code may be contained in memory 356 or may be read or downloaded from one or more external devices.

For example, code or software may be downloaded from a memory medium, such as a solid-state memory or similar memory devices 483, or may be provided by a manual input device 485, such as a keyboard or a keypad entry, or may be read from a magnetic or optical medium (not shown) or via downloaded from a second I/O device 487 when needed. Information items provided by external devices 483, 485, 487 may be accessible to processor 352 through input/output device 420, as shown. Further, the data received by input/output device 420 may be immediately accessible by processor 352 or may be stored in memory 356. Processor 352 may further provide the results of the processing to one or more external devices (i.e., display 492, recording device 494 or a second processing unit 495).

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit (e.g., ASIC).

As would be understood, the operations illustrated may be performed sequentially or in parallel using different processors to determine specific values. Processing system 210 may also be in two-way communication with each of the sources 220a . . . 220n. Processing system 210 may further receive or transmit data over one or more network connections 480 from a server or servers over, e.g., a global computer communications network such as the Internet, Intranet, a wide area network (WAN), a metropolitan area network (MAN), a local area network (LAN), a terrestrial broadcast system, a cable network, a satellite network (cellular), and a wireless network (Wi-Fi), as well as portions or combinations of these and other types of networks. As will be appreciated, network 480 may also be internal networks or one or more internal connections of a circuit, circuit card or other device, as well as portions and combinations of these and other communication media or an external network, e.g., the Internet and Intranet.

In one aspect of the invention, external devices 483, 485, 487, 492, 494, 495 may be representative of a handheld calculator, a special purpose or general-purpose processing system, a desktop computer, a laptop computer, tablet computer, or personal digital assistant (PDA) device, etc., as well as portions or combinations of these and other devices that can perform the operations illustrated.

Figure 5A:
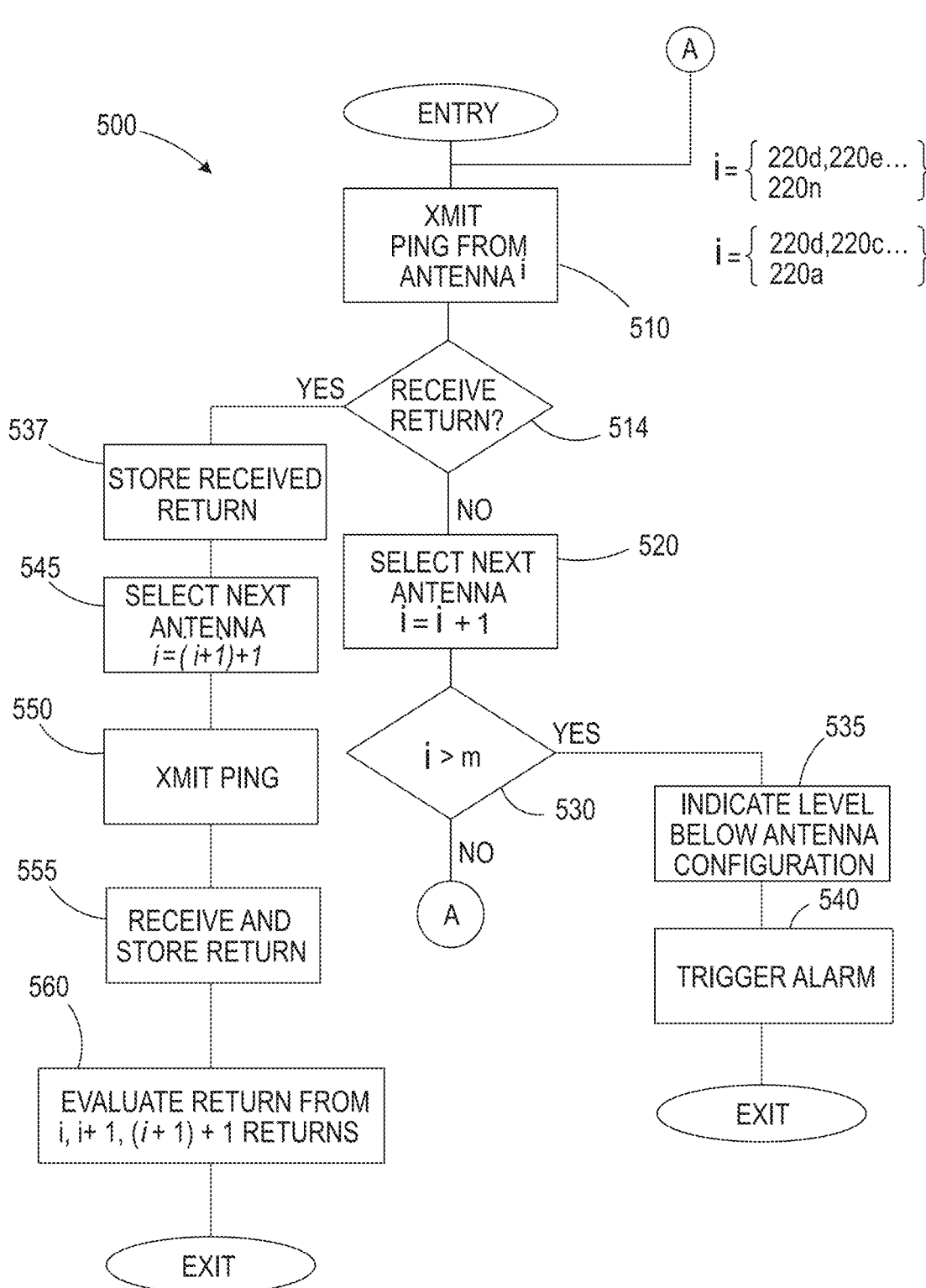
FIG. 5A illustrates a flowchart of an exemplary processing in accordance with the principles of the invention.

FIG. 5A illustrates a flowchart of an exemplary processing in accordance with the principles of the invention.

In this illustrated exemplary processing 500, the processing system 210 (described with reference to at least FIGS. 2-4) initiates transmission of a signal (referred to, hereinafter as "ping") to a selected one ("i") of the antenna 220a . . . 220n. In one aspect of the invention, the initially selected antenna may be selected as the top-most antenna (i.e., 220d, FIG. 2) as the container may be considered in an initially "full state."

In accordance with the illustrated embodiment shown in FIG. 2, processing may operate from the highest antenna 220d positioned on face 140 to the lowest antenna positioned on face 140 (220a or 220n). In one aspect of the invention, processing may select to operate with antennas selected from a first set of antennas (i.e., 220d, 220e . . . 220n—clockwise selection). Alternatively, processing may select to operate with antennas selected from a second set of antennas (i.e., 220d, 220c . . . 220a—counterclockwise selection). In still another alternative aspect of the invention, processing may select to operate using the first set of antennas and then the second set of antennas, wherein the first and second sets of antennas may be a symmetric or a non-symmetric relation with respect to a known point (e.g., center point 260). Although examples of the selection of the one or more antenna selected to be within the set of antenna are disclosed, it would be recognized that other methods of selection of antennas within the set of antenna may be implemented without altering the scope of the invention claimed.

Processing then selects, at step 510, an initial antenna selection, referred to as "i" from which a signal or a ping is to be transmitted. At step 514, processing waits for return or reflection of the transmitted ping.

Upon not receiving a return (or reflected) signal (after a known period of time, as discussed in FIG. 5B), processing continues to step 520, where a next ("i+1") antenna is selected from the selected clockwise or counterclockwise set of antennas. Processing then proceeds to step 530 where a check of the value (within the selected set) of the selected antenna is greater than the number of antenna (m) within the selected set of antenna. If the value of the selected antenna is greater than the number antenna within the set, then processing proceeds to step 535, wherein the returns (i.e., reflections of transmitted pings) from each of the antenna within the selected set of antenna is evaluated.

At step 535, the processing system 210 performs a test to determine if any return has been received from any antenna in the selected set. Upon determining no returns have been received from any of the antennas in the selected set, the processing system 210 sets an indication that no returns have been received from any of the antennas in the selected set and, hence, the liquid level is flagged as being "Too Low." At step 540, the processing system 210 triggers an alarm indication to indicate the "Too Low" condition.

Returning to step 530, if the value (within the selected set) of the next selected antenna is not greater than the number of antennas within the selected set, processing proceeds to step 510 to transmit (i.e., Xmit) a ping from the selected (next) antenna.

Returning to step 514, when a return is detected, processing proceeds to step 537 where the received return is stored. At step 545, a next antenna is selected ((i+1)+1), wherein processing proceeds to step 550 to transmit a ping from the selected (next) antenna. At step 555, a return from the transmitted "ping" is received and subsequently stored.

At step 560, the returns from the i, i+1 and (i+1)+1 antenna selected are evaluated to determine a level of the contained liquid.

As the antenna selection is made from highest to lowest antenna placement on face 140 (in this illustrative processing) after two sequential returns are received, processing is halted as each of the antennas lower in position to the (I+1)+1 antenna would be in contact with the contained liquid and, thus, information from these lower antennas do not contribute any additional information to the level of the contained liquid. This limitation of the number of antennas transmitting is advantageous as it reduces the power requirements needed in obtaining a level of the contained fluid.

Although FIG. 5A refers to processing for selecting one antenna in one of a clockwise set and a counterclockwise set of antennas, it would be understood that the processing shown in FIG. 5A may be adaptable to select first one set of antennas (e.g., clockwise) and then select the other set of antennas (e.g., counterclockwise) to determine the level of the contained liquid.

In one aspect of the invention, wherein the position of the antennas within one set (e.g., clockwise) of antenna on face 140 may be spatially offset from a position of the antenna in the second set (e.g., counterclockwise) of antenna on face 140 (i.e., non-symmetrical relation), the use of information from both the first and second sets of antenna provides for a more precise determination of the liquid within container 110.

Figure 5B:
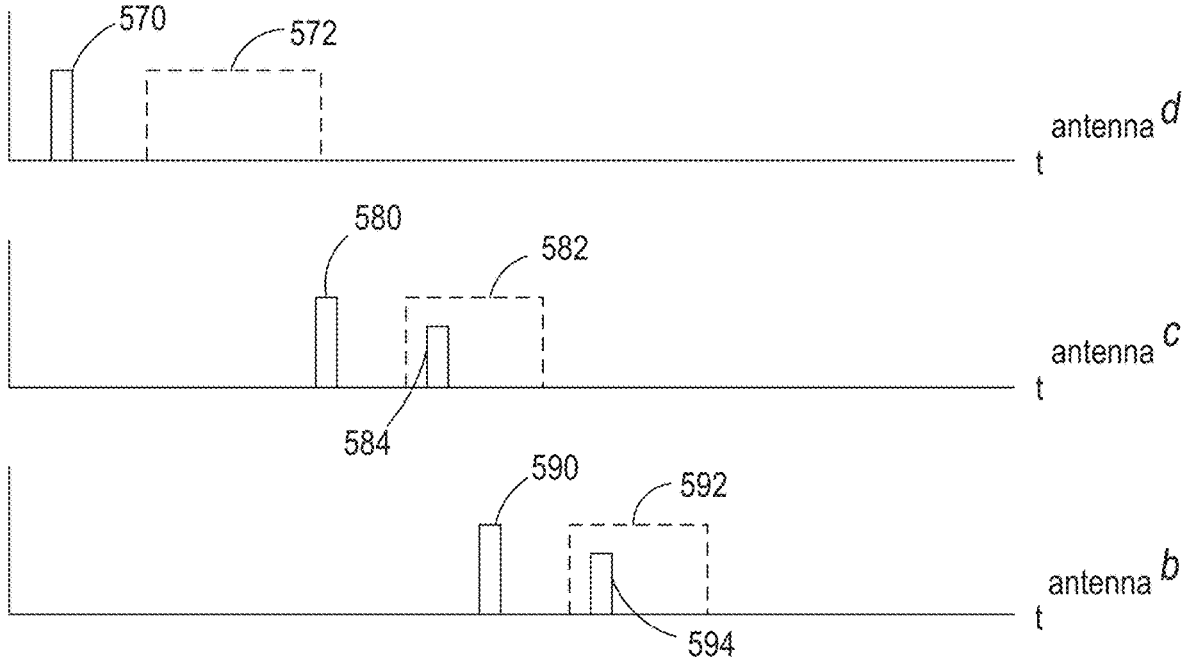
FIG. 5B illustrates an exemplary timing chart in accordance with the principles of the invention.

FIG. 5B illustrates an exemplary timing chart in accordance with the principles of the invention.

In this illustrated example, which corresponds to the processing shown in FIG. 5A, an initial ping or transmission 570 is made from antenna 220d (the highest antenna illustrated in FIG. 2). A return window 572 is opened. The time period the return window 572 remains open is based on the expected time of the detection of a return to ping 570.

In this illustrated example, a return is not detected within the expected time, which is flagged as a return, but a NO response. Processing proceeds to select a next antenna (e.g., antenna 220c), wherein a ping 580 is transmitted and a return window 582 is opened. In this illustrated example, return 584 is detected and window 582 is closed. A next antenna (e.g., antenna 220*b*) is selected from which ping 590 is transmitted and return window 592 is opened.

As illustrated, return 594 is detected and, thus, window 594 is closed.

Figure 6:
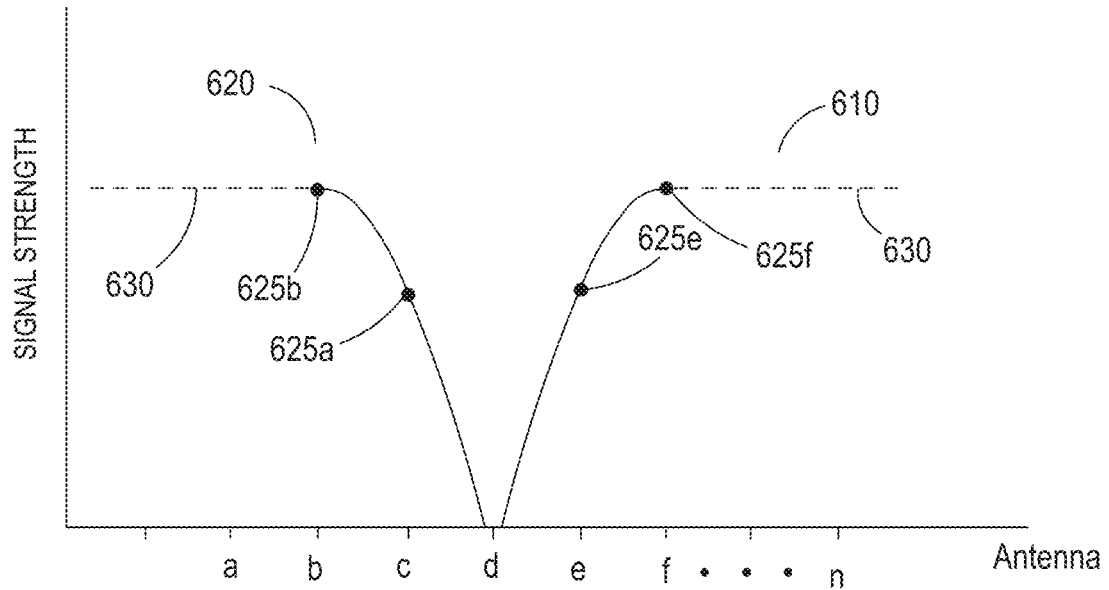
FIG. 6 illustrates a graph of an exemplary signal return chart for determined liquid content within a barrel in accordance with the principles of the invention.

FIG. 6 illustrates a graph of an exemplary signal return chart 600 for determining liquid content within a barrel in accordance with the principles of the invention.

In this illustrated example, which is related to the timing diagram shown in FIG. 5B, the transmission of a ping from antenna 220*d* produces no return and, hence, no signal is shown for antenna 220*d* in FIG. 6. However, with the selection of antenna 220*e* and 220*f,* returns 625*e* and 625*f* detected by antenna 220 and 220*f,* respectively are shown on graph segment 610.

With the detection of return 625*e* and, a second (confirmation) return 625*f,* processing may be halted and a level of contained liquid may be determined.

Further illustrated are returns 625*c* and 625*b,* associated with antenna 220*c* and 220*b,* (see FIG. 2), respectively on graph segment 620.

In accordance with one aspect of the invention, returns 625*b,* 625*c,* 625*e* and 625*f* may be evaluated (e.g., signal strength) to determine a level of the contained fluid.

In accordance with another aspect of the invention, the position of antennas 220*b,* 220*c* may be spatially offset (i.e., physically displaced) from antennas 220*e,* 220*f* and, thus, the evaluation of the received returns may determine the level of the contained liquid more precisely, as previously discussed.

Figure 7A:
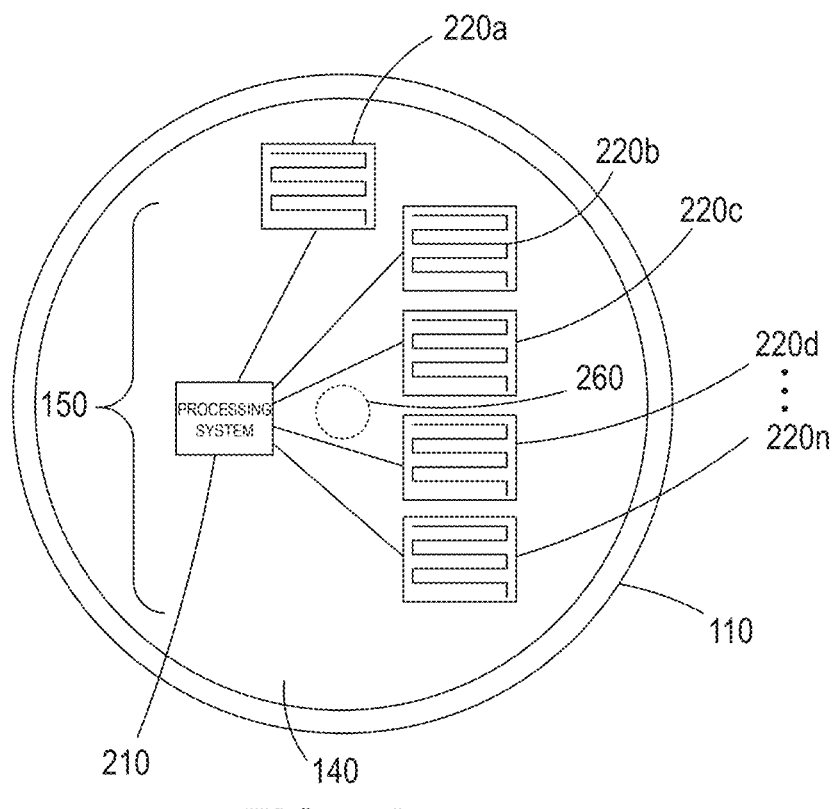
FIGS. 7A and 7B illustrate a first and second aspect of a second exemplary embodiment of a system for determining liquid content within a barrel in accordance with the principles of the invention.

FIG. 7A illustrates a first aspect of a second exemplary embodiment of a system for determining liquid content within a barrel in accordance with the principles of the invention.

In this illustrated configuration, antenna 220*a,* 220*b* . . . 220*n* are arranged linearly on face 140 of barrel 110.

In this illustrated configuration, antenna 220*a,* 220*b,* 220*c* . . . 220*n* are shown in a linear arrangement, wherein processing similar to that shown in FIGS. 5A, 5B and 6 may be performed.

Figure 7B:
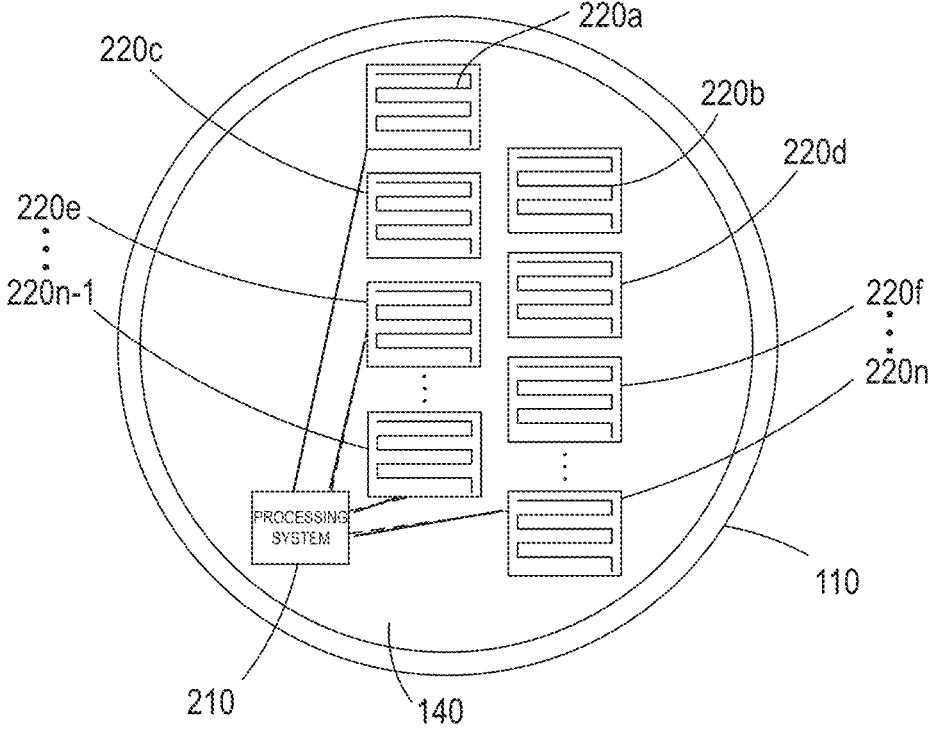

FIG. 7B illustrates a second aspect of a second exemplary embodiment of a system for determining liquid content within a container (or barrel) in accordance with the principles of the invention.

In this illustrated configuration, antenna 220*a,* 220*c* . . . 220*n*-1 may be arranged in a first set and antenna 220*b,* 220*d* . . . 220*n* may be arranged in a second set of antennas that is spatially offset from the first set of antennas. As discussed with regard to FIG. 2, the positioning of the illustrated plurality of antenna in a physically non-symmetrical relation allows for a more precise determination of a level of fluid within barrel 110. In the implementation depicted by FIG. 7A the processing system 210 is disposed at a known offset distance from the center point 260 of the face 140 of the barrel 110. The implementation depicted by FIG. 7B includes but does not show the barrel 110 face 140 center point 260 that is not visible behind the depicted antenna 220*e.*

Accordingly, a determination of the level of a contained liquid may be made based on the receiving of reflections of transmitted pings or signals as previously discussed.

Figure 8:
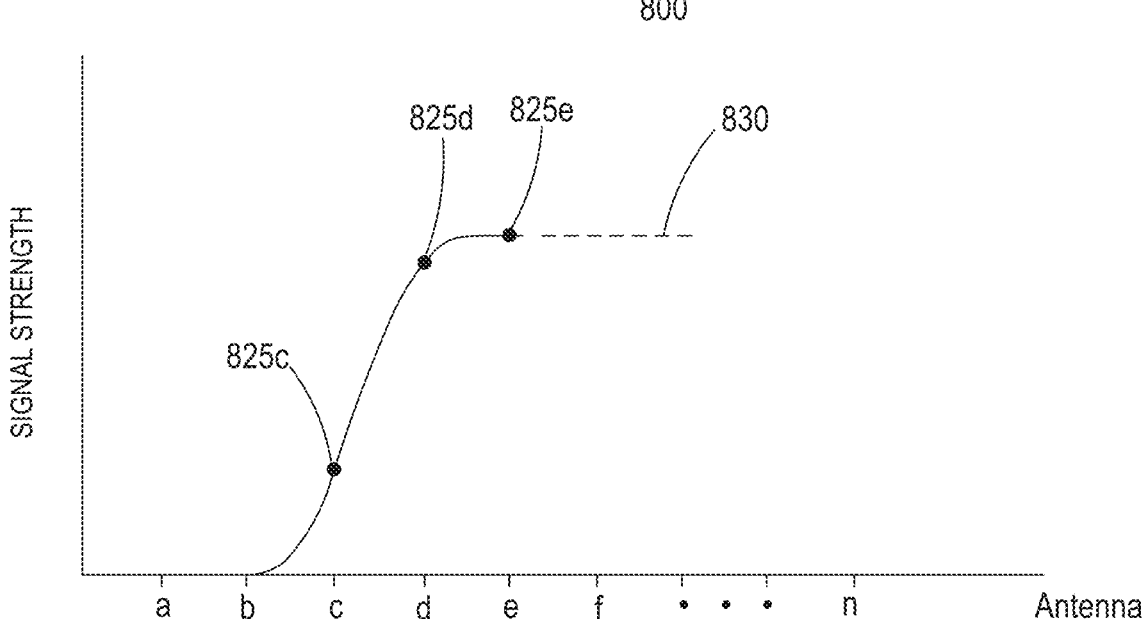
FIG. 8 illustrates a graph of an exemplary signal return chart associated with the configurations shown in FIGS. 7A and 7B for determined liquid content within a barrel in accordance with the principles of the invention.

FIG. 8 illustrates a graph of an exemplary signal return chart 800 associated with the configurations shown in FIGS. 7A and 7B in accordance with the principles of the invention.

In accordance with this aspect of the invention, signals transmitted by antenna 220*a,* 220*b* (two physically highest antenna, FIGS. 7A and 7B) fail to provide a response within an expected time window (FIG. 5B) and, thus, a first return 825*c* is received from the transmission of a ping from antenna 220*c* with a subsequent return 825*d* received from the transmission of a ping from antenna 220*d* as shown on graph segment 830. As discussed previously, processing may be halted after two consecutive returns are received.

In accordance with one aspect of the invention, when the returned signal level differ by a known amount, a next transmission and return 825*e* may be executed to validate a previous return (e.g., 825*d*).

In this illustrative example, a level of the content liquid in barrel 110 may be determined as lying between the position of antenna 220*b* and 220*c,* based on the strength of return signals depicted by FIG. 8. Hence, with the knowledge of the position of each of the antenna with respect to center point 260 (FIG. 2), the level of liquid 120, and the volume content within barrel 110 may be accurately determined.

Figure 9:
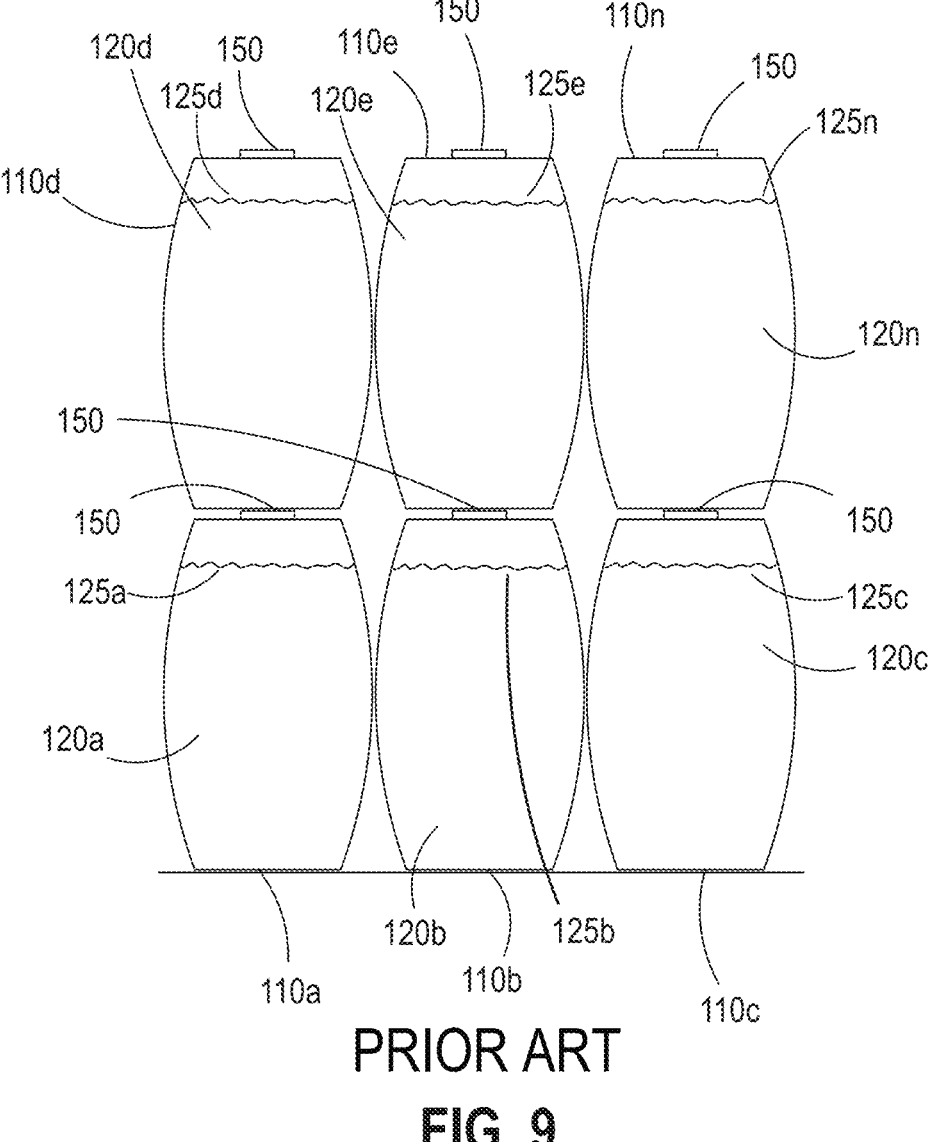
FIG. 9 illustrates a second conventional configuration for storing a plurality of barrels and the liquid contained therein.

FIG. 9 illustrates a second conventional configuration for storing a plurality of barrels and the liquid contained therein.

In this second configuration of storing barrels, barrels 110*a,* 110*b,* . . . 110*n* are stored vertically where monitoring system 150 is attached to face 140 of each of the illustrated barrels 110. The implementation depicted by FIG. 9 shows the exemplary respective liquid levels 125*d.* 125*e,* 125*n,* 125*a,* 125*b,* 125*c* of liquids 120*d,* 120*e,* 120*n,* 120*a,* 120*b,* 120*c.*

In this illustrated configuration, it would be recognized by those skilled in the art that the level of the contained liquid with each of the barrels may be obtained from a single signal or ping, as the level of the liquid is measured from face 140.

Accordingly, monitoring system 150 may be configured to include a single antenna configuration that may be used to monitor the vertically displaced liquid within the vertically stacked container(s) 110.

Figure 10:
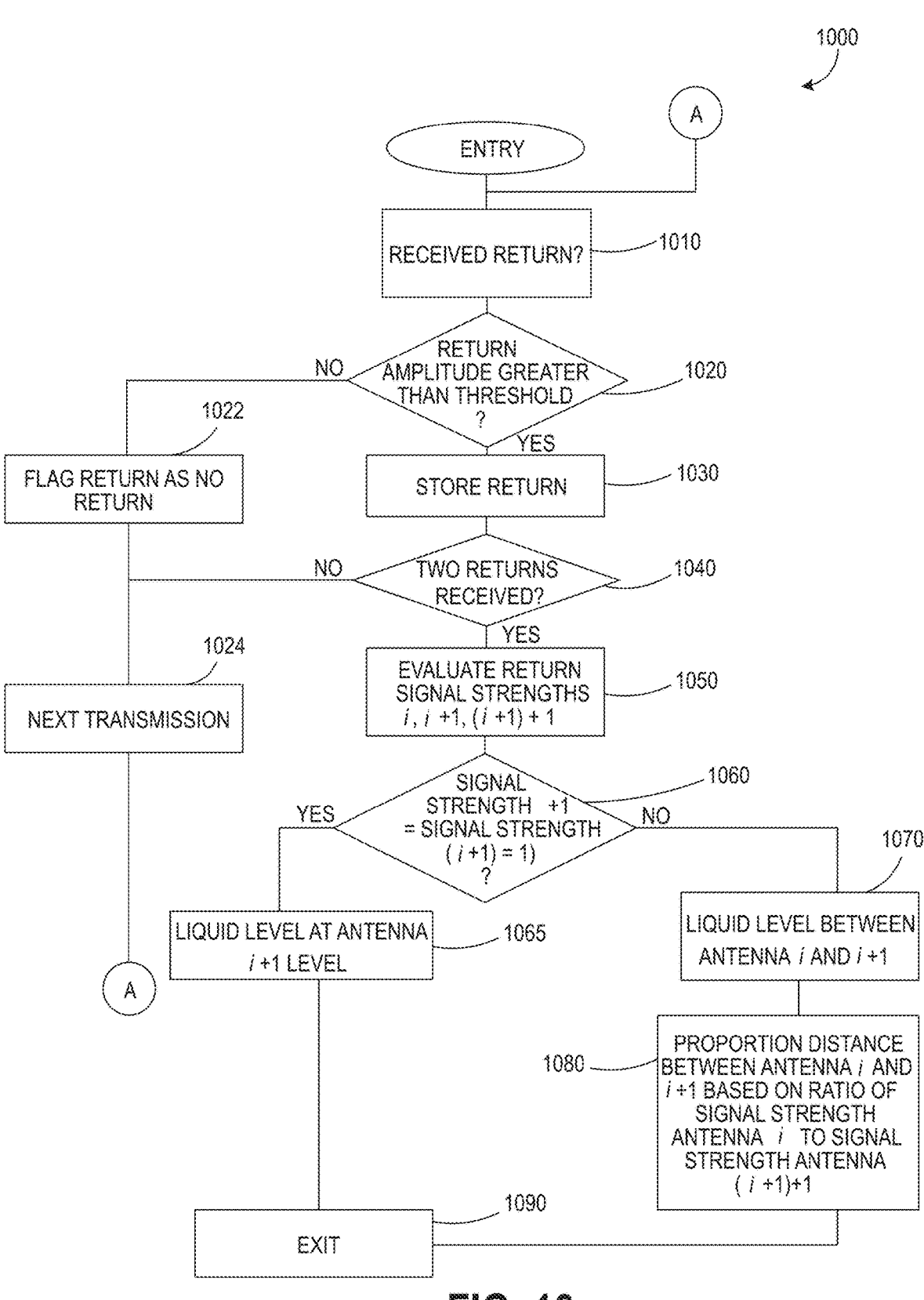
FIG. 10 illustrates a flowchart of an exemplary processing for determining liquid content within a barrel in accordance with the principles of the invention.

FIG. 10 illustrates a flowchart of an exemplary processing for evaluating the return signals in accordance with the principles of the invention.

In accordance with the illustrated processing 1000, a determination is made at step 1010 as to whether a return has been received. If so, a signal strength or amplitude of the received signal (i.e., the return) is evaluated with regard to a threshold level at step 1020. If the received signal strength is less than or equal to a predetermined minimum threshold level, then processing continues to step 1022, where the return is removed from the processing and an indication of NO return is associated with the transmitted ping. At step 1024, a next antenna is selected (as previously discussed) and processing continues at step 1010.

Returning to step 1020, if the return signal strength is greater than the predetermined minimum threshold, then processing proceeds to step 1030 where the return is stored.

At step 1040 a determination is made whether two consecutive returns have been received. If not, then processing proceeds to step 1024, wherein a next transmission is initiated.

However, if two consecutive returns have been received, the processing continues to step 1050 to evaluate the received signal strengths associated with the first return (i.e., antenna i+1) and the second return (i.e., antenna i+1+1).

At step 1060 a determination is made whether the received signal strengths of the two consecutive returns are approximately the same. If so then the contained liquid level is determined to be comparable to the position of the i+1 antenna at step 1065. Processing then proceeds to step 1090 where the processing is ended.

Returning to step 1060, if the signal strengths are not approximately equal, then the liquid level may be determined to be between the $i^{th}$ and the $i^{th}+1$ antenna at step 1070. In one aspect of the invention, the liquid level may be determined proportionally between the $i^{th}$ and the $i^{th}+1$ antenna based on the signal strength of the $i^{th}+1$ antenna with respect to the signal strength of the $i^{th}+1+1$ antenna.

Processing then proceeds to step 1090 to exit.

In accordance with the principles of the invention, the determined level of the contained liquid, based on the signal strength of at least two responses or reflections, which are greater than a threshold value, may then be transmitted to one or more of the illustrated external devices shown in FIG. 4. In one aspect of the invention, threshold value may be preset within memory 356. Alternatively, a threshold value may be downloaded into memory 356 in a manner as previously discussed. In still another aspect of the invention, the threshold value may be dynamically determined, based in part, on the characteristics of the container. For example, a size of the container, a material of the container, etc. For example, a calibration of the monitoring system 150 may occur once placed on a face 140 of a container, wherein the characteristics of the container and/or contained liquid may be entered into monitoring system 150. A series of transmissions may occur from one or more of antenna 220a . . . 220n, and the responses to the series of transmissions may be evaluated for establishing a threshold value that enables signals that may be considered valid responses to the processed.

In one aspect of the invention, a volume of the contained liquid may be obtained from at least the determined fluid level and knowledge of the physical dimensions of the container. For example, the volume of the barrel or tank may be determined as:

$$V(tank)=\pi r^2 L$$

where L is the length of the tank; and
r is the radius of a circular segment of the tank
The filled volume of a horizontally oriented tank or barrel, for example, may be determined by first finding an area, A, of a circular segment and multiplying it by the length, L.
A partial volume calculation may next be derived as:

$$A=(1/2)r\,2(\downarrow-\sin\downarrow)$$

where $\downarrow=2*\arccos(m/r)$ and
$\downarrow$ is in radians.
Accordingly, a volume of a segment may be determined as:

$$V(segment)=(1/2)r^2(\downarrow-\sin\downarrow)L.$$

If the determined fluid level, f, is less than ½ of "d", then the segment created from the level height and V (fill)=V (segment).

However, if the fluid level, f, is greater than ½ of "d" then, the segment that is created by the empty portion of the tank may be determined and subtracted from the total volume of the container or tank to obtain:

$$V(fill)=V(tank)-V(segment).$$

Figures 11A, 11B, 11C:
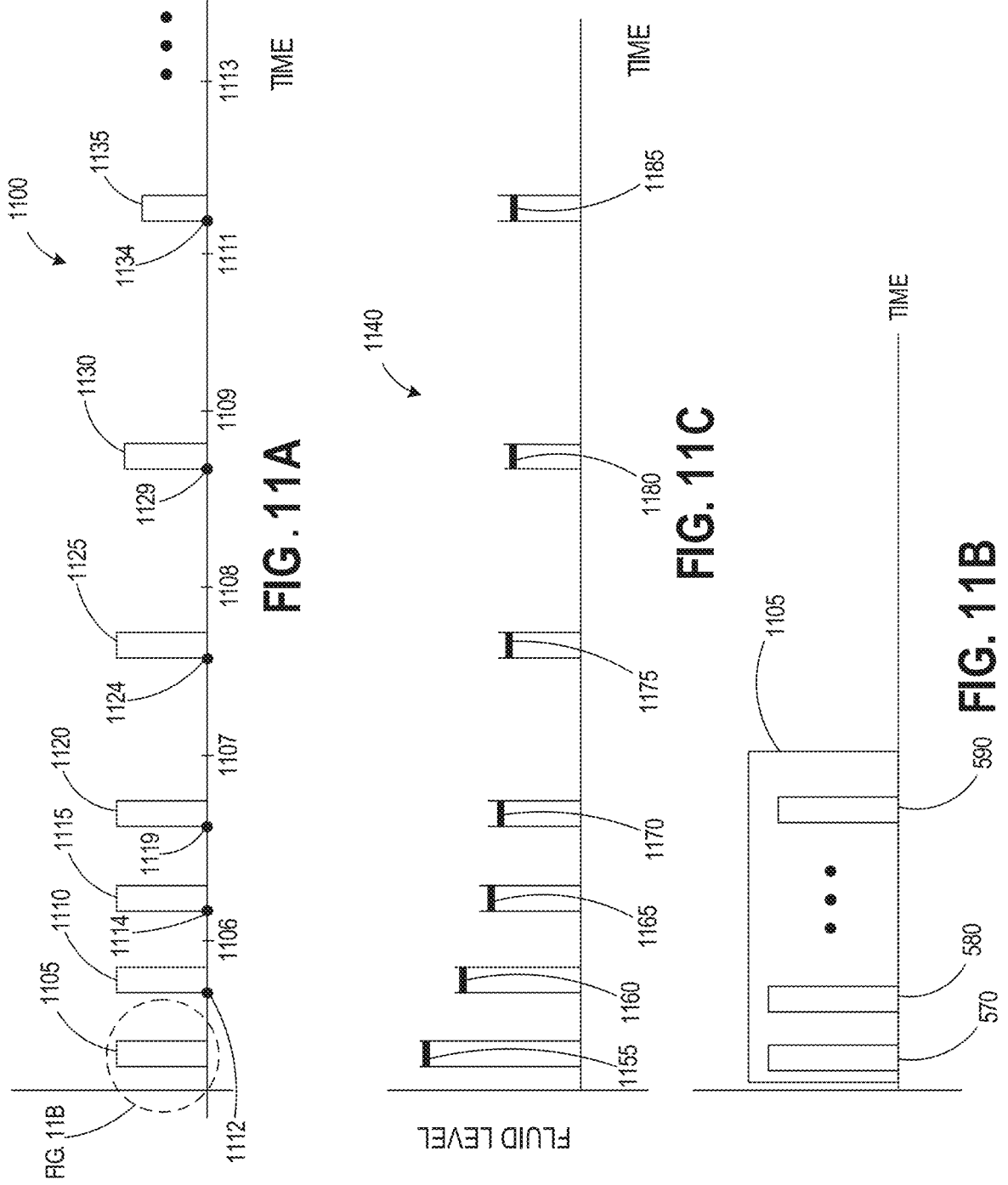
FIGS. 11A-11C illustrate exemplary signal transmission and signal return graphs as a function of time in accordance with one aspect of the invention.

In another aspect of the invention, for vertically oriented barrels, the volume of the contained liquid may be obtained as:

$$V(tank)=\pi r^2 h,$$

where h is height of the contained fluid.
FIGS. 11A-11C illustrate exemplary signal transmission and signal return graphs as a function of time in accordance with a further aspect of the invention.

In accordance with this further aspect of the invention, the quality of a container may be determined by the long-term evaluation of the losses (leakage and/or absorption) of the liquids contained with the container. The long-term evaluation of the losses associated with a container may further be utilized to determine a rate of testing of the liquid within the container.

FIG. 11A illustrates an exemplary signal transmission graph 1100 as a function of time, wherein signal transmissions occur within bursts over an extended period of time. In accordance with the principles of the invention, the duration of the usage of monitoring system 150 is divided into a plurality of periods 1106, 1107, 1108, 1109, 111, 1113 and 1117, which are referred to in this exemplary illustration as collection time periods. Further shown are a plurality of transmission bursts 1105, 1110, 1115 . . . 1150, wherein a measurement of a fluid within a container is made.

FIG. 11B is an expanded view of burst 1105, which is identified as FIG. 11B in FIG. 11A.

In this illustrated example, a plurality of transmissions 570, 580 and 590 (which are comparable to the transmissions shown in FIG. 5B) are included within burst 1105, wherein the plurality of transmissions are associated with at least one of the illustrated antenna 220a-220n, as previously discussed. Accordingly, a collection of fluid levels may be obtained for each of the illustrated transmission bursts.

In one aspect of the invention, processing system 210 may include a timer circuit (not shown) that provides an alarm clock feature that causes processing system 210 to transmit burst 1105, containing transmissions 570, 580, 590. After processing the associated reflections from transmissions 570, 580, 590, processing system 210 may enter a sleep mode, in which little power is consumed. After burst 1105 is completed, processing system 210 may again be activated by the timer circuit (not shown) to cause the transmission of signals (i.e., 570, 580, 590) within burst 1110.

This process of sleeping after each burst is completed and activating after a known time thereafter (e.g., 1112, 1114, 1119, 1124 . . . 1149) repeats for the life of the container or barrel to which monitoring system 150 is attached.

This process of sleeping and activation is advantageous as it provides for extended usable life of a fixed, or dedicated power source.

In one aspect of the invention, the activation time may be substantially constant such that fluid measurement may be made at a known rate. For example, burst transmissions 1105 . . . 1150 may occur at a known rate (e.g., a daily basis, a weekly basis, a monthly basis, etc.). The desired rate of fluid measurement may be input into processing system 210 as previously described.

Alternatively, and as shown in FIG. 11A, the rate of fluid measurement may be made dynamically, based on changes in the fluid measurement over time.

FIG. 11C illustrates an exemplary graph 1140 of corresponding fluid levels or container volume determined based on the return signals associated with the transmission bursts.

In this exemplary graph, a fluid level or container volume value 1155 may be determined based on the signal transmissions/signal returns associated with burst 1105. Similarly, a fluid level or container volume value 1160 may be determined based on the signal transmissions/signal returns associated with burst 1110. And in accordance with the principles of the invention, fluid levels or container volumes 1165, 110, 1175, 1180 1185, 1195, etc. may be determined based on the signal transmissions/signal returns associated with corresponding transmission bursts 1115, 1120, 1125, 1130, 1135, 1150, etc.

As illustrated, the determined fluid level, or volume, initially decreases from a high value 1155 (i.e., full barrel) to a lower value 1175 and then remains substantially constant (i.e., 1175, 1180, 1185) as the losses from leakage and/or absorption decrease over time.

Accordingly, the rate of change of the fluid level or volume may, thus, be used to determine a duration of a sleep state of processing system 210. For example, when the rate of change of the fluid level is high (e.g., level 1155 to level 1160), signal transmission bursts and subsequent level measurements may be performed at a first rate (e.g., once/day). However, as the rate of change of the measured fluid level is slowing (e.g., level 1165 to level 1170) the duration of a sleep state of processing system 210 may be increased such that signal transmission bursts and measurements are performed at a second rate (e.g., once/week). In addition, as the rate of change of the measured fluid level is determined to be substantially negligible (e.g., level 1180 to level 1185) the duration of the sleep state of processing system 210 may be increased still further.

This dynamic determination of the rate of measurement is further advantageous as it further decreases the power needed to maintain system 150 for extended periods (e.g., multiple years).

Figure 12:
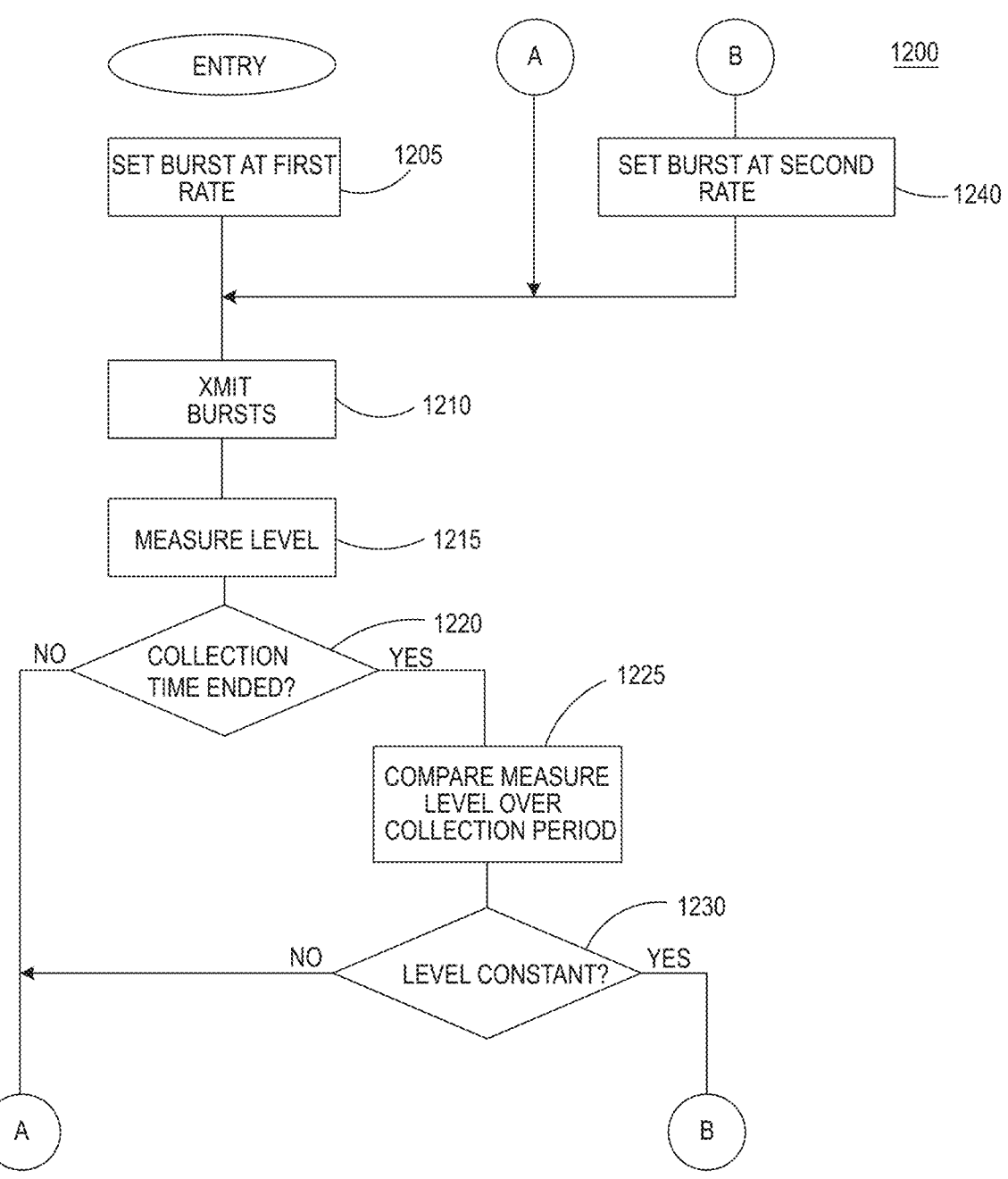
FIG. 12 illustrates an exemplary processing associated with the graphs shown in FIGS. 11A and 11B.

FIG. 12 illustrates an exemplary processing 1200 associated with the graphs shown in FIGS. 11A-11C.

In this illustrated process, the rate of burst transmission 1105-1150 (each containing signal transmission 570, 580 590) is set to a first rate at step 1205. At step 1210, a burst transmission (e.g., 1105) occurs wherein a fluid level (or volume) is determined at step 1215, as previously discussed. At step 1220, a determination is made whether a collection time has ended. If not, then processing proceeds to step 1210 to cause the emission of a second or next burst transmission (e.g., 1110), wherein a second measurement level is determined. At step 1220, a determination is again made as to whether a collection time has ended (e.g., 1106).

If the collection time has ended, processing proceeds to step 1225, wherein the determined fluid level (volume) (e.g., 1155, 1160) are evaluated to determine a rate of change of the determined fluid levels.

At step 1230, a determination is made whether the rate of change is small (i.e., substantially constant level). If the rate of change is not small (i.e., fluid level is not substantially constant) then processing proceeds to step 1210, wherein a next set of burst transmission (e.g., 1115, 1120) occur at the first rate.

However, if the rate of change of the fluid level is small (i.e., fluid level is determined to be substantially constant), then processing proceeds to step 1240, wherein the rate of subsequent transmission bursts is set to a second rate. As shown in FIG. 11A, the second rate is increased such that processing system 210 remains in a sleep state for a longer period and a lesser number of burst transmissions 1130, 1135 occur in an associated collection time period.

To further provide valuable information to the distillers, a measure of alcohol content of the remaining fluid may be determined from the determined evaporation/absorption of the fluid or liquid within the container.

Distilled liquids are stored in warehouses that are generally not climate controlled, and, hence, the ambient or surrounding environment affects the rate of evaporation and/or absorption of the contained liquids.

Environmental factors, such as temperature, barrel characteristics, time and geography contribute to a rate of change of an alcohol content of the fermenting liquid or fluid within a container. Local climate, which includes temperature, temperature fluctuations, and humidity, also affects the rate of evaporation. Local geography, such as altitude, seasonal variations and air quality also affects the rate of evaporation, and, consequently, the alcohol content within the barrel. In addition, the condition of the container is also a factor in the rate of production of alcohol in the container.

Figure 13:
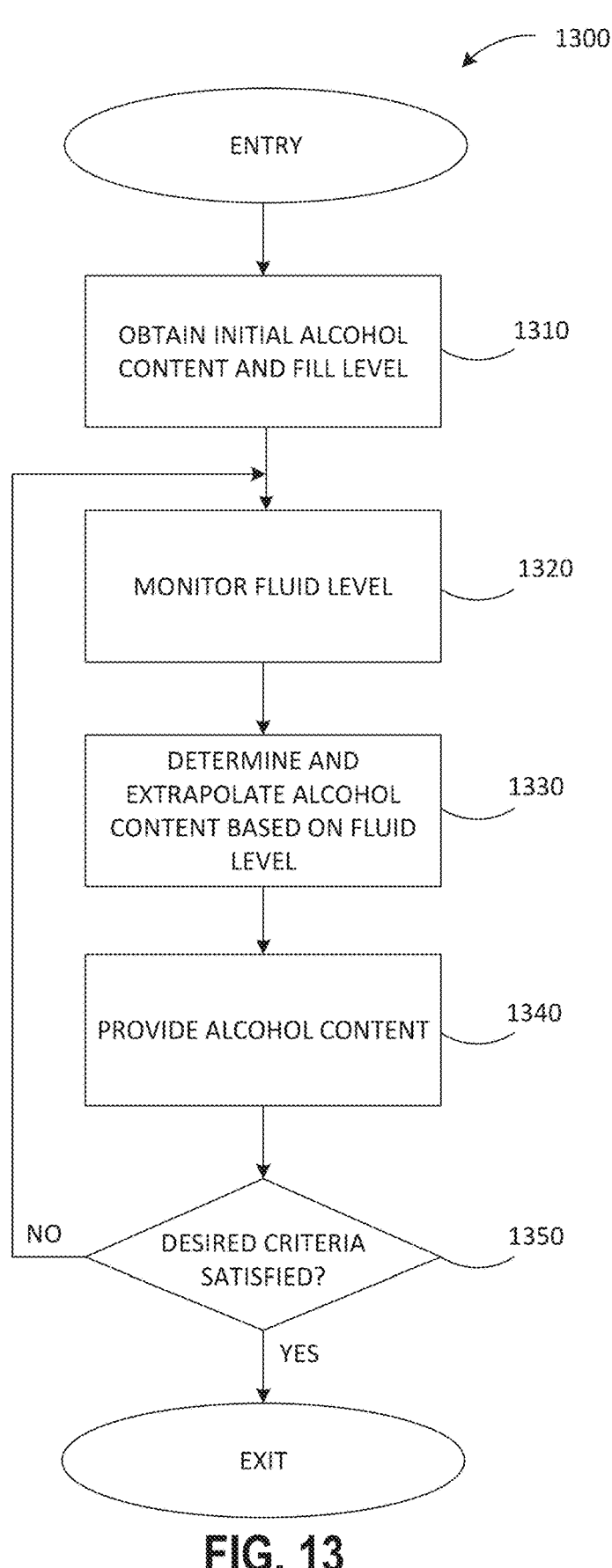
FIG. 13 illustrates a flowchart of an exemplary process associated with a determination of an alcohol content within a container in accordance with the principles of the invention.

FIG. 13 illustrates an exemplary process for determining alcohol content of a fermenting fluid within a container in accordance with the principles of the invention.

In this illustrated exemplary process 1300 upon filling a barrel or container with a liquid that is to be fermented, a measure of an initial alcohol content is determined and stored at step 1310. For example, the liquid entered into the container or barrel represents a mash that has been obtained from a distillation process associated with the fermentation of a base material, such as barley, rye, corn, wheat or a combination thereof.

At step 1320, a measure of the fluid level within the container is made. The measure of fluid level may be determined continuously, periodically or intermittently, utilizing one or more of the methods previously discussed.

At step 1330, a determination of an alcohol content is performed based at least on a determined fluid level and one or more environmental factors. At step 1340, the determined alcohol content is presented to a user for evaluation.

At step 1350 a determination is made whether one or more criterion associated with a desired requirement is satisfied. For example, determined alcohol content is within a desired range and/or a minimum length of time of the aging of the liquid within the container has been exceeded.

If one or more criterion is not satisfied, processing proceeds to step 1320 for further continued monitoring of fluid level and evaluation of alcohol content. As previously discussed, the monitor of the fluid level (and evaluation of alcohol content) may be determined periodically or continuously. In one aspect of the invention, the period of sampling may be based on a duration of time the liquid is within the barrel. That is, the interval between sampling is shorter during the early stages of fermentation and longer as the period of fermentation is increased.

Otherwise, processing is ended.

Figure 14:
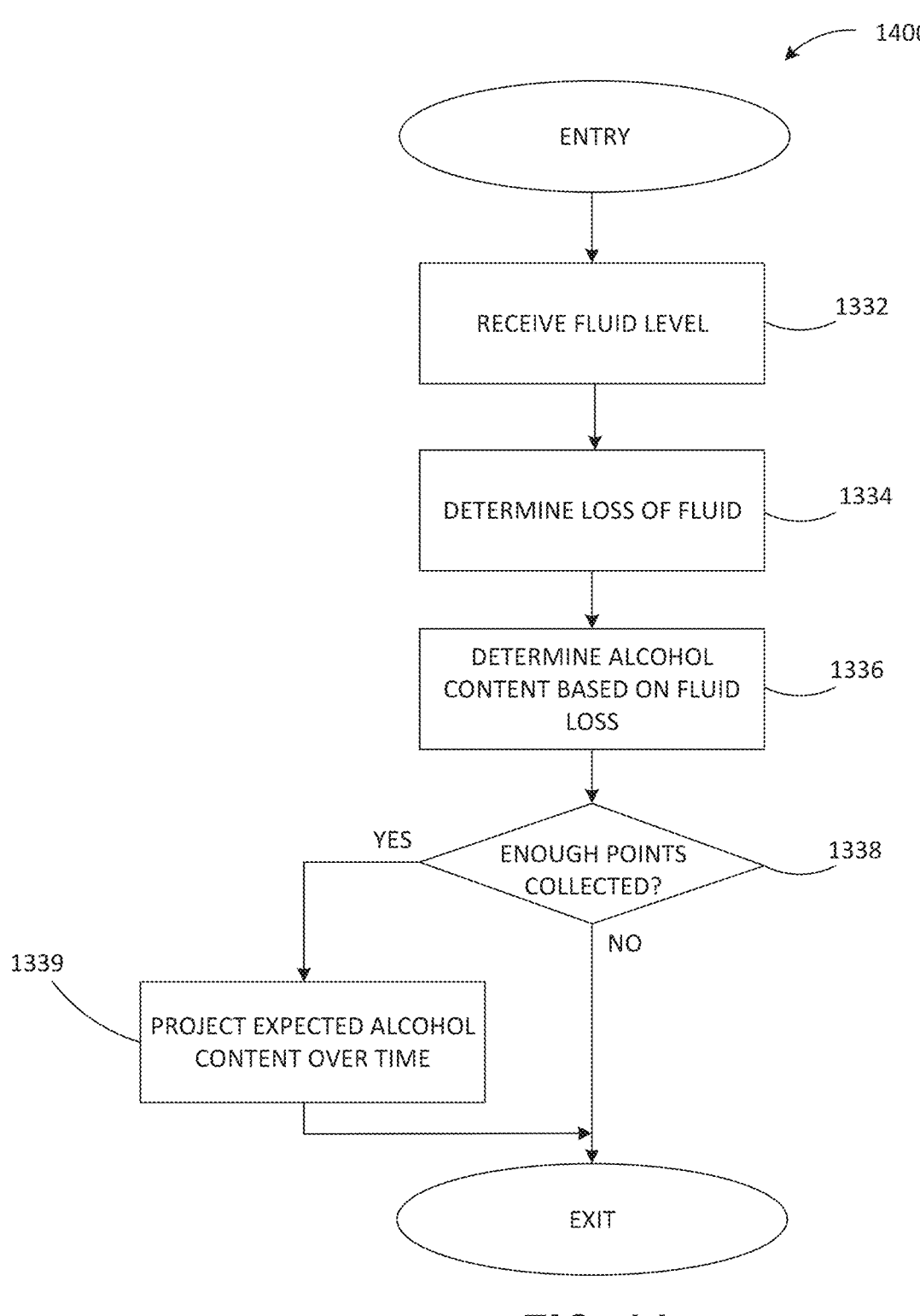
FIG. 14 illustrates a flowchart of an exemplary process for determining and extrapolating alcohol content of a liquid within a container in accordance with the principles of the invention.

FIG. 14 illustrates a flow chart of an exemplary processing associated with step 1330 of FIG. 13 for determining and extrapolating alcohol content of a liquid within a container in accordance with the principles of the invention.

In this exemplary process 1400, processing receives at step 1332 a fluid level obtained from a monitoring system, as previously discussed. At step 1334, a determination of a loss of fluid or liquid is determined, wherein the loss of fluid may be due to evaporation of the fluid or absorption of the fluid by the container as the container remains in place over an extended period of time.

At step 1336, an alcohol content of the liquid or fluid remaining in the container is determined, wherein the alcohol content is determined based, in part, on the at least one of an initial alcohol content, and one or more environmental conditions.

At step 1338 a determination is made as to whether enough data points have been collected. If enough data points have been collected, a determination of an expected alcohol content (i.e., a projection of alcohol content) is performed at step 1339. For example, and as would be known in the art, when two data points are collected, a straight-line approximation of the alcohol content may be obtained. In an illustrative example, when three data points are collected, a curved line, passing through the collected points, may be formulated that provides for an approximation of the expected alcohol content. When additional sample points are collected a more accurate approximation of the expected alcohol content may be obtained. In one aspect of the invention, at least three data or samples points are to be collected to obtain a first order approximation of the expected alcohol content. In another aspect of the invention, the process of determining an approximation of the expected alcohol content is performed as a selected number (e.g., a specified subset, or all) of the data points collected so as to obtain a more accurate approximation of the expected alcohol content.

Otherwise, processing exits.

Figure 15:
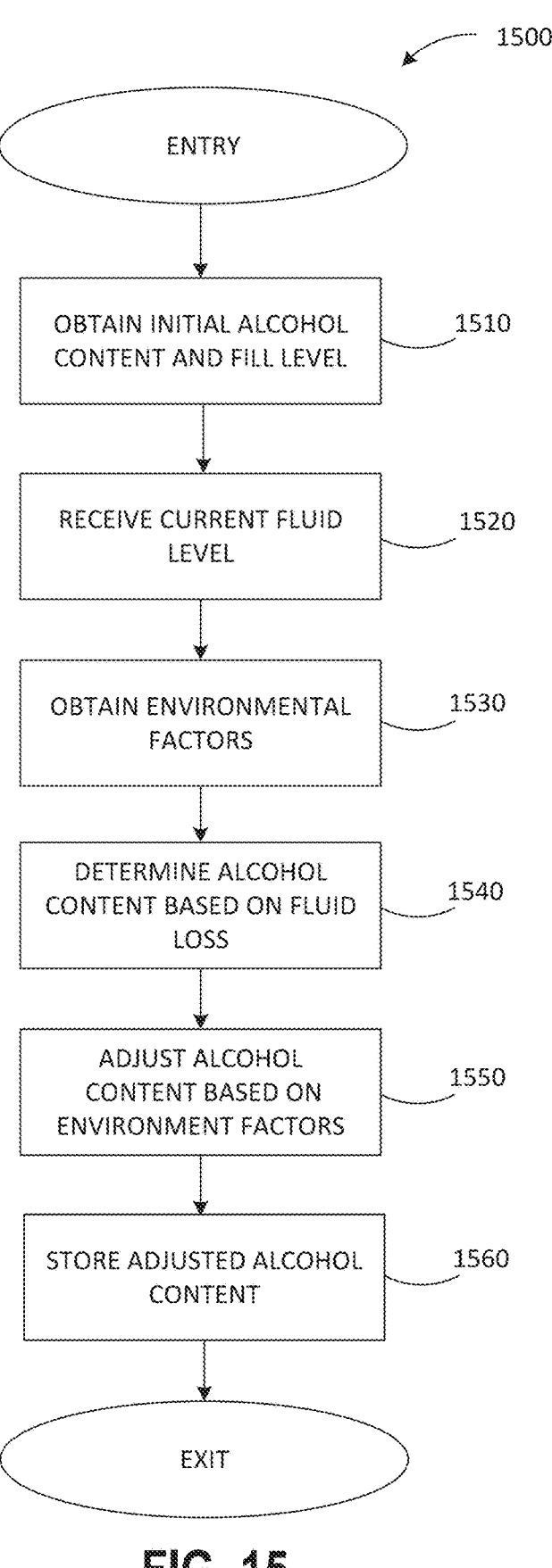
FIG. 15 illustrates a flowchart of an exemplary process for determining alcohol content of a liquid within a container in accordance with the principles of the invention.

FIG. 15 illustrates a flowchart of an exemplary process associated with step 1336 of FIG. 14 for determining alcohol content of a liquid within a container in accordance with the principles of the invention.

In the illustrated process, an initial alcohol content and fill level are obtained at step 1510. At step 1520, a determination of a loss in liquid or fluid level is based on the initial fill level and the determined current fill level. At step 1530, environmental factors surrounding the container are obtained. These factors may include information regarding temperature, humidity, seasonal variations, etc.

At step 1540 a determination of a current alcohol content is determined from the determined loss, wherein a nominal alcohol content decrease (or increase) is utilized to determine the current alcohol content. In one aspect of the invention, the nominal alcohol content decrease or increase is substantially constant over time. In another aspect of the invention, the nominal alcohol content increase or decrease may be variable, wherein the nominal alcohol content increase or decrease varies over time. In one aspect of the invention, the alcohol content may be determined based on a model of alcohol content over time, wherein the model may be developed by a series of actual measurements obtained over a known time period.

At step 1550 the determined alcohol content is subjected to a process for adjusting the determined alcohol content based on environment factors. And at step 1560, the adjusted alcohol content is stored for subsequent processing.

Figure 16:
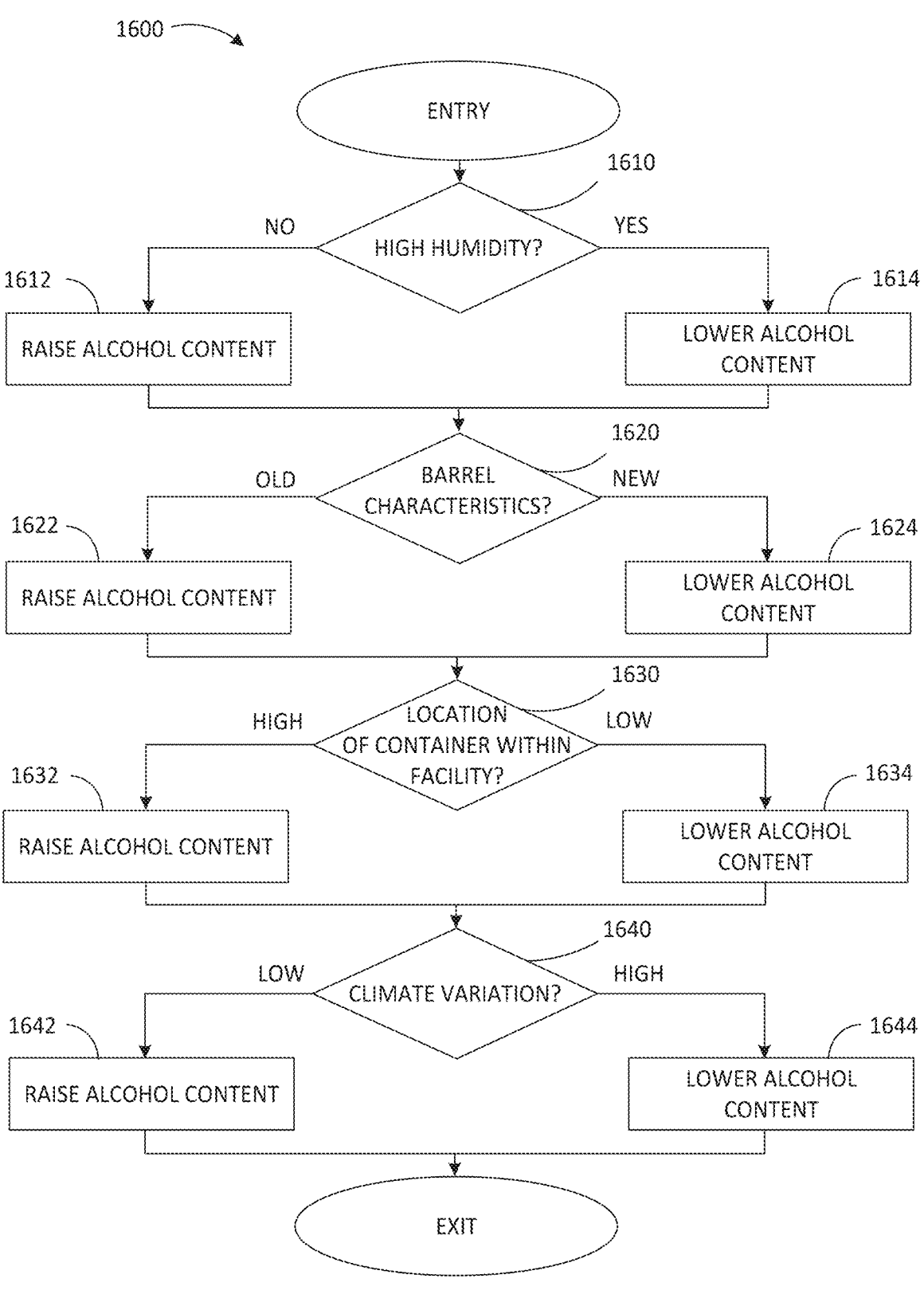
FIG. 16 illustrates a flowchart of an exemplary process for adjusting a determined alcohol content based on environmental considerations.

FIG. 16 illustrates a flowchart of an exemplary process associated with adjusting alcohol content presented in step 1550 based on one or more environmental factors or considerations.

In accordance with this exemplary processing 1600, at step 1610, a determination is made regarding the humidity level in the surrounding environment. If it is determined that the humidity level is high, then the alcohol content is lowered, at step 1614, as alcohol evaporates more quickly in high humidity conditions than water. In an illustrative example, a threshold humidity level of fifty percent may be considered as a high humidity level. The threshold humidity level may be adjusted in accordance with what would be known to one of ordinary skill. Otherwise, the alcohol content is raised at step 1612. The degree of raising or lowering the alcohol content may be constant. Alternatively, the degree of raising or lowering the alcohol content may be varied based on the level of humidity. In still another aspect, the degree of raising or lowering the alcohol content may be varied based on a length of time the contained fluid or liquid has been subjected to the humidity conditions.

At step 1620, a determination is made regarding the condition of the container. If it is determined that the container is essentially new, or has been used a few times, then processing proceeds to step 1624 where the alcohol content is lowered, as a newer container affords greater absorption of the contained fluid. Otherwise, at step 1622 the alcohol content is raised, as there is less absorption of the contained fluid.

At step 1630, a determination is made regarding a location of the container. For example, a determination of a high position within a stack of containers may require a raising of the alcohol content, at step 1632 as the higher position may cause greater temperature fluctuations around the container. Otherwise, the alcohol content may be lowered at step 1634 as it is expected that less temperature fluctuation exists around the lower positioned container.

At step 1640, a determination is made regarding climate variations, wherein high climate (e.g., high altitude, northern geographical location, etc.) may require a lowering of the alcohol content at step 1644, while a lower climate (e.g., lower altitude, more southern geographical location, etc.), may require the alcohol content to be retained the same or raised at step 1642.

Processing then exits with an adjusted alcohol content level.

Although processing 1600 refers to a limited number of factors that may be considered in adjusting a determined alcohol content, it would be within the knowledge of those skilled in the art to include additional factors that may affect the alcohol content of a contained liquid over time. For example, such additional factors may include but not be limited to the condition of the container (the condition of the container may include further elements of the nature of the inner surface (e.g., charred, not charred) of the container), the length of time the container has been in service, the number of times or cycles that the container has been utilized, and the like.

Such additional factors have been contemplated by the inventors and are included within the scope of the invention claimed.

Figure 17:
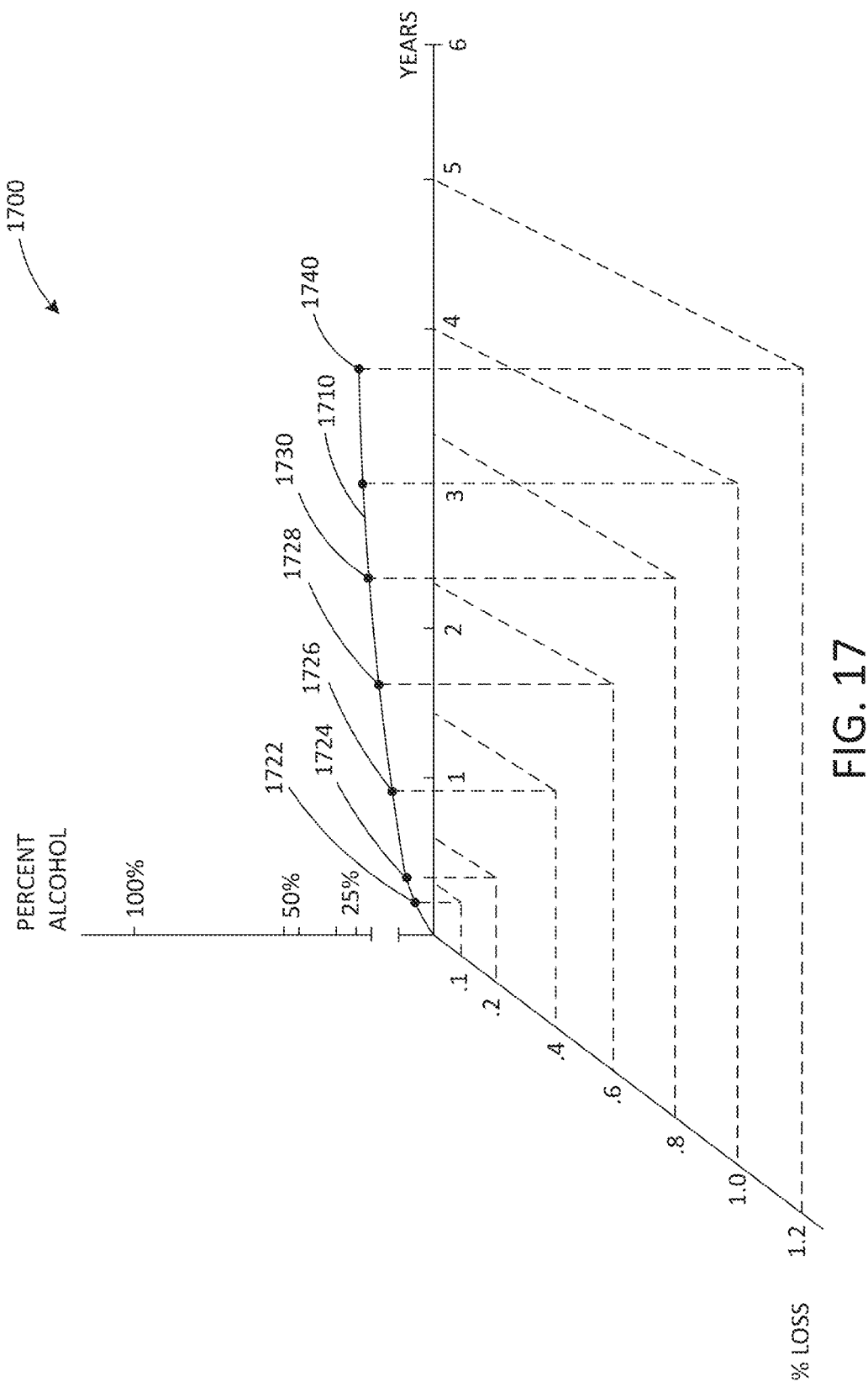
FIG. 17 illustrates an exemplary plotting and extrapolating alcohol content of a liquid within a container in accordance with the principles of the invention.

FIG. 17 illustrates an exemplary plot of determined alcohol content and extrapolating alcohol content in accordance with the principles of the invention.

In this illustrated example, chart 1700 comprises a horizontal axis on to which a number of years of storage of a container is plotted and a vertical axis onto which is plotted a percentage of alcohol content of the contained fluid. In addition, on a third coordinate, is shown that represents a percentage of loss of liquid within the container. Accordingly, a three-dimensional formulation or model of alcohol content versus percentage of fluid loss versus a period of time may be determined, wherein an expected or typical alcohol content may be determined from a determination of a loss of fluid.

Plot line 1710 represents an approximation of a change in alcohol content versus fluid loss, wherein plot line 1710 represents an idealized representation of the development or production of alcohol of the fermenting liquid within the container that may be obtained using mathematical formulation. Alternatively, plot line 1710 may correspond to a series of actual measurements of alcohol content made using conventional methods. For example, measurements or data points 1722, 1724, 1726, 1728, 1730 . . . 1740 may represent one or more measurements of both fluid loss and alcohol content of the fermenting liquid at known periods of time. For example, measurements 1722, 1724 . . . 1740 may be taken periodically (i.e., monthly) or randomly, Based on the measurements or data points 1722-1740, plot line 1710 may then be formulated using statistical methods (e.g., "line of best fit." "least squares," etc.) to produce an approximation of the change in alcohol content that best represents the measured points. Although a "line of best fit" or "least squares" method are discussed, it would be recognized by those skilled in the art that other statistical methods may be utilized to formulate plot line 1710 without altering the scope of the invention claimed.

FIG. 18 illustrates an exemplary graph of alcohol content determination in accordance with the principles of the invention.

FIG. 18 represents a projection 1820 of the idealized or model plot line 1710 onto the two-dimensional plane 1810 of alcohol content verses percent of loss shown in FIG. 17.

In accordance with the principles of the invention, utilizing the idealized projection 1820, an estimate, (i.e., a first order) measure of alcohol content may be determined based on a determined fluid loss. That is, preliminary (i.e., first order) alcohol content measurements may be determined for each of the measurement points based on the determined fluid loss taken at different times. A more refined alcohol measurement may be determined from the preliminary alcohol content at each of the measured (i.e., collected) data points by adjusting or modifying the preliminary alcohol content by one or more environmental factors, as shown and discussed with regard to FIG. 16. Measurements 1832, 1834, 1836, 1838 . . . 1852, represent the more refined measurements of alcohol content after considering one or more environmental factors for corresponding ones of the expected alcohol content based on the model shown in FIG. 17.

In accordance with the principles of the invention, the measurements of fluid loss (and determination of alcohol content) may be taken at a first rate during a first period of time while subsequent measurements of fluid loss may be taken at a second rate during a second period of time, wherein the second rate is longer than the first rate. That is, the periodicity of the measurement rate (i.e., first rate and second rate) increases over time.

For example, during a first year, when alcohol production and fluid loss is greatest, fluid loss measurements may be taken at a first rate (e.g., 1832 . . . 1842) and when alcohol production and fluid loss is less, fluid loss measurements may be taken at a second rate (e.g., 1848, 1850, 1852), wherein the first rate is higher (i.e., measurements performed more often) than the second rate.

Further illustrated is a statistical formulation of the measured samples 1832, 1834 . . . 1852, as represented by dashed plot line 1880. Similar to the formulation discussed with regard to FIG. 17, dashed plot line 1880 represents a model that may be provided to refine the model shown in FIG. 17. For example, a plurality of plot lines 1880, taken from a corresponding measurements of a plurality of containers that have similar characteristics (i.e., geographical location) may be accumulated and included in model 1710.

In one aspect of the invention, plot line or model 1880 may be utilized to determine a projection 1890 of an expected alcohol content that when projected onto the plane of alcohol v. years, shown in FIG. 17, may provide information of alcohol production for subsequent years.

Various implementations have been disclosed with reference to the Drawings. However, other implementations are possible. For example, an exemplary method may comprise receiving information regarding an initial state of a liquid in a container, the initial state comprising at least one of: an alcohol measure and a level of the liquid within the container; monitoring a level of the liquid within the container, wherein the monitoring is performed external to the container; determining an amount of loss of the liquid within the container based on the initial level and the monitored level;

and estimating the alcohol measure of liquid remaining within the container based on the determined amount of loss of the liquid.

The method may further comprise storing a plurality of estimated alcohol measures.

The method may further comprise extrapolating an expected alcohol measure based on the stored plurality of estimated alcohol measures.

Estimating the alcohol measure may further comprise adjusting the estimated alcohol measure based on at least one environmental condition.

The at least one environmental condition may be selected from a group consisting of: temperature, location within a facility, a geographic location of the facility, and container condition.

The determination of estimating the alcohol measure may be performed periodically.

The rate of periodicity estimating the alcohol measure may be adjustable.

The rate of periodicity estimating the alcohol measure may be increased as a function of time.

An exemplary system may comprise a plurality of antennas positioned on an exterior surface of a barrel, wherein the plurality of antennas are configured to capture signals reflected by a liquid within the barrel; and a processor configured to: receive the reflected signals; and determine a level of the liquid within the barrel, wherein based on the determined level of the liquid within the barrel, the processor is further configured to: determine a loss of liquid within the barrel based on the determined level of fluid and an initial level of fluid; and estimate an alcohol content of the liquid within the barrel based on the determined loss of liquid.

The system may further comprise the processor may be configured to store the estimated alcohol content.

The system may further comprise the processor may be configured to extrapolate an expected alcohol content based on a stored plurality of estimated alcohol measures.

The system may further comprise the processor may be configured to adjust the estimated alcohol content based on at least one environmental condition.

The at least one environmental condition may be selected from a group consisting of: temperature, location within a facility, a geographic location of the facility, and container condition.

The determination of estimating the alcohol content may be performed periodically.

The rate of periodicity estimating the alcohol content may be adjustable.

The rate of periodicity estimating the alcohol content may be adjustable as a function of time.

An exemplary method may comprise: determining, by a monitoring system external to a container, a level of a liquid within the container; and estimating an alcohol content of the liquid within the container based on the determining level of the contained liquid, wherein the estimation comprises: determining an amount of loss of liquid based on the determined level of liquid; obtaining a first order alcohol content based on a model expectation of alcohol content; and determining the alcohol content based on adjusting the first order alcohol content based on at least one environmental condition.

The at least one environmental condition may comprise at least one of: a temperature, a location within a facility, a geographic location of the facility, and a container condition.

The method may further comprise projecting an estimated alcohol content based on a plurality of the determined alcohol content.

The method may further comprise determining the level of liquid within the container periodically, wherein measurements of the level of liquid is performed at a first rate during a first period of time and at a second rate during a second period of time, the first rate being faster than the second rate.

FIG. 19 illustrates a flowchart of a second exemplary process for determining alcohol content of a fluid within a container in accordance with the principles of the invention.

In a further aspect of the invention claimed, the system configurations shown in FIGS. 2, 7A, 7B may be further utilized to determine alcohol content directly. Thus, while alcohol content determination has been discussed with regard to determination of fluid loss, the system may employ a second algorithm in conjunction with or independent of the processing previously disclosed.

In this aspect of the invention, system 150 may implement the illustrated exemplary process 1900, wherein a first antenna from a set of antenna selected from a plurality of antenna associated with the externally mounted antennas shown in FIGS. 2, 7A, 7B is selected at step 1310. In one aspect of the invention, the first antenna among the set of antenna selected may be associated with the lowest position (e.g., 220*n*) among the illustrated plurality of antenna 220*a*-220*n*. Alternatively, the first antenna among the set of antenna may be selected based on a determined level of fluid within the container, wherein the first antenna selected is that antenna that is associated with the highest level of fluid (e.g., the top-most antenna initially). In still a further alternative embodiment, the set of antenna may be selected as a single antenna. For example, the physically lowest positioned antenna may be selected as being included as the sole selected antenna within the set of antenna. In still a further aspect, the sole selected antenna within the set of antenna may be selected as that antenna located physically positioned at or just below the fluid level of the fluid within the barrel. In still a further aspect, the sole selected antenna within the set of antenna may be selected as that antenna physically positioned between the lowest positioned antenna and the antenna positioned at or just below the level of fluid. Although examples of the selection of the one or more antenna selected to be within the set of antenna are disclosed, it would be recognized that other methods of selection of antennas within the set of antenna may be implemented without altering the scope of the invention claimed.

In one aspect of the invention upon filling a barrel or container with a liquid that is to be fermented, a measure of an initial alcohol content may be determined and stored at step 1910. For example, the liquid entered into the container or barrel may represent a mash that has been obtained from a distillation process associated with the fermentation of a base material, such as barley, rye, corn, wheat or a combination thereof.

At step 1920, at least one signal may be transmitted in at least one frequency band from the selected antenna into the contained fluid. A return (i.e., return or reflected signal) associated with each of the transmitted at least one signal is captured at step 1930. At step 1940 a determination of a difference in at least one characteristic (e.g., signal strength, frequency, phase, distance and/or time traveled) between the transmitted signal and the return or reflected signal is made.

In one aspect of the invention, processing system 210 may include a frequency shifting measurement circuit that allows for the determination of a difference between a frequency of the transmitted signal and a frequency of the associated return signal. Alternatively, processing system 210 may include phase shifting measurement circuitry that allows for the determination of a difference between a phase of the transmitted signal and a phase of the associated return signal.

At step 1950, an alcohol content associated with the selected antenna of the fluid within the container may be obtained based on a change in the characteristic (e.g., signal strength, frequency, phase, distance and/or time traveled) of the returned signal.

In one aspect of the invention, the selected antenna may transmit at least one signal (or plurality of signals) at a same frequencies with different phases into the contained fluid, wherein the difference in phase between each of the at least one (plurality of) transmitted signals and the associated returned signal may be determined. In one aspect of the invention, the at least one (plurality of) phase differences may be accumulated and averaged, for example, to obtain an average phase difference. An alcohol content, associated with the selected antenna, may be determined, for example, based on the obtained average phase difference. In another aspect of the invention, the selected antenna may transmit at least one signal (or a plurality of signals) at different frequencies with a same phase into the contained fluid, wherein a difference in frequency between each of the at least one (plurality of) transmitted signal(s) and the associated return may be determined. In one aspect of the invention, the at least one (plurality of) frequency differences may be accumulated and averaged, for example, to obtain an average frequency difference. An alcohol content, associated with the selected antenna may be determined, based on the obtained frequency difference. In still another aspect of the invention, the selected antenna may transmit a plurality of signals at different frequencies and at different phases. Differences in frequency and phase between the transmitted signals and the return signals may be determined, accumulated and averaged to obtain an average frequency and phase values. An alcohol content may be determined based on the averaged frequency and phase values.

At step 1960, a next antenna from the set of antenna of the plurality of antenna is selected. At step 1970 a determination is made whether a last antenna has been selected. In one aspect of the invention, the last antenna may be selected as the last antenna among the plurality of antenna. In another aspect of the invention, the last antenna may be selected as the last antenna associated with a fluid level within the container.

If the last antenna is not selected, processing proceeds to step 1920 wherein at least one signal is transmitted by the selected antenna and the processing illustrated by at least steps 1930 to 1950 for obtaining alcohol content associated with the selected antenna is performed.

However, if the last antenna of the set of antenna has been selected, then processing proceeds to step 1980, wherein an average (or a median) alcohol content may be determined based on the previously determined alcohol content associated with each of the selected antenna. At step 1990, a report of the determined alcohol content may be provided.

In one aspect of the invention, the average (or median) alcohol content may be determined based on a filtering of the alcohol content associated with each of the selected antenna. For example, the average (or median) alcohol content may be obtained by removing a high alcohol content and a low alcohol content from the collected set of alcohol content in order to remove singular values. Alternatively, the average (or median) alcohol content may be obtained by first removing the alcohol content associated with the last selected antenna and averaging or accumulating the remining values. In this manner, the determined average (or median) alcohol content obtained is not influenced by an alcohol content at the fluid/air boundary.

Although, the process shown in FIG. 19 contemplates determining an alcohol content from the determined alcohol content associated with each of the selected antenna, it would be recognized by those skilled in the art that resultant characteristics (e.g., signal strength change, frequency shift, phase shift, change in distance and/or time traveled, etc.) may be obtained for each of the selected antenna, and an alcohol content may be obtained based on a resultant characteristic obtained over all the selected antenna within the set of antenna.

In accordance with the principles of the invention, the alcohol content obtained utilizing the processing shown in FIG. 19 may be further adjusted in a manner similar to that described with regard to FIGS. 15 and 16.

In still another aspect of the invention, the alcohol content obtained utilizing the processing shown in FIG. 19, may be correlated with the alcohol content obtained utilizing the processing shown in FIG. 14. Alternatively, the alcohol content obtained utilizing the processing shown in FIG. 19, may supplement the alcohol content obtained utilizing the processing shown in FIG. 14 to improve the model as shown in FIGS. 17 and 18.

FIGS. 20A-D illustrate exemplary charts of alcohol content of a liquid within a container for different transmitted frequencies.

Figures 20A, 20B, 20C, 20D:
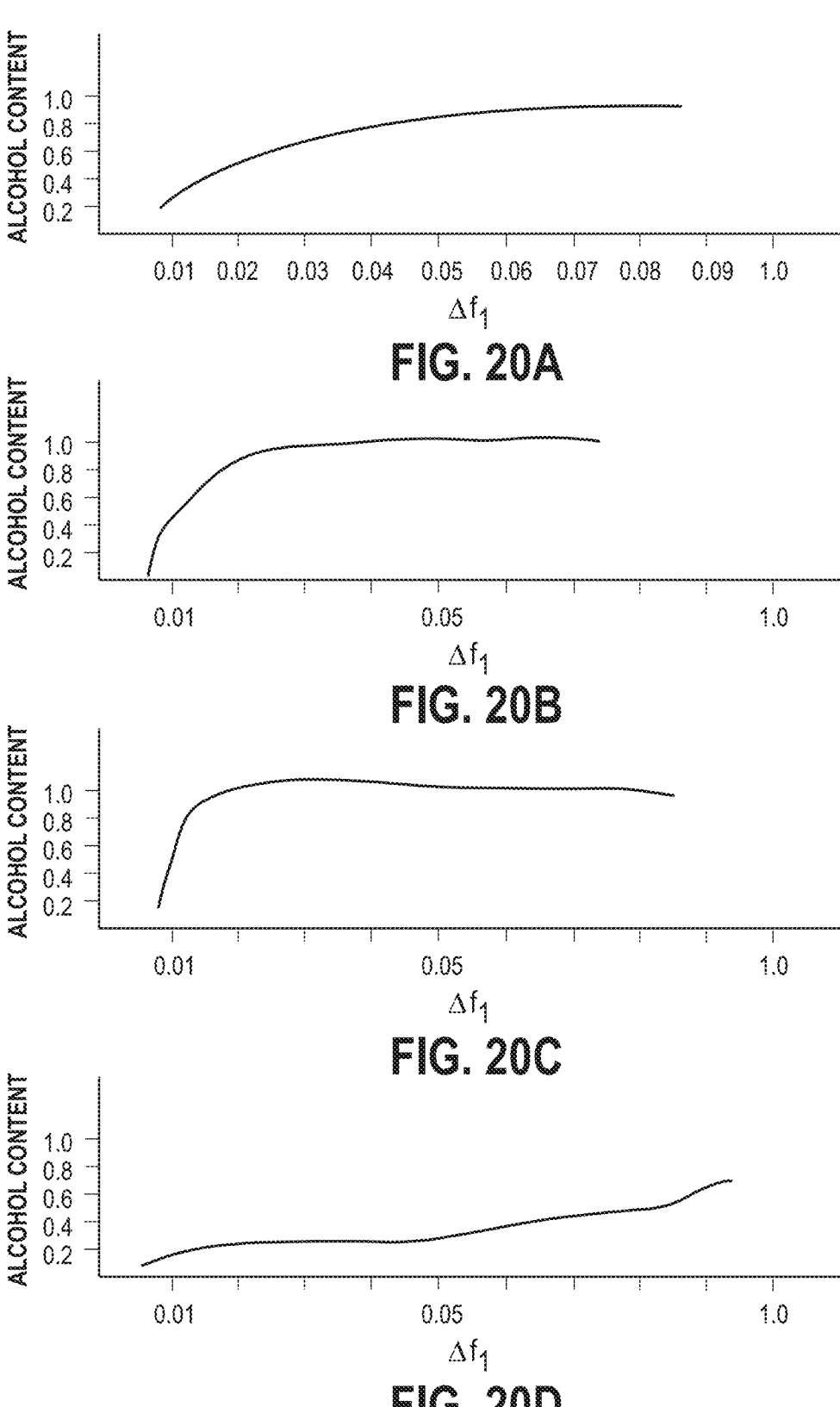

FIG. 20A illustrates an exemplary chart (or mapping) of an alcohol content of a liquid within a container over a transmitted frequency wherein the transmitted signal frequency is represented as $f_1$. In this exemplary chart alcohol content is represented on a vertical axis and a frequency difference ($\Delta f_1$) between a transmitted signal and a return signal is shown on a horizontal axis. As shown, as the alcohol content increases, the expected difference in frequency between the transmitted signal and the return signal increases. Accordingly, a measurement of the frequency difference provides a means for determining an alcohol content of a fluid or liquid within the container.

Accordingly, a measurement of the frequency difference provides a means for determining an alcohol content of a fluid or liquid within the container.

FIGS. 20B-20D represent charts, similar to the chart shown in FIG. 20A, representing a measure of alcohol content associated with a fluid or liquid for different transmitted frequencies (represented as $f_2$, $f_3$, $f_4$ respectively).

Accordingly, an alcohol content may be determined for each of a plurality of measured frequency returns for each of the selected antenna configurations. Accordingly, an overall alcohol content may be determined based on the collection of one or more alcohol content taken over one or more frequency measurements over one or more antenna configurations.

Although only four (4) frequencies are illustrated, it would be within the knowledge of those skilled in the art to create additional charts showing frequency shift as a function of alcohol content without undue experimentation. As the number of charts similar to those shown in FIGS. 20A-20D is expanded, the accuracy of the measurement of alcohol content would increase as the number in the transmitted frequencies increases.

Although FIGS. 20A-20D illustrate exemplary charts of alcohol content as a function of change in frequency, it would be recognized by those skilled in the art that a similar set of exemplary charts may be obtained as a function of phase change, signal strength change, change in distance and/or time traveled or other similar characteristic associated with the transmitted signal, without altering the scope of the invention claimed.

FIG. 21 illustrates an exemplary chart of determined alcohol content as a function of time in accordance with the principles of the invention.

In this illustrated example, chart 1500 represents a plurality of measurement sets 2110, 2120, 2130, 2140, 2150, 2160, 2170, 2180 and 2190 that are taken at intervals over a period of time. For example, the measurements 2110a-2110n associated with measurement set 2110 represent a measured alcohol content for each of a plurality of antenna 220a-220n (similar to the configurations shown in FIGS. 2, 7A and 7B). In this illustrated example, the value of "n" is selected as eight (8) to illustrate the principles of the invention. Similarly, the measured data points are shown as individual data points linearly spaced apart to show the individual measurements. Generally, it would be expected that one or more measurements or measurement points a-n of any measurement set 2110, 2120, 2130, 2140, 2150, 2160, 2170, 2180 and 2190 may be the same or substantially the same.

In addition, each of the illustrated measurement points 2110a-2110n may represent an accumulated value taken over multiple transmission frequencies (and/or phase) measurements (e.g., frequencies $f_1$, $f_2$, $f_3$, $f_4$, as shown in FIGS. 14A-14D). For example, measurement set 2120 and 2130 represent similar measurements taken, in this illustrated case, at a first known rate (e.g., quarterly) during a first or initial period (i.e., first year).

In accordance with the principles of the invention, an average or median value (i.e., 2110m) associated with measurement points 2110a-2110n of measurement set 2110 may be calculated to determine an alcohol content associated with measurement set 2110. Similarly, median values 2120m, 2130m associated with measurements 2120a-2120n, 2130a-2130n, respectively, may be calculated to represent an overall alcohol content for measurement sets 2120, 2130, respectively. Similar average or median values may be determined for each of the measurement sets 2140-2190.

Accordingly, a median alcohol content for each of the illustrated measurement sets 2110-2190 may be determined and utilized to determine a progression of alcohol content of the liquid or fluid within a container without the need to interrupt the process by taking conventional measurements.

Further illustrated, with regard to measurement set 2160 are measurements 2160b-2160n associated with antenna 220b-220n. In this illustrated example, as evaporation or absorption of the fluid within the container occurs, it may be determined that a signal transmitted by antenna 220a provides no useful information and, thus, a signal from antenna 220a is not transmitted nor included within the calculations of an overall alcohol content (i.e., 2160m). A similar selection of antenna is shown by measurement sets 2170-2190 where signals associated with antenna 220b are neither transmitted nor included within the calculation of overall alcohol content (e.g., 2170m-2190m).

In accordance with the principles of the invention, the measurements of fluid loss (and determination of alcohol content) may be taken concurrently at a first rate (e.g., quarterly) during a first period of time (e.g., first and second year) while subsequent measurements of fluid loss and alcohol content may be taken concurrently at a second rate (semi-annually, annually) during a second (e.g., $2^{nd}$ and $3^{rd}$ year, $4^{th}$ and $5^{th}$ year) period of time, wherein the second rate is longer than the first rate. That is, the periodicity of the measurement rate (i.e., first rate and second rate) may increase over time.

For example, during a first year, when alcohol production is greatest, measurements may be taken at a first rate (e.g., measurement sets 2110, 2120 . . . 2160) and when alcohol production is less, measurements may be taken at a second rate (e.g., 2170, 2180, 2190), wherein the first rate is higher (i.e., measurements performed more often) than the second rate.

Alternatively, the measurement of fluid loss and alcohol content progression may be taken asynchronously wherein fluid loss may be determined at a fluid loss first and second rate as previously discussed and alcohol content progression may be determined at an alcohol progression first and second rate, wherein the fluid loss rates and the alcohol progression rates are different.

Further illustrated is a statistical formulation of the measured sets 2110*m*-2190*m* as represented by dashed plot line 2195. Dashed plot line 2195 represents a model that may be utilized to refine the models shown in FIG. 20A-20D. For example, a plurality of plot lines 2195, taken from a corresponding measurements of a plurality of containers that have similar characteristics may be accumulated and included in the model shown in FIGS. 20A-20D.

FIG. 21, similar to FIG. 18, illustrates the variation in the time period between measurements that may occur for the measurement of an alcohol content associated with the processing shown in FIG. 19. As previously discussed, the time period of measurement for alcohol content may occur concurrently with the time period of measurement for fluid level shown in FIG. 18. However, it would be recognized that the time period for alcohol content determination may be different than the time period of measurement for fluid level. Thus, the two processes shown may operate concurrently or independently without altering the scope of the invention claimed.

In accordance with one aspect of the invention, the transmitted signal discussed may comprise a Frequency Modulated (FM) signal, in which the frequency of the transmitted signal is varied (i.e., modulated) during the duration of the transmitted signal. In this manner, the fluid loss, as discussed, may more accurately be determined, as the alteration or change of the transmitted frequency during a specific period provides for different time of returns of the transmitted frequency. Thus, the signals during each of the transmissions 570, 580, 590, etc., shown in FIG. 5B, may comprise a plurality of frequencies (i.e., frequency modulate), wherein the corresponding return windows may be varied based on the transmitted frequency. For example, the transmission signal within a transmission may be continuously varied from a first frequency to a second frequency Alternatively, the transmission signal with a transmission may be discretely altered in a known pattern (e.g., f1, f1+x, f1+2x, etc.) in still another aspect the frequencies within a transmission may be varied (i.e., modulated) in a pseudo-random pattern (e.g., f1, f1+x, f1-2x, f1-x, . . . , etc.). In this manner the time of the return signals associated with each of the transmitted signals may be varied (i.e., modulated) based on the transmitted frequency. In one aspect of the invention, the transmitted signals may be transmitted as Frequency Modulated Continuous Wave (FMCW) signals. In another aspect of the invention, the transmitted signals may be transmitted as pulse signals within a frequency of each of the pulses within a transmission is modulated. In still another aspect, each of the pulses within a transmission may comprise a "chirp" signal, wherein the frequency of a transmitted signal is varied during the transmission of a pulse signal.

In one aspect of the invention, the range of frequency variation may vary based on a determined distance, as will be discussed. In another aspect of the invention, the starting frequency value for each of the signal transmissions 1105, 1115 (FIG. 11A) or the transmissions 570, 580 . . . within each of the transmissions 1105, 1115 . . . (FIG. 11B) may be varied. Alternatively, the pattern of frequency modulation with signal transmissions 1105, 1115 . . . or transmissions 570, 580 . . . with transmission 1105, 1115 . . . may be varied.

Although FIGS. 11A and 11B illustrate time variable transmissions, it would be recognized that the interval being transmissions may be increased, decreased or remain steady over time.

In one aspect of the invention, an average value of the time of the return signals may be determined to determine an overall time that may be used to determine at least one of a fluid level, a mash level and a solid material level. Alternatively, a filtering of the return times may be made to remove those times that are not representative of returns. For example, the highest return time and the lowest return time may be removed from any calculation of an overall time based on the remaining return times.

In accordance with the principles of the invention, a measure of different content of a container may be determined based on different returns of the modulated signal transmission. For example, in a content comprising both a fluid, a mash (i.e., fluid plus solid content) and a solid content, the signals returns associated with the different content may vary based on the transmitted frequency. For example, selected frequency transmissions may result in returns that are reflected from the fluid, selected other frequency transmission may result in returns that are reflected from the mash and selected other frequency transmissions may result in returns that are reflected from the content.

FIG. 22 illustrates an exemplary example of a transmission sequence in accordance with the principles of the invention.

In the illustrated exemplary transmission sequence 2200, which is similar to the sequence shown in FIGS. 11A-11C, transmissions are shown as a function of time (X-axis) and frequency (Y-axis). As shown in FIG. 22, transmissions 570, 580 . . . 590 within a single burst transmission 1105 may comprise one or more transmission frequency changes, wherein the transmission frequency is varied. For example, during transmission 570 during interval 1105 the signals emitted vary between frequency f1 and f2. Similarly, during transmission 580 of interval 105, the signals transmitted or emitted vary between f3 and f4. Similar frequency variation occur for transmission 590. In the illustrated examples, the frequencies are transmitted, within a single transmission, in a continuous pattern (e.g., sawtooth).

In another example, shown with regard to burst transmission 1125, the frequencies within a single transmission 570, 580, . . . 590 may be modulated, which in this case is shown as sinusoidally or triangularly modulated (e.g., upward and downward).

Further illustrated is the starting and stopping frequencies within each of the single transmission 570, 580, . . . 590 within a corresponding burst transmission 1105, 1125 may be different in the selection of the different starting frequencies (e.g., f1, f3, etc.), the rate of frequency modulation and the type of frequency modulation (e.g., sawtooth, triangular, pseudo-random etc.) may be determined, in part, based on the type of material (i.e., fluid, mash, solid) that is being evaluated. For example, for a container containing only fluid (e.g., water tower), a single same starting frequency may be selected wherein the modulation may be one of unmodulated or modulated using a sawtooth pattern. In another example, wherein both fluid and mash are expected with a container, a plurality of frequencies may be selected, wherein the starting frequency and modulation type may be varied to provide diversity to the timing of the return frequencies may be evaluated to obtain a picture of the container (i.e., level of mash and level of fluid atop the mash).

As discussed with regard to FIG. 5B, a return window may be established for each of the transmitted frequencies, wherein the timing of the return window may increase, or decrease based on the transmitted frequency and the expected content.

As would be appreciated by those skilled in the art, the return window may be initially set as a large number (to accommodate an empty tank) and decreased as the tank fills with one or more of a fluid, a mash or a solid content, as the level of the contained content (e.g., solid content) would not decrease (only increase) over time. Hence, the expected return window time may be decreased as the return signal is expected is a shorter time.

In one aspect of the invention, the system shown in FIGS. 7A and 7B may comprise a single transmission antenna to transmit a plurality of signals at different frequencies and frequency ranges (or a plurality of antennae if different frequency ranges require different antenna capabilities) and a receiving antenna to receive a plurality of signals at different frequencies and frequency ranges (or a plurality of antennae if different frequency ranges require different antenna capabilities). The receiving antenna and the transmitting antenna may be separated wherein the transmitting antenna transmits a signal into the container at an angle wherein the reflection is returned to the receiving antenna at substantially the same angle. The angle of transmission may further be altered as the level of the content within the container increases. As the steepness of the angle of transmission decreases (i.e., from an axis perpendicular to the monitoring system), a limit factor may be established such that an alarm is generated when the steepness of the transmission angle falls below a threshold. Thus, as the angle of transmission decreases from 70 degrees to 20 degrees with regard to an axis perpendicular to the monitoring system, an alarm may be trigged to indicate the level of fill of one or more of the content within the container.

FIG. 23 illustrates an exemplary chart of the collection of one or more materials within a container monitored by the external monitoring system disclosed herein.

In this exemplary chart 2300, solid content 2310 accumulates over time from a zero value to a greater value. The solid material generally increases over time as there is no means for removing the material during the monitoring period. The amount of a mash material, i.e., a mixture of fluid and solid material 2320 similarly over time. However, the amount of mash material increases randomly over time as the fluid within the mash is dispensed, while the remainder of the mash material becomes of a more solid content as the mash settles on-top of the solid material and the fluid is removed. The amount of fluid material similarly increases over time. However, because means for removing the fluid material from the container may exist, the amount of fluid also decreases over time such that the fluid first mixes with the mash material and is later dispensed.

In one aspect of the invention, the frequencies of transmission shown in FIG. 22, may be based, in part, on the content of the container. For example, in a new configuration transmission signals may comprise a single frequency or range of frequencies as the expected content is limited to fluid, whereas the number of frequencies and/or ranges (and the variations of frequencies and ranges) may increase as different types of content are detected within the container. Thus, as solid content increases, a frequency and/or frequency range applicable to solid content may be introduced into the transmission sequence. Returning to FIG. 22, transmissions 570, 580 . . . 590 within burst transmission 1105 may include only a single frequency (or frequency range) transmission whereas the transmissions 570, 580, 590 within burst transmission 1125 may include a plurality of frequency (and/or frequency ranges). The starting frequencies of the plurality of transmitted signals may be selected to be the same or different.

Although FIG. 22 illustrates a plurality of transmitted signals 570, 580 . . . 590, it would be recognized that in aspects of the invention, wherein only a signal transmitting antenna is utilized (see FIG. 1, for example), then only a signal transmitting may occur during each interval. Alternatively, a plurality of transmitted signals may occur during each interval wherein the transmitted signal is the same. The number of transmitted signals and the frequency of each interval may be adjusted to conserve power (in a battery-operated configuration).

The level of solid content and/or the fill rate may be monitored such that a condition of the tank or container may be determined and potential issues regarding overflow, for example, may be averted. In one aspect of the invention, the information collected from the level of the content within the tank or container may, as previously discussed, be provided to one or more external or remote sites such that the information is provided to appropriate personnel.

Hence, in the application of the external monitoring systems disclosed in FIGS. 7A and 7B, which has been discussed with regard to fluid measurement and alcohol content within a barrel or container, it would be recognized that the configuration shown in FIG. 1, for example, would be application to other systems that are arranged in this manner.

For example, a conventional septic system, wherein in a measurement of a solid content within the septic system may be determined. In another application of waste management, wherein large amounts of waste product are contained in containers (or pools), a measurement of the solid content within the container may be used to determine when appropriate dredging operations are to occur. In addition, the external monitoring system disclosed may further provide information regarding a rate of fill or collection of solid materials. In addition, the information collected by the external monitoring system disclosed may provide an indication that the health of a collection system, when the collection system is performing not performing properly. For example, a determined level of fill of solid content may trigger a message that the system is near capacity and cleaning and/or removal of the solid material is needed.

In another aspect, the maintenance of fluid within the system may be an indication of the improper egress of the fluid from the system.

In one aspect of the invention, and as previously discussed, information regarding the level of solid content, the level of fluid level and/or the health of the system may be transmitted to one or more external devices to provide information to those persons needing such information to manage the system (e.g., homeowner, site managers, etc.).

In one aspect of the invention, and as discussed previously, the measurement of content (i.e., fluid and/or solid material) can be recorded and provided to external (or remote) monitoring systems over time such that a projection of fill rate may be determined. The projection, which may be adjusted and/or modified, over time provides a means for determining potential failures. In addition, the collected recorded data may be used to provide information regarding regulatory compliance with required environmental monitoring. The providing of the determined data may be transferred to one or more external systems through one or more of: a wired connection and a wireless connection (e.g., Wi-Fi, BLUETOOTH, etc.). In still another aspect, the collected data may be retained locally and downloaded onto tangible medium (e.g., USB drive) for subsequent processing by one or more external or remote devices.

Although the example provided with regard to employing the external monitoring system for the monitoring of content (e.g., fluid, mash, solid waste) of a septic system, it would be understood that the system disclosed would be applicable to other systems. For example, in a commercial wastewater management systems (or underground storm drains, retention pond water levels, etc.) measurements made using the disclosed system may provide information to be used in determining with required regulatory compliance standards and sustainability. The external monitoring system disclosed would also be applicable to fluid storage systems (e.g., storing oil, fuel, chemical and water tanks). Or to agricultural systems such as irrigation reservoirs, manure pits or livestock waste.

In accordance with the principles of the invention, the non-invasive monitoring system provides a modern, reliable and low maintenance solution for tracking fluid/waste content, which replaces outdated invasive methods or devices (e.g., float sensors, manual inspection). The non-invasive system provides a more reliable, lower cost solution to the content management that ensures detection of early problems, reduced maintenance costs and improved environmental compliance.

Although the monitoring systems disclosed, herein, have made reference to the use of radio frequency transmission, it would be recognized by those skilled in the art that the signals transmitted may be in the ultra-sonic range. Transmission of ultra-sonic signals may be suitable for systems that are an area in which radio frequency transmission is not suitable or allowed. Signals transmitted in an ultra-sonic frequency range may be transmitted as discussed using steady transmission or frequency modulated transmissions.

Various implementations have been disclosed with reference to the Drawings. However, other implementations are possible.

Implementation 1. A method for determining an alcohol content of a fluid within a barrel, the method comprising the steps of: transmitting at least one signal from each antenna within a set of antenna selected from among a plurality of antenna positioned externally to the barrel into the barrel; receiving a response associated with the transmitted at least one signal, determining a change in at least one characteristic between corresponding transmitted at least one signal and the received response; determine a change of a characteristic between the at least one transmitted signal and a corresponding received response; and determine from the determined change in the characteristic an alcohol content of the fluid within the barrel based on a mapping of an alcohol content with respect to the change in characteristic.

Implementation 2. The method of implementation 1, wherein the step of determining a change in characteristic comprises the steps of: accumulating the change in characteristic between each of the at least one transmitted signal and the corresponding received response; and setting the determined change in characteristic as the accumulated change in characteristics.

Implementation 3. The method of implementation 2, wherein the step of determining a change in characteristic comprises the steps of: averaging the accumulated change in characteristic between each of the at least one transmitted signal and the corresponding received response; and setting the determined change in characteristic as the average accumulated change in characteristic.

Implementation 4. The method of implementation 1, wherein the characteristics is selected from at least one of: a signal strength, a frequency shift, and a phase shift.

Implementation 5. The method of implementation 1, wherein the step of determining a change in characteristic comprises the steps of: determining an average value of the change in characteristic for each of the at least one signal for each of the antenna within the set of antenna; determining an alcohol content for each of the average values; and determining an overall alcohol content based on the determined alcohol content for each of the average values.

Implementation 6. The method of implementation 1, comprising: identifying among the plurality of antenna, an antenna positioned within a range of the fluid within the barrel; and selecting the identified antenna as being within the set of antenna.

Implementation 7. The method of implementation 6, wherein the step of identifying comprises the steps of: transmitting from the plurality of antenna, a measurement signal into the barrel; receiving a return signal of the transmitted measurement signal; determining a signal strength of the received return signal, and identifying an antenna associated with a signal strength greater than a threshold value as being within the range of the fluid.

Implementation 8. The method of implementation 1, transmitting at least one signal from each antenna comprises the steps of: transmitting at a first rate during a first period of time; and transmitting at a second rate during a second period of time.

Implementation 9. The method of implementation 8, wherein the first rate is greater than the second rate.

Implementation 10. A system for determination of an alcohol content of a fluid within a barrel, the system comprising: a plurality of antenna positioned external to the barrel; and a transmission/reception system configured to: transmit at least one transmission signal within at least one frequency band from a set of antenna selected from the plurality of antenna; receive a return signal associated with the transmitted at least one transmission signal; and determine a change in at least one characteristic between the at least one transmission signal and a corresponding return signal; and determine from the determined change in the at least one characteristic an alcohol content of the fluid based on a mapping of alcohol content with respect to the change in the at least one characteristic.

Implementation 11. The system of implementation 10, wherein the change in the at least one characteristic comprises at least one of: a signal strength change, a frequency change or a phase change.

Implementation 12. The system of implementation 10, wherein the transmission/reception system is configured to: determine the change in the at least one characteristic as an average of the change in the at least one characteristic over each determined change in the at least one characteristic.

Implementation 13. The system of implementation 10, wherein the transmission/reception system is configured to: determine an average change in the at least one characteristic as: an average value of the change in the at least one characteristic over each of the at least one determined change in the at least one characteristic for corresponding ones of the antenna within the set of antenna; and an average of the average values.

Implementation 14. The system of implementation 10, wherein set of antenna comprises at least one antenna associated with a determined level of fluid within the barrel.

Implementation 15. The system of implementation 14, wherein the system is configured to: transmit a measurement signal into the barrel from an antenna selected from the plurality of antenna; receive a return signal associated with the measurement signal; determine a signal strength of the return signal; and assign, when the signal strength is greater than a threshold value, a corresponding antenna selected from the set of antenna.

Implementation 16. A system for determining an alcohol content of a fluid within a barrel, the system comprising: a plurality of antenna arranged at known locations on a face of the barrel; and a processing system comprising: a transmitting system and a receiving system in communication with each of the plurality of antenna; and a processing system configured to: receive, from the receiving system, information regarding a signal transmitted into the barrel by the transmitting system, wherein the information is associated with the signal transmitted to determine a level of fluid within the barrel and an alcohol content of the fluid within the barrel, wherein a determination of the level of fluid comprises: causing transmission of a measurement signal from each of the plurality of antenna; receiving a response associated with the transmitted measurement signal; and determining at least one factor associated with the received response; and assigning, when the at least one factor is greater than a threshold value, a corresponding antenna to a set of antenna; and wherein the determination of the alcohol content comprises: causing the transmission of at least one signal from each of the antenna within the set of antenna; receiving at least one return signal in response to the transmission of the at least one signal transmission; determining a change in a characteristic between the at least one signal transmission and a corresponding return signal; and determining an alcohol content associated with the fluid within the barrel as a function of a mapping of alcohol content with respect to the change in the characteristic.

Implementation 17. The system of implementation 16, wherein the processing system is further configured to periodically perform the determination of fluid level and alcohol content, and wherein a rate of performance of the determination of fluid level and alcohol content may be the same or different.

Implementation 18. The system of implementation 16, wherein the mapping of alcohol content with respect to change in characteristic is established on an individual transmission frequency basis.

Implementation 19. The system of implementation 16, wherein performance of the determination of alcohol content is performed starting with a lowest positioned antenna within the set of antenna.

Implementation 20. The system of implementation 16, wherein performance of the determination of alcohol content is performed starting with a highest positioned antenna within the set of antenna.

For example, an exemplary method may comprise receiving information regarding an initial state of a liquid in a container, the initial state comprising at least one of: an alcohol measure and a level of the liquid within the container; monitoring a level of the liquid within the container, wherein the monitoring is performed external to the container; determining an alcohol content of the liquid within the container based on the initial level; and estimating the alcohol measure of liquid remaining within the container. In addition, a measure of the loss of fluid in the container may be used to limit the measurements taken to only those configurations that would provide useful information in determining the alcohol content.

The method may further comprise storing a plurality of estimated alcohol measures.

The method may further comprise extrapolating an expected alcohol measure based on the stored plurality of estimated alcohol measures.

Estimating the alcohol measure may further comprise adjusting the estimated alcohol measure based on at least one environmental condition.

The at least one environmental condition may be selected from a group consisting of: temperature, location within a facility, a geographic location of the facility, and container condition.

The determination of estimating the alcohol measure may be performed periodically.

The rate of periodicity estimating the alcohol measure may be adjustable.

The rate of periodicity estimating the alcohol measure may be increased as a function of time.

An exemplary system may comprise a plurality of antennas positioned on an exterior surface of a barrel, wherein the plurality of antennas are configured to capture signals reflected by a liquid within the barrel; and a processor configured to: receive the reflected signals; and determine a change in at least one characteristic of the return signal, wherein based on the determined change in the at least one characteristic an alcohol content may be determined. The processor may be further configured to: determine a loss of liquid within the barrel based on the determined level of fluid and an initial level of fluid; and limit the signal transmission from those antenna that would provide useful information in the estimation of an alcohol content of the liquid within the barrel.

The system may further comprise the processor may be configured to store the estimated alcohol content.

The system may further comprise the processor may be configured to extrapolate an expected alcohol content based on a stored plurality of estimated alcohol measures.

The system may further comprise the processor may be configured to adjust the estimated alcohol content based on at least one environmental condition.

The at least one environmental condition may be selected from a group consisting of: temperature, location within a facility, a geographic location of the facility, and container condition.

The determination of estimating the alcohol content may be performed periodically.

The rate of periodicity estimating the alcohol content may be adjustable.

The rate of periodicity estimating the alcohol content may be adjustable as a function of time.

An exemplary method may comprise: determining, by a monitoring system external to a container, an estimation of an alcohol content of the liquid within the container based on the a determination of one or more characteristic associated with one or more signals transmitted within the barrel, wherein the estimation comprises: determining a change in at least one characteristic at a known frequency (or phase); obtaining a first order alcohol content based on a model expectation of alcohol content at the known frequency (or phase); and determining the alcohol content based on adjusting the first order alcohol content based accumulating a plurality of first order alcohol content associated with different locations of fluid within the barrel or container.

The method may further comprise projecting an estimated alcohol content based on a plurality of the determined alcohol content.

The method may further comprise determining the alcohol content of the liquid within the container periodically, wherein measurements of the alcohol content are performed at a first rate during a first period of time and at a second rate during a second period of time, the first rate being faster than the second rate. The first rate and the second rate of the transmission of signals for the determination of alcohol content may be based, at least in part, as previously discussed with regard to the transmission of signals for the determination of fluid level. For example, the first rate may occur during a first period of time and the second rate may occur during a second period of time. The first rate may be greater than the second rate. For example, during a period of expected rapid change in alcohol content measurement associated with the determination of alcohol content, measurements may occur once/week, whereas during a period of expected slowing of the change in alcohol content, the determination of alcohol content may occur once/month, semi-annually, etc.

It would be understood and recognized that the first and second rates associated with fluid level measurement and alcohol content may be same or different. In addition, it would be recognized that the measurement of fluid level and alcohol content may be performed periodically wherein the period of measurement of fluid level and the period of determination of alcohol content may be the same or different. That is, fluid level measurement and alcohol content measurement may be performed at the same time and the same rates. Alternatively, fluid level measurement and alcohol content measurement may be performed at different times and at different rates.

In summary, the presented invention, provides for the determination of alcohol production progression during the distilling of an alcohol based liquid within a container without causing any interference with the alcohol production by the need to physically test the liquid, wherein the measure of alcohol with the container is based on a system that may be attached to a face of a container, that causes the transmission of one or more signals in at least one frequency range into the container, where the transmitted signals that are reflected off the fluid or liquid contained within the container are captured and evaluated to determine a level of the fluid or liquid within the tank. A measure of the alcohol content is then based on the determination of the loss of fluid or liquid.

The system disclosed achieves technical advantages over the prior art as the invention disclosed remains external to the enclosed system (barrel, etc.) and does not affect the internal ecosystem or contents of the barrel.

In addition, a method associated with the present invention is disclosed, wherein the method comprises the steps of: transmitting at least one signal into said tank; receiving a response associated with selected ones of said transmitted at least one signal; and evaluating said received response associated with selected ones of said transmitted at least one signal, wherein said evaluation comprises: determining a signal strength of each of said received response; selecting at least two of said received responses, wherein said selected responses are associated with a highest signal strength; and determining said fluid level based on a relationship between said selected at least two of said received responses.

In addition, a method associated with the present invention is disclosed wherein the method comprises the steps of: obtaining an initial alcohol content and level of a fluid within a container and obtaining measurements of the fluid level over time to evaluate and determine a loss of fluid due to one of evaporation and absorption, computing an expected alcohol content based on the initial alcohol content and the loss of fluid and further adjusting the expected alcohol content by one or more environment factors associated with at least the conditions surrounding the storage of the fluid.

Although various features have been described with reference to the Figures, other features are possible. For example, a device implementation in accordance with the present disclosure may comprise modular units with a varying thickness print flex antenna across a barrel face. The device may be implemented with a custom-designed PCB motherboard configured to be mounted in the middle of the barrel face. The device may comprise radar and radio frequency chips and a separate data transceiver module. The data transceiver module may be configured to operate using BLUETOOTH, LORAWAN or another band protocol. The device may be configured with a defined power source, for example a C1, D2 certified single core battery. The device may be attached to the face of an enclosed system (e.g., a whiskey barrel) with the printed antenna arrays located with reference to a defined position of a watch/barrel face. The antenna arrays may be located with reference to the center point of the watch/barrel face. The devices may be adhered or attached to the barrel face with an adhesive or attached with composite fasteners (screw/nail/staples, or the like).

The device may be configured to use a combination of Millimeter Wave (MM Wave) and or Radio Wave (RF), and/or other direct analog measurement methodologies to determine the liquid substrate level behind a barrel face. Liquid-level measurements may be relayed to multiple central communications hubs via BLUETOOTH, LORAWAN or any other communications technology, depending on the distance from the barrel to central device. From the central device, measurement data may be exported out of the rickhouse via satellite, cellular, or fiber connection to the cloud or a handheld device. A device implementation deployed on a barrel may be configured to broadcast measurement data packets from the barrel to the central device and from there exported out of the rickhouse via satellite, cellular, or fiber connection to the cloud or a handheld device configured to collect the measurement data packets exported from the central receiving device.

The device implementation may be configured to account for the introduction of foreign bodies or materials such as wooden staves, woods chips, or anything else that would displace the liquid level. For example, software may be configured to account for the displacement measurement and the displacement differential of any object inserted into the liquid to maintain an accurate measurement. In an illustrative example, the displacement and/or differential measurement software implementation may have a foreign body displacement measurement mode that determines displacement differential between liquid levels measured at different points in time, that is, before and after a foreign body is introduced to the container. The device implementation may incorporate the use of RFID to connect the device to software to track the device/barrel location in a "rickhouse."

The device implementation may use MM Wave, RF Wave, or another lower frequency or band as needed. This radar may be a low enough frequency to ensure penetration of the wood or the material associated with the container. The signal that is transmitted into the barrel by the antenna would be reflected back at levels where the liquid is present, in contrast with no reflections from levels where the liquid is not present. This group of reflections and non-reflections produces a total measured signal that is processed by the device to determine an estimate of the height of the liquid-air interface.

In an illustrative example, a device implementation may be configured to determine liquid level measurements in a horizontal rick storage mode. For example, a horizontal rick storage mode implementation may be configured to measure the liquid level over time as it relates to where any substrate is in contact with the barrel face as well as the liquid-air interface. Such an implementation will be able to determine fluid volume at any given period. Distillers are required by law to log exactly how many proof gallons they put into any barrel at any time. The device implementation may be calibrated by inputting the exact amount of whiskey/tequila/ spirits/etc. (substrate) reported to all required international governmental agencies on to the device, permitting the device to measure the differential of evaporation over time (AKA "The Angels Share"). In an illustrative example, the device implementation can then determine loss over time based on how antennas read the liquid-air interface behind each antenna. In this example implementation, the device is directly measuring the difference in liquid level between points of a varying printed antenna design as well as any liquid-air gaps in the antenna array which may vary in size and orientation.

In another illustrative example a device implementation may be configured to determine liquid level measurements in a vertical palletized storage mode. For example, a vertical palletized storage mode implementation may be configured to measure the reflection between the waves as it pertains to liquid content of an aging barrel. In this mode one or more antennas will reflect waves downward through the barrel face and measure the reflection time between device and barrel, device and substrate, device and barrel bottom as well as any materials inserted or placed in the barrel. This measurement may calculate the distance and relative length of the wave and convert that measure into an accurate measure of substrate. Some waves will go through the barrel and never return and will be disregarded. The device may be configured to only interpret what the device knows as operative space and measure total volume.

The device implementation may be a combination of a peel and stick design and/or with a potential non-metal/ composite screw/staple/nail or fastening device that would allow distillers to adhere/attach the device to the barrel face at the time of barrel fill.

During barrel fill distillers may be required by law to exactly track and log the amount of liquid put in the barrel as stated above. All barrels may not be filled to the same fill level or amount. Accordingly, one or more calibration steps may be performed, as described herein. Connecting the device to the barrel and the system may benefit from calibration to ensure correct and accurate measurements. In an illustrative example a software application may be configured to uniquely associate the barrel to the device for the barrel's primary lifespan (these could be sent to a secondary market). For example, a unique hardware identifier for a barrel may be associated in a database with a unique identifier for an instance of the measurement device disclosed herein. In such an example, particular calibration data determined for the barrel/measurement device pair may be uniquely associated with the measurement device in the database, permitting the calibration and measurement performance of the device to be tracked over time.

As these "rickhouse" environments are quite harsh, a very strong adhesive or other fastening device may be used to adhere/attach the device to the barrel face in both horizontal (traditional rick storage) and vertical (palletized) storage options. We may also encase the designed PCB board and all of the components in a strong epoxy resin potting material or other hard casing to protect all electronics from any potential damage. Damage could be from forces like bumps, scrapes, dings to whiskey leaking on top and heat and/or humidity.

Once the barrel is filled and calibrated, the device is capable of providing a near absolute liquid level measurement. Barrels may range in total volume (the industry average is a 53-gallon barrel which will vary in finished size.) Barrels can be filled above 53 gallons. In an illustrative example the device may adhere/attach to the barrel face in the same fashion regardless of barrel size or storage options such as horizontal rick storage and palletized storage. Antenna arrays can vary in size and orientation based on the size of the barrel face as the barrels vary in total surface volume.

After filling, barrels may be moved to their storage locations where they will sit for varying periods of time. Because of this the device design may comprise a single core ATEX certified battery system which will give a potential life span between 6-10 years. In an illustrative example the device may be configured to satisfy a fire safety class 1 div 2 classifications according to DISCUS, NEC, and as well as ATEX class 2. Keeping fire safety in mind, the single core battery may be used because the single core battery traditionally has a slower discharge rate than reusable or rechargeable batteries. The device may be configured to ping only once a month, every month for the life span of the device or barrel, to conserve battery energy.

The device may be configured to be in communication with a central receiver. The central receiver may be configured in communication with other sensors such as ambient temperature and humidity. Once the device is pinged from the central receiver, the device will activate; once activated the device programming will cause the device to follow distinct operation sequences for horizontal storage and palletized storage device implementations.

In an illustrative example a device implementation designed for a horizontal storage mode in a traditional rickhouse may be configured to perform operations comprising: the device will activate an RF signal which goes across the antenna array; the device will measure exactly the differential of what is behind the barrel head and any relation to the space liquid-air differential between antennas across the clock face of the barrel and the device; as well as the relation of what's behind the wood to our antenna array will allow for volume measurement.

In an illustrative example a device implementation designed for a palletized storage mode may be configured to perform operations comprising: the device will activate in a similar manner as the horizontal storage mode implementation but rather with an MM signal. The device will fire downward and register the wavelength and reflection between device, barrel face, liquid, barrel bottom, and any particulate inside the barrel; the device will then interpret the total space of liquid contained and a measurement will be calculated.

All measurements will be saved in platform for the distiller or end user to make both qualitative and quantitative inferences. These qualitative and quantitative inferences may be used to calculate predictions for Barrel Yield, Tax Planning, Barrel Provenance, and Supply Chain planning.

If a distiller can understand exactly where their total run volume stands more accurately than current industry models of 2-4% loss per year they can make better decisions and inferences on metrics such as barrel performance as it relates to the quality of a cooperage (barrel maker), how any potential variable may affect a barrel such as heat, humidity, any coating material or R&D experiment. Knowing the volume of barrel can allow distillers to make many decisions to both increase efficiency and reduce industrial waste.

Another value add is that with the accurate volume, distillers can work with their insurance provider to reduce potential premiums as well as make sure that they are neither under-insured nor over-insured. They would just be adequately insured for loss.

Potential Yield: In the pursuit of optimizing production, distilleries need to and want to accurately gauge the volume of whiskey in each barrel. This not only helps in maximizing the yield from each batch but also in efficiently utilizing resources. Precise measurements allow for better supply chain forecasting and planning, ensuring that each step of the distillation and aging process is conducted with the utmost efficiency. Also helping with yield as it pertains to number of bottles and cases for their distributors.

Tax Planning: The taxation on distilled spirits can be complex, and it's based, in part, on the volume of product produced and stored. Accurate barrel measurements are essential for distilleries to comply with tax regulations accurately. This precision helps avoid over or underpayment of taxes, which can have significant financial implications. By knowing exactly how much whiskey is in each barrel, distilleries can file more accurate tax returns, thus avoiding potential legal and financial issues. There are major benefits to knowing your PGs (proof gallons) as tax rates do change from around $2.85 and $13.25 once a distillery crossed a set limit (100,000 PGs or roughly 1886 barrel) taxes increase.

Provenance: from its distillation to its aging-knowing volume and history adds to the product's allure and value consumers will pay. Precise barrel measurement contributes to the detailed tracking of each batch's journey, ensuring that the provenance is well-documented and authentic. This level of detail enriches the narrative of the whiskey, providing whiskey enthusiasts with a deeper appreciation of its heritage and quality.

The device may be implemented with a flex tail antenna array that will cover the clockface or in a wagon wheel design of a whiskey barrel that is adhered by a durable adhesive or composite fastener. RF and MM wave chips may be used to determine the liquid levels. The device may include a fire safety approved battery. The device may be configured with multiple interfaces to push data both into and out of the device. The device may be encased in a hard epoxy potting or protective casing. The device may be configured with BLUETOOTH, LORAWAN or another communication band to carry data in and out of the device.

The device remains external to the barrel and does not impede the aging process. The device lowers labor cost over handheld devices and is more accurate. The device is also on the face of the barrel; thus, the barrel can be rolled without the device having to be removed.

Referring to FIG. 24, a system for obtaining internal conditions of a container is illustrated in accordance with examples of the present disclosure. In some aspects, FIG. 24 depicts a container 110, which may be a wooden cask, barrel, or other sealed liquid-containing vessel having an exterior wall 140. The container 110 holds a liquid 120, such as a distilled spirit, wine, or other liquid product. The liquid 120 occupies a portion of the interior volume of container 110, creating a liquid-air interface or liquid level at a specific height within the container. In some aspects, a plurality of radio frequency (RF) responsive elements 220u, 220v, 220w, 220x, 220y, and 220n are disposed externally on the wall 140 of container 110. These RF-responsive elements 220u-220n may be arranged in a substantially vertical array along the exterior surface of the container, with each element positioned at a different height relative to a bottom portion of the container 110. The RF-responsive elements 220u-220n may include passive RFID tags, semi-passive tags, metasurface structures, resonant circuits, or other RF-interactive devices configured to interact with incident RF signals in a manner that is influenced by the adjacent internal environment within the container.

In some aspects, each RF-responsive element 220u-220n includes an antenna structure configured to receive RF signals and to reflect, backscatter, or otherwise interact with these signals. The RF-responsive elements 220u-220n may be configured to respond to signals within various frequency bands, such as ultra-high frequency (UHF) bands commonly used for RFID applications, sub-6 GHz frequencies used in cellular or Wi-Fi communications, or other suitable RF bands. The design of the antenna associated with each RF-responsive element 220u-220n may be optimized to enhance sensitivity to dielectric variations on the opposite side of the container wall.

In some aspects, the RF-responsive elements 220u-220n are strategically positioned such that some elements may be adjacent to portions of the container containing liquid 120, while other RF-responsive elements 220u-220n may be adjacent to portions containing only air and/or vapor. As the liquid level changes over time due to processes such as evaporation, absorption, or consumption, different RF-responsive elements 220u-220n become aligned with the liquid-air interface.

To the right side of FIG. 24, a schematic representation illustrates one or more operational principles of an RF-responsive element 220u-220n. In some aspects, the RF-responsive element 2402 represents an example RF-responsive element similar to elements 220u-220n mounted on the container. The RF-responsive element 2402 is shown in relation to its environment 2404, which represents the surrounding conditions that influence the RF signal interactions. Within the RF-responsive element 2402, the internal components 2406a-2406n (such as antennas, resonators, or other RF-interactive structures) interact with incoming RF signals. These components may be configured in various arrangements to optimize their response to environmental changes. In some aspects, each RF-responsive element 2402 includes internal components 2406a-2406n, which may comprise antenna structures, loops, coils, inductors, resonators, metamaterials, or other RF-interactive components designed to receive and interact with RF signals. The configuration and composition of these internal components 2406a-2406n may determine how the RF-responsive element 2402 interact with incident RF signals and how they are affected by the adjacent environment 2404. The internal components may be tuned to specific frequencies or designed with particular geometries to enhance their sensitivity to environmental changes on the opposite side of the container wall.

In some aspects, an RF signal 2408 is transmitted toward the RF-responsive element 2402 from an external source. The RF signal 2408 may be generated by an RF reader 2412 or other transmitting device. The RF signal 2408 may comprise continuous waves, modulated signals, or pulsed transmissions configured to interact with the internal components 2406a-2406n of the RF-responsive element. When the RF signal 2408 encounters the RF-responsive element 2402 and its internal components 2406a-2406n, a portion of the signal is reflected, backscattered, or reradiated, producing a reflection signal 2410 that returns to the RF reader 2412. The characteristics of this reflection signal 2410, such as its amplitude (received signal strength indicator or RSSI), phase, resonant frequency, or channel state information (CSI), may be influenced by the environment 2404 adjacent to the RF-responsive element.

The RF reader 2412 receives and processes the reflection signal 2410 to extract information about the internal condition of the container. By analyzing the collective response of the vertically arranged RF-responsive elements 220u through 220n and their respective internal components 2406a-2406n, the system can determine where the transition occurs between liquid-influenced and air-influenced responses, thereby identifying the liquid level 120 within the container 110. That is, the system operates on the principle that an RF-responsive element 2402 positioned adjacent to a liquid-backed portion of the container wall will interact with RF signals differently than an RF-responsive element 2402 that may be located adjacent to an air-backed portion, due to the different dielectric properties affecting the internal components 2406a-2406n of each element. This non-invasive monitoring approach allows for continuous or periodic measurement of liquid levels without breaching the integrity of the container or disturbing its contents. The system represented in FIG. 24 provides a means for monitoring the internal contents of sealed containers by leveraging the interactions between RF signals, the specially designed internal components of the RF-responsive elements, and the varying environments they encounter.

FIG. 24 additionally depicts a variation of the RF-responsive element 2414, which includes an integrated microcontroller unit (MCU) 2416 configured to locally process signal information and generate characteristics 2418 corresponding to one or more properties of the received RF signal. In some aspects, the RF-responsive element 2414 is not merely passive but may exhibit active or semi-passive capabilities, such as sensing, signal processing, or data logging.

In operation, an RF interrogation signal 2408 is transmitted toward the environment 2402, which may include a liquid-filled container 110 having a surface 120 and outer wall 140. As the RF signal 2408 interacts with the environment, a reflected signal 2410 is returned to the RF reader 2412. Simultaneously, RF-responsive element 2414 receives the RF signal and internally evaluates signal features such as RSSI, signal phase, frequency offset, CSI, or channel quality metrics using its onboard components, including MCU 2416. In some aspects, the MCU 2416 processes these internally measured signal characteristics and generates corresponding data values 2418, which may be stored locally or encoded into a backscattered response. These values 2418 may represent, for example, the RSSI as measured at the RF-responsive element 2414, or signal integrity parameters indicative of the propagation conditions through the surrounding medium (e.g., air, vapor, or liquid). In some implementations, the RF-responsive element 2414 may also sense temperature, humidity, or vibration, and include such data in the measured characteristics 2418.

In some aspects, the characteristics of the reflected signal 2410—as measured by the RF reader 2412—may be compared with the internally sensed characteristics 2418 measured by RF-responsive element 2414. By analyzing differences or correlations between these two sets of signal data, the system can improve diagnostic accuracy, validate environmental readings, or identify anomalies such as signal interference, tag detuning, material seepage, or unexpected liquid ingress. For example, if the RSSI measured by the RF-responsive element 2414 significantly deviates from that observed at the RF reader 2412, the system may infer that signal absorption or multi-path distortion is occurring in the monitored environment. Such discrepancies can be indicative of evolving conditions, such as fluid level changes, material degradation, or external contamination.

In some implementations, MCU 2416 may support additional logic or learning algorithms that allow RF-responsive element 2414 to autonomously detect patterns or generate alerts based on predefined thresholds or historical trends. These features enable improved sensing architectures, particularly for applications involving long-term container monitoring, such as barrel aging, chemical storage, or environmental exposure analysis.

In certain embodiments, the RF-responsive element 2414 may refer to a sensing component that is configured to generate a signal indicative of at least one characteristic of an environment, substance, or system under observation. As used herein, "indicative of" generally encompasses situations in which the generated signal reflects, represents, or is correlated to a given property without necessarily providing a direct, one-to-one measurement. For example, the sensing component may output an analog signal that undergoes post-processing or interpretation, where even a subtle change in resonant frequency or waveform amplitude can reveal underlying information about a fluid's dielectric constant, temperature, or other relevant parameters. In this sense, a frequency shift, phase variation, or coded output may each qualify as "indicative of" the property in question, so long as the signal conveys information that may be interpreted or mapped to the characteristic.

Moreover, in various aspects, the phrase "at least one characteristic" may not limit the system to measuring only a single property. A single sensing component or an array of sensing components may detect multiple attributes—such as fluid level, density, composition, or dielectric constant—and still satisfy scenarios in which only one selected property is processed or analyzed. That is, additional measured attributes may be incorporated, thereby supporting expanded functionality without departing from the fundamental principle that a generated signal need only correlate with one or more properties of interest. Whether the signal is a digital bitstream, an analog waveform, or a frequency response curve, the signal may be transformed, filtered, or otherwise analyzed to derive meaningful insights regarding the measured environment or substance.

In certain implementations, a sensing component is configured to generate a signal indicative of at least one dielectric property associated with a fluid stored within the container. By "associated with the fluid," it is understood that the signal may reflect how the fluid's presence, composition, or level influences the electromagnetic or electrostatic environment in proximity to the sensing module. For instance, if the fluid partially fills the container, the interface between the fluid and the surrounding headspace can induce a measurable change in resonant frequency, impedance, or signal strength, thereby serving as an indirect measure of fluid level. Conversely, when the fluid's composition or concentration shifts—such as through evaporation, absorption, or chemical exchange with the container material—these alterations produce corresponding variations in the fluid's dielectric response, which the sensing component can capture and convey. Thus, a system may generate a signal (e.g., an active signal, a reflected signal, etc.) that is indicative of at least one dielectric property associated with the fluid, such that a system can conduct at least one of a fluid-level detection (where the fluid boundary modulates the measured property) or a composition-based sensing (where changing fluid characteristics modify the dielectric constants being measured).

In some aspects, the fluid contained in a container is subject to composition-based or environment-driven changes resulting from interactions with the container itself. These changes may arise, for example, as the fluid undergoes chemical exchange with the inner surface of the container, experiences variations in temperature or pressure, or is exposed to differing levels of humidity or ambient gases. In certain scenarios, the fluid's concentration, chemical composition, or physical properties (e.g., viscosity, dielectric constant, or pH) can shift over time due to absorption, evaporation, oxidation, or other reactions facilitated by the container's material.

Moreover, these environment-driven or composition-based alterations may occur progressively, even without direct human intervention, as a function of storage duration, atmospheric conditions, or intrinsic material properties of the container. As an illustrative example, a wooden barrel used for aging spirits or wine may impart flavor compounds or cause water-ethanol exchange that changes the fluid's flavor profile, alcohol concentration, and coloration. In other instances, a polymeric or metallic container might introduce subtle chemical interactions affecting the fluid's longevity or stability. Regardless of the specific mechanism, these changes collectively contribute to time-varying characteristics of the fluid, offering opportunities for monitoring, analysis, or adaptive control.

FIG. 25 illustrates a block diagram of an exemplary architecture 2502 of a radio-frequency (RF) sensing device that may be implemented in various embodiments of a non-invasive sensing system for monitoring internal conditions of containers in accordance with examples of the present disclosure. The RF sensing device may be the same as or similar to the RF-responsive element 220u-220n and/or RF-responsive element 2402 of FIG. 24. The architecture 2502 may be configured to operate in passive, semi-passive, or active modes depending on the specific implementation and power requirements of the sensing application.

An RF sensing device may include an antenna 2504 configured to receive and/or transmit RF signals in communication with external reading devices. The antenna 2504 may comprise a suitable antenna structure including, but not limited to, dipole configurations, patch arrangements, loop structures, microstrip designs, fractal patterns, or other antenna geometries selected based on operating frequency, spatial constraints, gain requirements, and directional characteristics. In some aspects, the antenna 2504 may be designed as a conformal structure that can be adhered to curved surfaces such as barrel staves or container walls. The antenna 2504 may be tuned to operate in various frequency bands including ultra-high frequency (UHF) ranges commonly used in RFID applications (e.g., 860-960 MHz), industrial, scientific and medical (ISM) bands (e.g., 2.4 GHz or 5.8 GHz), or other frequency ranges suitable for penetrating container materials and/or interacting with contained liquids. In some aspects, the antenna 2504 may serve dual functions in many implementations: receiving interrogation signals from external reading devices and/or reflecting or transmitting response signals that carry sensed information.

In some aspects, the antenna 2504 may be coupled to an impedance matching network 2506, which may optimize power transfer between the antenna 2504 and the device's internal circuitry. The impedance matching network 2506 may comprise passive components such as capacitors, inductors, transformers, transmission line sections, or active components that dynamically adjust matching parameters based on operating conditions. In some aspects, the impedance matching network 2506 may minimize reflection losses by providing a conjugate match to the RF input impedance of downstream components, thereby maximizing the power transferred from the antenna to the processing circuitry or, conversely, from the device back to the external reader. In some aspects, the impedance matching network 2506 may be designed with a variable or switchable configuration to accommodate different operational modes or frequency bands.

In some aspects, a demodulator 2508 may be coupled to the impedance matching network 2506 and may extract baseband information from the incident RF carrier signal. The demodulator 2508 may implement various demodulation techniques including amplitude shift keying (ASK), phase shift keying (PSK), frequency shift keying (FSK), or more complex schemes such as quadrature amplitude modulation (QAM) depending on the communication protocol employed. The demodulator 2508 processes the received RF signal to recover command and control data that may include timing instructions, sensor polling requests, configuration parameters, or other information transmitted from an external reader. In some aspects, the demodulator 2508 may incorporate signal conditioning components such as filters, amplifiers, or level shifters to improve signal quality before demodulation.

In some aspects, the demodulated signal from the demodulator 2508 may be provided to a microcontroller unit (MCU) 2510, which may operate as a central processing element of the RF sensing device. The MCU 2510 may be implemented using a microcontroller (typically low-power), processor, application-specific integrated circuit (ASIC), field-programmable gate array (FPGA), system-on-chip (SoC), or other suitable processing element configured to coordinate the operation of the sensing and communication components. The MCU 2510 executes firmware or software instructions to manage power consumption, process sensor readings, control modulation parameters, and implement application-specific algorithms for environmental sensing. In some aspects, the MCU 2510 may incorporate sleep modes, wake-up timers, or event-triggered processing to minimize power consumption during periods of inactivity.

In some aspects, the RF sensing device may include a modulator 2512 coupled to the MCU 2510 and the antenna 2504, which may be configured to encode information in the reflected or transmitted signal. The modulator 2512 may operate by varying the impedance of the antenna 2504 in response to control signals from the MCU 2510, thereby modulating the backscattered signal in a process known as load modulation. Alternatively, or in addition, in active implementations, the modulator 2512 may generate an actively transmitted waveform carrying the encoded information. The modulation may encode identification data, sensor readings, signal metrics, or other information derived from the RF interaction or sensor measurements. The modulator 2512 may implement various modulation schemes including amplitude modulation, phase modulation, frequency modulation, or combinations thereof to efficiently encode information while maintaining compatibility with reader systems.

Example information 2514 indicates various signal characteristics that may be sensed, modulated, or encoded by the RF sensing device. These characteristics include, but are not limited to, channel state information (CSI), which provides a fine-grained frequency-domain profile of the RF channel including amplitude and phase information across multiple subcarriers; signal phase information capturing the relative carrier phase between transmitted and received signals, which is sensitive to propagation delay; received signal strength indicator (RSSI), which provides an indication of power level received or reflected; resonant frequency measurements, which may shift based on changes in nearby dielectric loading such as liquid level behind the tag, and the reflected signal. These signal characteristics may be processed by the MCU 2510 to infer information about the environment surrounding the RF sensing device or may be transmitted to an external reader for further analysis.

In some aspects, an energy harvester 2516 may be coupled to the impedance matching network 2506 and functions to convert a portion of the received RF energy into DC power for operating the device. The energy harvester 2516 may include rectifier circuits (e.g., using Schottky diodes, CMOS transistors, or other semiconductor devices), voltage multipliers (e.g., Dickson, Villard, or Cockcroft-Walton configurations), and impedance-matching networks optimized for power conversion rather than signal integrity. In some aspects, the energy harvester 2516 may be designed to operate efficiently across multiple frequency bands or to extract energy from ambient RF sources other than the primary interrogation signal. The efficiency of the energy harvester 2516 may vary based on factors such as input power level, frequency, polarization, and impedance matching accuracy. The harvested energy from the energy harvester 2516 may be provided to a regulator 2518, which conditions the power for use by the device's active components. The regulator 2518 may include voltage stabilization circuits, current limiting protection, and noise filtering to provide a stable DC supply voltage despite variations in harvested power. In some implementations, the regulator 2518 may incorporate multiple output voltages to serve different components with different power requirements or may implement dynamic voltage scaling to balance performance and power consumption based on available energy.

In some aspects, the architecture 2502 may include a boost converter 2520 coupled to the regulator 2518 or directly to the energy harvester 2516. The boost converter 2520 steps up the voltage level from the harvested energy to meet the requirements of downstream components or to efficiently charge an energy storage element. The boost converter 2520 may implement inductor-based, capacitor-based (charge pump), or transformer-based topologies depending on efficiency requirements, space constraints, and voltage conversion ratios. An energy storage element 2522 may be coupled to the boost converter 2520 or directly to the regulator 2518, providing temporary energy storage to support operation during periods without sufficient incoming RF power. The energy storage element 2522 may comprise capacitors, supercapacitors, thin-film batteries, or other rechargeable storage technologies selected based on capacity requirements, leakage characteristics, cycle life, and physical constraints. In semi-passive implementations, the energy storage element 2522 enables the device to perform sensing or processing operations independent of the availability of an interrogation signal, thereby extending the functionality of the device.

The architecture 2502 may incorporate one or more sensors 2524 coupled to the MCU 2510, which gather data about the environment adjacent to the RF sensing device. These sensors 2524 may include temperature sensors (e.g., thermistors, resistance temperature detectors, digital temperature sensors), humidity sensors, pressure sensors, ethanol vapor detectors, moisture sensors, accelerometers, or other environmental sensors relevant to the application. In some aspects, the RF characteristics themselves may serve as implicit sensors, with the MCU 2510 analyzing parameters such as antenna resonance, impedance, or signal propagation to infer environmental conditions without dedicated sensor components. The sensors 2524 may operate on various principles including resistive, capacitive, piezoelectric, optical, or electrochemical sensing mechanisms, selected based on the parameter being measured and power constraints.

In operation, the architecture 2502 enables dual-mode RF sensing whereby the device receives a downlink RF signal, measures its characteristics, and either backscatters or actively transmits a return signal to a reader. Changes in the environment, such as but not limited to variations in liquid level, vapor concentration, or container wall moisture, modulate both the received signal characteristics and the reflected signal, enabling inference of internal conditions based on comparative analysis. This dual-path sensing approach provides enhanced sensitivity and reliability compared to single-parameter measurement methods, particularly in challenging environments such as wooden barrels or other containers with variable material properties.

The architecture 2502 may support various operating modes, including continuous monitoring, periodic sampling, or event-triggered operation, depending on power availability and application requirements. In passive implementations, the device operates solely from harvested RF energy during reader interrogation. In semi-passive configurations, the energy storage element 2522 provides power for sensing and processing between reader interrogations while still using backscatter for communication. In active implementations, the device may transmit signals independently using harvested or stored energy. The architecture 2502 may be implemented using discrete components, integrated circuits, system-in-package technologies, or custom ASICs depending on production volume, size constraints, and performance requirements. The physical implementation may be optimized for conformal mounting on container surfaces, with considerations for environmental protection, adhesion methods, and minimizing impact on container aesthetics or functionality.

Referring now to FIG. 26, a signal response profile diagram 2600 illustrating various radio frequency (RF) signal characteristics as functions of liquid level relative to an RF-responsive element is depicted according to embodiments of the present disclosure. The diagram 2600 comprises multiple subgraphs arranged vertically, each representing a different signal metric that may be measured or derived when an RF signal interacts with an RF-responsive element positioned externally on a container surface and/or wall.

The top subgraph 2602 illustrates the Received Signal Strength Indicator (RSSI) response curve 2604 plotted as a function of liquid level relative to the RF-responsive element position (measured in centimeters). The RSSI response curve 2604 demonstrates a transition when the liquid level crosses the position of the RF-responsive element (at the 0 cm position). When the liquid level is above the sensor (negative values on the x-axis), the RSSI value remains relatively low as indicated by the substantially flat portion of curve 2604 to the left of position 2606. As the liquid level approaches and passes the sensor position at point 2606 (0 cm mark), the RSSI value increases substantially, as shown by the steep transition region of curve 2604. The RSSI value then stabilizes at a higher level when the liquid level is below the position of the RF-responsive element, as indicated by the substantially flat portion of curve 2604 to the right of position 2608. The characteristic S-curve arises from the transition between low-dielectric air and high-dielectric liquid, which alters the RF signal propagation and reflection, typically leading to changes in RSSI and phase due to increased dielectric loading and absorption. That is, the change in dielectric environment when liquid replaces air behind the RF-responsive element may modify the reflection and absorption characteristics of the signal due to the higher dielectric constant and loss tangent of the liquid, which can lead to measurable changes in signal strength (RSSI), phase, and/or resonance characteristics.

The second subgraph 2612 depicts the phase response curve 2614 as a function of liquid level relative to the position of the RF-responsive element. The phase response exhibits an inverse relationship compared to the RSSI curve. When the liquid level is below the sensor (negative values on the x-axis), the phase value remains relatively high. As the liquid level approaches and crosses the position of the RF-responsive element at point (0 cm mark), the phase value decreases, as shown by the steep transition region of curve 2614. Position 2618 marks a point on the phase response curve where the liquid level is above the position of the RF-responsive element, and the phase has stabilized at a lower value. This phase transition occurs because the propagation characteristics of the RF signal change when interacting with liquid versus air, resulting in a measurable phase shift that can be detected by an RF reader system.

The third subgraph 2622 illustrates the Channel State Information (CSI) metric represented by curve 2624. Unlike the monotonic transitions seen in RSSI and phase responses, the CSI metric exhibits a peak-like behavior centered around the liquid level transition point. At position 2626 (0 cm mark), where the liquid level aligns with the position of the RF-responsive element, the CSI distortion may reach a maximum value as indicated by the peak of curve 2624. Points 2628 represent measurements at the peak where the liquid level at the position of the RF-responsive element. The CSI metric may provide a highly sensitive indicator of the exact liquid-air interface position, as it captures frequency-domain characteristics of the RF channel that are particularly responsive to dielectric boundaries.

The fourth subgraph 2632 shows the resonant frequency response curve 2634 as a function of liquid level. When the liquid level is below the position of the RF-responsive element (negative values on the x-axis), the resonant frequency remains at a baseline value. As the liquid level approaches and crosses the position of the RF-responsive element at 2636 (0 cm mark), the resonant frequency may shift to a different value as shown by the transition region of curve 2634. Position 2638 marks a point where the liquid level is at the position of the RF-responsive element, and the resonant frequency has stabilized at a new value. This frequency shift occurs because the resonance characteristics of the RF-responsive element are influenced by the dielectric properties of the adjacent materials, with liquid causing a measurable shift in the resonant frequency compared to air.

The lower portion of FIG. 26 includes three diagrams 2640a, 2640b, and 2640c, each representing a different liquid level scenario corresponding to specific points on the x-axis of the signal response graphs. The left diagram 2540a shows a liquid level at position −1.25 cm relative to the position of the RF-responsive element. The center diagram 2540b shows a liquid level at position 0 cm, aligned with the position of the RF-responsive element. The right diagram 2640c shows a liquid level at position +2 cm relative to the position of the RF-responsive element.

Together, these diagrams illustrate profile readings based on one or more scenarios corresponding to the signal responses shown in the graphs above. Thus, the signal response profile illustrated in diagrams 2640a, 2640b, and 2640c depicts how multiple RF signal characteristics can be measured simultaneously to provide a determination of liquid level within a container using externally mounted RF-responsive elements. By analyzing combinations of these signal metrics, the system can achieve accuracy and reliability in non-invasive liquid level sensing applications, particularly for wooden casks, barrels, or other containers where traditional invasive sensors would be undesirable. Although the signal responses illustrated from left to right in FIG. 26 reflect a rising liquid scenario, it will be understood that in certain applications, such as aging or evaporation monitoring, the liquid level may initially begin above the sensor and subsequently drop below it. In such cases, the signal response profiles may exhibit inverse transitions. In some aspects, an RF-responsive element may be positioned in the bottom half of a container such that variations in liquid level above the RF-responsive element do not materially affect its signal response. In such configurations, observed changes in signal characteristics may instead be attributable to evolving properties of the liquid itself, such as alcohol by volume (% ABV), color, viscosity, or other dielectric-affecting parameters.

Referring now to FIG. 27, illustrated is a composite time-domain chart 2700 showing signal behavior and environmental change over time for a container monitoring system according to at least one aspect of the present disclosure. The chart 2700 depicts a multi-parameter visualization wherein different signal characteristics and derived metrics are plotted as functions of time, enabling correlation between RF signal responses and physical changes occurring within the monitored container.

The horizontal axis of chart 2700 represents time, advancing from left to right across defined time intervals or measurement events, including timestamps T=t−n, T=t, T=t+x, and T=t+y. These timestamps correspond to successive measurement or sampling points at which the RF-responsive elements interact with an interrogation signal from a reader or base station. The vertical axis on the left side represents RSSI values, while the vertical axis on the right side represents cumulative loss percentage of the liquid within the container. The chart 2700 includes multiple plotted curves 2702a, 2702b, 2702c, 2702d, 2702e, and 2702f (collectively referred to as curves 2702), each representing an RSSI trend associated with an individual RF-responsive element positioned at a different height on the exterior wall/surface of a container. The RF-responsive elements may comprise passive RFID tags, semi-passive sensing transceivers, reconfigurable intelligent surfaces, or other RF-interactive structures configured to modulate, reflect, or backscatter an incident RF signal. These RF-responsive elements may be arranged in a substantially vertical array along the container's exterior surface, with each element having a known position relative to the container's bottom or reference point.

Each curve 2702 exhibits characteristic behavior indicative of the interaction between the corresponding RF-responsive element and its local environment. For instance, the signal strength reflected from an RF-responsive element may change based on whether the element is adjacent to a portion of the container containing liquid, vapor, or air. This change occurs because the dielectric properties of these different media affect the electromagnetic coupling between the RF-responsive element and the incident RF signal. Liquid typically has a higher dielectric constant than air, which can alter the resonance, impedance, or backscatter characteristics of the RF-responsive element.

For example, curve 2702*a* corresponds to an RF-responsive element positioned near the top of a container. Its relatively flat and high RSSI indicates that the tag remains adjacent to air throughout the measurement period, confirming that the liquid level never reaches it. In contrast, curve 2702*b* demonstrates a pronounced increase in RSSI over time, starting at a lower signal level (indicating that the RF-responsive element is adjacent to liquid) and rising sharply as the liquid level drops and the tag transitions to being adjacent to air and/or vapor. Similarly, curve 2702*c*, curve 2702*d*, and curve 2702*e* demonstrate a pronounced increase in RSSI over time, starting at a lower signal level (indicating that the RF-responsive element is adjacent to liquid) and rising sharply as the liquid level drops and the tag transitions to being adjacent to air and/or vapor. The dotted lines in FIG. 27 represent a future RSSI reading.

Curve 2704 corresponds to the cumulative loss percentage, which quantifies the volume of liquid that has evaporated, leaked, or been absorbed by the container walls over time. This metric may be calculated based on the change in liquid level (curve 2706) and knowledge of the container's internal geometry. The cumulative loss percentage curve 2704 enables tracking of long-term trends in liquid depletion, which may be particularly valuable for aging processes like spirit maturation or quality control in storage applications.

Curve 2706 represents the inferred liquid level within the vessel over time, which may be derived from the RSSI data of the multiple RF-responsive elements. This liquid level curve 2706 may be computed through various methods, such as threshold detection (identifying which tags exhibit RSSI values above a predetermined threshold), interpolation between adjacent RF-responsive elements, or more complex signal processing algorithms that consider the relative RSSI changes across multiple elements. The liquid level curve 2706 provides a continuous or discrete estimate of where the liquid-air interface is located within the container at any given time.

Curve 2704 corresponds to the cumulative loss percentage, which quantifies the volume of liquid that has evaporated, leaked, or been absorbed by the container walls over time. This metric may be calculated based on the change in liquid level (curve 2706) and knowledge of the container's internal geometry. The cumulative loss percentage curve 2704 enables tracking of long-term trends in liquid depletion, which may be particularly valuable for aging processes like spirit maturation or quality control in storage applications.

Vertical lines 2708*a*, 2708*b*, 2708*c*, and 2708*d* (collectively referred to as lines 2708) mark specific timestamps or events in the monitoring timeline. Line 2708*a* may indicate the initiation of monitoring or a calibration event. Line 2708*b* might correspond to a moment when the RSSI from a particular RF-responsive element (e.g., 2702*b*) reached a transition value, suggesting alignment with the liquid-air interface. Line 2708*c* could correspond to a moment when the RSSI from a particular RF-responsive element (e.g., 2702*c*) reached a transition value, suggesting alignment with the liquid-air interface and the RF-responsive element associated with the line curve 2702*c*. Line 2708*d* might correspond to a moment when the RSSI from a particular RF-responsive element (e.g., 2702*d*) reaches a transition value, suggesting alignment with the liquid-air interface and the RF-responsive element associated with the line curve 2702*c*.

In some aspects, the temporal relationships between the various signal responses may be used to infer both instantaneous liquid levels and longer-term dynamics such as evaporation rates. For instance, the time delay between inflection points in curves 2702*c* and 2702*d* may correspond to the time taken for the liquid level to descend between the respective positions of the corresponding RF-responsive elements. By analyzing these temporal patterns and correlating them with environmental data, the system can estimate various parameters of interest, such as liquid loss rate, vapor-phase development, or compositional changes in the container contents. In some implementations, computational logic or algorithms that track the evolution of RSSI values over time, detect signal features such as peaks, valleys, inflection points, or slope changes, and compute derived metrics like the liquid level (curve 2704) or cumulative loss percentage (curve 2706) may be used. These algorithms may employ statistical techniques, machine learning models, or physics-based simulations to improve the accuracy and reliability of the inferred parameters.

The approach exemplified by chart 2700 can support various types of RF-responsive elements, including passive RF-responsive elements that rely solely on the energy of an incident interrogation signal, semi-passive RF-responsive elements that include a battery or energy harvester to power some functions, or active devices that can transmit signals independently. The RF communication may operate in various frequency bands, such as UHF RFID (860-960 MHz), Wi-Fi (2.4 GHz or 5 GHz), or cellular bands (e.g., 5G sub-6 GHz or mmWave), depending on the specific requirements of the application. By integrating temporal information with spatial signal patterns, a system can provide comprehensive insights into the internal conditions of a sealed container without requiring direct access to its contents. This non-invasive monitoring approach may be particularly valuable for processes where maintaining container integrity is critical, such as aging of spirits, long-term storage of sensitive chemicals, or quality control in food processing.

In operation, the chart 2700 may be generated either in real-time as new measurements are collected or retrospectively from stored data. The visualization provided by chart 2700 enables operators to observe trends, identify anomalies, and make informed decisions about the monitored container. For example, an unexpected rapid change in the RSSI of one or more RF-responsive elements might indicate a leak or accelerated evaporation, prompting investigation or intervention. Similarly, a gradual flattening of the cumulative loss curve 2706 might suggest that the container has reached equilibrium with its environment, potentially signaling the completion of a maturation process. The monitoring approach illustrated by chart 2700 may be extended to include additional signal characteristics beyond RSSI, such as phase shift, resonant frequency, or channel state information, which may provide complementary information about the container contents. The approach may also be scaled to monitor multiple containers simultaneously, enabling comparative analysis across a set of containers under similar or different conditions.

Referring now to FIG. 28, illustrated is a composite phase-domain chart 2800 showing signal behavior and environmental change over time for a container monitoring system according to at least one aspects of the present disclosure. The chart 2800 depicts a multi-parameter visualization wherein different signal characteristics and derived metrics are plotted as functions of time, enabling correlation between RF phase responses and physical changes occurring within the monitored container.

The horizontal axis of chart 2800 represents time, advancing from left to right across defined time intervals or measurement events, including timestamps T=t−n, T=t, T=t+x, and T=t+y. These timestamps correspond to successive measurement or sampling points at which the RF-responsive elements interact with an interrogation signal from a reader or base station. The vertical axis on the left side represents phase values in degrees, while the vertical axis on the right side represents cumulative loss percentage of the liquid within the container. The chart 2800 includes multiple plotted curves 2802a, 2802b, 2802c, 2802d, and 2802e (collectively referred to as curves 2802), each representing a phase response trend associated with an individual RF-responsive element positioned at a different height on the exterior wall/surface of a container. The RF-responsive elements may comprise passive RFID tags, semi-passive sensing transceivers, reconfigurable intelligent surfaces, or other RF-interactive structures configured to modulate, reflect, or backscatter an incident RF signal with characteristic phase shifts. These RF-responsive elements may be arranged in a substantially vertical array along the container's exterior surface, with each element having a known position relative to the container's reference point.

Each curve 2802 exhibits characteristic behavior indicative of the interaction between the corresponding RF-responsive element and its local environment. Unlike RSSI measurements, phase responses typically decrease when an RF-responsive element transitions from liquid-backed to air-backed states. This phase shift occurs because the propagation characteristics and effective electrical path length change based on the dielectric properties of the adjacent media.

For example, curve 2802a corresponds to an RF-responsive element positioned near the top of a container. Its relatively flat and high phase value (approximately) 160° indicates that the tag remains adjacent to air throughout the measurement period, confirming that the liquid level never reaches this height. In contrast, curve 2802b demonstrates a pronounced decrease in phase over time, starting at a higher phase value (indicating that the RF-responsive element is initially adjacent to air) and dropping sharply as liquid evaporates and the sensor gradually transitions to being adjacent to vapor or air instead of liquid. Similarly, curves 2802c, 2802d, and 2802e demonstrate characteristic phase transitions at their respective heights as the liquid level decreases over time.

Curve 2804 corresponds to the cumulative loss percentage, which quantifies the volume of liquid that has evaporated, leaked, or been absorbed by the container walls over time. This metric increases steadily throughout the monitoring period, reflecting the ongoing evaporation or "angel's share" typical in aging processes like spirit maturation. The cumulative loss percentage enables tracking of long-term trends in liquid depletion, which may be particularly valuable for quality control and inventory management.

Curve 2806 represents the inferred liquid level within the vessel over time, which may be derived from the phase data of the multiple RF-responsive elements. This liquid level curve 2806 may be computed through various methods, such as threshold detection (identifying which tags exhibit phase values below a predetermined threshold), interpolation between adjacent RF-responsive elements with transitioning phase values, or more complex signal processing algorithms that consider the relative phase changes across multiple elements. The liquid level curve 2806 decreases over time, consistent with expected evaporation in a sealed container.

Vertical lines 2808a, 2808b, 2808c, and 2808d (collectively referred to as lines 2808) mark specific timestamps or events in the monitoring timeline. Line 2808a may indicate the initiation of monitoring or a calibration event. Line 2808b might correspond to a moment when the phase response from RF-responsive element 2802b reached a transition value (approximately) 120°, suggesting alignment with the liquid-air interface. Line 2808c could correspond to a moment when the phase response from RF-responsive element 2802c crossed a similar transition threshold. Line 2808d might mark a significant milestone in the aging process, such as a scheduled quality check or sampling event.

In some aspects, the temporal relationships between the various phase signal responses may be used to infer both instantaneous liquid levels and longer-term dynamics such as evaporation rates. For instance, the time delay between inflection points in curves 2802c and 2802d may correspond to the time taken for the liquid level to descend between the respective positions of the corresponding RF-responsive elements. By analyzing these temporal patterns and correlating them with environmental data, the system can estimate various parameters of interest, such as liquid loss rate, vapor-phase development, or compositional changes in the container contents.

In some implementations, a system may incorporate computational logic or algorithms that track the evolution of phase values over time, detect signal features such as transitions, inflection points, or slope changes, and compute derived metrics like the liquid level (curve 2806) or cumulative loss percentage (curve 2804). These algorithms may employ statistical techniques, machine learning models, or physics-based simulations to improve the accuracy and reliability of the inferred parameters.

The approach exemplified by chart 2800 can support various types of RF-responsive elements, including passive RF-responsive elements that rely solely on the energy of an incident interrogation signal, semi-passive RF-responsive elements that include a battery or energy harvester to power some functions, or active devices that can transmit signals independently. The RF communication may operate in various frequency bands, such as UHF RFID (860-960 MHz), Wi-Fi (2.4 GHz or 5 GHz), or cellular bands (e.g., 5G sub-6 GHz or mmWave), depending on the specific requirements of the application. By integrating temporal information with spatial phase patterns, a system can provide comprehensive insights into the internal conditions of a sealed container without requiring direct access to its contents. This non-invasive monitoring approach may be particularly valuable for processes where maintaining container integrity is critical, such as aging of spirits, long-term storage of sensitive chemicals, or quality control in food processing.

In operation, the chart 2800 may be generated either in real-time as new measurements are collected or retrospectively from stored data. The visualization provided by chart 2800 enables operators to observe trends, identify anomalies, and make informed decisions about the monitored container. For example, an unexpected rapid change in the phase response of one or more RF-responsive elements might indicate a leak or accelerated evaporation, prompting investigation or intervention. Similarly, a gradual flattening of the cumulative loss curve 2804 might suggest that the container has reached equilibrium with its environment, potentially signaling the completion of a maturation process.

The monitoring approach illustrated by chart 2800 demonstrates how phase measurement complements RSSI data, providing an additional dimension of signal characteristics that can enhance detection sensitivity. This approach may be further extended to include other parameters such as resonant frequency or channel state information, which may provide complementary information about the container contents. The approach may also be scaled to monitor multiple containers simultaneously, enabling comparative analysis across a set of containers under similar or different conditions.

Referring now to FIG. 29, illustrated are frequency-domain plots showing how reflected radio frequency (RF) signal characteristics vary as a function of alcohol content within a liquid adjacent to an externally affixed RF-responsive element in accordance with aspects of the present disclosure. A system may implement frequency-dependent reflection and phase behavior to determine or estimate the alcohol content of liquid contained within a vessel such as a cask, barrel, or tank, without requiring direct contact with the liquid. FIG. 29 comprises two separate graphs arranged in vertical alignment. The upper graph 2902 depicts reflected signal strength as a function of frequency, while the lower graph 2904 shows phase shift as a function of frequency for corresponding measurements.

In the upper graph 2902, the vertical axis represents reflected signal strength measured in decibels (dB), and the horizontal axis represents frequency. The graph 2902 illustrates how the amplitude of reflected RF signals exhibits characteristic frequency-dependent behavior that correlates with the alcohol content of the liquid within the container. Three distinct curves 2906a, 2906b, and 2906c are shown, each corresponding to different alcohol by volume (ABV) percentages. Specifically, curve 2906a represents the reflected signal amplitude profile associated with liquid having approximately 50% ABV, curve 2906b represents the reflected signal amplitude profile associated with liquid having approximately 45% ABV, and curve 2906c represents the reflected signal amplitude profile associated with liquid having approximately 40% ABV.

Each of the curves 2906a, 2906b, and 2906c exhibits a resonant response characterized by a peak amplitude at a specific frequency. The resonant frequency at which this peak occurs shifts systematically as a function of the liquid's alcohol content. This frequency shift phenomenon occurs because the dielectric properties of the liquid vary substantially with ethanol concentration. For instance, curve 2906a (corresponding to 50% ABV) shows a resonant peak at a higher frequency compared to curve 2906c (corresponding to 40% ABV). This relationship between resonant frequency and alcohol content provides a basis for non-invasive determination of the liquid's alcohol concentration through analysis of the frequency-domain characteristics of reflected RF signals.

The lower plot 2904 illustrates corresponding phase shift measurements across the same frequency range. The vertical axis represents phase shift measured in degrees, while the horizontal axis again represents frequency. Similar to the amplitude plot 2902, the phase plot 2904 includes three distinct curves 2908a, 2908b, and 2908c, corresponding respectively to liquids with 50% ABV, 45% ABV, and 40% ABV. Each of the phase curves 2908a, 2908b, and 2908c demonstrates a characteristic phase transition or "dip" centered approximately at the resonant frequency identified in the amplitude plot 2902. The depth and sharpness of these phase transitions correlate with the ethanol concentration of the liquid. For example, curve 2908a (50% ABV) exhibits a deeper and more pronounced phase dip compared to curve 2908c (40% ABV). Additionally, the frequency position at which the phase dip occurs shifts in a manner consistent with the shifts observed in the amplitude resonance peaks, providing complementary information that may enhance measurement reliability or precision.

The frequency-domain measurements depicted in FIG. 29 may be obtained using various RF sensing architectures. In some embodiments, the system may utilize passive or chipless RF-responsive elements (e.g., RFID tags), resonant backscatter devices, or frequency-selective surfaces mounted externally on the container surface. In other embodiments, the system may employ active transceiver modules capable of swept-frequency measurements or orthogonal frequency division multiplexing (OFDM) techniques to capture the full complex-valued frequency response of the liquid-container system. The characteristic frequency-dependent behaviors shown in FIG. 29 enable non-invasive compositional analysis of the container contents. By analyzing the precise frequency position of resonant peaks in the amplitude response (curves 2906a, 2906b, 2906c) or the location and depth of phase transitions (curves 2908a, 2908b, 2908c), a system can determine alcohol concentration without requiring physical samples to be extracted from the container. This approach preserves the integrity of the aging or storage process, which may be particularly valuable in applications such as spirit maturation where container breaching is undesirable.

In some implementations, the frequency-domain signatures may be processed using reference-based comparison, wherein measured frequency responses are matched against a calibrated database of known alcohol concentrations. In other implementations, machine learning algorithms may be trained to recognize the spectral features corresponding to specific ABV levels from the full complex-valued frequency response. Such approaches may compensate for variations in container materials, geometry, or environmental conditions that might otherwise affect measurement accuracy. The frequency-domain analysis depicted in FIG. 29 may be performed at discrete time intervals to track changes in alcohol concentration over extended periods. Such temporal monitoring may enable observation of evaporation dynamics, ethanol-to-water ratio shifts, or loss of volatile compounds over time in aging spirits or other liquids, providing valuable insights into maturation processes without disturbing the container contents.

Referring now to FIG. 30, illustrated are frequency-domain plots showing how reflected radio frequency (RF) signal characteristics vary as a function of moisture or seepage conditions detected by an externally affixed RF-responsive element in accordance with aspects of the present disclosure. FIG. 30 comprises two separate graphs arranged in vertical alignment, showing complementary signal metrics that may be analyzed to detect anomalous conditions within a container. The upper graph 3002 depicts reflected signal strength as a function of frequency. The vertical axis represents reflected signal strength measured in decibels (dB), and the horizontal axis represents frequency. The graph 3002 illustrates how the amplitude of reflected RF signals exhibits characteristic frequency-dependent behavior that correlates with the presence of seepage or moisture migration within the container wall or at the exterior-interior boundary. The solid line represents a seepage event signature, characterized by a resonant response with a peak amplitude 3006 at a specific frequency followed by a pronounced signal depression 3008. This resonant profile differs substantially from normal operating conditions, where the reflected signal may exhibit more uniform amplitude across the measured frequency range.

The specific shape and characteristics of the reflected signal profile can provide information about the nature and extent of the seepage event. For instance, the height of peak 3006 relative to the baseline signal level, the width of the resonant peak, the depth of depression 3008, and the sharpness of transitions between these features may correlate with factors such as the extent of moisture penetration, the composition of the leaking fluid, or the progression of the seepage event over time. In some implementations, these characteristics may be quantified through parameters such as quality factor (Q-factor), peak-to-valley ratio, or spectral moments to enable automated detection and classification of seepage events.

The lower graph 3004 illustrates corresponding phase shift measurements across the same frequency range. The vertical axis represents phase shift measured in degrees, while the horizontal axis again represents frequency. Similar to the amplitude plot 3002, the phase plot 3004 depicts the characteristic signature of a seepage event. The phase response exhibits a gradual transition 3010 followed by a sharp discontinuity 3012, creating a distinctive profile that can be detected through phase-sensitive measurements.

The RF-responsive elements that generate these signal characteristics may be implemented using various technologies. For example, they may comprise passive RF-responsive elements (e.g., RFID tags), resonant circuits, metasurfaces, or other RF-interactive structures capable of reflecting incident RF signals with characteristic modulation of amplitude and phase. These elements may be designed with specific frequency responses that maximize sensitivity to the dielectric changes associated with moisture penetration or liquid seepage through container walls. The RF-responsive elements may be affixed to the exterior surface of the container in locations likely to experience seepage or moisture accumulation, such as near joints, seams, or areas subject to mechanical stress.

The frequency-domain measurements depicted in FIG. 30 may be particularly valuable for early detection of container integrity issues before they progress to observable liquid leakage. By analyzing the precise frequency position, magnitude, and shape of resonant features in both amplitude and phase responses, a monitoring system can identify subtle changes in the container wall's moisture content or the development of microfractures that might eventually lead to leakage. This approach enables preventive maintenance or intervention before significant product loss occurs. In some implementations, the frequency-domain signatures may be processed using pattern recognition algorithms, reference-based comparison, or machine learning techniques to distinguish normal variations in signal characteristics from the specific patterns indicative of seepage events. These computational approaches may compensate for environmental factors, material aging, or other non-fault conditions that might otherwise trigger false alarms. The frequency-domain analysis approach depicted in FIG. 30 may be performed continuously, periodically, or on-demand to monitor container integrity over extended periods. Such monitoring may be particularly valuable in applications involving high-value contents, hazardous materials, or aging processes where container breaches could compromise product quality or safety.

Referring now to FIG. 31, illustrated is a set of frequency-domain signal plots 3102 showing radio frequency (RF)

signal characteristics as affected by both char level of a container's interior wall and the color/maturity of a contained liquid such as whiskey in accordance with aspects of the present disclosure. The signal plots 3102 demonstrate the relationship between these physical characteristics and measurable RF signal parameters due to variations in dielectric and electromagnetic properties of the container materials and contained liquid.

The upper plot 3102 presents reflected signal strength as a function of frequency. The vertical axis represents reflected signal strength measured in decibels (dB), while the horizontal axis represents RF frequency. The upper plot 3102 includes three distinct response curves 3104, 3106, and 3108, each corresponding to different char levels applied to the interior surface of the container. Specifically, curve 3104 corresponds to light char, curve 3106 corresponds to medium char, and curve 3108 corresponds to heavy char. The char level, which may be established during container fabrication or reconditioning, influences the electromagnetic response characteristics as depicted by the different reflection profiles. The light char curve 3104 exhibits a relatively flat, broadband reflection pattern, indicating minimal interaction with the RF signal. The medium char curve 3106 demonstrates a well-defined resonant peak, which may result from moderately enhanced surface conductivity and dielectric transition properties associated with the carbonized layer. The heavy char curve 3108 shows a dampened peak with a frequency shift relative to the medium char response, which may be attributed to increased thickness of the carbonized layer, greater absorption characteristics, and enhanced porosity of the heavily charred surface.

The lower plot 3110 depicts phase shift versus frequency behavior under varying contained liquid conditions. In this plot, the vertical axis represents phase shift measured in degrees, while the horizontal axis again represents frequency. The three curves 3112, 3114, and 3116 correspond to different whiskey color profiles, which serve as indicators of chemical composition, aging progression, and interaction between the liquid and the container wall. Specifically, curve 3112 represents dark whiskey, curve 3114 represents medium whiskey, and curve 3116 represents light whiskey. The phase curves demonstrate that changes in the liquid composition-including factors such as ethanol concentration, dissolved tannins, esters, and lignin-derived compounds-result in measurable variations in RF phase response. The dark whiskey curve 3112 exhibits a broader phase transition region and deeper phase roll-off, which may correspond to greater interaction with the container wall and extended aging periods. The medium whiskey curve 3114 shows intermediate phase characteristics. The light whiskey curve 3116 demonstrates sharper phase transitions occurring at comparatively higher frequencies, which may indicate lower dielectric loss and predominance of ethanol in the composition.

The frequency-domain signatures illustrated in FIG. 31 may be utilized by an RF sensing system to determine multiple characteristics of the container and its contents without requiring direct physical access to the interior. For example, the system may infer the container's char level by analyzing the resonance shape and reflection magnitude patterns. Similarly, the system may determine liquid maturity or chemical concentration by evaluating phase shift characteristics. Additionally, the system may track changes over time related to aging processes, refill cycles, or reconditioning treatments by monitoring shifts in these RF response patterns. In various implementations, the RF response profiles shown in FIG. 31 may be processed using spectral analysis techniques, pattern recognition algorithms, machine learning models, or parameterized physical models to quantify char level, estimate maturation progress, or identify container conditioning stages. The actual measurement may be performed using various RF sensing approaches, which may include RF-responsive elements (e.g., passive chipless tags), backscatter radio-frequency identification (RFID) devices, or broadband RF transceivers mounted externally on the container surface. The RF sensing approach illustrated by FIG. 31 provides a non-invasive method for monitoring both container characteristics and liquid properties, which may be particularly valuable in applications where maintaining container integrity is essential, such as in spirit aging, chemical storage, or specialized fluid processing operations.

In certain embodiments, the RF-responsive element may be arranged in the bottom half of the container such that variations in liquid level above the element do not materially affect its signal response. This configuration enables the system to focus specifically on changes in the contained liquid's properties (such as alcohol content, color, or chemical composition) without the confounding variable of liquid level fluctuations, as the element remains consistently adjacent to a liquid below the anticipated evaporation zone throughout the monitoring period.

Referring now to FIG. 32A, illustrated is an embodiment of an AI-driven RF sensing system 3200 configured for analyzing environmental signal characteristics associated with a liquid-filled container (e.g., a barrel or cask) in accordance with aspects of the present disclosure. The system 3200 is configured to collect RF signal response data from one or more external sensing structures mounted on a container 110 and to process that data using a machine-learning model 3202 to infer internal conditions of interest, such as but not limited to liquid level, evaporation rate, alcohol concentration, char level, or seepage presence.

The AI-driven RF sensing system 3200 represents an integrated solution for non-invasive monitoring of containers through radio frequency interaction analysis. The system 3200 may include hardware components such as RF transmission and reception modules, along with software components that implement signal processing algorithms and machine learning inference capabilities. In certain aspects, the system 3200 may be implemented as a distributed architecture wherein sensing components are positioned proximally to containers while processing components may be located either locally or remotely. The system 3200 can support various operational modes including real-time monitoring, scheduled polling, or event-triggered analysis of container contents. Unlike traditional invasive measurement techniques that require opening containers or inserting probes, system 3200 enables continuous monitoring without disturbing the aging process, potentially preserving product quality while providing enhanced data collection capabilities. The system 3200 may be configured to monitor individual containers or simultaneously track multiple containers throughout a storage facility, with scalability accommodated through distributed sensing nodes and centralized processing. In some implementations, the system 3200 may operate with minimal power requirements, potentially using energy harvesting or long-life batteries to support extended deployment periods matching typical aging durations of several years.

The machine-learning model 3202 may be configured to analyze input data 3206 derived from RF signal interactions with an RF-responsive element, container, and/or the content of the container. The machine-learning model 3202 may comprise various computational architectures such as neural networks, random forests, support vector machines, or ensemble methods that transform signal characteristics into inferences about container conditions. The machine-learning model 3202 may be trained using supervised learning techniques wherein labeled datasets pair known container states (e.g., verified liquid levels or measured alcohol contents) with corresponding RF signal patterns. Alternatively, the machine-learning model 3202 may employ unsupervised or semi-supervised learning to identify patterns and anomalies without extensive labeled data. In certain implementations, the machine-learning model 3202 may incorporate transfer learning principles, allowing knowledge gained from one container type to be applied to others with appropriate calibration adjustments. The machine-learning model 3202 may execute on various computational platforms ranging from embedded processors within sensing units to cloud-based computing environments accessing data through wireless transmission. Through continual refinement, the machine-learning model 3202 can adapt to evolving container conditions, potentially improving accuracy over time as additional data is collected and incorporated into training datasets.

The neural network 3204 may be included within or represent an implementation of the machine-learning model 3202, providing a specific architectural approach to processing RF signal data. The neural network 3204 may comprise multiple layers of interconnected nodes or neurons that transform input features into increasingly abstract representations before generating output predictions. For RF signal processing applications, the neural network 3204 may include convolutional layers suitable for identifying spatial patterns in signal data, recurrent structures for analyzing temporal sequences, or attention mechanisms for focusing on relevant signal components. The network architecture may be tailored to the specific sensing modality employed, such as specialized layers for processing phase information, RSSI variations, or channel state information matrices. During operation, the neural network 3204 applies learned weights and biases to input data 3206, propagating transformed values through activation functions to generate inferences about container contents. These inferences may include continuous values (e.g., precise liquid level measurements), categorical classifications (e.g., presence of seepage), or temporal predictions (e.g., estimated remaining aging duration). Implementations of the neural network 3204 may vary in complexity from lightweight models suitable for edge deployment to deep architectures requiring substantial computational resources.

Input data 3206 encompasses the signal-derived information fed into the machine-learning model 3202 for analysis. This data may include raw or processed measurements obtained from RF interactions with the container 110, the RF-responsive element, and/or the contents of the container. The input data 3206 may comprise multiple signal characteristics including received signal strength indicators (RSSI), phase shifts, channel state information (CSI), resonant frequency variations, or other electromagnetic parameters that vary based on material properties and geometric arrangements. Depending on the implementation, input data 3206 may incorporate time-series information showing how signals change over measurement intervals, potentially revealing trends in evaporation rates or compositional changes. The data may include metadata such as timestamps, container identifiers, environmental readings, or calibration references that provide context for the signal measurements. In some embodiments, input data 3206 may represent differential measurements comparing current readings against baseline values, highlighting changes rather than absolute states. The format, resolution, and dimensionality of input data 3206 may vary based on the specific sensing technology employed and the machine learning architecture, ranging from simple scalar values to complex multi-dimensional tensors representing spatial and spectral distributions of RF responses. In some aspects, the input data may include one or more profile readings based on one or more scenarios corresponding to the signal responses shown in the graphs of FIG. 26. Thus, the signal response profile illustrated in diagrams 2640*a*, 2640*b*, and 2640*c* may include multiple RF signal characteristics measured simultaneously to provide data to make a determination of liquid level within a container using externally mounted RF-responsive elements.

Optional pre-processing 3210 represents signal conditioning or feature extraction operations performed on raw measurements before they are provided to the machine-learning model 3202. This processing stage may include noise reduction techniques such as filtering, smoothing, or outlier removal to enhance signal quality. Feature extraction algorithms may identify relevant characteristics from raw waveforms, potentially calculating statistical moments, spectral components, or correlation metrics that facilitate subsequent analysis. Normalization or standardization procedures may scale input values to ranges suitable for the neural network 3204, while dimensionality reduction techniques might compress redundant information for computational efficiency. In some implementations, optional pre-processing 3210 may incorporate domain-specific transformations that emphasize container-relevant signal characteristics, such as emphasizing frequency bands known to interact strongly with liquid-air interfaces. The specific pre-processing operations may be selected based on empirical performance evaluations or theoretical electromagnetic models of container interactions. While illustrated as a distinct block in FIG. 32A, the optional pre-processing 3210 functionality may be integrated within sensor firmware, implemented in dedicated signal processing hardware, or executed as part of the machine learning pipeline.

Output data 3212 represents the processed results generated by the machine-learning model 3202 after analyzing input data 3206. The output data 3212 may provide quantitative measurements, qualitative assessments, predictions, or alerts related to container conditions. Depending on the implementation, output data 3212 may be formatted as numerical values (e.g., liquid level in centimeters, alcohol content percentage), categorical classifications (e.g., normal condition vs. leak detected), trend projections (e.g., estimated time to reach target maturation), or multidimensional representations of container state. The output data 3212 may include confidence metrics or uncertainty estimations that indicate the reliability of inferences based on signal quality or model certainty. In networked implementations, output data 3212 may be transmitted to monitoring systems, database servers, or user interfaces for visualization and decision support. The format and content of output data 3212 may be tailored to specific use cases, such as compliance reporting for regulatory authorities, quality control metrics for production managers, or simplified status indicators for operational staff. The temporal resolution of output data 3212 may vary from real-time continuous monitoring to periodic batch updates depending on application requirements and power constraints.

The inferred characteristics 3214 represent specific container and/or liquid conditions or properties determined by the machine-learning model 3202 as components of the output data 3212. These characteristics may include liquid level, alcohol content (ABV), evaporation rate, leak detection, char layer classification, or predictive aging indicators. Each characteristic may be derived from different aspects of the RF signal response, potentially requiring specialized feature extraction or model components. The characteristics 3214 may include both current state information and trend analysis showing how conditions have changed over time. For example, an evaporation trend might be calculated by analyzing sequential liquid level measurements and environmental factors. In some implementations, the inferred characteristics 3214 may include actionable insights such as optimal rotation scheduling for barrels experiencing uneven aging conditions or alerts when measurements deviate from expected patterns. The precision and accuracy of these characteristics may vary based on sensing technology, signal quality, and model training, with certain implementations providing uncertainty bounds or confidence intervals alongside point estimates. The specific characteristics included in system output may be configurable based on operational requirements, with additional characteristics potentially added through model retraining or extended feature extraction.

Optional post-processing 3216 encompasses additional analysis or transformation operations performed on the machine-learning model's immediate outputs before presenting final results. This processing stage may include calibration adjustments that account for systematic biases or sensor-specific variations, potentially referencing historical measurements or calibration constants. The post-processing operations might apply business rules or compliance thresholds that convert raw measurements into actionable statuses, such as flagging containers that approach regulatory limits or quality thresholds. Temporal analysis algorithms may process sequential measurements to calculate derived metrics like rates of change or to perform anomaly detection by comparing measurements against expected trends. In some implementations, optional post-processing 3216 may generate visualizations, summary statistics, or reports that contextualize measurements for human operators. While shown as a distinct component in FIG. 32A, the post-processing functionality may be integrated into reporting systems, implemented within user interfaces, or executed as part of a broader analytics pipeline. The specific post-processing operations may be customized based on industry requirements, operational preferences, or regulatory frameworks applicable to the contained substances.

In some aspects, a set 3224 of passive or semi-passive RF-responsive elements 220*u*-220*n* is affixed to the external surface of the container 110. These RF-responsive elements may be configured as specially designed antennas, resonators, or backscatter devices that interact with incident radio frequency signals. Each element 220*u*-220*n* may be positioned at a different height or location on the container to enable spatial monitoring of internal conditions. The RF-responsive elements 220*u*-220*n* may operate without internal power sources in passive implementations, deriving energy from incident RF signals to modulate and reflect responses. In semi-passive implementations, the elements may include energy storage components such as batteries or capacitors that power signal processing or sensing functions while still using backscatter for communication. The physical design of these elements may be optimized for specific frequency bands, polarizations, or reflection characteristics suited to detecting liquid interfaces, vapor density, vapor density in head space 3222, or material properties 3218 through the container wall. The RF-responsive elements 220u-220n may include tuned circuits, impedance-controlled structures, or frequency-selective surfaces that produce measurable signal variations when their electromagnetic environment changes due to shifts in adjacent materials. In some embodiments, these elements may include additional sensing components such as temperature sensors, strain gauges, or humidity detectors that provide complementary measurements alongside RF interactions.

The RF signals 3221 represent electromagnetic waves transmitted toward the container 110 and the RF-responsive elements 220u-220n by the transmit module 3232. These signals may operate in various frequency bands, potentially including ultra-high frequency (UHF), microwave, or millimeter-wave ranges selected based on penetration characteristics through container materials and sensitivity to internal conditions. The RF signals 3221 may be configured with specific modulation patterns, frequency sweeps, or pulse characteristics optimized for detecting liquid interfaces or compositional properties. In some implementations, the signals may employ spatial diversity through multiple transmission antennas or beamforming techniques that focus energy toward specific container regions. The signals 3221 may be transmitted continuously for real-time monitoring, periodically to conserve power, or on-demand when triggered by schedule or external request. The signal properties including frequency, power level, polarization, and modulation scheme may be dynamically adjusted based on environmental conditions or specific monitoring objectives. In certain embodiments, the RF signals 3221 may incorporate frequency-hopping or spread-spectrum techniques to mitigate interference in environments with multiple containers or RF systems.

The reflected signals 3223 represent electromagnetic waves that return from the RF-responsive elements 220u-220n after interaction with the container 110, the RF-responsive element, and/or the content of the container. In some aspects, these signals may carry information as a reflected transmitted signal 3223. In some aspects, these signals may carry information about the container's internal state encoded in various signal characteristics such as amplitude, phase, frequency shift, or time delay. The reflected signals 3223 may exhibit different properties depending on whether the corresponding RF-responsive element is adjacent to liquid, vapor, or air within the container, due to the varying electromagnetic properties of these materials. In implementations using passive backscatter communication, the reflected signals 3223 may be modulated by the RF-responsive elements through load modulation, where impedance variations create distinctive reflection patterns. The reflected signals 3223 may travel in multiple paths due to scattering from container structures, potentially carrying additional information about container geometry or material conditions. Signal strength, coherence, and quality may vary based on factors such as distance, orientation, and environmental conditions. Reception techniques including diversity combining, coherent detection, and/or statistical signal processing may be employed to extract maximum information from these reflections despite potential signal degradation or interference.

Container 110 represents a vessel designed to hold liquid, such as a whiskey barrel, wine cask, or other storage receptacle being monitored by the RF sensing system. The container 110 may be constructed from various materials including wood, metal, plastic, or composite materials, with specific electromagnetic properties that influence RF signal propagation. The container 110 may have a defined geometry such as a cylindrical barrel with curved staves and metal hoops, with dimensions and proportions that affect signal paths and reflections. Internal contents of container 110 may include liquids, vapors, solids, or combinations thereof, potentially stratified or mixed depending on the specific application and stage of processing. The container 110 may undergo various physical changes during normal operation, such as expansion, contraction, or moisture absorption, which might affect signal propagation characteristics over time. In aging applications, the container material may interact with contents through processes such as absorption, extraction, or oxidation, potentially changing both the contents and the container properties. The RF-responsive elements 220u-220n may be affixed to the exterior surface of container 110 without penetrating the container wall, thereby preserving the integrity of the aging environment while enabling non-invasive monitoring of internal conditions.

The liquid 120 represents the fluid contents within container 110 being monitored by the RF sensing system. This liquid may be a distilled spirit, wine, beer, or other substance with specific electromagnetic properties that affect RF signal interaction. The liquid 120 may have a defined surface level 3220 that creates a liquid-air interface within the container, potentially changing over time due to evaporation, absorption, consumption, or leakage. The composition of liquid 120 may evolve during aging processes through oxidation, extraction of compounds from container walls, or chemical reactions, potentially affecting its dielectric properties and RF signal interactions. The liquid 120 may have varying dielectric constant, conductivity, or loss tangent depending on its composition, with properties such as alcohol content potentially influencing these electromagnetic characteristics in measurable ways. Temperature gradients or stratification may exist within the liquid, creating spatial variations in properties that might be detectable through appropriate sensing techniques. The level, volume, and composition of liquid 120 represent primary monitoring targets for the RF sensing system, with changes in these parameters potentially correlated with quality indicators, process status, or compliance requirements depending on the specific application context.

The transmit module 3232 represents the hardware and control components responsible for generating and emitting RF signals 3221 toward the container 110 and its attached RF-responsive elements 220u-220n. This module may include RF signal generators, power amplifiers, and antenna systems configured to produce signals with suitable frequency, power, modulation, and directional characteristics for container monitoring applications. The transmit module 3232 may support various operational modes including, but not limited to, continuous wave transmission, frequency-modulated continuous wave (FMCW), pulsed operation, impulse radar, guided wave radar (GWR), continuous-wave Doppler radar (CW Doppler), Time-Of-Flight (TOF) radar, Phase-Based Radar, Millimeter-Wave Radar, or more complex waveform generation tailored to specific sensing objectives. In some implementations, the module may incorporate beamforming capabilities through phased arrays or multiple antennas to direct energy toward specific container regions or to simultaneously monitor multiple containers. The transmit module 3232 may include control logic that manages transmission timing, power levels, or frequency selection based on application requirements or environmental conditions. Power management features may optimize energy consumption for battery-powered implementations, potentially including sleep modes, duty cycling, or adaptive power control based on distance or signal quality requirements. The physical configuration of transmit module 3232 may range from integrated units mounted near containers to distributed systems with centralized generation and remote antenna placement depending on facility layout and monitoring architecture.

The receive module 3234 encompasses the hardware and signal processing components that capture, condition, and interpret the reflected signals 3223 returning from the RF-responsive elements 220u-220n. This module may include receive antennas, low-noise amplifiers, filtering circuits, and demodulation systems designed to extract relevant information from potentially weak or distorted reflections. The receive module 3234 may implement various detection methods including coherent reception, envelope detection, or I/Q demodulation depending on the specific signal characteristics being measured. Signal processing capabilities within the module may include amplification, filtering, digitization, and preliminary analysis of received waveforms before forwarding processed data to subsequent analysis stages. In some implementations, the receive module 3234 may incorporate diversity reception through multiple antennas or channels to improve signal quality in challenging environments. The receive sensitivity, bandwidth, and dynamic range may be optimized for the expected signal characteristics and operational conditions, potentially including adaptive gain control to accommodate varying signal strengths. Depending on the system architecture, the receive module 3234 may be physically integrated with the transmit module 3232 in a single transceiver unit 3230 or implemented as a separate component positioned for optimal reception of reflected signals. The module may include calibration capabilities that compensate for environmental variations or component aging to maintain measurement accuracy over extended deployment periods. In some aspects, the transceiver unit 3230 may be the same as or similar to the RF reader 2412 of FIG. 24.

The spacing D 3228 represents the distance between the RF sensing system components (particularly the transmit module 3232 and receive module 3234) and the container 110 with its attached RF-responsive elements 220u-220n. This spacing may vary depending on the specific implementation, ranging from direct contact mounting to standoff distances of several meters. The spacing D 3228 may influence signal propagation characteristics, power requirements, and measurement accuracy, with different sensing modalities potentially operating optimally at different distances. In some applications, minimizing spacing D may improve signal strength and measurement precision by reducing path loss, while in other scenarios, increased spacing may provide broader coverage or accommodate operational constraints such as access requirements or thermal isolation. The spacing D may be fixed in permanent installations or variable in mobile monitoring systems that approach containers temporarily for periodic measurements. Signal processing algorithms may incorporate knowledge of spacing D 3228 to compensate for path loss, propagation delays, or beam spreading effects in measurement calculations. In multi-container monitoring environments, the spacing D may differ between containers based on physical arrangement, potentially requiring calibration adjustments or adaptive transmission parameters to maintain consistent performance across varying distances.

Referring now to FIG. 32B, illustrated is another example of an RF-based sensing architecture for analyzing contents within a container 110, wherein a transmitted signal 3240 is directed toward the container and is reflected back as signal

3244. In contrast to RF-responsive element-based sensing, the configuration shown in FIG. 32B allows direct interrogation of the container using signal reflections, without requiring contact sensors or affixed components on the vessel itself. In some aspects, radar principles can be utilized to infer characteristics of the internal environment of the container 110 based on signal behavior as it reflects from liquid boundaries, air-liquid interfaces, or structural features of the container interior.

The reflected signal 3244 may follow one or more propagation paths 3242 due to partial reflections, scattering, and transmission through the medium within the container. These multiple paths 3242 may include surface reflections, internal bounces, or wall interactions that provide rich spatial and spectral features. Such reflections may be processed by the system using signal processing techniques and fed into a machine-learning inference engine to identify or track characteristics including, but not limited to, liquid level, volume, structural anomalies (e.g., cracks or bulges), surface disturbances, or seepage. By analyzing both time-of-arrival and phase response from the signal paths 3242, the system may isolate specific spatial zones inside the container where variations in electromagnetic properties occur, indicating a change in contents or condition. To enable such functionality, the system may implement one or more radar modalities, each providing distinct advantages for different environmental or application scenarios. In some embodiments, the system may switch dynamically between modalities or operate them in parallel to enhance accuracy and robustness.

The radar modalities that may be utilized in the system may include FMCW radar that transmits a continuous signal whose frequency is linearly modulated over time. By measuring the frequency shift between transmitted and received signals, highly accurate distance and level measurements can be achieved. This technique is particularly suitable for continuous monitoring of fluid levels and can resolve sub-millimeter changes within the container. The radar modalities that may be utilized in the system may include impulse radar that transmits short-duration, high-bandwidth pulses that offer impactful temporal and spatial resolution. The high penetration capabilities of UWB signals make them suitable for sensing through container walls (e.g., wooden staves or metal jackets), while their fine resolution allows for detailed profiling of fluid layers and interfaces, including foam or vapor regions. The radar modalities that may be utilized in the system may include Guided Wave Radar (GWR) that utilizes electromagnetic pulses transmitted along a guided medium (e.g., a probe or rod) inserted into or near the container. The reflections from material interfaces along the probe are used to determine the liquid level or detect phase changes. GWR is particularly effective in containers with complex internal structures or turbulent/foamy contents. The radar modalities that may be utilized in the system may include Continuous-Wave Doppler Radar (CW Doppler) that uses continuous transmission and measures the frequency shift caused by moving targets-such as ripples or level changes-within the container. This modality can detect micro-movements of the fluid surface and may be used to infer theft, tampering, or agitation within the container during transport. The radar modalities that may be utilized in the system may include Time-of-Flight (ToF) Radar that emits short RF pulses and calculates the time taken for the pulse to reflect back from the internal liquid surface. The precise timing provides accurate distance measurements, suitable for use in containers requiring frequent, reliable updates on liquid status. The radar modalities that may be utilized in the system may include Phase-Based Radar that analyzes phase changes in reflected RF waves to determine sub-wavelength shifts in distance or material composition. Because phase changes are highly sensitive to minor environmental variations, this radar type excels in detecting gradual evaporation or small-scale compositional changes in the liquid. The radar modalities that may be utilized in the system may include Millimeter-Wave Radar that operates at frequencies above 24 GHz (often 60 GHz or 77 GHz), and provides fine resolution, high sensitivity to dielectric transitions, and compact form factors. This modality is particularly beneficial for integration into space-constrained environments or for use with small-scale barrels and sample vessels.

In some embodiments, the reflected signal 3244 may be analyzed by a local or remote processing system comprising a machine-learning model similar to the model 3202 described in FIG. 32A. The model may analyze time-domain, frequency-domain, and/or phase information from the reflected signal to infer the liquid level or other relevant attributes of the container contents. In multi-path environments, algorithms may separate overlapping reflections to estimate distances to multiple internal surfaces, stratified fluid layers, or structural obstructions. The signal behavior over time may also allow the system to detect dynamic changes such as active seepage, foam buildup, fermentation activity, or thermal layering. Advantageously, the example shown in FIG. 32B enables non-contact RF-based inspection and monitoring of a container using only external radar sensing components. This configuration may be beneficial for sealed barrels, aged spirits, or environments requiring strict hygiene, where opening containers or applying contact sensors is undesirable or impractical. Additionally, the diversity of supported radar modalities ensures that the system can be adapted to a wide range of materials, fluid types, environmental conditions, and monitoring requirements.

FIG. 33 illustrates a training system 3300 for generating a machine-learning model capable of inferring internal conditions of a container using radio-frequency (RF) signal features. The training system 3300 includes several interacting components that work together to develop a model that can predict parameters such as liquid level or alcohol content based on RF signal characteristics obtained from external sensing elements. The training system 3300 comprises a model trainer 3302, which coordinates the training process and includes a machine-learning model 3304. The system further incorporates data source(s) 3306 that provide input features for training, a predicted values module 3308 that captures model outputs, a loss function module 3310 that evaluates prediction accuracy, and a trained model 3312 that represents the finalized model after training completion.

The data source(s) 3306 supply training data including various RF signal features 3314 such as RSSI, phase measurements, CSI metrics, and frequency domain characteristics. These features may be derived from measurements taken by RF-responsive elements affixed to the exterior of containers as previously described. The data sources 3306 may additionally include ground truth information about container contents, such as actual liquid level measurements and alcohol by volume (% ABV) values, which serve as labels for supervised learning. The model trainer 3302 orchestrates the training process by feeding input features from data source(s) 3306 into the machine-learning model 3304. The machine-learning model 3304 processes these inputs and generates predicted values 3308 representing estimates of internal container conditions. These predicted values 3308 are compared against corresponding ground truth values using the loss function 3310, which calculates discrepancies and provides feedback to the model trainer 3302. Based on the feedback from the loss function 3310, the model trainer 3302 adjusts parameters within the machine-learning model 3304 to minimize prediction errors. This iterative process continues until the model achieves satisfactory performance, at which point it is saved as trained model 3312 for deployment in operational RF sensing systems.

As previously described, the model trainer 3302 functions as the central orchestration component within training system 3300, managing the iterative refinement of the machine-learning model 3304. The model trainer 3302 may implement various optimization algorithms that systematically adjust model parameters to improve prediction accuracy. The model trainer 3302 may employ techniques such as stochastic gradient descent, Adam optimization, or other specialized methods appropriate for the specific machine learning architecture being developed. In operation, the model trainer 3302 first initializes the machine-learning model 3304 with starting parameters, which may be randomly assigned or transferred from a previously trained model in a transfer learning approach. During each training iteration, the model trainer 3302 selects batches of training examples from data source(s) 3306, forwards them through the machine-learning model 3304, and retrieves the resulting predicted values 3308. After the loss function 3310 calculates the prediction error, the model trainer 3302 computes parameter gradients and applies appropriate updates to the machine-learning model 3304. The model trainer 3302 may implement various training regimes, including early stopping when validation performance plateaus, learning rate scheduling to adjust optimization step sizes, or regularization techniques to prevent overfitting. For complex RF sensing applications, the model trainer 3302 may also implement cross-validation across different container types or environmental conditions to ensure the resulting model generalizes effectively to diverse operational scenarios.

Additionally, the model trainer 3302 may manage computational resources, potentially distributing training across multiple processing units or adjusting batch sizes to optimize memory utilization. The model trainer 3302 may also log training progress, capturing performance metrics, parameter statistics, and example predictions for later analysis or comparison between model versions. When training converges according to predefined criteria—such as reaching a target loss threshold or completing a maximum number of epochs—the model trainer 3302 finalizes the machine-learning model 3304 and serializes it as trained model 3312, making it ready for deployment in production environments.

The machine-learning model 3304 represents the computational architecture that transforms RF signal features into predictions about container internals. This model may be implemented using various approaches depending on the complexity of the RF sensing task and the characteristics of available training data. For RF sensing applications in container monitoring, the machine-learning model 3304 may be structured as a neural network with specialized layers suited to processing spatial, temporal, or spectral signal patterns. Such architectures might include convolutional layers for extracting spatial features from multi-tag arrangements, recurrent or transformer layers for analyzing temporal signal evolution, or combinations thereof in a hybrid design. Alternatively, the machine-learning model 3304 could employ ensemble methods like random forests or gradient-boosted trees, which may offer interpretability advantages in regulatory contexts where prediction rationales are important.

The input layer of machine-learning model 3304 is dimensioned to accommodate the feature vectors provided by data source(s) 3306, which may include multiple signal characteristics (RSSI, phase, etc.) potentially across multiple measurement positions or time points. Internal layers transform these inputs through linear and non-linear operations, gradually mapping the raw signal features to more abstract representations that correlate with container properties.

The output layer of machine-learning model 3304 is configured to produce the specific container parameters being predicted, such as liquid level height, alcohol content percentage, or categorical assessments of container integrity. For regression tasks like level prediction, the output might be a single continuous value, while for multi-parameter inference, the output could comprise multiple nodes representing different aspects of the container state. During forward propagation, machine-learning model 3304 computes activations through its layers, applying weights, biases, and activation functions to transform the input features into predicted values 3308. During backward propagation guided by model trainer 3302, these weights and biases are adjusted to reduce the discrepancy between predictions and ground truth as measured by loss function 3310. The machine-learning model 3304 may also incorporate architectural features specific to RF sensing challenges, such as attention mechanisms that focus on particularly informative frequency bands or tag positions, or specialized layers that incorporate electromagnetic propagation principles as inductive biases.

The data source(s) 3306 component represents the repositories and pipelines that provide training examples to the machine-learning model 3304. These sources supply both input features derived from RF signal measurements and the corresponding ground truth values for supervised learning. In the context of RF-based container monitoring, data source(s) 3306 may include databases of historical measurements collected from containers with known internal states, simulated datasets generated through electromagnetic modeling of RF-material interactions, or combinations of real and synthetic data used for model pre-training or augmentation. The RF signal features 3314 provided by data source(s) 3306 may include various signal characteristics such as RSSI, which measures the power level of received signals and varies based on the dielectric properties of materials between and around the RF elements; phase measurements, which capture timing relationships between transmitted and received signals that can be affected by propagation paths; CSI metrics, which provide detailed frequency-domain profiles of the RF channel including amplitude and phase information across multiple subcarriers; and frequency-domain patterns that characterize resonant behavior of the RF elements as influenced by nearby materials. These signal features may be collected from passive or semi-passive RF-responsive elements attached externally on containers, without requiring direct access to the container contents. The features may be preprocessed before serving as inputs to the machine-learning model 3304, with operations such as normalization, dimensionality reduction, or feature engineering applied to enhance learning efficiency. In some aspects, the data sources(s) 3306 may include one or more profile readings based on one or more scenarios corresponding to the signal responses shown in the graphs of FIG. 26. Thus, the signal response profile illustrated in diagrams 2640a. 2640b, and 2640c may include multiple RF signal characteristics measured simultaneously to provide data to make a determination of liquid level within a container using externally mounted RF-responsive elements.

The ground truth labels paired with these features may represent the actual internal conditions of the containers at the time of measurement, such as liquid levels, alcohol percentages, or other parameters of interest. These labels may be obtained through traditional measurement methods during controlled experiments, certified measuring instruments, or other reliable reference sources. Data source(s) 3306 may implement various sampling strategies to ensure balanced representation across different container types, fill levels, or environmental conditions, potentially oversampling rare conditions to improve model robustness. The component may also manage data versioning, validation, and partitioning into training, validation, and test sets to support rigorous model development and evaluation.

The predicted values 3308 represent the outputs generated by the machine-learning model 3304 when processing input features from data source(s) 3306. These values constitute the model's estimates of container internal conditions based on RF signal characteristics, and serve as the basis for performance evaluation during training. In RF-based container monitoring applications, predicted values 3308 may include continuous estimates such as liquid level height in centimeters, alcohol concentration as a percentage, or evaporation rate over time. Alternatively, they might represent categorical assessments such as char level classification, seepage detection results, or quality categorizations. For multi-task models, predicted values 3308 could comprise vectors of multiple parameters simultaneously inferred from the same RF measurements. During training, these predicted values 3308 are generated through forward propagation within the machine-learning model 3304, with the model's current parameters determining how input features are transformed into output estimates. The predicted values 3308 are then passed to the loss function 3310, which quantifies their deviation from known ground truth values to guide model refinement. The format and interpretation of predicted values 3308 depend on the specific architecture of the machine-learning model 3304. For regression tasks, they might be direct scalar outputs from the model's final layer, while for classification tasks, they could be probability distributions across possible categories. Some model designs might produce both point estimates and uncertainty measures, enabling risk-aware decision-making in operational settings.

The precision, accuracy, and reliability of predicted values 3308 typically improve over the course of training as the model trainer 3302 adjusts model parameters to minimize prediction errors. By tracking the evolution of predicted values 3308 across training iterations, developers can assess learning progress, identify challenging prediction cases, and diagnose potential issues such as overfitting or underfitting. After deployment of the trained model 3312, the equivalent of these predicted values becomes the operational output of the RF sensing system, potentially feeding into monitoring dashboards, automated control systems, or compliance reporting tools in distillery or warehouse environments.

The loss function 3310 quantifies the discrepancy between predicted values 3308 generated by the machine-learning model 3304 and the corresponding ground truth values provided by data source(s) 3306. This component plays a critical role in the training process by providing the optimization signal that guides parameter updates within the model. For RF sensing applications in container monitoring, the loss function 3310 may be selected based on the specific prediction tasks and their operational importance. Common implementations include mean squared error (MSE) for continuous parameters like liquid level, cross-entropy loss for categorical predictions like seepage classification, or custom formulations that combine multiple error terms with task-specific weighting factors. In some implementations, loss function 3310 may incorporate domain knowledge about RF sensing physics or container monitoring priorities. For example, it might apply higher penalties to errors in specific operating ranges where precision is particularly important, such as near regulatory thresholds for alcohol content. The loss function may also include terms that promote physically plausible predictions, such as monotonicity constraints for liquid level estimates or temporal consistency for sequential measurements.

During each training iteration, loss function 3310 receives the current batch of predicted values 3308 along with their corresponding ground truth values, computes the appropriate error metric, and returns this value to model trainer 3302. The model trainer then uses this error signal to compute gradients and update model parameters in a direction that reduces the loss. For container monitoring systems that must balance multiple objectives-such as accuracy across different content types, robustness to environmental variations, and computational efficiency-loss function 3310 may implement a weighted combination of terms that collectively guide the model toward an optimal trade-off. The relative weights of these terms may be fixed in advance based on application requirements or dynamically adjusted during training. Beyond its role in parameter optimization, loss function 3310 also provides a quantitative measure of model performance that can be tracked over time to assess training progress, compare different model versions, or establish acceptance criteria for model deployment. A decreasing trend in the loss value typically indicates improving model quality, though validation on held-out data remains essential to confirm generalization capability.

The trained model 3312 represents the final output of the training system 3300—a machine-learning model whose parameters have been optimized through the training process and which is ready for deployment in operational RF sensing systems for container monitoring. This component encapsulates the architecture, weights, and computational graph of the machine-learning model 3304 after training completion. The trained model 3312 may be serialized in a format suitable for persistent storage and efficient loading into inference systems, such as TensorFlow SavedModel, ONNX, or platform-specific binary formats. Depending on the implementation, it may also include metadata about the training process, performance metrics, expected input formats, and output interpretations to facilitate integration with broader monitoring infrastructure. In RF-based container monitoring applications, the trained model 3312 embodies the learned relationships between RF signal characteristics and internal container parameters. Once deployed, it enables real-time or periodic inference of liquid levels, alcohol content, or other parameters of interest without requiring direct access to container contents, thereby preserving the integrity of aging processes or other sensitive operations.

The effectiveness of trained model 3312 depends on various factors, including the representativeness of training data, the appropriateness of the model architecture for the specific RF sensing task, and the thoroughness of the training process. Before operational deployment, the trained model may undergo additional validation on test datasets or controlled field trials to ensure it meets accuracy, robustness, and computational performance requirements. In some implementations, trained model 3312 may be designed for deployment on resource-constrained edge devices mounted directly on or near containers, requiring optimization techniques such as quantization, pruning, or knowledge distillation to reduce model size and computational demands while maintaining prediction quality. Alternatively, for centralized monitoring of multiple containers, the trained model may be deployed on server infrastructure that processes RF measurements collected from distributed sensing nodes. The trained model 3312 may be periodically retrained or fine-tuned as new data becomes available, environmental conditions change, or operational requirements evolve. This continuous improvement process helps maintain prediction accuracy and extends the model's utility across changing container characteristics or aging conditions.

RF signal features 3314 serve as primary inputs to the machine-learning model 3304. These features are derived from measurements collected by RF-responsive elements attached externally on containers, and they capture how radio frequency signals interact with the container and its contents. As depicted in FIG. 33, the RF signal features 3314 include multiple categories of measurements that provide complementary information about container internals. RSSI measurements quantify the power level of signals received after interaction with the container environment, with variations in signal strength potentially indicating changes in the dielectric properties associated with different fill levels or content compositions. Phase measurements capture the timing relationships between transmitted and received signals, which can be affected by propagation paths and material boundaries within the container. CSI (Channel State Information) metrics provide detailed frequency-domain profiles of the RF channel, including amplitude and phase information across multiple subcarriers, potentially revealing spectral signatures associated with specific internal conditions. Frequency domain characteristics describe how certain frequency components of RF signals are affected differently by container contents, potentially revealing resonance patterns or absorption characteristics that correlate with parameters of interest. These RF signal features may be collected through various sensing modalities, including passive backscatter from RFID tags, active measurements from wireless transceivers, or specialized RF sensing structures designed specifically for container monitoring applications. The features may exhibit different sensitivities to various aspects of container contents; for example, RSSI measurements might be particularly responsive to liquid level transitions, while frequency-domain characteristics might better capture compositional variations such as alcohol content. The data source(s) 3306 may provide these features in raw form or preprocessed through operations such as normalization, filtering, or feature extraction to enhance their utility for model training. During model development, the relative importance of different feature types may be evaluated through techniques such as feature importance analysis or ablation studies, potentially informing future sensor designs or measurement protocols to emphasize the most informative signal characteristics. The bottom portion of the RF signal features 3314 section in FIG. 33 may indicate the target parameters that the system aims to predict, including liquid level and % ABV (alcohol by volume). These parameters may represent the ground truth labels paired with RF features in the training dataset, enabling supervised learning of the relationships between external RF measurements and internal container conditions.

Referring to FIG. 34, an artificial neural network 3400 is illustrated for processing radio-frequency (RF)-derived input data and generating predictions relating to characteristics of contents within a sealed container in accordance with aspects of the present disclosure. The neural network 3400 may be implemented as part of a machine-learning system for analyzing radio frequency signal characteristics associated with a container such as a barrel, cask, tank, or other vessel. The artificial neural network 3400 represents a computational architecture configured to transform input features derived from RF signal interactions with a container and its contents into predicted values corresponding to internal characteristics of the container. In the illustrated aspect, the artificial neural network 3400 comprises multiple interconnected layers including an input layer 3402, multiple hidden layers 3406, 3408, 3412, and an output layer 3416. These layers are connected via weighted edges 3404, 3410, and 3414, which enable signal propagation throughout the network. The artificial neural network 3400 may be structured as a feedforward multilayer perceptron (MLP), although other architectural configurations may be implemented depending on the specific RF sensing application requirements.

The input layer 3402 is configured to receive data values derived from RF signal measurements collected by one or more RF-responsive elements positioned externally on a container. The input layer 3402 comprises multiple input neurons, each corresponding to a specific feature or parameter extracted from the RF signal data. These features may include, but are not limited to, RSSI values, phase measurements, CSI metrics, or frequency-domain characteristics such as resonant frequency shifts or amplitude variations. The input layer 3402 acts as the entry point for data into the neural network, where each input neuron may be assigned a weight representing the relative importance of its corresponding feature. The input neurons may apply initial transformations to normalize or scale the incoming data values to facilitate subsequent processing within the network.

In some aspects, the input layer 3402 may receive multiple features extracted from a single RF signal measurement, while in other aspects, the input layer 3402 may receive distinct features from multiple RF measurements taken at different positions on the container or at different time points. The dimensionality of the input layer 3402 may be configured based on the richness and complexity of the RF signal features being utilized for the specific container monitoring application. For instance, when analyzing RSSI patterns from multiple RF-responsive elements positioned at different heights on a container, the input layer 3402 may include neurons corresponding to each element's signal strength value.

The input layer 3402 connects to a first hidden layer 3406 via a first set of edges 3404. These edges 3404 represent weighted connections between the nodes of the input layer 3402 and the nodes of the first hidden layer 3406. Each edge carries a weight value that modulates the strength of the signal transmitted along that connection. During forward propagation, the input values received at layer 3402 are multiplied by the corresponding edge weights of edges 3404 before being passed to the neurons in the first hidden layer 3406. These weights effectively determine how strongly each input feature influences the activations in the subsequent layer. The edges 3404 impact the learning capability of the neural network, as their weight values are adjusted during training to optimize the network's predictive performance. The collection of weights associated with edges 3404 forms a weight matrix that encodes the learned relationships between input features and higher-level abstractions. In some implementations, the edges 3404 may also incorporate additional parameters such as bias terms, which allow the network to learn additive offsets that can improve modeling flexibility.

The first hidden layer 3406 comprises multiple neurons that receive weighted inputs from the input layer 3402 via edges 3404. In some aspects, each neuron in the first hidden layer 3406 may compute a weighted sum of its inputs, apply a non-linear activation function (such as ReLU, sigmoid, or tanh), and produce an output value that represents a transformed feature or abstraction derived from the original input data. The neurons in the first hidden layer 3406 enable the network to learn and represent complex, non-linear relationships between RF signal characteristics and container properties.

The first hidden layer 3406 begins the process of feature extraction and transformation, identifying patterns or relationships in the RF data that may be indicative of container conditions such as liquid level, content composition, or internal characteristics. The number of neurons in the first hidden layer 3406 may be configured based on the complexity of the modeling task, with more neurons potentially enabling the capture of more intricate patterns at the cost of increased computational requirements and potential overfitting risk. The first hidden layer 3406 connects to a second hidden layer 3408 via edges 3410. Similar to edges 3404, the edges 3410 represent weighted connections that determine how strongly each neuron in the first hidden layer 3406 influences the neurons in the second hidden layer 3408. The second hidden layer 3408 continues the hierarchical feature extraction process, potentially identifying more abstract or higher-level patterns in the data based on the transformed features from the first hidden layer 3406.

The second hidden layer 3408 may comprise multiple neurons that further refine the representations learned in the first hidden layer 3406. Such neurons may apply additional non-linear transformations, enabling the network to model increasingly complex relationships between RF signal characteristics and container properties. The second hidden layer 3408 may extract features that correspond to specific aspects of the container's internal state, such as liquid-air interface positions, content density variations, or other physically meaningful characteristics.

Continuing through the network, the second hidden layer 3408 connects to a third hidden layer 3412, which may perform additional feature refinement and abstraction. The connections 3410 between the second hidden layer 3408 and the third hidden layer 3412 function similarly to the previously described edges, carrying weighted signals that encode learned relationships. The third hidden layer 3412 may separate or isolate features related to different physical phenomena within the container, potentially preparing the network to make specific predictions about distinct container characteristics. The third hidden layer 3412 connects to the output layer 3416 via edges 3414. These final weighted connections determine how the high-level features extracted by the hidden layers are combined to generate predictions about the container's internal state. The edges 3414 effectively encode the learned relationships between abstract feature representations and specific output parameters of interest, such as liquid level, alcohol content, or other container characteristics.

The output layer 3416 comprises one or more neurons that generate the final predictions or classifications produced by the neural network. Each neuron in the output layer 3416 may correspond to a specific parameter or characteristic being predicted, such as liquid level height, alcohol concentration percentage, presence of seepage, or classification of container conditions. The output neurons may apply different activation functions depending on the prediction task-linear activations for regression tasks (e.g., predicting continuous values like liquid level) or softmax activation for classification tasks (e.g., categorizing container conditions). The output layer 3416 translates the abstract internal representations learned by the network into quantitative predictions or qualitative assessments that can be used for monitoring, control, or decision-making purposes related to the container and its contents. The predictions generated by the output layer 3416 may be used to track aging processes, detect anomalies, estimate evaporation rates, or provide other insights into container conditions without requiring direct access to the container contents.

Input data 2206 represents the features or parameters extracted from RF signal measurements that are provided to the artificial neural network 3400. These inputs may be derived from various RF sensing modalities, including passive backscatter from RFID tags, active measurement from wireless transceivers, or other RF sensing techniques appropriate for non-invasive container monitoring. The input data 2206 may undergo preprocessing to enhance signal quality, extract relevant features, or normalize values before being fed into the neural network.

Output data 2212 represents the predictions or classifications generated by the artificial neural network 3400 based on the input RF signal features. These outputs may include quantitative measurements such as liquid level height, alcohol concentration, evaporation rate, or qualitative assessments such as leak detection, char level classification, or quality categorization. The output data 2212 provides insights into the container's internal conditions without requiring direct physical access to the container contents, enabling non-invasive monitoring for applications such as spirit aging, quality control, or regulatory compliance.

In various implementations, the artificial neural network 3400 may be trained using supervised learning techniques, where labeled datasets pair known container states with corresponding RF signal patterns. The training process adjusts the weights associated with the network's edges to minimize prediction errors, resulting in a model capable of accurately inferring container conditions from external RF measurements. The trained network may be deployed as part of a monitoring system that continuously or periodically assesses container conditions, potentially triggering alerts or control actions based on the predicted container states.

The architecture illustrated in FIG. 34 provides a framework for RF-based container monitoring that can be adapted to various container types, content compositions, and monitoring objectives. The neural network approach enables the system to learn complex relationships between RF signal characteristics and container properties, potentially extracting insights that would be difficult to model using traditional analytical methods. The flexibility of the neural network architecture allows for customization based on specific application requirements, potentially incorporating additional features or specialized network structures to enhance performance for particular container monitoring scenarios.

Referring now to FIG. 35, a distributed monitoring and analysis system 3500 is illustrated for determining one or more characteristics of a liquid 120 contained within a container 110 in accordance with at least one aspect of the present disclosure. The container 110 may be implemented as a wooden barrel, cask, or other vessel used in distillation, aging, storage, or similar environments. The distributed monitoring and analysis system 3500 integrates external RF sensor data, networked processing capabilities, machine learning analysis, data storage, and user interface functionality to provide monitoring of container contents without requiring direct access to the interior of container 110.

The container 110 includes an exterior surface 140 to which one or more RF-responsive elements 220u-220n are affixed or positioned in proximity. These RF-responsive elements 220u-220n may be arranged in an array that spans a vertical axis of the container 110, enabling spatial resolution of signal interactions corresponding to changes in the liquid level, composition, or other characteristics of the liquid 120 or surrounding environment within the container 110. The array configuration facilitates detection of the liquid-air interface and monitoring of changes at an interface over time, which may result from processes such as evaporation, absorption, or consumption.

In various implementations, the RF-responsive elements 220u-220n may comprise passive RFID tags, chipless resonators, metasurfaces, energy-harvesting reflective antennas, or other RF-interactive elements capable of reflecting or backscattering RF signals in a manner influenced by the adjacent environment. The RF-responsive elements 220u-220n may be configured to respond to specific RF frequencies or frequency ranges, potentially with distinctive resonance characteristics, phase responses, or backscatter modulation patterns. The RF-responsive elements 220u-220n may be affixed to the container surface 140 using adhesives, brackets, straps, or other attachment mechanisms that ensure stable positioning without penetrating the container wall.

A node 3518 may include one or more antenna arrays or RF interrogators positioned near the container 110. The node 3518 may be implemented as an RF reader, transceiver, or low-power IoT hub that is configured to emit RF signals toward the RF-responsive elements 220u-220n and collect reflected or backscattered responses. The node 3518 may be located proximal to the container 110, such as mounted on a nearby warehouse wall, rack, or other structure, and may include RF front-end hardware, signal processing logic, and wireless communication circuitry. In some implementations, a single node 3518 may monitor multiple containers, potentially using beamforming, scheduled polling, or other techniques to distinguish signals from different containers. In some aspects, the node 3518 may correspond to network equipment configured within a communication system, such as a 3G, 4G, or 5G communication network.

The node 3518 obtains, makes, and/or captures various RF signal measurements from the interactions between transmitted signals and the RF-responsive elements 220u-220n. These measurements may include RSSI, signal phase, CSI, resonant frequency shifts, or other electromagnetic parameters that vary based on the presence, level, or properties of the liquid 120 within the container 110. These signal characteristics may be influenced by the dielectric properties of the liquid, which in turn affect the electromagnetic coupling, impedance, or resonance of the RF-responsive elements 220u-220n.

The node 3518 may be connected to a network 3502, which may include a local area network, wireless mesh network, cellular network, or cloud-based infrastructure such as the Internet. Through the network 3502, signal measurements 3206 from one or more nodes 3518 are transmitted to various system components, enabling distributed processing and analysis. The network 3502 facilitates data transfer, command and control functions, and system integration across potentially disparate physical locations, allowing for centralized monitoring of distributed container environments.

In some aspects, the distributed monitoring and analysis system 3500 may include a machine-learning system 3504 comprising one or more models 3202. These one or more models 3202 may be implemented as neural networks, decision trees, random forests, support vector machines, or other machine learning architectures suitable for processing RF signal data to infer container conditions. The machine-learning system 3504 receives signal data 3206 from one or more sensor nodes via the network 3502 and processes this data using trained models 3202. These models analyze patterns, correlations, or other relationships within the signal data to derive insights about the internal state of the container 110.

The machine-learning models 3202 may be configured to infer one or more characteristics of the liquid contents, including but not limited to liquid fill level, alcohol concentration (expressed as percentage ABV), evaporation or seepage loss rates, char level of the barrel interior, or changes in dielectric properties associated with aging or contamination. The models may be trained using supervised learning approaches, where historical signal data is paired with known ground truth measurements of these characteristics, enabling the model to learn the relationships between RF signal patterns and physical container properties. The machine-learning system 3504 generates inference results 3312, which may be transmitted via the network 3502 to a data visualization module or other system components. These inference results 3312 represent the predictions or determinations by the distributed monitoring and analysis system 3500 regarding the monitored container characteristics, potentially including confidence levels, uncertainty estimates, or other statistical metadata to contextualize the predictions.

The distributed monitoring and analysis system 3500 may include a data storage repository 3514 for persisting raw and processed signal data. This repository may be implemented as a database, data lake, or other storage architecture suitable for handling time-series data, metadata, and analysis results. The data storage repository 3514 enables historical analysis, audit trails, and retention of measurement data for compliance, quality control, or process improvement purposes. The repository may store multiple data types, including raw signal measurements, derived metrics, container metadata (such as fill date, batch number, or contents), and system operational data. One or more remote computing devices 3512 may be connected to the network 3502, providing user access to the distributed monitoring and analysis system 3500. These devices may include desktop computers, laptops, tablets, smartphones, or specialized industrial control terminals. The remote computing devices 3512 may incorporate a graphical user interface 3522 for operator interaction, displaying metrics 3508, logs 3510, and/or other content 3520 related to container monitoring.

The user interface 3222, displayed on the remote computing devices 3512, provides visualization of monitoring data, potentially including real-time measurements, historical trend graphs, alerts, and actionable recommendations based on machine-learning output. The interface 3222 may be implemented as a web dashboard, mobile application, or desktop control panel, offering various visualization modes such as time-series plots, heatmaps, 3D representations, or tabular data. The interface may support customization, filtering, or drill-down capabilities to focus on specific containers, metrics, or time periods of interest. The metrics 3508 displayed on the user interface 3522 may include derived values such as liquid level, alcohol content, evaporation rate, temperature, or other parameters relevant to container monitoring. These metrics may be presented as current values, trend lines, or comparative analyses against reference points, target ranges, or historical norms. The metrics presentation may incorporate visual cues such as color coding, threshold indicators, or status symbols to facilitate rapid assessment of container conditions.

The logs 3510 presented on the user interface 3522 may include chronological records of system events, measurements, alerts, or user interactions. These logs may provide details on system operation, data collection timing, anomaly detection, or actions taken in response to specific conditions. The logs may support filtering, searching, or export capabilities to facilitate troubleshooting, compliance documentation, or operational review. In some implementations, the distributed monitoring and analysis system 3500 may further include a control subsystem 3516 configured to receive inference outputs and generate control signals. This subsystem establishes a feedback loop, where container monitoring data drives automated actions to maintain desired conditions or respond to detected anomalies. The control subsystem 3516 may interface with environmental management systems, production scheduling tools, or other operational technologies to implement its control functions.

Based on detected changes in temperature, alcohol content, evaporation rate, or other monitored parameters, the control subsystem 3516 may adjust heating/cooling (H/C) parameters within the distillation or aging environment. These adjustments might include activating fans, modifying warehouse dampers, opening or closing temperature valves, or triggering other environmental control mechanisms to maintain optimal conditions for product development. The heating/cooling functions may operate on individual containers or affect the ambient environment for multiple containers, potentially with zone-based control for larger storage facilities.

The distributed monitoring and analysis system 3500 architecture allows for scalable deployment across multiple containers, batch monitoring within aging warehouses, and dynamic retraining of the machine-learning model 3202 using incoming measurements and stored data. Multiple nodes 3518 may synchronize via edge computing gateways or feed into a centralized cloud analytics platform. Data may be periodically offloaded to the repository 3514 for audit, compliance, or long-term trend analysis. The distributed monitoring and analysis system 3500 provides non-invasive monitoring of container contents, preserving the integrity of aging processes while delivering valuable insights into product development, inventory management, and quality control. Through integration of RF sensing, networked communication, machine learning, and control systems, the approach enables comprehensive monitoring without requiring direct access to container contents or disruption of traditional production processes.

Referring now to FIG. 36, a process 3600 for determining one or more characteristics of a liquid or other contents stored within a container is illustrated in accordance with aspects of the present disclosure. Process 3600 represents a sequence of operations that may be performed to non-invasively monitor liquid characteristics such as level, composition, alcohol content, or other parameters using externally-mounted sensors that do not require direct contact with the monitored liquid. In some aspects, process 3600 may be executed by an integrated monitoring system similar to those described in connection with previous figures, such as the systems illustrated in FIG. 22, 32, or 35.

Process 3600 begins at block 3602, which represents an initialization or starting point for the monitoring sequence.

The start block 3602 may correspond to activation of the monitoring system, initialization of sensing hardware, or the beginning of a scheduled monitoring cycle. In some implementations, the process 3600 may initiate based on a timer, an external trigger, or a command received from a control system. The start block 3602 may also encompass preparatory operations such as self-diagnostics, calibration verification, or parameter initialization to ensure proper system operation prior to data collection.

Following initialization, the process 3600 advances to block 3604, which represents monitoring contents within a container with at least one sensor system. Block 3604 encompasses the active sensing operations wherein the monitoring system collects data regarding the container contents using one or more sensing modalities. The sensor system employed at block 3604 may include radio-frequency (RF) based sensors, such as passive or semi-passive RF-responsive elements positioned on the exterior surface of the container. These RF-responsive elements may include RFID tags, resonators, or other RF-interactive devices configured to interact with interrogating radio signals in a manner that is influenced by the adjacent internal environment. The monitoring operation at block 3604 may involve transmitting radio-frequency signals toward the container and RF-responsive elements, then capturing and analyzing the resulting reflected or backscattered signals.

In some aspects, the monitoring at block 3604 may be performed continuously, providing real-time data about container contents. In other aspects, the monitoring may occur periodically according to a predefined schedule, such as hourly, daily, or weekly measurements, to conserve power or computational resources while maintaining sufficient temporal resolution for the application requirements. The monitoring operation may involve multiple sensor types or multiple measurement modalities to capture complementary data, potentially including RSSI measurements, phase information, CSI, resonant frequency shifts, or combinations of these characteristics. The selection of specific sensing parameters and frequencies may be tailored to the particular container material, expected content characteristics, and monitoring objectives.

At block 3606, the process collects at least one data point from the at least one sensor system. This block represents the acquisition and initial processing of measurement data obtained during the monitoring operation. The collected data points may include raw signal values such as reflection amplitudes, phase shifts, or frequency responses measured at multiple locations on the container. These measurements may be taken from a plurality of RF-responsive elements arranged in a spatial pattern, such as a vertical array, to capture information about the internal container state with appropriate spatial resolution. The data collection may also include contextual information such as timestamps, environmental readings (temperature, humidity), or system configuration parameters that may affect signal interpretation.

In some implementations, data collection at block 3606 may involve filtering, normalization, or other signal conditioning operations to prepare the raw sensor readings for subsequent analysis. These operations may include noise reduction, baseline correction, or feature extraction techniques appropriate for the specific sensing modality. The collected data points may be temporarily stored in local memory, buffered for batch processing, or immediately forwarded to the analysis system depending on the implementation architecture.

The process then advances to block 3608, which represents receiving and analyzing the at least one data point using an artificial intelligence system, the artificial intelligence system comprising a machine-learning model. At this block, the collected measurement data is processed through computational algorithms designed to extract meaningful information about the container contents. The artificial intelligence system referenced in block 3608 may be implemented using various machine learning architectures, including but not limited to neural networks, support vector machines, random forests, or ensemble methods that combine multiple modeling approaches. The machine-learning model may have been previously trained using labeled datasets that pair known container states (e.g., verified liquid levels or measured alcohol contents) with corresponding RF signal patterns. This supervised learning approach enables the model to recognize patterns in the signal data that correlate with specific internal conditions, even when these patterns are complex or non-linear. The analysis performed at block 3608 may involve feature extraction from the raw signal data, transformation of these features through one or more computational layers, and ultimately the generation of predictions or classifications regarding the container contents.

In some aspects, the analysis may occur on-device, with the machine-learning model executing locally on processors integrated with or near the sensing hardware. In other aspects, the analysis may be performed remotely, with collected data transmitted to cloud servers or centralized computing infrastructure for processing. The analysis may incorporate temporal information, comparing current readings against historical data to identify trends, anomalies, or changes in the container contents over time. Additionally, the analysis may consider multiple sensor inputs simultaneously, fusing data from different sensing modalities or spatial locations to improve prediction accuracy and consistency.

Following analysis, the process 3600 proceeds to block 3610, where at least one characteristic of the contents is determined using the artificial intelligence system. This block represents the output stage of the analytical process, where specific parameters or properties of the container contents are quantified or classified based on the processed sensor data. The determined characteristics may include, but are not limited to, liquid level, alcohol by volume (ABV) concentration, temperature, color characteristics, char depth, or the presence of contaminants or anomalous conditions. The determination of these characteristics may include not only central value estimates but also confidence intervals, uncertainty metrics, or probability distributions that reflect the reliability of the inferences. For continuous parameters such as liquid level or alcohol content, the system may produce numerical values with appropriate units and precision. For categorical characteristics such as quality classifications or anomaly detection, the system may generate discrete outputs or probability scores associated with each potential classification.

In some implementations, incorp may involve comparing derived measurements against reference values, thresholds, or expected ranges to evaluate whether the container contents are developing according to expectations. The system may also calculate derivative metrics, such as evaporation rates, based on changes in primary characteristics over time. The determination process may The determination process may incorporate business logic, regulatory requirements, or quality control parameters specific to the application context, such as distillery operations, chemical storage, or food processing.

At block 3612, the process 3600 transmits the at least one determined characteristic to at least one device associated with a user. This block encompasses the communication of results from the monitoring system to individuals or systems responsible for container management, quality control, or operational decision-making. The transmission may occur through various communication channels, including wired networks, wireless protocols (Wi-Fi, Bluetooth, cellular), or specialized industrial communication standards appropriate for the operational environment. The device receiving the transmitted characteristics may include desktop computers, mobile devices, specialized industrial terminals, or automated control systems. The transmitted information may be presented through graphical user interfaces, textual reports, data visualizations, or machine-readable formats suitable for integration with other software systems. In some implementations, the transmission may trigger notifications or alerts when monitored characteristics exceed thresholds or exhibit anomalous patterns that require attention.

The format and content of the transmitted information may be tailored to the specific user role and application context. For example, production managers might receive comprehensive dashboard views with historical trends and forecasts, while maintenance personnel might receive focused alerts about specific containers requiring attention. The transmission may include not only the determined characteristics but also supporting metadata, confidence metrics, or recommended actions based on the monitoring results.

The process 3600 concludes at block 3614, which represents the completion of a single monitoring cycle. After reaching this end block, the system may return to the start block to begin another monitoring iteration, potentially with updated parameters or adjusted scheduling based on the results of the completed cycle. In continuous monitoring implementations, the end block might represent a brief reset or reconfiguration before immediately restarting the process, while in periodic monitoring scenarios, the system might enter a low-power state until the next scheduled measurement interval.

The process 3600 illustrated in FIG. 36 provides a structured approach to non-invasive monitoring of container contents using RF sensing technology and machine learning analysis. This approach enables ongoing assessment of liquid characteristics without disrupting aging processes, compromising container integrity, or requiring manual sampling, thereby supporting quality control, inventory management, and process optimization in various industrial applications.

Referring now to FIG. 37, an exemplary process 3700 for determining at least one characteristic of contents within a container using a machine-learning model is illustrated in accordance with aspects of the present disclosure. Process 3700 represents a flowchart depicting a sequence of operations that may be performed to analyze contents of a container such as, but not limited to, a barrel, cask, tank, or other vessel suitable for containing liquid, mash, solid, or other materials. The process 3700 may be implemented in conjunction with the systems described in previous figures, including but not limited to FIGS. 22, 32, and 35.

As shown in FIG. 37, the process 3700 begins at block 3702, which represents an initialization point for the monitoring sequence. Block 3702 may correspond to the activation of a monitoring system, the initialization of sensing hardware, or the beginning of a scheduled monitoring cycle. In some implementations, the process 3700 may initiate based on a timer event, an external trigger signal, or a command received from a control system. The initialization at block 3702 may encompass preparatory operations such as self-diagnostics, calibration verification, or parameter loading to ensure proper system functionality prior to data collection. Following initialization, the process 3700 advances to block 3704, wherein a sensor system acquires at least one data point associated with the contents of a container. The sensor system may comprise one or more sensing modalities capable of non-invasively detecting properties of the container contents. In some embodiments, the sensor system may include radio-frequency (RF) sensing mechanisms, wherein RF signals are transmitted toward and reflected or backscattered by passive or semi-passive RF-responsive elements affixed externally to the container. The RF-responsive elements may include, but are not limited to, RFID tags, chipless resonators, metasurfaces, or other RF-interactive structures configured to produce measurable signal variations when their electromagnetic environment changes due to variations in adjacent materials.

The data point acquired at block 3704 may comprise various signal features extracted from the RF interactions, such as RSSI values, which measure the power level of signals received after interaction with the container environment; phase measurements, which capture timing relationships between transmitted and received signals; CSI, which provides detailed frequency-domain profiles of the RF channel including amplitude and phase information across multiple subcarriers; or resonant frequency shifts, which may correlate with specific properties of the container contents. In alternative aspects, data points may be obtained from complementary sensing modalities such as optical, acoustic, thermal, or other non-invasive technologies that can detect properties of the container contents without requiring direct contact.

The acquisition of data points at block 3704 may involve multiple measurements taken from different spatial positions on the container, potentially using an array of RF-responsive elements arranged to provide information about internal content distribution. The data acquisition may also include preprocessing operations such as signal filtering, normalization, or feature extraction to enhance the signal quality and extract relevant information from the raw measurements.

At block 3706, the process 3700 continues with inputting the acquired data point into a machine-learning model by one or more processors. The machine-learning model represents a computational structure that has been trained to recognize patterns and relationships between RF signal characteristics and internal container conditions. The model may be implemented using various architectures such as neural networks, decision trees, random forests, support vector machines, or other suitable machine learning approaches. The machine-learning model may have been previously trained on historical datasets labeled with ground truth values for liquid characteristics such as fill level, alcohol concentration, evaporation loss, or compositional changes. This supervised learning approach enables the model to generalize from known examples to new, unseen data, effectively mapping signal features to internal container properties. The training process may have involved exposing the model to diverse conditions, container types, and content variations to ensure robust performance across different operational scenarios. In some implementations, the machine-learning model is executed on a local computing device, such as a microcontroller or edge processing node located near the container. This approach may reduce latency and minimize network bandwidth requirements. In other implementations, the acquired data may be transmitted to a cloud-based inference platform, which may provide greater computational resources for complex model execution or enable centralized monitoring of multiple containers. The selection between local and remote processing may depend on various factors including power availability, connectivity options, computational requirements, and monitoring frequency.

The input provided to the machine-learning model at block 3706 may include not only the current measurement data but also contextual information such as container metadata, environmental conditions, or historical measurements that provide additional context for accurate inference. The input format may be tailored to the specific model architecture, potentially requiring normalization, reshaping, or other transformations to match the expected input structure of the trained model.

At block 3708, the machine-learning model outputs, based on the input data, at least one characteristic associated with the contents of the container. This output represents the inference result, translating the measured signal features into meaningful properties of the container contents. The output may take various forms depending on the specific monitoring objectives and model design. For regression tasks, the output may include numerical predictions such as a percentage alcohol by volume (ABV), a precise liquid level measurement in centimeters or inches, a volume estimate in liters or gallons, or an evaporation rate over time. These continuous variables provide quantitative assessments of specific content properties that may be tracked over time to monitor aging processes, detect anomalies, or manage inventory. For classification tasks, the output may comprise categorical determinations such as assigning the container to predefined classes like "full," "half," or "low" for fill level assessment, or "normal" versus "abnormal" for anomaly detection. These discrete categorizations may be suitable for triggering specific operational responses based on container status. In probabilistic implementations, the output may include a probability distribution over possible states or parameter values, providing not only a central estimate but also a measure of prediction uncertainty. This approach can enable risk-aware decision-making by communicating the confidence level associated with the inference results. The output produced at block 3708 may include not only the primary characteristic of interest but also related parameters, confidence metrics, or supporting information that contextualizes the prediction. For example, along with a predicted alcohol content, the model might output a confidence interval, an estimated time to target maturation, or a comparison against historical trends.

In certain aspects, the output from block 3708 is used to trigger downstream actions within an integrated monitoring and control system. These actions may include activating environmental controls to maintain optimal aging conditions, notifying operators of containers requiring attention or rotation, scheduling maintenance activities, or logging measurements for compliance reporting, quality control, or regulatory purposes. The specific actions triggered may depend on the application context, such as distillery operations, food processing, chemical storage, or other industrial settings where non-invasive content monitoring provides operational value.

At block 3710, the process 3700 concludes. This terminal block represents the completion of a single monitoring and inference cycle. After reaching this endpoint, the system may return to block 3702 to begin another iteration, potentially with updated parameters or adjusted scheduling based on the results of the completed cycle. In continuous monitoring implementations, the process may restart immediately or after a short delay, while in periodic monitoring scenarios, the system might enter a low-power state until the next scheduled measurement interval. The process 3700 illustrated in FIG. 37 provides a streamlined approach to non-invasive monitoring of container contents using RF sensing technology coupled with machine learning inference. This approach enables ongoing assessment of content characteristics without disrupting aging processes, compromising container integrity, or requiring manual sampling, thereby supporting quality control, inventory management, and process optimization across various industrial applications.

Referring now to FIG. 38, illustrated is an exemplary aspect of a barrel monitoring system 3800 deployed in a warehouse environment 3802, which may represent a rickhouse, aging room, or other storage facility where multiple barrels 3804 are stored. The barrels 3804 are arranged on a racking structure 3806, which provides organized storage and access to the barrels 3804 during aging, fermentation, or other processes. Each barrel 3804 may be the same as or similar to container 110 described in reference to FIGS. 1-2, and may contain liquid content such as distilled spirits, wine, beer, or other fermentable liquids.

The barrel monitoring system 3800 comprises a distributed network of RF reader devices positioned throughout the monitoring environment 3802 to communicate with RF-responsive elements affixed to the barrels 3804. In the illustrated embodiment, these reader devices include a wall-mounted reader 3808 and an overhead reader 3810, both configured to emit RF interrogation signals toward the barrels 3804 and receive reflected or backscattered signals from the RF-responsive elements attached to the barrels. The wall-mounted reader 3808 represents a fixed-position RF interrogation device that may be the same as or similar to the transceiver unit 3230 described in reference to FIG. 32A, and/or the RF reader 2412 described in FIG. 24. The wall-mounted reader 3808 may include an antenna array configured to direct RF signals toward one or more rows or sections of the racking structure 3806, enabling systematic monitoring of multiple barrels simultaneously. The wall-mounted reader 3808 may implement various RF sensing technologies, including but not limited to UHF RFID, FMCW radar, or millimeter-wave sensing modalities as described in connection with FIG. 26.

The wall-mounted reader 3808 may operate continuously, providing ongoing monitoring of barrel conditions, or may activate periodically according to a predetermined schedule similar to the burst transmission patterns described in reference to FIG. 11A. The reader 3808 may include internal processing capabilities similar to processing system 210 described in FIGS. 3-4, or may function primarily as a data acquisition device that forwards collected signals to a central processing system for more comprehensive analysis. The overhead reader 3810 represents another fixed-position RF interrogation device, which may incorporate functionality similar to the node 3518 described in reference to FIG. 35. The overhead reader 3810 may provide complementary coverage to the wall-mounted reader 3808, enabling different signal angles and propagation paths that may enhance detection accuracy or provide redundancy in measurements. The overhead reader 3810 may emit downward-directed RF beams that interrogate multiple barrels across different rows or levels of the racking structure 3806, potentially with wider coverage area than the wall-mounted reader 3808.

In some implementations, the overhead reader 3810 may utilize specialized antenna configurations optimized for top-down interrogation, and may incorporate circular polarization, sectored arrays, or beam-steering capabilities similar to those described in connection with the transmit module 3232 of FIG. 32A. The overhead reader 3810 may operate in coordination with the wall-mounted reader 3808, using time-division multiplexing, frequency diversity, or other coordination mechanisms to avoid interference while maximizing coverage of the barrel monitoring environment. In some aspects, the system 3800 may further include a handheld device 3812, which may function as a portable RF reader or scanner that can be operated by personnel within the warehouse environment. The handheld device 3812 may be the same as or similar to one of the external devices 483, 485, 487, 492, 494, or 495 described in reference to FIG. 4, and/or may incorporate functionality of the remote computing devices 3512 described in reference to FIG. 35. The handheld device 3812 provides flexibility for spot-checking individual barrels, troubleshooting sensing issues, or collecting targeted measurements from specific barrels of interest.

The handheld device 3812 may include a user interface similar to the graphical user interface 3522 described in FIG. 35, displaying measurement results, barrel information, or historical data directly to the operator. The handheld device 3812 may be configured to communicate wirelessly with a central database or processing system, enabling real-time synchronization of collected data with the broader monitoring infrastructure similar to the communication functionality described for communication module 358 in FIG. 3. Each barrel 3804 in the system 3800 may include an RF-responsive element arranged in a pattern on the exterior surface of the barrel. As depicted in FIG. 38, these RF-responsive elements may be arranged in a vertical strip or array on the visible face of each barrel 3804, corresponding to elements 220*u*-220*n* as described previously in connection with FIGS. 2, 7A, 7B, and 24. These RF-responsive elements may include passive RFID tags, chipless resonators, metasurfaces, or other RF-interactive structures as described in relation to RF-responsive element 2402 of FIG. 24 and the architecture 2502 of FIG. 25.

The RF-responsive elements attached to each barrel 3804 interact with the RF signals emitted by readers 3808, 3810, and 3812, producing reflected or backscattered signals 3223 as described in reference to FIG. 32A. These RF interactions may be influenced by various factors including the liquid level within the barrel, the dielectric properties of the liquid (which may correlate with alcohol content as described in FIGS. 20A-20D and/or FIG. 29), the presence of vapor in the headspace 3222 described in FIG. 32A, and physical characteristics such as barrel wall moisture or char layer properties as depicted in FIG. 31. When the readers 3808, 3810, or 3812 receive these reflected signals, they may extract various signal features or characteristics for analysis. These features may include RSSI values, phase measurements, CSI, or resonant frequency shifts as described in reference to FIG. 26 and signal characteristics 3314 of FIG. 33.

The racking structure 3806 provides physical support and organization for the barrels 3804 within the warehouse environment 3802, and may be similar to the rack structures described in reference to FIG. 1. The operational workflow of the barrel monitoring system 3800 may involve scheduled or continuous interrogation of the RF-responsive elements by the readers 3808, 3810, with supplementary spot-checks performed using the handheld device 3812. The signal data collected from these interrogations may be transmitted to a processing system which may correspond to the machine-learning system 3504 described in reference to FIG. 35. This processing system may incorporate functionality similar to the AI-driven RF sensing system 3200 described in connection with FIG. 32A, potentially including machine learning models 3202 trained to recognize patterns in RF signal data that correlate with specific barrel conditions. The system may generate outputs including liquid level measurements, alcohol content estimates similar to those described in connection with FIG. 17, evaporation rate calculations, or alerts for anomalous conditions such as leaks or temperature excursions as discussed in relation to FIGS. 24-37. In certain implementations, the barrel monitoring system 3800 may incorporate coordination mechanisms between the various readers to prevent interference during simultaneous operation, similar to the processes described in reference to FIGS. 10-12. The system 3800 enables non-invasive monitoring of barrel contents without requiring direct access to the interior of the barrels, thereby preserving the integrity of aging processes while providing the advantages described throughout the specification.

Referring now to FIG. 39, an exemplary rickhouse or barrel-aging facility 3900 is illustrated, configured for non-invasive wireless monitoring of a plurality of containers 3904 in accordance with aspects of the present disclosure. The illustration depicts the rickhouse 3900 with a partially cutaway wall to reveal the internal arrangement of barrels 3904 stored within the facility structure 3902. The facility structure 3902 may comprise various construction materials, which may include wood, metal, concrete, composite materials, or combinations thereof, selected to maintain appropriate environmental conditions for aging processes. The facility structure 3902 may be similar to conventional configurations for storing barrels as discussed with reference to FIG. 1. In this respect, the structure 3902 serves purposes comparable to the storage environments depicted in FIGS. 1 and 9, while accommodating the external monitoring approach described in connection with FIGS. 24-38. The containers 3904, which may be implemented as barrels, casks, or other vessels suitable for storing and aging liquids, correspond functionally to containers 110 described with reference to FIGS. 1-2, 7A-7B, and 24, 32A, 32B, and 35. These containers 3904 are arranged on a multilevel racking system 3906 within the facility structure 3902. The racking system 3906 may be similar to the rack storage configurations depicted in FIGS. 1, 9, and 38, providing support for organizing multiple containers in horizontal or vertical orientations.

Each container 3904 may include one or more externally mounted RF-responsive elements 3908 attached to their exterior surfaces. These elements correspond to the RF-responsive elements 220*u*-220*n* described in FIG. 24, the RF-responsive element 2402 of FIG. 24, or may implement the architecture 2502 detailed in FIG. 25. As previously described, these elements may comprise passive RFID tags, chipless resonators, reconfigurable intelligent surfaces, or other RF-interactive structures configured to reflect, backscatter, or otherwise modulate incident RF signals in a manner influenced by the container contents.

Positioned outside the facility structure 3902 is at least one RF interrogation unit 3910. The RF interrogation unit 3910 may be the same as or similar to the RF reader 2412 described in FIG. 24, the transceiver unit 3230 described in FIG. 32A, or the node 3518 described in FIG. 35. Furthermore, the RF interrogation unit 3910 may be implemented as a gNodeB or eNodeB of a 5G or 4G wireless cellular network, leveraging existing telecommunications infrastructure for container monitoring applications as discussed in connection with the communication aspects described with respect to FIG. 24. When implemented as a gNodeB, the RF interrogation unit 3910 may utilize beamforming capabilities native to 5G infrastructure to direct focused energy toward specific regions within the facility, potentially enhancing signal penetration and measurement precision.

The signals emitted by the RF interrogation unit 3910, represented by directional arrows in FIG. 39, correspond to the RF signals 3221 described in FIG. 32A, the transmitted signal 3240 in FIG. 32B, or the interrogation signals described in connection with FIG. 24. These signals pass through structure 3902 and interact with the RF-responsive elements on containers 3904. The resulting backscattered or modulated signals, shown as arrows returning to unit 3910, correspond to the reflected signals 3223 in FIG. 32A, the reflected signal 3244 in FIG. 32B, or the reflection signal 2410 in FIG. 24. These returned signals may contain features or characteristics influenced by the internal conditions of the containers 3904, including RSSI values, phase shifts, resonant frequency variations, or CSI that correlates with specific container parameters as detailed in the signal response profiles of FIG. 26. The RF interrogation unit 3910 may operate in various configurations, including fixed installation as depicted in FIG. 39, or as a mobile unit similar to the handheld device 3812 described in FIG. 38. Data collected by RF interrogation unit 3910 may be processed by systems corresponding to the machine-learning model 3202 described in FIG. 32A, the AI-driven RF sensing system 3200 in FIG. 32A, or the machine-learning system 3504 detailed in FIG. 35. These processing systems implement algorithms similar to those described in process 3600 of FIG. 36 and process 3700 of FIG. 37 to translate RF signal characteristics into meaningful measurements of container contents.

The system depicted in FIG. 39 represents an integrated, facility-scale implementation of the monitoring approaches developed throughout the disclosure, demonstrating how the container-level technologies described in earlier figures may be deployed in a comprehensive monitoring solution for commercial aging facilities. By combining RF sensing elements, cellular or dedicated RF interrogation infrastructure, and advanced signal processing techniques, the system enables non-invasive monitoring across multiple containers without disrupting traditional aging processes or requiring physical access to individual containers.

Referring now to FIG. 40, illustrated are two examples of RF-responsive elements that may be affixed to the exterior surface of a container for non-invasively monitoring internal contents. Specifically, FIG. 40 depicts a chipless reflective tag 4002 and a semi-passive RFID tag 4008, both of which may be employed in monitoring systems described in previous figures, such as those illustrated in FIGS. 24, 25, 32, and 35. The chipless reflective tag 4002 represents a passive RF-responsive element that operates without integrated circuits or semiconductors. The tag 4002 comprises a substrate 4004 and a patterned resonator structure 4006 formed thereon. The substrate 4004 may be implemented using various materials including, but not limited to, polyethylene terephthalate (PET), polyimide, FR-4, paper, or other flexible or rigid dielectric materials suitable for supporting RF structures. The substrate 4004 provides mechanical support for the resonator structure while maintaining appropriate dielectric properties that influence the electromagnetic characteristics of the tag. In some implementations, the substrate 4004 may incorporate adhesive backing for attachment to container surfaces, or may feature mounting holes or other attachment mechanisms for securing the tag to curved or irregular container geometries.

The resonator structure 4006 represents a conductive pattern designed to interact with incident RF signals in a frequency-dependent manner. The resonator structure 4006 may be formed of conductive material such as aluminum, copper, silver, gold, or conductive inks and may be fabricated using various manufacturing techniques, including etching, printing, deposition, or laser ablation. The specific geometry of resonator structure 4006 defines its electromagnetic response characteristics, potentially incorporating designs such as split-ring resonators, spiral traces, meandered lines, patch antennas, frequency-selective surfaces, or fractal patterns. These geometries create resonant structures that preferentially reflect, absorb, or scatter RF energy at specific frequencies, with response characteristics that vary based on the dielectric environment adjacent to the tag. When attached to the exterior surface of a container, the resonator structure 4006 interacts with the container wall and internal contents, particularly at the boundary between different materials such as the liquid-air interface in a barrel. This interaction causes measurable shifts in the tag's resonant frequency, amplitude response, phase characteristics, or spectral signature. These shifts may be detected by RF reader devices similar to RF reader 2412 in FIG. 24 or transceiver unit 3230 in FIG. 32A, enabling non-invasive inference of internal container conditions.

The chipless reflective tag 4002 provides several advantages for container monitoring applications. Because it may contain minimal (e.g., or no) semiconductor components, integrated circuits, or power sources, the tag 4002 may be manufactured at a low cost when produced at scale using printing techniques for example. This cost-effectiveness enables high-density deployment across multiple containers or positions on a single container. Additionally, the absence of semiconductors or battery components makes tag 4002 highly resistant to environmental factors such as temperature extremes, humidity fluctuations, or mechanical stress, which may be present in aging warehouses or manufacturing facilities. The tag 4002 may operate effectively across wide temperature ranges from −40° C. to +85° C. or beyond, withstand repeated thermal cycling, and resist degradation from exposure to humidity or corrosive environments. The passive nature of tag 4002 also provides theoretically unlimited operational lifetime, with performance determined primarily by the physical integrity of the substrate and resonator materials rather than battery limitations. In some implementations, the resonator structure 4006 may be designed with multiple resonant elements that respond to different frequency bands, enabling multiplexed sensing of different container parameters or providing redundancy for enhanced reliability.

The semi-passive RFID tag 4008 represents a more sophisticated RF-responsive element that combines passive backscatter communication with limited active functionality. The tag 4008 includes a substrate 4010, an RF antenna structure 4012, and an embedded microchip 4014 mounted or integrated within the tag architecture. The substrate 4010 may be implemented using materials similar to those described for substrate 4004, providing mechanical support and appropriate dielectric properties for the RF components. In some implementations, the substrate 4010 may incorporate multiple layers or regions with different material properties, optimizing performance for both the antenna structure and integrated circuitry. The antenna structure 4012 serves dual purposes in the semi-passive tag architecture. First, it captures RF energy from interrogation signals transmitted by reader devices, potentially harvesting this energy to power the tag's internal circuitry. Second, it enables communication by reflecting or backscattering a portion of the incident RF signal with modulation that encodes the tag's response data. The antenna structure 4012 may be implemented in various geometries including dipole configurations, patch designs, loop structures, or specialized shapes optimized for specific operating frequencies or container geometries. The antenna design may be tuned to maximize performance at particular frequency bands such as 860-960 MHz (UHF RFID), 2.4 GHz (ISM band), or other frequencies appropriate for container monitoring applications.

The embedded microchip 4014 in tag 4008 provides computational and sensing capabilities beyond those available in the chipless tag 4002. This microchip may include several functional components: a power management circuit that rectifies and regulates harvested RF energy; a digital controller that manages operations and data processing; memory for storing configuration parameters, sensor readings, or unique identification codes; modulation circuitry for controlling backscatter communication; and potentially sensor interfaces for temperature measurement, moisture detection, or other environmental parameters. In some implementations, the microchip may incorporate an analog-to-digital converter (ADC) that measures the strength of received RF signals, enabling the tag to report this value as part of its response. The semi-passive tag 4008 may operate in various modes depending on the application requirements and available energy. In fully passive mode, it relies entirely on harvested RF energy from reader interrogations, operating only when sufficient power is available from the incident signal. In semi-passive mode, it may incorporate an energy storage element such as a capacitor or thin-film battery that accumulates harvested energy over time, enabling periodic sensor measurements or data logging even when reader signals are intermittent. The energy storage element may provide sufficient power for the tag to measure and record parameters such as temperature profiles or signal strength variations over time, creating a history of container conditions that can be retrieved during subsequent reader interrogations.

Both tag architectures 4002 and 4008 may be incorporated into the barrel monitoring systems described in connection with FIGS. 24, 32A, 38, and 39, potentially affixed to barrels 3804 and interrogated by readers 3808, 3810, or handheld device 3812. They may also be employed in the rickhouse monitoring configuration illustrated in FIG. 39, attached to containers 3904 and interrogated by RF unit 3910. When deployed across multiple positions on a container or across multiple containers in a facility, these tags enable comprehensive, non-invasive monitoring of aging or storage processes without requiring direct access to container contents. The selection between chipless tags 4002 and semi-passive tags 4008 for a particular application may depend on various factors including cost constraints, required measurement precision, environmental conditions, and monitoring frequency. In some implementations, both tag types may be deployed in complementary configurations, with chipless tags providing high-density, low-cost coverage and semi-passive tags offering enhanced functionality at specific points of interest. The data collected from these tag deployments may be processed using the machine-learning approaches described in connection with FIGS. 32-37, translating RF signal characteristics into actionable insights about container contents or conditions.

Referring now to FIG. 41, an example of an RF interrogator 4102 is illustrated in accordance with aspects of the present disclosure. The RF interrogator 4102 may be configured to transmit interrogation signals and receive backs-cattered, reflected, and/or modulated responses from RF-responsive elements positioned externally on containers to monitor internal contents. The RF interrogator 4102 may be implemented as part of a standalone reader device, a gNodeB, a Wi-Fi/IoT access point, or another suitable RF sensing system. In some aspects, the RF interrogator 4102 may correspond to or implement functionality similar to the RF reader 2412, as described with reference to FIG. 24, the transceiver unit 3230 described with reference to FIG. 32A, or the node 3518 described with reference to FIG. 35.

The RF interrogator 4102 includes an RF front-end 4104 operatively connected to an antenna path 4106. The RF front-end 4104 comprises hardware components that manage the transmission and reception of radio frequency signals. In some implementations, the RF front-end 4104 may include multiple transmit and receive chains configured to operate across various frequency bands suitable for penetrating container materials and detecting reflections from internal content boundaries. The RF front-end 4104 may incorporate power amplifiers for boosting outgoing signals to appropriate transmission power levels, low-noise amplifiers (LNAs) for enhancing weak received signals while minimizing added noise, mixers for frequency conversion between baseband and RF domains, filters for rejecting out-of-band interference, switches or duplexers for managing transmit/receive paths, and impedance matching circuitry for optimizing power transfer between components. The RF front-end 4104 may be configured to emit various RF signal types, including continuous wave carriers, frequency-modulated continuous wave (FMCW) signals, pulsed transmissions, or modulated waveforms matching specific sensing protocols. In some aspects, the RF front-end 4104 may support frequency sweeping capabilities, wherein the transmission frequency is varied across a predefined range to obtain spectral response characteristics similar to those described with reference to FIGS. 20A-20D, 29, and 31. Additionally, the RF front-end 4104 may implement beamforming techniques using phased antenna arrays to direct energy toward specific container regions or to simultaneously monitor multiple containers arranged in configurations similar to those illustrated in FIGS. 38 and 39. The RF front-end 4104 may further incorporate phase modulation or manipulation capabilities to enhance sensing accuracy or to support advanced modulation schemes for tag communication.

The antenna path 4106 represents the signal path connecting the RF front-end 4104 to one or more external antennas. This path may comprise transmission lines, connectors, impedance matching networks, or other components that facilitate efficient signal transfer between the RF front-end 4104 and the antenna system. In some implementations, the antenna path 4106 may support multiple antenna connections to enable spatial diversity, MIMO (Multiple-Input Multiple-Output) operations, or beamforming capabilities. The antenna path 4106 may be configured with appropriate isolation and filtering to minimize interference between transmit and receive functions, particularly in continuous-wave backscatter sensing applications.

The RF interrogator 4102 further includes control logic 4108 operatively coupled to the RF front-end 4104. The control logic 4108 may be implemented using digital logic circuits, microcontrollers, field-programmable gate arrays (FPGAs), or application-specific integrated circuits (ASICs) configured to manage the operational parameters of the RF front-end 4104. The control logic 4108 generates timing signals, configures frequency settings, establishes power levels, and coordinates transmit/receive switching to implement specific interrogation protocols. In some aspects, the control logic 4108 may manage duty cycling for power conservation, particularly in battery-powered implementations similar to the power management techniques described with reference to FIGS. 11A-11C. The control logic 4108 may direct the RF front-end 4104 to issue specific frequency bands, modulation patterns, or beam steering configurations optimized for different container materials, content types, or deployment scenarios. For example, when monitoring wooden barrels, the control logic 4108 may select frequencies and power levels appropriate for penetrating oak staves while maximizing reflection from liquid interfaces, as described in connection with the systems of FIGS. 24 and 32.

A set of processor(s) 4110 may be communicatively coupled to the control logic 4108 and configured to perform signal processing, feature extraction, and inference operations. The processor(s) 4110 may be implemented using general-purpose microprocessors, digital signal processors (DSPs), or specialized machine learning processors tailored for RF signal analysis. In some implementations, the processor(s) 4110 may incorporate multiple processing cores or heterogeneous computing architectures to balance performance requirements with power constraints. The processor(s) 4110 may execute algorithms that extract various signal parameters from the received backscattered or reflected signals. These parameters may include RSSI, which measures the power level of received signals as described in connection with FIG. 26; phase angles or phase shifts between transmitted and received signals that may indicate propagation changes due to dielectric boundaries; CSI, which provides detailed frequency-domain profiles of the RF channel including amplitude and phase information across multiple subcarriers; or resonant frequency shifts that correlate with specific properties of container contents as illustrated in FIGS. 29 and 31. Using these extracted signal features, the processor(s) 4110 may implement inference algorithms to estimate physical characteristics within monitored containers. For example, the processor(s) 4110 may determine liquid level based on the transition patterns in RSSI or phase responses across vertically arranged RF-responsive elements, as described with reference to FIGS. 27 and 28. The processor(s) 4110 may estimate alcohol content percentages based on frequency response patterns similar to those illustrated in FIG. 29, or detect anomalous conditions such as leakage using signal signatures similar to those depicted in FIG. 30.

In some implementations, the processor(s) 4110 may execute machine learning models similar to those described with reference to FIGS. 33 and 34, transforming raw signal measurements into actionable insights about container contents. These models may implement neural networks, decision trees, support vector machines, or other machine learning architectures trained to recognize patterns corresponding to specific container states or content properties.

The RF interrogator 4102 further includes memory 4112 coupled to the processor(s) 4110. The memory 4112 may comprise various storage technologies including volatile memory (such as SRAM or DRAM), non-volatile memory (such as Flash, EEPROM, or MRAM), or combinations thereof arranged to provide appropriate capacity and performance characteristics for the application. The memory 4112 may store firmware that defines the operational behavior of the RF interrogator 4102, signal-processing algorithms that implement feature extraction or filtering operations, threshold parameters that define decision boundaries for classification or alerting, or trained machine-learning models that map signal features to container properties. Additionally, the memory 4112 may store reference data that aids in signal interpretation or system calibration. This data may include tag lookup tables that associate tag identifiers with spatial positions or expected responses, historical response curves that establish baselines for comparison, or environmental calibration data that compensates for temperature, humidity, or other ambient factors affecting RF propagation. In some implementations, the memory 4112 may maintain logs of measurement history, enabling trend analysis or anomaly detection based on deviations from established patterns as described with reference to FIGS. 27 and 28.

A communication interface 4114 is provided to enable the RF interrogator 4102 to exchange data with external systems via a communication path 4116. The communication interface 4114 serves as a bridge between the RF sensing domain and broader monitoring or control infrastructure, translating internal data representations into standardized communication protocols. The communication interface 4114 may implement wired connectivity options such as Ethernet, USB, RS-485, or CAN bus; wireless protocols such as Wi-Fi, Bluetooth, ZigBee, or LoRa; or cellular standards such as 5G NR, NB-IoT, or LTE-M, selected based on deployment requirements for range, bandwidth, and power consumption. Through the communication interface 4114, the RF interrogator 4102 may transmit various data types to external systems. This data may include raw or processed signal features extracted from RF interactions, inference results derived from local processing (such as estimated liquid levels or alcohol content), tag identifiers for inventory tracking, or environmental metadata providing context for measurements. The communication interface 4114 may support bidirectional communication, allowing the RF interrogator 4102 to receive configuration updates, adjust operational parameters, or download updated machine learning models from remote management systems.

The communication path 4116 represents the physical or wireless connection between the communication interface 4114 and external systems. This path may be implemented using various technologies depending on the deployment scenario, from direct cable connections in fixed installations to wireless links in mobile or distributed sensing applications. The communication path 4116 may connect the RF interrogator 4102 to monitoring dashboards, databases, control systems, or distributed processing infrastructure as depicted in the system architecture of FIG. 35.

The architecture of RF interrogator 4102 supports both active and passive tag interrogation methods. For passive tag interrogation, the RF front-end 4104 may emit continuous carrier waves and detect modulated backscatter from tags that reflect the incident energy with characteristic variations based on their electromagnetic environment. For active or semi-passive tag communication, the RF interrogator 4102 may implement more complex bidirectional protocols, potentially with dedicated time slots for tag responses or specific modulation schemes optimized for reliable data exchange. The RF interrogator 4102 may be configured to scan arrays of RF-responsive elements similar to those described with reference to FIGS. 2, 7A, 7B, and 24. When these elements are placed on container surfaces such as barrel staves, variations in their response characteristics may indicate dielectric transitions between air and liquid portions within the container. By analyzing these variations across multiple elements or frequencies, the RF interrogator 4102 can detect liquid levels, monitor evaporation rates, or assess compositional changes without requiring direct access to container contents.

The modular design of RF interrogator 4102 enables flexible deployment across various monitoring scenarios. The system may be implemented in warehouse-scale deployments monitoring multiple containers simultaneously, as illustrated in FIGS. 38 and 39; in edge installations providing focused coverage for specific container arrangements; or in handheld devices similar to device 3812 in FIG. 38 for mobile inspection or troubleshooting operations. The RF interrogator 4102 may also be integrated with broader monitoring and control infrastructure, feeding data into distributed analysis systems like those depicted in FIG. 35 to support comprehensive container management across large facilities.

FIG. 42 illustrates an example of a wireless communication node 4202 configured to implement RF-based environmental sensing capabilities within a cellular infrastructure. The wireless communication node 4202 may represent a 5G base station (gNodeB) or similar wireless access point that combines conventional wireless communication functionality with specialized RF sensing capabilities directed toward non-invasive monitoring of container contents as described in previous embodiments. The wireless communication node 4202 may include at least one antenna 4204 configured to transmit and receive radio frequency signals. The antenna 4204 may comprise a single radiating element or, more commonly in cellular implementations, may represent a portion of a larger antenna array capable of directional transmission and reception. The antenna 4204 enables bidirectional wireless communication between the node 4202 and various wireless devices, while also facilitating specialized sensing operations when directed toward RF-responsive elements positioned on containers similar to those described in connection with FIGS. 24-41.

The wireless communication node 4202 may further include an antenna array and RF front end 4206 coupled to the antenna 4204. The antenna array and RF front end 4206 may correspond functionally to the transceiver unit 3230 described with reference to FIG. 32A and/or the RF reader 2412 described with reference to FIG. 24. The antenna array portion of block 4206 may comprise multiple radiating elements arranged in a predefined spatial configuration to support MIMO operations and beamforming capabilities. These capabilities enable the wireless communication node 4202 to direct focused RF energy toward specific spatial regions, which may contain RF-responsive elements affixed to containers as described in previous embodiments. The beamforming functionality allows for enhanced signal penetration through challenging materials like wooden barrel staves or metal-reinforced containers, potentially improving sensing accuracy compared to omnidirectional transmission approaches.

The RF front end portion of block 4206 incorporates various signal conditioning and routing components that manage the conversion between digital baseband signals and analog RF waveforms suitable for wireless transmission. These components may include power amplifiers that boost outgoing signals to appropriate transmission levels; low-noise amplifiers (LNAs) that enhance the reception of weak reflected signals while minimizing noise contribution; mixers that perform frequency conversion between baseband and RF domains; filters that selectively pass desired frequency components while suppressing unwanted signals; duplexers or switches that enable time-division or frequency-division sharing of antenna resources between transmit and receive functions; and impedance matching networks that optimize power transfer between system components. The RF front end 4206 may be configured to operate across multiple frequency bands, potentially including sub-6 GHz bands commonly used in cellular deployments as well as specialized bands optimized for container sensing applications.

Connected to the antenna array and RF front end 4206 is a sensor interrogation module 4208, which represents a functional block dedicated to RF-based environmental sensing operations. The sensor interrogation module 4208 may correspond functionally to the machine-learning system 3504 described with reference to FIG. 35 and/or the AI-driven RF sensing system 3200 described with reference to FIG. 32A. The sensor interrogation module 4208 is configured to generate interrogation signals suitable for probing RF-responsive elements positioned on containers, direct these signals through the antenna array and RF front end 4206, receive reflected or backscattered responses, and extract meaningful information from these responses.

The sensor interrogation module 4208 may implement various sensing modalities as described in previous embodiments, including passive backscatter detection from RFID tags or chipless resonators, active interrogation of semi-passive sensing elements, or direct radar-based monitoring of liquid-air interfaces within containers. The sensor interrogation module 4208 may generate waveforms optimized for sensing applications, such as frequency-modulated continuous wave (FMCW) signals, ultra-wideband pulses, or frequency-swept interrogation signals that provide enhanced spectral information about the monitored environment. The sensor interrogation module 4208 may analyze various signal features extracted from the reflected or backscattered responses, including RSSI values as described in connection with FIG. 27, phase information as detailed in FIG. 28, CSI metrics, or resonant frequency characteristics similar to those illustrated in FIGS. 29-31. Based on these signal features, the sensor interrogation module 4208 may perform direct inference of container properties, such as determining liquid level, estimating alcohol content, detecting seepage events, or monitoring evaporation rates as described throughout previous embodiments. Alternatively, the module may extract and format signal features for transmission to external processing systems via the backhaul/core interface 4212, potentially leveraging one or more other machine learning models or centralized analytics platforms for enhanced inference accuracy. The sensor interrogation module 4208 may operate independently from the wireless communication functions of the node 4202 or may coordinate with these functions to share resources or minimize potential interference.

The wireless communication node 4202 further includes an RF transceiver 4210 connected to the antenna array and RF front end 4206. The RF transceiver 4210 performs the conventional wireless communication functions of the node, managing the modulation and demodulation of signals according to applicable wireless standards such as 5G NR, LTE, or Wi-Fi. The RF transceiver 4210 may implement various modulation schemes, channel coding techniques, and multiple access methodologies appropriate for the wireless communication standard being supported. The transceiver may further manage frequency hopping, power control, timing synchronization, and other protocol-specific requirements for robust wireless communication.

While the RF transceiver 4210 and sensor interrogation module 4208 are depicted as separate functional blocks, they may share certain hardware resources through the antenna array and RF front end 4206. This resource sharing may be implemented through time-division multiplexing, frequency-division multiplexing, or other coordination mechanisms that enable both communication and sensing functions to operate effectively without mutual interference. The transceiver 4210 may be designed to support multiple simultaneous communication sessions with various user equipment devices while the sensor interrogation module 4208 periodically performs sensing operations, potentially leveraging idle resources during low traffic periods.

A backhaul/core interface 4212 is provided within the wireless communication node 4202, facilitating connectivity between the node and broader network infrastructure. The backhaul/core interface 4212 manages the transmission and reception of data between the wireless communication node 4202 and other network elements, such as a cellular core network, cloud computing resources, or centralized management systems. The interface supports both control plane signaling for node management and user plane data for content delivery, enabling integrated operation of the communication and sensing functions.

The backhaul/core interface 4212 may implement various physical connectivity options, such as fiber optic links, microwave backhaul, or wired Ethernet connections, based on deployment requirements and available infrastructure. The interface may support standardized protocols such as GTP-U. SCTP, or IP-based communication, enabling seamless integration with existing network elements. Through this interface, the wireless communication node 4202 can transmit sensing data, inference results, or extracted signal features to external processing systems, management platforms, or application servers that leverage this information for inventory tracking, quality control, regulatory compliance, or other operational purposes related to container monitoring.

In some deployment scenarios, the wireless communication node 4202 may connect to an external backhaul/core interface 4214, which provides additional connectivity options or interface capabilities beyond those integrated directly within the node. The external backhaul/core interface 4214 may represent a separate physical device or network element that extends the connectivity options available to the wireless communication node 4202, potentially providing additional protocol support, routing capabilities, or security features. The external interface 4214 may be deployed in network architectures that implement functional splits between radio and baseband processing, such as Centralized RAN (C-RAN) configurations where baseband processing occurs at centralized locations separate from radio transmission sites.

The configuration illustrated in FIG. 42 enables dual-use operation of cellular infrastructure, leveraging existing or planned wireless communication deployments for enhanced environmental sensing capabilities. By integrating the sensor interrogation module 4208 within the wireless communication node 4202, the system can provide both conventional wireless connectivity services and specialized container monitoring functions without requiring separate dedicated sensing infrastructure. This integration may be particularly valuable in environments such as distillery warehouses, chemical storage facilities, or production environments where both wireless connectivity and non-invasive container monitoring are desired.

The wireless communication node 4202 may utilize standardized wireless spectrum for both communication and sensing operations, potentially reducing deployment costs compared to dedicated sensing systems operating in specialized frequency bands. In some implementations, the node 4202 may dedicate specific time or frequency resources to sensing operations, ensuring that these functions do not interfere with critical communication services while maintaining adequate monitoring coverage and update frequency. The beamforming capabilities of the antenna array enable directed interrogation of specific container regions, potentially enhancing sensing precision or enabling selective monitoring of containers arranged in dense configurations similar to those illustrated in FIGS. 38 and 39.

The device disclosed, while discussed with regard to a barrel or container associated with alcohol production, it would be recognized that the system and processing disclosed, herein, is applicable to other configurations, such as septic tank, waste management systems, water towers, or other similar type containers that are used to retain one or more content that may be a liquid, a mash and/or a solid (and combination thereof) to determine a level of the contained content, whether liquid, mash or solid within the configuration.

For example, the invention disclosed may determine a level of a solid content within a septic tank, wherein the system comprises at least one transmitting antenna positioned on a face (or the lid) of the septic tank, the transmitting antenna configured to transmit into the tank a frequency modulated signal, wherein a starting frequency and a modulation of the signal is selected based on the material within the tank; and at least one receiving antenna configured to receive return signals corresponding to the transmitted frequency modulated signal, wherein the return signals are received within a time window associated with a corresponding transmitted signal, determining from a time of the received return signal with respect to the corresponding transmitted signal, a distance from the at least one transmitting antenna to the fill level of the solid content; and provide an indication of the fill level to at least one monitoring system, the monitoring system being one of: local to the system and remote from the system.

In still another example, the invention disclosed may monitor content within a container by transmitting signal downwardly into a container from a source positioned external to the container, a least one signal into the container, wherein the frequency of the at least one signal varies over time, determining a time of reception of a response with respect to the transmission, wherein the response is received within an expected time window after a time of transmission of a corresponding transmitted signal, determining a distance to at least one content within the container generating the based on the time of the return; and provide an indication of a level of fill of at least one of the at least one content within the container.

In one aspect of the invention, the frequency of transmission of each of the at least one signal is based, in part, of the content within the container, wherein a starting frequency of each of the at least one transmitted signal is based, in part, on the expected content with the container.

In one aspect of the invention, the variation of the frequency of the at least one transmitted signal is based, in part, on the expected content of the container, wherein the variation of frequency transmission is one of: continuous and patterned.

In one aspect of the invention, the transmission of the signal into the container may be arranged substantially perpendicular to a face of the container or transmitted at an angle to the expected content. In one aspect of the invention, an alarm may be triggered when a steepness of the angle of transmission falls below a known threshold.

In one aspect of the invention, providing an indication of a level of fill comprises transmitting the fill level to one of: a locally monitored memory storage device and to a remote location, wherein the transmission is through one of: a wired connection and a wireless connection.

In still another example, the invention disclosed may determine a level of at least one content within a container, wherein the system comprises at least one transmitting antenna and at least one receiving antenna positioned both of which may be positioned jointly or separately on a face of the barrel, wherein each of the at least one transmitting antenna is configured to transmit a signal in at least one frequency range with at least frequency variation during the transmission, each of the at least one receiving antenna configured to receive a corresponding response to the transmitted signal and a processing system comprising a processor and a memory containing therein processor readable instruction, which when accessed by the processor cause the processor to instruct each of the transmitting antenna to transmit the at least one signal, receive from a selected one of the plurality of receiving antenna a response from the transmitted at least one signal, wherein the response is received within an expected time window; determine a level of at least one content with the container; and provide an indication of the determined level for each of the at least one content within the container.

In accordance with at least one aspect of the present disclosure, a method for measuring changes in a fluid stored within a container is described. In some aspects, the method may include: generating, by a radio-frequency sensing element, a signal indicative of at least one dielectric property associated with a fluid stored within a container, the fluid being subject to at least one of a composition-based or an environment-driven change resulting from interactions with the container; and generating an output representative of at least one time-varying fluid characteristic of the fluid.

In some aspects, the method comprises: receiving the signal from the radio-frequency sensing element at a plurality of measurement intervals; and analyzing changes in the signal across the plurality of measurement intervals to detect at least one fermentation parameter of the fluid that changes over time.

In some aspects, the method comprises: storing, in a memory device, signals received across the plurality of measurement intervals; detecting a threshold change in the at least one fermentation parameter; and providing a notification when the threshold change is reached.

In some aspects, the method comprises: measuring, via an environmental sensor proximate to the container, at least one of temperature or humidity; and adjusting the at least one time-varying fluid characteristic based on the at least one of temperature or humidity.

In some aspects, the method comprises: inputting, to a machine-learning model, the signal indicative of the at least one dielectric property; and receiving, from the machine-learning model, data representing the at least one time-varying fluid characteristic of the fluid.

In some aspects of the method, the at least one time-varying fluid characteristic comprises at least one of a fluid level or a fluid volume.

In some aspects, a system for measuring changes of a fluid stored within a container is described. In some aspects, the system may include: a radio-frequency sensing element disposed externally on a container, the radio-frequency sensing element configured to generate a signal indicative of at least one dielectric property associated with a fluid stored within the container, the fluid being subject to at least one of a composition-based or an environment-driven change resulting from interactions with the container; and a processing component to generate an output representative of at least one time-varying fluid characteristic of the fluid based on the signal from the radio-frequency sensing element.

In some aspects, the container comprises a wooden barrel having an interior surface configured to impart at least one of a flavor or a chemical change to the fluid.

In some aspects, the fluid is a beverage comprising at least one of a wine, beer, or distilled spirits, and the at least one time-varying fluid characteristic of the fluid includes at least one fermentation parameter that changes over time.

In some aspects, the processing component is further to receive the output from the radio-frequency sensing element at a plurality of measurement intervals.

In some aspects, the processing component is further to: store each output received across multiple measurement intervals in a memory device, analyze each output to detect a threshold change in the at least one fermentation parameter, and provide a notification when the threshold change is reached.

In some aspects, the radio-frequency sensing element includes an antenna array adhered to an external surface of the container.

In some aspects, the processing component is further to: obtain at least two output signals per measurement interval, each output signal of the at least two output signals corresponding to a different sub-band within a frequency range; and obtain the at least one time-varying fluid characteristic based on a combination of at least two output signals.

In some aspects, to generate the signal indicative of the at least one dielectric property associated with the fluid stored within the container comprises to receive a radio-frequency interrogation signal and generate the signal based on the radio-frequency interrogation signal.

In some aspects of the system, the system further comprises an environmental sensor configured to measure at least one of temperature or humidity proximate to the container, wherein the processing component is configured to adjust the at least one time-varying fluid characteristic for ambient conditions based on data from the environmental sensor.

In some aspects, the processing component is configured to vary a measurement interval based on a rate of change in the at least one dielectric property.

In some aspects, to generate the output representative of the at least one time-varying fluid characteristic of the fluid comprises to: input the signal indicative of the at least one dielectric property of the fluid stored within the container into a machine-learning model; and output, by the machine-learning model, based on the input, data representative of the at least one time-varying fluid characteristic of the fluid.

In some aspects, the machine-learning model is trained on training data comprising a plurality of data points associated with one or more fluids, and wherein the machine-learning model is trained to predict, based on the training data, one or more time-varying fluid characteristics associated with one or more fluids.

In some aspects, the at least one time-varying fluid characteristic of the fluid includes at least one of fluid level or fluid volume.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A system comprising:
   a radio-frequency sensor disposed on an external surface of a wooden barrel having an interior surface configured to impart at least one of a flavor change or a chemical change to a fluid stored within the wooden barrel, the sensor being configured to generate a plurality of response signals corresponding to multiple frequencies within a frequency range, the plurality of response signals being indicative of at least one dielectric characteristic of the fluid; and
   at least one processor to:
      at multiple measurement intervals during storage of the fluid within the wooden barrel, analyze the plurality of response signals to generate an output representative of at least one time-varying fluid characteristic of the fluid, wherein the at least one time-varying fluid characteristic includes at least one aging parameter that changes during storage;
      store outputs from the multiple measurement intervals in a memory device;
      evaluate the stored outputs to determine when the at least one aging parameter satisfies a threshold; and
      trigger a notification when the threshold is satisfied.

2. The system of claim 1, wherein the fluid comprises at least one of a wine, beer, or spirit.

3. The system of claim 1, wherein the radio-frequency sensor comprises an antenna array having multiple antenna elements positioned at different locations on the external surface of the wooden barrel.

4. The system of claim 1, wherein the radio-frequency sensor is configured to receive radio-frequency interrogation signals and generate the plurality of response signals in response to the radio-frequency interrogation signals.

5. The system of claim 1, further comprising an environmental sensor configured to measure at least one of temperature or humidity proximate to the wooden barrel, wherein the at least one processor is to adjust the at least one aging parameter based on data from the environmental sensor.

6. The system of claim 1, wherein to analyze the plurality of response signals and generate the output comprises to:
   input the plurality of response signals into a machine-learning model; and
   output, by the machine-learning model, data representative of the at least one aging parameter.

7. The system of claim 6, wherein the machine-learning model is trained on training data comprising response signals from fluids at known stages of aging within wooden barrels.

8. The system of claim 1, wherein the at least one aging parameter comprises at least one of:
   an alcohol by volume percentage;
   a concentration of wood extractive compounds;
   a color intensity value;
   an evaporation rate; or
   an angel's share loss rate.

9. The system of claim 1, wherein the at least one processor is to predict, based on the stored outputs, a future time when the at least one aging parameter will satisfy the threshold.

10. The system of claim 1, wherein the radio-frequency sensor comprises a passive RFID tag that modulates backscattered signals based on the at least one dielectric characteristic of the fluid.

11. A system comprising:
    a radio-frequency sensor disposed on an external surface of a wooden barrel having an interior surface configured to impart at least one of a flavor change or a chemical change to a fluid stored within the wooden barrel, the radio-frequency sensor being configured to generate a plurality of response signals corresponding to multiple frequencies within a frequency range, the plurality of response signals being indicative of at least one electromagnetic characteristic of the fluid, wherein the fluid comprises at least one of a wine, beer, or spirit; and
    at least one processor to:
       at multiple measurement intervals during storage of the fluid within the wooden barrel, analyze the plurality of response signals to generate an output representative of at least one time-varying fluid characteristic of the fluid, wherein the at least one time-varying fluid characteristic includes at least one aging parameter that changes during storage;
       store outputs from the multiple measurement intervals in a memory device;
       evaluate the stored outputs to determine when the at least one aging parameter satisfies a threshold; and
       trigger a notification when the threshold is satisfied.

12. The system of claim 11, wherein the radio-frequency sensor comprises an antenna array having multiple antenna elements positioned at different locations on the external surface of the wooden barrel.

13. The system of claim 11, wherein the radio-frequency sensor is configured to receive radio-frequency interrogation signals and generate the plurality of response signals in response to the radio-frequency interrogation signals.

14. The system of claim 11, further comprising an environmental sensor configured to measure at least one of temperature or humidity proximate to the wooden barrel, wherein the at least one processor is to adjust the at least one aging parameter based on data from the environmental sensor.

15. The system of claim 11, wherein to analyze the plurality of response signals and generate the output comprises to:
    input the plurality of response signals into a machine-learning model; and
    output, by the machine-learning model, data representative of the at least one aging parameter.

16. The system of claim 11, wherein the at least one aging parameter comprises at least one of:
    an alcohol by volume percentage;
    a concentration of wood extractive compounds;
    a color intensity value;
    an evaporation rate; or
    an angel's share loss rate.

17. The system of claim 11, wherein the at least one processor is to predict, based on the stored outputs, a future time when the at least one aging parameter will satisfy the threshold.

18. The system of claim 11, wherein the radio-frequency sensor comprises a passive RFID tag that modulates back-scattered signals based on the at least one electromagnetic characteristic of the fluid.

19. The system of claim 11, wherein the at least one electromagnetic characteristic comprises at least one of a dielectric property, a conductive property, or a magnetic property of the fluid.

20. A system for measuring changes of a fluid stored within a container, comprising:

a radio-frequency sensor including an antenna array adhered to an external surface of a container, the radio-frequency sensor being configured to generate response signals indicative of at least one dielectric characteristic of the fluid, the fluid being subject to at least one of a composition-based or an environment-driven change resulting from interactions with the container; and at least one processor to:

receive at least two response signals per measurement interval from the radio-frequency sensor, each response signal corresponding to a different sub-band within a frequency range; and generate an output representative of at least one time-varying fluid characteristic of the fluid based on a combination of the at least two response signals.

21. The system of claim 20, wherein the fluid comprises at least one of a wine, beer, or spirit.

22. The system of claim 20, wherein the radio-frequency sensor comprises an antenna array having multiple antenna elements positioned at different locations on the external surface of the container.

23. The system of claim 20, wherein the radio-frequency sensor is configured to receive radio-frequency interrogation signals and generate the response signals in response to the radio-frequency interrogation signals.

24. The system of claim 20, wherein the at least one time-varying fluid characteristic includes at least one aging parameter that changes during storage, wherein the at least one processor is further to:

determine when the at least one aging parameter satisfies a threshold; and trigger a notification when the threshold is satisfied.

25. The system of claim 24, wherein the at least one aging parameter comprises at least one of:

an alcohol by volume percentage;

a concentration of wood extractive compounds;

a color intensity value;

an evaporation rate; or an angel's share loss rate.

26. The system of claim 24, further comprising an environmental sensor configured to measure at least one of temperature or humidity proximate to the container, wherein the at least one processor is to adjust the at least one aging parameter based on data from the environmental sensor.

27. The system of claim 20, wherein to generate an output comprises to:

input the at least two response signals into a machine-learning model; and output, by the machine-learning model, data representative of the at least one time-varying fluid characteristic of the fluid.

28. The system of claim 27, wherein the machine-learning model is trained on training data comprising response signals from fluids at known stages of aging within containers.

29. The system of claim 20, wherein the radio-frequency sensor comprises a passive RFID tag that modulates back-scattered signals based on the at least one dielectric characteristic of the fluid.

\* \* \* \* \*